United States Patent
Roberts et al.

(10) Patent No.: US 10,124,367 B2
(45) Date of Patent: *Nov. 13, 2018

(54) METHODS FOR ARRANGING NANOSCOPIC ELEMENTS WITHIN NETWORKS, FABRICS AND FILMS

(71) Applicant: Nantero inc., Woburn, MA (US)

(72) Inventors: David A. Roberts, Woburn, MA (US); Hao-Yu Lin, Winchester, MA (US); Thomas R. Bengtson, Derry, NH (US); Thomas Rueckes, Byfield, MA (US); Karl Robinson, Beaverton, OR (US); H. Montgomery Manning, Eagle, ID (US); Rahul Sen, Lexington, MA (US); Michel Pires Monteiro, Athol, MA (US)

(73) Assignee: Nantero, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/241,495

(22) Filed: Aug. 19, 2016

(65) Prior Publication Data

US 2017/0072431 A1    Mar. 16, 2017

Related U.S. Application Data

(63) Continuation of application No. 13/076,152, filed on Mar. 30, 2011, now Pat. No. 9,422,651, which is a
(Continued)

(51) Int. Cl.
*B05D 1/40* (2006.01)
*D04H 1/4382* (2012.01)
(Continued)

(52) U.S. Cl.
CPC .............. *B05D 1/40* (2013.01); *B05D 1/005* (2013.01); *B05D 1/02* (2013.01); *B05D 1/18* (2013.01);
(Continued)

(58) Field of Classification Search
CPC ........................................................ B05D 1/40
See application file for complete search history.

(56) References Cited

U.S. PATENT DOCUMENTS 6,057,637 A    5/2000    Zettl
6,277,318 B1   8/2001    Bower
(Continued)

FOREIGN PATENT DOCUMENTS

EP    1 612 586    1/2006
GB    2364933      2/2002
(Continued)

OTHER PUBLICATIONS

Ago, et al., "Workfunction of Purified and Oxidized Carbon Nanotubes," Synthetic Metals, vol. 103, 1999, pp. 2494-2495.
(Continued)

*Primary Examiner* — Larry W Thrower
(74) *Attorney, Agent, or Firm* — Nantero, Inc.

(57) ABSTRACT

A method for arranging nanotube elements within nanotube fabric layers and films is disclosed. A directional force is applied over a nanotube fabric layer to render the fabric layer into an ordered network of nanotube elements. That is, a network of nanotube elements drawn together along their sidewalls and substantially oriented in a uniform direction. In some embodiments this directional force is applied by rolling a cylindrical element over the fabric layer. In other embodiments this directional force is applied by passing a rubbing material over the surface of a nanotube fabric layer. In other embodiments this directional force is applied by running a polishing material over the nanotube fabric layer for a predetermined time. Exemplary rolling, rubbing, and polishing apparatuses are also disclosed.

27 Claims, 93 Drawing Sheets

Related U.S. Application Data continuation-in-part of application No. 12/945,501, filed on Nov. 12, 2010, now Pat. No. 9,574,290.

(60) Provisional application No. 61/449,784, filed on Mar. 7, 2011, provisional application No. 61/350,263, filed on Jun. 1, 2010, provisional application No. 61/319,034, filed on Mar. 30, 2010.

(51) Int. Cl.
| | |
|---|---|
| *B82Y 30/00* | (2011.01) |
| *B82Y 40/00* | (2011.01) |
| *D04H 1/4242* | (2012.01) |
| *D04H 1/4391* | (2012.01) |
| *D04H 1/74* | (2006.01) |
| *B05D 1/00* | (2006.01) |
| *B05D 1/02* | (2006.01) |
| *B05D 1/18* | (2006.01) |
| *B05D 1/28* | (2006.01) |
| *B05D 1/32* | (2006.01) |
| *C01B 32/168* | (2017.01) |

(52) U.S. Cl.
CPC ............. *B05D 1/28* (2013.01); *B05D 1/32* (2013.01); *B82Y 30/00* (2013.01); *B82Y 40/00* (2013.01); *C01B 32/168* (2017.08); *D04H 1/4242* (2013.01); *D04H 1/4382* (2013.01); *D04H 1/4391* (2013.01); *D04H 1/74* (2013.01)

(56) References Cited

U.S. PATENT DOCUMENTS

| | | |
|---|---|---|
| 6,319,102 B1 | 11/2001 | Luo |
| 6,342,276 B1 | 1/2002 | You |
| 6,409,567 B1 | 6/2002 | Amey, Jr. et al. |
| 6,423,583 B1 | 7/2002 | Avouris et al. |
| 6,495,116 B1 | 12/2002 | Herman |
| 6,495,258 B1 | 12/2002 | Chen et al. |
| 6,515,339 B2 | 2/2003 | Shin et al. |
| 6,528,020 B1 | 3/2003 | Dai et al. |
| 6,531,828 B2 | 3/2003 | Yaniv et al. |
| 6,616,495 B1 | 9/2003 | Tusboi |
| 6,630,772 B1 | 10/2003 | Bower et al. |
| 6,645,628 B2 | 11/2003 | Shiffler, Jr. et al. |
| 6,706,402 B2 | 3/2004 | Rueckes et al. |
| 6,707,098 B2 | 3/2004 | Hofmann et al. |
| 6,808,746 B1 | 10/2004 | Dai et al. |
| 6,833,558 B2 | 12/2004 | Lee et al. |
| 6,835,591 B2 | 12/2004 | Rueckes et al. |
| 6,858,197 B1 | 2/2005 | Delzeit |
| 6,863,942 B2 | 3/2005 | Ren et al. |
| 6,888,773 B2 | 5/2005 | Morimoto |
| 6,890,780 B2 | 5/2005 | Lee |
| 6,893,328 B2 | 5/2005 | So |
| 6,899,945 B2 | 5/2005 | Smalley et al. |
| 6,905,892 B2 | 6/2005 | Esmark |
| 6,918,284 B2 | 7/2005 | Snow et al. |
| 6,919,592 B2 | 7/2005 | Segal et al. |
| 6,919,740 B2 | 7/2005 | Snider |
| 6,921,575 B2 | 7/2005 | Horiuchi et al. |
| 6,924,538 B2 | 8/2005 | Jaiprakash et al. |
| 6,946,410 B2 | 9/2005 | French et al. |
| 7,057,402 B2 | 6/2006 | Cole et al. |
| 7,065,857 B2 | 6/2006 | Watanabe et al. |
| 7,067,328 B2 | 6/2006 | Dubrow et al. |
| 7,259,410 B2 | 8/2007 | Jaiprakash et al. |
| 7,335,395 B2 | 2/2008 | Ward et al. |
| 7,365,632 B2 | 4/2008 | Berlin et al. |
| 7,375,369 B2 | 5/2008 | Sen et al. |
| 7,567,414 B2 | 7/2009 | Bertin et al. |
| 7,641,885 B2 | 1/2010 | Liu |
| 2001/0004979 A1 | 6/2001 | Han et al. |
| 2002/0022429 A1 | 2/2002 | Yaniv et al. |
| 2002/0160111 A1 | 10/2002 | Sun et al. |
| 2002/0185770 A1 | 12/2002 | McKague |
| 2003/0004058 A1 | 1/2003 | Li et al. |
| 2003/0122111 A1 | 7/2003 | Glatkowski |
| 2003/0177450 A1 | 9/2003 | Nugent |
| 2003/0200521 A1 | 10/2003 | DeHon et al. |
| 2004/0005723 A1 | 1/2004 | Empedocles et al. |
| 2004/0007528 A1 | 1/2004 | Bakajin et al. |
| 2004/0023253 A1 | 2/2004 | Kunwar et al. |
| 2004/0031975 A1 | 2/2004 | Kern et al. |
| 2004/0041154 A1 | 3/2004 | Watanabe et al. |
| 2004/0043527 A1 | 3/2004 | Bradley et al. |
| 2004/0070326 A1 | 4/2004 | Mao et al. |
| 2004/0071949 A1 | 4/2004 | Glatkowski et al. |
| 2004/0099438 A1 | 5/2004 | Arthur et al. |
| 2004/0104129 A1 | 6/2004 | Gu et al. |
| 2004/0132070 A1 | 7/2004 | Star et al. |
| 2004/0181630 A1 | 9/2004 | Jaiprakash et al. |
| 2004/0253167 A1 | 12/2004 | Silva et al. |
| 2004/0265550 A1 | 12/2004 | Glatkowski et al. |
| 2004/0266106 A1 | 12/2004 | Lee |
| 2005/0053525 A1 | 3/2005 | Segal et al. |
| 2005/0079659 A1 | 4/2005 | Duan et al. |
| 2005/0095938 A1 | 5/2005 | Rosenberger et al. |
| 2005/0118839 A1 | 6/2005 | Chen |
| 2005/0212014 A1 | 9/2005 | Horibe et al. |
| 2006/0237537 A1 | 10/2006 | Empedocles |
| 2007/0004191 A1 | 1/2007 | Gu et al. |
| 2008/0143906 A1 | 6/2008 | Allemand et al. |
| 2008/0234424 A1 | 9/2008 | Lee |
| 2009/0052029 A1 | 2/2009 | Dai et al. |
| 2010/0055385 A1 | 3/2010 | Shim et al. |
| 2010/0104808 A1 | 4/2010 | Fan et al. |
| 2010/0227155 A1 | 9/2010 | Bao et al. |
| 2011/0262772 A1 | 10/2011 | Hauge et al. |

FOREIGN PATENT DOCUMENTS

| | | |
|---|---|---|
| JP | 2001035362 | 7/1999 |
| JP | 2000203821 | 7/2000 |
| JP | 2004090208 | 3/2004 |
| JP | 2008166754 | 7/2008 |
| WO | WO-1998/39250 | 9/1998 |
| WO | WO-1999/65821 | 12/1999 |
| WO | WO-2001/03208 | 1/2001 |
| WO | WO-2002/45113 | 6/2002 |
| WO | WO-2002/48701 | 6/2002 |
| WO | WO-2003/016901 | 2/2003 |
| WO | WO-2003/034142 | 4/2003 |
| WO | WO-2008/054541 | 5/2008 |
| WO | WO-2010/014107 | 2/2010 |
| WO | WO-2010/095140 | 8/2010 |

OTHER PUBLICATIONS

Ajayan, et al., "Applications of Carbon Nanotubes," Topics Appl. Phys., vol. 80, 2001, pp. 391-425.

Amblard, G., "Development and characterization of carbon nanotube processes for NRAM technology," Proc. of SPIE 2011, vol. 7970, pp. 797017-1-797017-7.

Awano, Y., "Graphene for VLSI: FET and Interconnect Applications," IEDM 2009 Technical Digest, pp. 10.1.1-10.1.4.

Banerjee, et al., "Functionalization of Carbon Nanotubes with a Metal-Containing Molecular Complex," Nano Letters, vol. 2, No. 1, 2002, pp. 49-53.

Berhan, et al., "Mechanical Properties of Nanotube Sheets: Alterations in Joint Morphology and Achievable Moduli in Manufacturable Materials," J. Appl. Phys., vol. 95, No. 8, Apr. 2004, pp. 4335-4345.

Bonard, et al., "Monodisperse Multiwall Carbon Nanotubes Obtained with Ferritin as Catalyst," Nano Letters, vol. 2, No. 6, 2002, pp. 665-667.

Brock, et al., "Carbon Nanotube Memories and Fabrics in a Radiation Hard Semiconductor Foundry," 2005 IEEE Conference, 9 pgs.

Brown, K. M., "System in package "The Rebirth of SIP"," 2004 IEEE Custom Integrated Circuits, May 2004, 6 pgs.

(56) References Cited

OTHER PUBLICATIONS

Cassell, et al., "Large Scale CVD Synthesis of Single-Walled Carbon Nanotubes," J. Phys. Chem. B, vol. 103, 1999, pp. 6484-6492.
Chen, et al., "Heterogeneous Single-Walled Carbon Nanotube Catalyst Discovery and Optimization," Chem. Mater., vol. 14, 2002, pp. 1891-1896.
Cheng, H.M., "Large-Scale and Low-Cost Synthesis of Single-Walled Carbon Nanotubes by the Catalytic Pyrolysis of Hydrocarbons," Appl. Phys. Ltrs., vol. 72, No. 25, Jun. 1998, pp. 3282-3284.
Chiang, et al., "Purification and Characterization of Single-Wall Carbon Nanotubes (SWNTs) Obtained from the Gas-Phase Decomposition of CO (HiPco Process)," J. Phys. Chem. B, vol. 105, 2001, pp. 8297-8301.
Crowley, et al., "512 Mb PROM with 8 layers of antifuse/Diode cells," IEEE International Solid-State Circuits Conference, vol. XLVI, Feb. 2003, pp. 284-285.
Cui, et al., "Carbon Nanotube Memory Devices of High Charge," Applied Phys. Ltrs., vol. 81, No. 17, Oct. 2002, pp. 3260-3262.
Dai, et al., "Controlled Chemical Routes to Nanotube Architectures, Physics, and Devices," J. Phys. Chem. B, vol. 103, 1999, pp. 11246-11255.
de Heer, et al., "Aligned Carbon Nanotube Films: Production and Optical and Electronic Properties," Science, 286, 1995, pp. 845-847.
Delzeit, et al., "Multilayered Metal Catalysts for Controlling the Density of Single-Walled Carbon Nanotube Growth," Chem. Phys. Ltrs., vol. 348, 2001, pp. 368-374.
Desai, et al., "Freestanding Carbon Nanotube Specimen Fabrication," Proceeding 2005 $5^{th}$ IEEE Conference on Nanotechnology, Nagoya, Japan, Jul. 2005, 4 pgs.
Engel, et al., "Thin Film Nanotube Transistors Based on Self-Assembled, Aligned, Semiconducting Carbon Nanotube Arrays," ACS Nano, 2008, vol. 2, No. 12, pp. 2445-2452.
Engel, et al., "Supporting Information: Thin Film Nanotube Transistors Based on Self-Assembled, Aligned, Semiconducting Carbon Nanotube Arrays.".
European Search Report, European Patent Application No. 11763387, dated Oct. 16, 2013, 2 pgs.
Franklin, et al., "An Enhanced CVD Approach to Extensive Nanotube Networks with Directionality," Adv. Mater., vol. 12, No. 12, 2000, pp. 890-894.
Fuhrer, et al., "High-Mobility Nanotube Transistor Memory," Nano Letters, vol. 2, No. 7, 2002, pp. 755-759.
Guo, et al., "Mechanical and Electrostatic Properties of Carbon Nanotubes Under Tensile Loading and Electric Field," Journal of Physics D: Applied Physics, 2003, 36, pp. 805-811.
Haddon, et al., "Purification and Separation of Carbon Nanotubes," MRS Bulletin, Apr. 2004, pp. 252-259 (www.mrs.org/publications/bulletins).
Hafner, et al., "Catalytic Growth of Single-Wall Carbon Nanotubes from Metal Particles," Chem. Phys. Ltrs., vol. 296, 1998, pp. 195-202.
Homma, et al., "Single-Walled Carbon Nanotube Growth on Silicon Substrates Using Nanoparticle Catalysts," Jpn, J. Appl. Phys., vol. 41, 2002, pp. L89-L91.
Huai, Y., "Spin-Transfet Torque MRAM (STT-MTAM): Challenges and Prospects," AAPS Bulletin, vol. 18, No. 6, Dec. 2008, pp. 33-40.
International Search Report, International Patent Application No. PCT/US05/18467 dated Oct. 1, 2007, 5 pgs.
International Search Report, International Patent Application No. PCT/US05/18539 dated Sep. 18, 2006, 4 pgs.
International Search Report, International Patent Application No. PCT/US05/45316 dated Sep. 6, 2005, 2 pgs.
International Search Report, International Patent Application No. PCT/US11/030578 dated May 27, 2011, 2 pgs.
Jeong, et al., "A Purification Method of Single-Wall Carbon Nanotubes Using H2S and 02 Mixture Gas," Chem. Phys. Ltrs., vol. 344, Aug. 2001, pp. 18-22.
Jiang, et al., "Performance Breakthrough in 8nm Gate-All-Around Length Gate-All Around Nanowire Transistors using Metallic Nanowire Contacts," 2008 Symposium on VLSI Technology Digest of Technical Papers, pp. 34-35.
Joselevich, et al., "Vectorial Growth of Metallic and Semiconducting Single-Wall Carbon Nanotubes," Nano Letters, vol. 0, No. 0, A-E, 2002.
Kahn, et al., "Solubilization of Oxidized Single-Walled Carbon Nanotube in Organic and Aqueous Solvents through Organic Derivatization," Nano Letters, vol. 2, No. 11, 2002, pp. 1215-1218.
Kianian, et al., "A 3D Stackable Carbon Nanotube-based Nonvolatile Memory (NRAM)," ESSDERC, Nantero, Inc., Jun. 14, 2010, 4 pgs.
Kim et al., "Density Control of Self-Aligned Shortened Single-Wall Carbon Nanotubes on Polyelectrolyte-Coated Substrates," Colloids and Surfaces A, Physiochem. Eng. Aspects, 266, 2005, pp. 91-96.
Kim et al, "Highly Aligned Scalable Platinum-Decorated Single-Wall Carbon Nanotube Arrays for Nanoscale Electrical Interconnects," ACSNano, vol. 3, No. 9, 2009, pp. 2818-2826.
Kong, et al., "Chemical Vapor Deposition of Methane for Single-Walled Carbon Nanotubes," Chem. Phys. Ltrs., vol. 292, Aug. 1998, pp. 567-574.
Kong, et al., "Nanotube Molecular Wires as Chemical Sensors," Science, vol. 287, Jan. 2000, pp. 622-625.
Li, et al., "Carbon Nanotube Nanoelectrode Array for Ultrasensitive Dna Detection," Nano Letters, vol. 3, No. 5, 2003, pp. 597-602.
Li, et al., "Growth of Single-Walled Carbon Nanotubes from Discrete Catalytic Nanoparticles of Various Sizes," J. Phys. Chem. B, vol. 105, 2001, pp. 11424-11431.
Li, et al., "Preparation of Monodispersed Fe—Mo Nanoparticles as the Catalyst for CVD Synthesis of Carbon Nanotubes," Chem. Mater., vol. 13, 2001, pp. 1008-1014.
Ma, et al., "Alignment and Dispersion of Functionalized Carbon Nanotubes in Polymer Composites Induced by an Electric Field," Carbon 46, 4, 2008, pp. 706-710.
Merkulov, et al., "Alignment Mechanism of Carbon Nanotubes Produced by Plasma-Enhanced Chemical Vapor Deposition," App. Phys. Ltrs., vol. 79, No. 18, 2001, pp. 2970-2972.
Nerushev, et al., "Carbon Nanotube Films Obtained by Thermal Chemical Vapour Deposition," J. Mater. Chem., vol. 11, 2001, pp. 1122-1132.
Niu, et al., "High Power Electrochemical Capacitors Based on Carbon Nanotube Electrodes," Appl. Phys. Ltrs., vol. 70, No. 11, Mar. 1997, pp. 1480-1482.
Novak, et al., "Nerve Agent Using Networks of Single-Walled Carbon Nanotubes," Appl. Phys. Ltr, vol. 83, No. 19, Nov. 2003, pp. 4026-4028.
Onoa, et al., "Bulk Production of Singly Dispersed Carbon Nanotubes with Prescribed Lengths," Nanotechnology, vol. 16, 2005, pp. 2799-2803.
Padgett, et al., "Influence of Chemisorption on the Thermal Conductivity of Single-Wall Carbon Nanotubes," Nano Letters, 2004, vol. 4, No. 6, pp. 1051-1053.
Parikh, et al., "Flexible Vapour Sensors Using Single Walled Carbon Nanotubes," Sensors and Actuators B, vol. 113, 2006, pp. 55-63.
Peigney, et al., "A Study of the Formation of Single- and Double-Walled Carbon Nanotubes by a CVD Method," J. Phys. Chem. B, vol. 105, 2001, pp. 9699-9710.
Pint, et al., "Synthesis of High Aspect-Ratio Carbon Nanotube "Flying Carpets" from Nanostructured Flake Substrates," Nano Letters, 2008, vol. 8, No. 7, pp. 1879-1883.
Qi, et al., "Toward Large Arrays of Multiplex Functionalized Carbon Nanotube Sensors for Highly Sensitive and Selective Molecular Detection," Nano Letters, vol. 3, No. 3, 2003, pp. 347-351.
Rosendale, et al., "A 4 Megabit Carbon Nanotube-based Nonvolatile Memory (NRAM)," ESSCIRC 2010 Proceedings, pp. 478-481.
Rueckes, et al., "Carbon Nanotube-Based Nonvolatile Random Access Memory for Molecular Computing," Science, 2000, vol. 289, pp. 94-97.
Servalli, G., "A 45nm Generation Phase Change Memory Technology," IEDM 2009 Technical Digest, pp. 5.7.1-5.7.4.

(56) References Cited

OTHER PUBLICATIONS

Shelimov, et al., "Purification of Single-Wall Carbon Nanotubes by Electronically Assisted Filtration," Chem. Phys. Ltrs., vol. 282, 1998, pp. 429-434.

Smith, et al., "Contamination Control and Pilot Manufacturing of Commercial Grade Carbon Nanotube Colloidal Formulations," 2013 SEMI Advanced Semiconductor Manufacturing Conference (ASMC 2013), 5 pages.

Snow, et al., "Random Networks of Carbon Nanotubes as an Electronic Material," App. Phys. Ltrs., vol. 82, No. 13, Mar. 2003, pp. 2145-2147.

Sotiropoulou, et al., "Carbon Nanotube Array-Based Biosensor," Anal Bioanal Chem, vol. 375, 2003, pp. 103-105.

Star, et al., "Nanoelectronic Carbon Dioxide Sensors," Adv. Mater., vol. 16, No. 22, 2004, pp. 2049-2052.

Star, et al., "Nanotube Optoelectronic Memory Devices," Nano Letters, vol. 4, No. 9, 2004, pp. 1587-1591.

Tawfick, et al., "Flexible High-Conductivity Carbon Nanotube Interconnects Made by Rolling and Printing," Small (Weinheiman der Bergstrasse, Germany) 2009, pp. 1-7.

Valentini, et al., "Sensors for sub-ppm NO2 Gas Detection Based on Carbon Nanotube Thin Films," Appl. Phys. Ltrs., vol. 82, No. 6, Feb. 2003, pp. 961-963.

Ward, et al., "A Non-Volatile Nanoelectromechanical Memory Element Utilizing a Fabric of Carbon Nanotubes," IEEE 2004, pp. 34-38.

Wu, Yihong, "Effects of Localized Electric Field on the Growth of Carbon Nanowalls," Nano Letters, 2002, vol. 2, No. 4, pp. 355-359.

Zhang, et al., "Metal Coating on Suspended Carbon Nanotubes and its Implications to Metal-tube Interaction," Chem. Phys. Ltrs., vol. 331, 2000, pp. 35-41.

Zhang, et al., "Select Pathways to Carbon Nanotube Film Growth," Adv. Mater., vol. 13, No. 23, Dec. 2001, pp. 1767-1770.

Zhang, et al., "Formation of Metal Nanowires on Suspended Single-Walled Carbon Nanotubes," Appl. Phys. Ltrs., vol. 77, No. 19, Nov. 2000, pp. 3015-3017.

Zhao, et al., "Frequency-Dependent Electrical Transport in Carbon Nanotubes," Phys. Review B, vol. 64, 2001, pp. 201402-1-201402-4.

Zhou, et al., "p-Channel, n-Channel Thin Film Transistors and p-n Diodes Based on Single Wall Carbon Nanotube Networks," Nano Letters, vol. 4, No. 10, 2004, pp. 2031-2035.

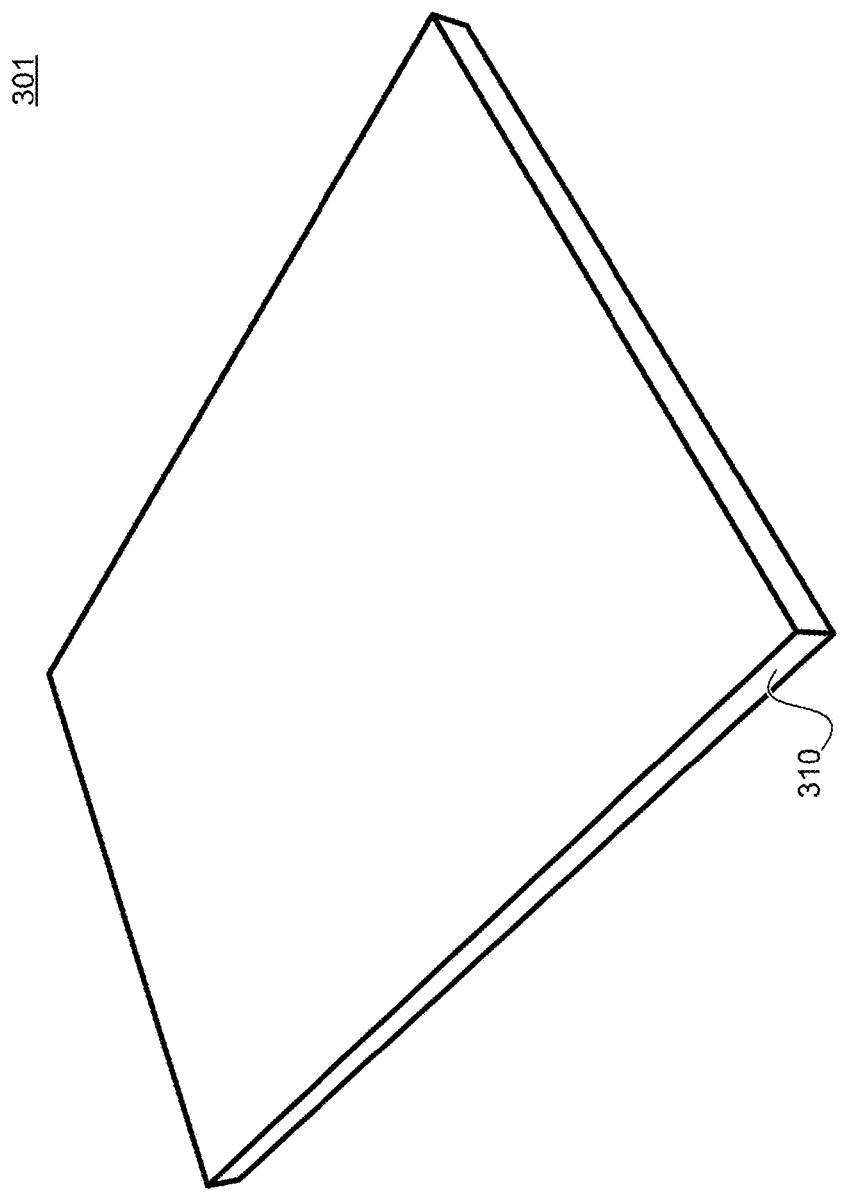

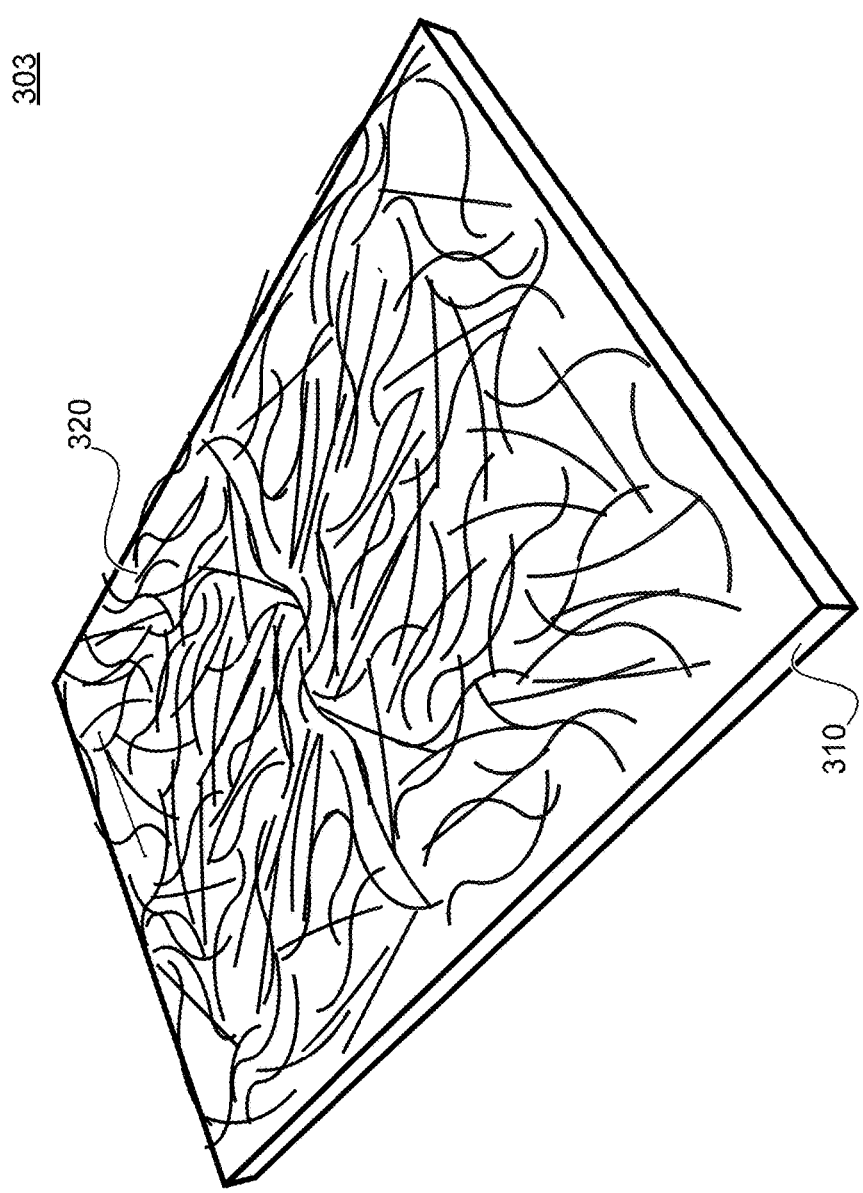

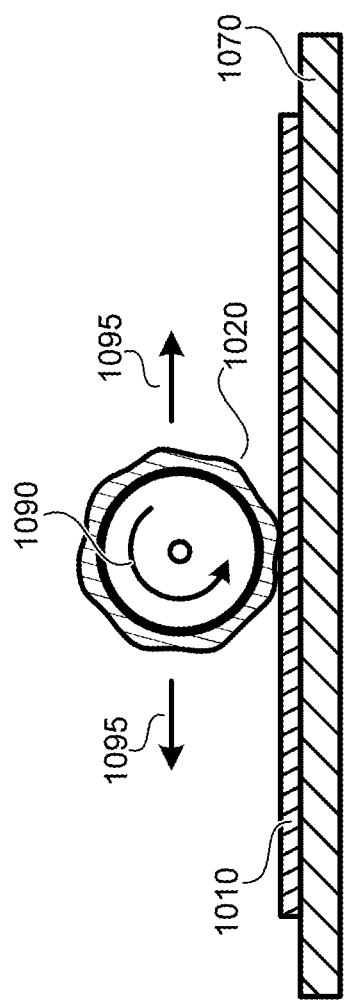

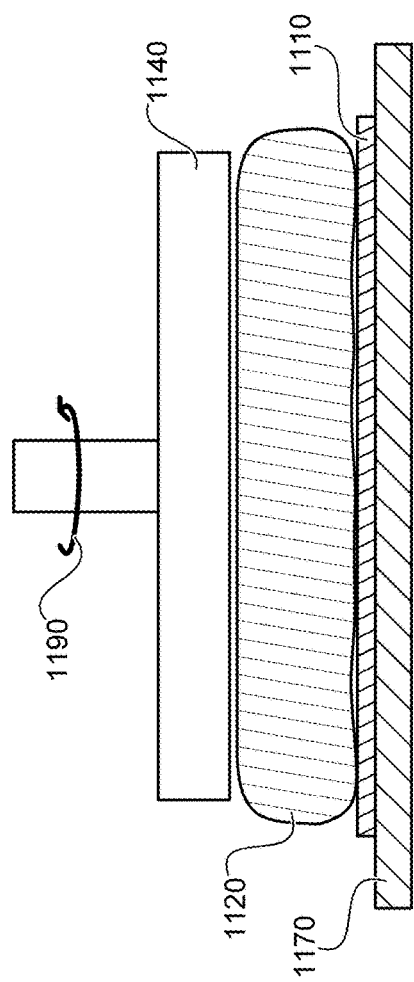

METHODS FOR ARRANGING NANOSCOPIC ELEMENTS WITHIN NETWORKS, FABRICS AND FILMS

CROSS-REFERENCE TO RELATED APPLICATION

This application is a continuation of and claims priority under 35 U.S.C. § 120 to U.S. patent application Ser. No. 13/076,152, entitled "Methods For Arranging Nanoscopic Elements Within Networks, Fabrics, And Films," the contents of which are incorporated herein in their entirety by reference, which is a continuation-in-part of and claims priority under 35 U.S.C. § 120 to U.S. patent application Ser. No. 12/945,501, filed on Nov. 12, 2010, entitled "Methods for Arranging Nanotube Elements within Nanotube Fabrics and Films," the contents of which are incorporated herein in their entirety by reference, which claims priority under 35 U.S.C. § 119(e) to U.S. Provisional Patent Application Ser. No. 61/319,034, filed on Mar. 30, 2010, entitled "Methods for Reducing Gaps and Voids within Nanotube Layers and Films" and U.S. Provisional Patent Application Ser. No. 61/350,263, filed on Jun. 1, 2010, entitled "Methods for Reducing Gaps and Voids within Nanotube Layers and Films," the contents of which are incorporated herein in their entirety by reference.

This application further claims priority under 35 U.S.C. § 119(e) to the following provisional applications, the contents of which are incorporated herein in their entirety by reference:

U.S. Provisional Patent Application Ser. No. 61/449,784 filed on Mar. 7, 2011, entitled "Methods for Arranging Nanotube Elements within Nanotube Fabrics and Films;"

U.S. Provisional Patent Application Ser. No. 61/350,263, filed on Jun. 1, 2010, entitled "Methods for Reducing Gaps and Voids within Nanotube Layers and Films;" and U.S. Provisional Patent Application Ser. No. 61/319,034, filed on Mar. 30, 2010, entitled "Methods for Reducing Gaps and Voids within Nanotube Layers and Films."

This application is related to the following U.S. patents, which are assigned to the assignee of the present application, and are hereby incorporated by reference in their entirety:

U.S. Pat. No. 6,835,591, filed on Apr. 23, 2002, entitled METHODS OF NANOTUBE FILMS AND ARTICLES;

U.S. Pat. No. 7,335,395, filed on Jan. 13, 2003, entitled Methods of Using Pre-Formed Nanotubes to Make Carbon Nanotube Films, Layers, Fabrics, Ribbons, Elements, and Articles;

U.S. Pat. No. 7,259,410, filed on Feb. 11, 2004, entitled Devices Having Horizontally-Disposed Nanofabric Articles and Methods of Making the Same;

U.S. Pat. No. 6,924,538, filed on Feb. 11, 2004, entitled Devices Having Vertically-Disposed Nanofabric Articles and Methods of Making Same;

U.S. Pat. No. 7,375,369, filed on Jun. 3, 2004, entitled Spin-Coatable Liquid for Formation of High Purity Nanotube Films;

U.S. Pat. No. 7,365,632, filed on Sep. 20, 2005, entitled RESISTIVE ELEMENTS USING CARBON NANOTUBES; and U.S. Pat. No. 7,567,414, filed on Nov. 2, 2005, entitled NANOTUBE ESD PROTECTIVE DEVICES AND CORRESPONDING NONVOLATILE AND VOLATILE NANOTUBE SWITCHES.

This application is related to the following patent applications, which are assigned to the assignee of the application, and are hereby incorporated by reference in their entirety.

U.S. patent application Ser. No. 10/341,005, filed on Jan. 13, 2003, entitled Methods of Making Carbon Nanotube Films, Layers, Fabrics, Ribbons, Elements, and Articles;

U.S. patent application Ser. No. 10/860,332, filed on Jun. 3, 2004, entitled HIGH PURITY NANOTUBE FABRICS AND FILMS;

U.S. patent application Ser. No. 11/304,315, filed on Dec. 15, 2005, entitled Aqueous Carbon Nanotube applicator Liquids and Methods for Producing Applicator Liquids Thereof;

U.S. patent application Ser. No. 12/533,687, filed on Jul. 31, 2009, entitled Anisotropic Nanotube Fabric Layers and Films and Methods of Forming Same; and U.S. Patent App. No. 61/304,045, filed on Feb. 12, 2010, entitled METHODS FOR CONTROLLING DENSITY, POROSITY, AND/OR GAP SIZE WITHIN NANOTUBE FABRIC LAYERS AND FILMS.

BACKGROUND

Technical Field

The present disclosure relates generally to nanotube fabric layers and films and, more specifically, to methods for arranging nanotube elements within nanotube fabric layers and films via the application of a directional force.

Discussion of Related Art

Any discussion of the related art throughout this specification should in no way be considered as an admission that such art is widely known or forms part of the common general knowledge in the field.

Nanotube fabric layers and films are used in a plurality of electronic structures, and devices. For example, U.S. patent application Ser. No. 11/835,856 to Bertin et al., incorporated herein by reference in its entirety, teaches methods of using nanotube fabric layers to realize nonvolatile devices such as, but not limited to, block switches, programmable resistive elements, and programmable logic devices. U.S. Pat. No. 7,365,632 to Bertin et al., incorporated herein by reference, teaches the use of such fabric layers and films within the fabrication of thin film nanotube based resistors. U.S. patent application Ser. No. 12/066,063 to Ward et al., incorporated herein by reference in its entirety, teaches the use of such nanotube fabrics and films to form heat transfer elements within electronic devices and systems.

Through a variety of previously known techniques (described in more detail within the incorporated references) nanotube elements can be rendered conducting, non-conducting, or semi-conducting before or after the formation of a nanotube fabric layer or film, allowing such nanotube fabric layers and films to serve a plurality of functions within an electronic device or system. Further, in some cases the electrical conductivity of a nanotube fabric layer or film can be adjusted between two or more non-volatile states as taught in U.S. patent application Ser. No. 11/280,786 to Bertin et al., incorporated herein by reference in its entirety, allowing for such nanotube fabric layers and films to be used as memory or logic elements within an electronic system.

U.S. Pat. No. 7,334,395 to Ward et al., incorporated herein by reference in its entirety, teaches a plurality of methods for forming nanotube fabric layers and films on a substrate element using preformed nanotubes. The methods include, but are not limited to, spin coating (wherein a solution of nanotubes is deposited on a substrate which is then spun to evenly distribute said solution across the surface of said substrate), spray coating (wherein a plurality of nanotube are suspended within an aerosol solution which is then dispersed over a substrate), and dip coating (wherein a plurality of nanotubes are suspended in a solution and a substrate element is lowered into the solution and then removed). Further, U.S. Pat. No. 7,375,369 to Sen et al., incorporated herein by reference in its entirety, and U.S. patent application Ser. No. 11/304,315 to Ghenciu et al., incorporated herein by reference in its entirety, teach nanotube solutions well suited for forming a nanotube fabric layer over a substrate element via a spin coating process.

While there exist a number of previously known techniques for moving and orienting individual nanotube elements—atomic force microscopy probes, for example, the use of which is well known by those skilled in the art for adjusting the position of single nanotube elements in laboratory experiments and the like—there is a growing need within the current state of the art to arrange relatively large scale films and fabrics of nanotube elements for larger scale, commercial applications. For example, as the physical dimensions of nanotube fabric based electronic devices scale below twenty nanometers, there is a growing need to develop denser nanotube fabrics. That is, to form nanotube fabrics in such a way as to limit the size of—or, in some cases, substantially eliminate—gaps and voids between individual nanotube elements. In another example, within certain applications—such as, but not limited to, nanotube fabric based field effect devices, nanotube fabric based photovoltaic devices, and nanotube fabric based sensors—there is a need for nanotube fabric layers that exhibit relatively uniform physical and electrical properties. Within such applications the orientation of nanotube elements relative to each other within a film can significantly affect the overall electrical parameters of the film (such as, but not limited to, charge mobility, sheet resistance, and capacitance).

Small scale nanotube arrangement techniques (such as, but not limited to, atomic force microscopy) are typically limited to adjusting the position of a very small number of nanotubes at a time, and then typically only in the micron range. Further such laboratory based methods are not scalable or easily adapted to any large scale, commercial application. As such, such methods are not practical for the arrangement of nanotube elements in large scale films and fabrics.

A number of previously known techniques for orienting nanotube elements within a relatively large scale film involve subjecting a dispersion of nanotube elements to an electrical or mechanical field as the dispersion is deposited over a substrate layer. For example, Ma et al. ("Alignment and Dispersion of Functionalized Carbon Nanotubes in Polymer Composites Induced by an Electric Field," *Carbon* 46(4):706-710 (2008)) teaches an alignment process for nanotube elements which includes applying an electrical field to a quantity of functionalized multi-walled carbon nanotubes suspended in a polymeric composite. Under the effect of the field, the functionalized nanotube will oriented themselves within the polymeric composite into a substantially uniform orientation. In another example, Merkulov et al. ("Alignment Mechanism of Carbon Nanofibers Produced by Plasma-Enhanced Chemical Vapor Deposition," *Applied Physics Letters* 79:2970 (2001)) teaches a method for directing the growth of carbon nanofibers by applying an electric field during a CVD growth process. In this way, nanotube growth will tend to follow the electric field lines.

Some other previously known techniques for orienting nanotube elements within a film involve applying a mechanical force to compress vertically grown (within respect to the plane of an underlying substrate) nanotube elements into a film of substantially parallel nanotubes. For example, de Heer, et al. (Aligned Carbon Nanotube Films: Production and Optical and Electronic Properties" *Science* 268(5212):845-847 (1995)) teaches a method of using a Teflon or aluminum pad to compress a vertically oriented distribution of nanotube elements into a film of essentially aligned nanotube elements. Similarly, Tawfick et al. ("Flexible High-Conductivity Carbon-Nanotube Interconnects Made by Rolling and Printing" *Small* (Weinheiman der Bergstrasse, Germany) (2009)) teaches a method of using a roller element to pack down a distribution of vertically grown nanotube elements into a substantially aligned horizontal film.

While these related techniques do not require a mobilizing fluid vehicle (as in the methods taught by Ma and Merkulov), they do require a distribution of vertically grown nanotubes. The fabrication and use of such vertical films grown in situ can be limiting within certain applications. For example, the growth of vertical nanotube films typically requires special operation conditions (such as, but not limited to, high temperatures, certain regents, and high gas pressures), which can be undesirable or otherwise inconvenient within certain semiconductor manufacturing operations. Such conditions may be incompatible with certain substrate materials, for example. Further, the catalysts used to grow nanotubes are typically metals or metalloids, materials which can be difficult to remove within high purity applications. Further, in situ growth of films limit the ability to form blends of nanotube formulations—for example, combinations of semiconducting and metallic nanotubes, single walled and multi walled nanotubes, or nanotubes mixed with other materials like buckyballs, silica, or other material particles. Further still, the roughness of vertically grown films is dictated by the density and uniformity of the vertical tubes as grown without additional liquid processing to enhance tube association. Such limitations within the growth of vertical nanotube films reduce their effectiveness and limit their applicability in large scale, commercial applications.

While these and other similar previously known methods provide some means of aligning or otherwise orienting nanotube elements, they are limited in that they require either wet suspensions of nanotube elements or nanotube elements grown in vertical orientations. Within many applications, these limitations will substantially limit the effectiveness of these techniques in commercial applications. Further, these previously known techniques will tend to limit the orientation of the aligned nanotube elements along a single direction. As such, there is a need for an efficient and relatively uncomplicated method of arranging nanotube elements within a dry nanotube fabric (for example, a nanotube fabric formed by spin coating a nanotube application solution over a substrate). Further, there is a need for a method of arranging nanotube elements within a nanotube fabric according to a preselected orientation (which may include nanotube arrangement along multiple directions).

SUMMARY

The current disclosure relates to methods for arranging nanotube elements within nanotube fabric layers and films via the application of a directional force.

In particular, the present disclosure provides a method for arranging nanoscopic elements within a network. The method comprises first providing a network of nanoscopic elements disposed over a material layer. The method further comprises applying a directional force to at least a portion of the network of nanoscopic elements to arrange at least a portion of the nanoscopic elements into an ordered network.

According to one aspect of the present disclosure a networks of nanoscopic elements include nanotube fabrics.

According to another aspect of the present disclosure nanoscopic elements include carbon nanotubes, nanowires, and mixtures thereof.

According to another aspect of the present disclosure a lubricating medium is deposited over a network of nanoscopic elements prior to the application of a directional force.

According to another aspect of the present disclosure, a method for forming a nanotube fabric layer comprises forming an unordered nanotube fabric layer over a material surface and applying a directional force over said unordered nanotube fabric layer to render at least a portion of said unordered nanotube fabric layer into an ordered network of nanotube elements.

According to another aspect of the present disclosure a puncture resistant material comprises a supporting structure and an ordered nanotube fabric element, said ordered nanotube fabric element comprising at least one ordered nanotube fabric layer, wherein said ordered nanotube fabric element is affixed to said supporting structure such that said ordered nanotube fabric element covers to a least a portion of said supporting structure material.

According to another aspect of the present disclosure an ordered nanotube fabric layer comprises a network of nanotube elements wherein groupings of said nanotube elements are arranged in a substantially uniform manner such that said groupings of nanotube elements are positioned essentially parallel to adjacent nanotube elements.

According to another aspect of the present disclosure an ordered nanotube fabric layer comprises a network of nanotube elements densely packed together, substantially minimizing gaps within said ordered nanotube fabric layer.

According to another aspect of the present disclosure an ordered nanotube fabric layer comprises a network of nanotube elements wherein the individual nanotube elements are separated from adjacent nanotube elements by gaps on the order of 1-2 nm.

According to another aspect of the present disclosure an ordered nanotube fabric layer comprises a network of nanotube elements wherein the individual nanotube elements are separated from adjacent nanotube elements by gaps on the order of 10 nm.

According to another aspect of the present disclosure an ordered nanotube fabric layer comprises a network of nanotube elements wherein the individual nanotube elements are separated from adjacent nanotube elements by gaps on the order of 50 nm.

According to another aspect of the present disclosure an ordered nanotube fabric layer comprises a network of functionalized nanotube elements, said functionalized elements coated with moieties such as to electrically insulate the sidewalls of individual nanotube elements from the sidewalls of adjacent nanotube elements.

According to another aspect of the present disclosure a nanotube fabric layer comprises an ordered network of nanotube elements, wherein substantially all of the nanotube elements are parallel to and in contact with a plurality of other nanotube elements along the long axis of the nanotube elements.

According to another aspect of the present disclosure a nanotube fabric layer comprises an ordered network of nanotube elements, wherein the nanotube fabric is impermeable to micron-sized particles.

According to another aspect of the present disclosure a nanotube fabric layer comprises an ordered network of nanotube elements, wherein the nanotube fabric is impermeable to nano-sized particles.

According to another aspect of the present disclosure an unordered nanotube fabric layer is formed via at least one spin coating operation.

Under another aspect of the present disclosure an unordered nanotube fabric layer is formed via at least one spray coating operation.

Under another aspect of the present disclosure an unordered nanotube fabric layer is formed via at least one dip coating operation.

Under another aspect of the present disclosure an unordered nanotube fabric layer is formed via a silk screen printing process.

Under another aspect of the present disclosure an unordered nanotube fabric layer is formed via a gravure or other large format film printing process.

Under another aspect of the present disclosure a rolling force is applied to an unordered nanotube fabric layer by rolling a cylindrical element over said unordered nanotube fabric layer.

Under another aspect of the present disclosure a rubbing force is applied to an unordered nanotube fabric layer by sliding the unordered nanotube fabric layer over a material surface.

Under another aspect of the present disclosure a directional force is applied to an unordered nanotube fabric layer by positioning a pliant film onto the CNT surface and then impinging a pressurized gas, a jet of frozen gas, or a jet of other particles or liquids over the surface of the intervening pliant layer Under another aspect of the present disclosure a polishing force is applied to an unordered nanotube fabric layer by passing a polishing material over the surface of the unordered nanotube fabric layer.

Under another aspect of the present disclosure a polishing force is applied to an unordered nanotube fabric layer by applying a rotating polishing material to the surface of the unordered nanotube fabric layer.

Other features and advantages of the present invention will become apparent from the following description of the invention which is provided below in relation to the accompanying drawings.

BRIEF DESCRIPTION OF THE DRAWINGS

FIGS. 3A-3F are perspective drawings illustrating an exemplary process according to the methods of the present disclosure for rendering a substantially unordered nanotube fabric layer into an ordered network of nanotube elements via a directional force;

FIG. 10B is a diagram illustrating the operation of the exemplary polishing apparatus depicted in FIG. 10A;

FIG. 11B is a diagram illustrating the operation of the exemplary polishing apparatus depicted in FIG. 11A;

DETAILED DESCRIPTION

Figure 1:
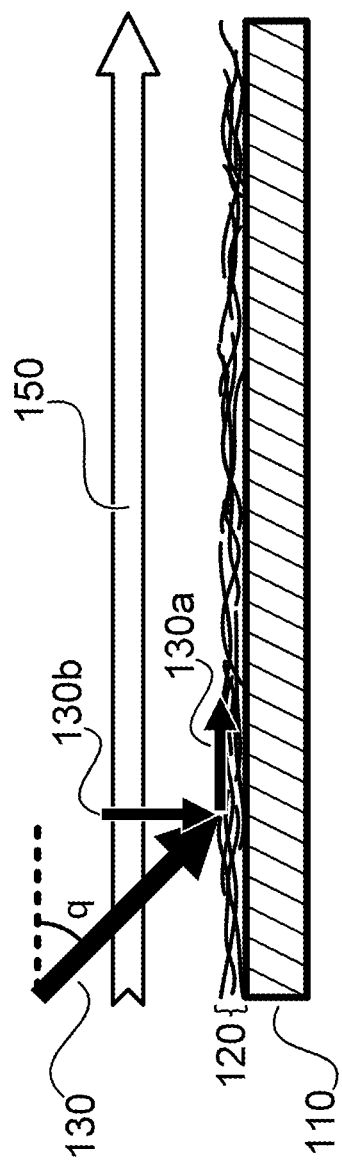
FIG. 1 is force diagram illustrating the translation of a directional force over a nanotube fabric.

The present disclosure teaches methods to arrange nanotube elements within nanotube fabric layers and films through the application of a directional force applied over such layers and films. These approaches can be employed to render regions, within a deposited nanotube fabric layer, into one or more networks of substantially ordered nanotube elements—that is, regions wherein the nanotube elements are oriented in a substantially uniform arrangement such that they group together along their sidewalls. In this manner, for example, nanotube fabrics may be created which are highly dense. In certain applications, such ordered nanotube fabric layers would be essentially free of gaps and voids between nanotube elements. Or, in another example, ordered nanotube fabrics may be created which are essentially free of gaps and voids greater than a certain dimension. Further, in another example, such methods may be used to realize nanotube fabrics wherein the number of gaps and voids within the fabric is significantly reduced. In still another example, an ordered nanotube fabric layer, arranged according to the methods of the present disclosure, includes a plurality of nanotube elements oriented in substantially the same direction.

It should be noted that within the present disclosure the term "network" is used to describe an arrangement of nanotube elements dispersed over the surface of a substrate. In certain applications networks of nanotube elements are relatively dense, with nanotube elements packed tightly together and, in some cases, entwined with adjacent nanotube elements. In other applications network of nanotube elements are relatively sparse, with gaps and spaces between individual nanotube elements. Within certain applications, individual nanotube elements with sparse networks might be separated by gaps on the order of 1-2 nm. Within other applications such gaps might be on the order of 10 nm. Within still other applications such gaps might be on the order of 50 nm.

A fabric of nanotubes as referred to herein for the present disclosure includes a layer of multiple, interconnected carbon nanotubes. A fabric of nanotubes (or nanofabric), in the present disclosure, e.g., a non-woven carbon nanotube (CNT) fabric, may, for example, have a structure of multiple entangled nanotubes that are irregularly arranged relative to one another. Alternatively, or in addition, for example, the fabric of nanotubes for the present disclosure may possess some degree of positional regularity of the nanotubes, e.g., some degree of parallelism along their long axes. Such positional regularity may be found, for example, on a relatively small scale wherein flat arrays of nanotubes are arranged together along their long axes in rafts on the order of one nanotube long and ten to twenty nanotubes wide. In other examples, such positional regularity maybe found on a larger scale, with regions of ordered nanotubes, in some cases, extended over substantially the entire fabric layer. Such larger scale positional regularity is of particular interest to the present disclosure.

The fabrics of nanotubes retain desirable physical properties of the nanotubes from which they are formed. For example, in some electrical applications the fabric preferably has a sufficient amount of nanotubes in contact so that at least one ohmic (metallic) or semi-conductive pathway exists from a given point within the fabric to another point within the fabric. Single walled nanotubes may typically have a diameter of about 1-3 nm, and multi walled nanotubes may typically have a diameter of about 3-30 nm. Nanotubes may have lengths ranging from about 0.2 microns to about 200 microns, for example. The nanotubes may curve and occasionally cross one another. Gaps in the fabric, i.e., between nanotubes either laterally or vertically, may exist. Such fabrics may include single-walled nanotubes, multi-walled nanotubes, or both. The fabric may have small areas of discontinuity with no tubes present. The fabric may be prepared as a layer or as multiple fabric layers, one formed over another. The thickness of the fabric can be chosen as thin as substantially a monolayer of nanotubes or can be chosen much thicker, e.g., tens of nanometers to hundreds of microns in thickness. The porosity of the fabrics can vary from low density fabrics with high porosity to high density fabrics with low porosity. Such fabrics can be prepared by growing nanotubes using chemical vapor deposition (CVD) processes in conjunction with various catalysts, for example. Other methods for generating such fabrics may involve using spin-coating techniques and spray-coating techniques with preformed nanotubes suspended in a suitable solvent, silk screen printing, gravure printing, and electrostatic spray coating. Nanoparticles of other materials can be mixed with suspensions of nanotubes in such solvents and deposited by spin coating and spray coating to form fabrics with nanoparticles dispersed among the nanotubes. Such exemplary methods are described in more detail in the related art cited in the Background section of this disclosure.

It should be noted that while much of the present disclosure discusses methods for the arrangement of nanotube elements within a nanotube fabric, the methods of the present disclosure are not limited in this regard. Indeed, the methods of the present disclosure can be used to arrange high aspect ratio nanoscopic elements (that is, nanoscopic "tube like" structures with length to width ratios on the order of 4 to 1 wherein at least one of those dimensions—length or width—is less than 100 nm) within a plurality of fabrics or networks. Such nanoscopic elements include, but are not limited to, single wall nanotubes, multiwalled nanotubes, nanowires, and mixtures thereof. Nanowires as mentioned herein is meant to mean single nanowires, aggregates of non-woven nanowires, nanoclusters, nanowires entangled with nanotubes comprising a nanofabric, mattes of nanowires, etc. Examples of nanowire (nanorod) materials are alumina, bismuth, cadmium, selenide, gallium nitride, gold, gallium phosphide, germanium, silicon, indium phosphide, magnesium oxide, manganese oxide, nickel, palladium, silicon carbide, titanium, zinc oxide and additional mixed nanowires such as silicon germanium or other types which are coated. Further, within the present disclosure networks of nanoscopic elements are described as arrangements of such freely formed and deposited nanoscopic elements in a substantially planer configuration. Exemplary networks of nanoscopic elements include, but are not limited to, nanotube fabric layers as described within the present disclosure and arrangements of nanowires dispersed over a material surface.

As described within U.S. Pat. No. 7,375,369 to Sen et al. and U.S. patent application Ser. No. 11/304,315 to Ghenciu et al., both incorporated herein by reference in their entirety, nanotube fabrics and films can be formed by applying a nanotube application solution (for example, but not limited to, a plurality of nanotube elements suspended within an aqueous solution) over a substrate element. A spin coating process, for example, can be used to evenly distribute the nanotube elements over the substrate element, creating a substantially uniform layer of nanotube elements. In other cases, other processes (such as, but not limited to, spray coating processes, dip coating processes, silk screen printing processes, and gravure printing processes) can be used to apply and distribute the nanotube elements over the substrate element. In other cases, CVD growth of nanotubes on a material surface may be used to realize an unordered nanotube fabric layer. Further, U.S. Patent App. No. 61/304,045 to Sen et al., incorporated herein by reference in its entirety, teaches methods of adjusting certain parameters (for example, the nanotube density or the concentrations of certain ionic species) within nanotube application solutions to either promote or discourage rafting—that is, the tendency for nanotube elements to group together along their sidewalls and form dense, raft-like structures—within a nanotube fabric layer formed with such a solution. By increasing the incidence of rafting within nanotube fabric layers, the density of such fabric layers can be increased, reducing both the number and size of voids and gaps within such fabric layers.

It should be noted that nanotube elements used and referenced within the embodiments of the present disclosure may be single-walled nanotubes, multi-walled nanotubes, or mixtures thereof and may be of varying lengths. Further, the nanotubes may be conductive, semiconductive, or combinations thereof. Further, the nanotubes may be functionalized (for example, by oxidation with nitric acid resulting in alcohol, aldehydic, ketonic, or carboxylic moieties attached to the nanotubes), or they may be non-functionalized.

It should be noted that the methods of the present disclosure are well suited for arranging functionalized nanotube elements within a nanotube fabric layer. Nanotube elements may be functionalized for a plurality of reasons. For example, certain moieties may be formed on the sidewalls of nanotube elements to add in the dispersion of those elements within an application solution. In another example, certain moieties formed on the sidewalls of nanotube elements can aid in the efficient formation of a nanotube fabric. In a further example, nanotube elements can be functionalized with certain moieties such as to electrically insulate the sidewalls of the nanotube elements. Nanotube elements can be functionalized by attaching organic, silica, or metallic moieties (or some combination thereof) to the sidewalls of the nanotube elements. Such moieties can interact with nanotube elements covalently or remain affixed through $\pi$-$\pi$ bonding.

The reduction or substantial elimination of gaps and voids within a nanotube fabric layer is particularly useful for devices with extremely small circuit sizes in which a uniform dispersion of nanotubes is desired. For example, when a fabric with very few—or only very small—gaps and voids is patterned and etched, the remaining nanotube article is effectively assured of containing nanotubes as opposed to lacking nanotubes as a result of a large void in the fabric. As the feature sizes decrease along with currently practiced lithography techniques, minimizing gaps and voids within nanotube fabric layers becomes more important to ensure a higher yield of functional circuit elements as the fabric is being etched.

For example, within some applications advancing lithography techniques may determine a minimum feature size (e.g., on the order of 20 nm). Voids and gaps within a nanotube fabric layer larger than some fraction of such a feature size (e.g., larger than about 10 nm) may result in nonfunctioning or ineffective circuit elements. By minimizing—or otherwise substantially eliminating—gaps and voids within a nanotube fabric layer, the incidence of such nonfunctioning or ineffective circuit elements can be significantly reduced.

In some applications by minimizing or substantially eliminating gaps and voids within a nanotube fabric layer, the density of an array of nanotube switching devices fabricated from that layer may be increased. U.S. patent application Ser. No. 11/280,786 to Bertin et al., incorporated herein by reference in its entirety, teaches a nonvolatile two terminal nanotube switch structure having (in at least one embodiment) a nanotube fabric article deposited between two electrically isolated electrode elements. As Bertin teaches, by placing different voltages across said electrode elements, the resistive state of the nanotube fabric article can be switched between a plurality of nonvolatile states. That is, in some embodiments the nanotube fabric article can be repeatedly switched between a relatively high resistive state (resulting in, essentially, an open circuit between the two electrode elements) and a relatively low resistive state (resulting in, essentially, a short circuit between the two electrode elements).

In other applications, relatively low density ordered nanotube fabrics—in some cases, on the order of a single nanotube thick—can be highly beneficial. Certain logic applications, for example, make use of relatively thin nanotube fabric layers as charge conducting planes. Such applications require that conduction paths through the nanotube fabric layer be substantially uniform. Within such applications, a thin and/or low density nanotube fabric layer can be arranged into an ordered network of nanotube elements oriented in a uniform direction, wherein the individual nanotube elements tend not to overlap or contact adjacent nanotube elements.

The fabrication of an array of such nanotube switching devices can include patterning of a nanotube fabric layer to realize a plurality of these nanotube fabric articles. The number and the size of the gaps and voids within a nanotube fabric layer can limit the feature size to which these nanotube fabric articles within such an array can be patterned. For example, within a nanotube switching device array wherein the individual nanotube switching devices are on the order of 20 nm square (that is, the nanotube fabric article within each device is essentially 20 nm by 20 nm), gaps within the nanotube fabric layer larger than about 10 nm, for example, may result in nonfunctioning or ineffective nanotube switching devices. For example, a typical unordered nanotube fabric layer may exhibit gaps over approximately 25% of its surface, and a typical ordered nanotube fabric layer may exhibit gaps over approximately 2% of its surface. By minimizing the number of gaps within the fabric layer— or limiting the size of these gaps—prior to the formation of the array of nanotube switching elements, the incidence of these nonfunctioning or ineffective nanotube switching devices can be significantly reduced or—in some applications—essentially eliminated.

Within the methods of the present disclosure, nanotube fabrics are typically formed over other material layers (through, for example, one or more spin coating operations). In some applications this material layer may be a silicon wafer. In other applications, this material layer may be a conductive material, such as, but not limited to, tungsten, aluminum, copper, nickel, palladium, titanium nitride, and tungsten nitride. In still other applications, this material layer may be a semiconducting material such as, but not limited to, silicon and gallium arsenide. In other applications, this material layer may be a dielectric material such as, but not limited to, silicon oxide and aluminum oxide. In still other applications, this material layer may be an organic semiconducting material such as, but not limited to, polyfluorene polythiophenes, polyacetylenes, polypyrroles, polyanilines, poly(p-phenylene sulfide), and poly(p-phenylene vinylene)s.

In some applications this material layer may be formed of a rigid material, such as, but not limited to, metal (e.g., steel or aluminum), ceramic, or glass. In other applications it may be formed of a flexible material such as a plastic film or sheet—e.g., polyethylene terephthalate (PET), polymethylmethacrylate, polyamides, polysulfones, and polycyclic olefins. In other applications a desired interface material (such as, but not limited to, silicon oxide) may be formed over a rigid material (such as, but not limited to, steel) to form a rigid structural composite which provides a substrate with the desired interface properties of a first material with the structural properties of a second material.

Dependant on the needs of an application, such material layers may be formed from materials such as, but not limited to, elemental silicon, silicon oxide, silicon nitride, silicon carbides, PTFE, organic polymer (including, but not limited to, polyesters, pvc, styrenes, polyvinyl alcohol, and polyvinyl acetate), hydrocarbon polymers (including, but not limited to, poly ethylene, polly propylene, and polycellosics), inorganic backbone polymers (including, but not limited to, siloxanes, polyphophazenes), boron nitride, gallium arsenide, group III/V compounds, group III/V compounds, wood, metals—including metal alloys and metal oxides (including, but not limited to, steel, aluminum, nickel, iron, manganese, titanium, copper, zinc, and tin), ceramics (including, but not limited to, aluminum oxide, cerium oxide, magnesium oxide, titanium oxide, tin oxides, zinc oxides), and glass (including, but not limited to, silicate glass, boron silicate glass, and sodium silicate glass).

In certain embodiments of the present disclosure, nanotube fabric layers (rendered into ordered networks of nanotube elements by the methods of the present disclosure) may be separated from a material layer to realize standalone nanotube fabric layers.

In other applications an ordered nanotube fabric layer—wherein, for example, the majority of nanotube elements are oriented in substantially the same direction—can be used to provide a nanotube fabric which exhibits a relatively uniform electrical or physical properties (such as, but not limited to, sheet resistance, uniformity of charge carriers, and heat transfer). Such ordered nanotube fabric can be useful in the fabrication of electronic devices and components, such as, but not limited to, non-volatile switching elements, nanotube fabric based logic devices, and heat transfer structures.

In other applications an ordered nanotube fabric layer substantially free of gaps and voids can be used to form a protective barrier layer over or around an adjacent material layer. For example, a thin nanotube fabric layer comprised of an ordered network of nanotube elements may be formed over a thicker unordered nanotube fabric layer. In this way, the thin ordered nanotube fabric layer—essentially free of gaps and voids—provides a barrier layer between the thicker unordered nanotube layer and any material layer (e.g., a conductive contact layer such as tungsten) deposited over the two nanotube fabric layers in subsequent process steps. In another example, an ordered nanotube fabric layer—with minimal gaps and voids—can be used to protect an underlying material layer from external contaminants (e.g., water, catalytic metals, and amorphous carbon). Such an ordered nanotube fabric layer may be used, for example, to form a substantially hydrophobic protective layer for OLED (organic light emitting diode) displays or photovoltaic cells. In another example, such ordered nanotube fabric layers may be used to realize protective packaging for shipping materials. In still another example such an ordered nanotube fabric layer may be used to form an anticorrosion layer over the body panel of a vehicle.

In other applications an ordered nanotube fabric layer can be used to provide a low or otherwise reduced frictional coating over a material layer. In certain applications an ordered nanotube fabric layer (wherein the nanotube elements have been oriented in a substantially uniform direction via the methods of the present disclosure) will exhibit a low coefficient of friction. Such ordered nanotube fabric layers can be used to reduce the friction between moving pieces within mechanical systems (such as, but not limited to, engine cylinders, pistons, and moving elements within MEMS devices). Such ordered nanotube fabric layers can also be used to provide low friction coatings over certain objects (such as, but not limited to, cookware and skis).

FIG. 1 is a force diagram illustrating the translation of an exemplary directional force over a nanotube fabric 120. As depicted in FIG. 1, an applied force 130 is delivered to the surface of a nanotube fabric 120 at angle θ (within this example, the nanotube fabric 120 has been formed over a material layer 110). The vertical 130*b* and horizontal 130*a* components of this applied force 130 act upon nanotube fabric layer 120 as the applied force 130 is moved across the nanotube fabric layer 120 along direction 150. The horizontal component 130*a* of applied force 130 works across the nanotube fabric 120 within the plane of the nanotube fabric 120, creating a directional force across the nanotube fabric layer. In some embodiments of the present disclosure—those embodiments wherein the horizontal component 130*a* of the applied force 130 is essentially a frictional force—the magnitude vertical component 130*b* of the applied force 130 can be used to modulate the magnitude horizontal component, and thus, the magnitude of the directional force. As will be shown within the present disclosure, the translation of such a directional force across a nanotube fabric will tend to arrange the nanotube elements within the nanotube fabric into an ordered network oriented substantially along the path of the directional force. The work done by translating a directional force across a nanotube fabric imparts energy into the nanotube fabric, which is used to arrange the individual nanotube elements. In certain embodiments of the present disclosure, multiple iterations of a directional force (that is, multiple passes of a directional force across the nanotube fabric) will impart such energy as to render more and more of the nanotube elements into an ordered arrangement with each successive pass.

The present disclosure teaches multiple apparatus for translating a directional force over a nanotube fabric in one or more directions. In some embodiments a directional force is applied once over a nanotube fabric. In other embodiments a directional force is applied multiple times, with each iteration of the applied directional force following substantially the same path (either moving back and forth over this path, or returning to a starting position for each iteration such that the directional force is only applied in a single direction) across the nanotube fabric. In some embodiments a substantially uniform directional force (in terms of magnitude and direction) will be applied over an entire nanotube fabric in order to orient the nanotube elements within the fabric along a single direction. In other embodiments the magnitude and direction of a directional force will be selected for different regions of a nanotube fabric such as to orient the nanotube elements within a fabric into a preselected pattern. It should be noted that, in the preferred embodiment of the present disclosure, an applied force (130 in FIG. 1) is applied at a non-perpendicular angle (that is θ is not equal to 90 degrees) and applied for multiple iterations. Further, it is preferable to use more iterations than fewer.

By applying a directional force over an essentially unordered network of nanotube elements, the nanotube elements may be rendered into an essentially ordered network, significantly limiting—or, in some applications, substantially eliminating—the number of gaps and voids between nanotube elements and orienting the nanotube elements into one or more substantially uniform directions. It should be noted that while the diagram of FIG. 1 depicts the application of a linear directional force applied directly to a nanotube fabric, the methods of the present disclosure are not limited in this regard. According to the methods of the present disclosure this directional force can be directly applied (wherein, for example, an apparatus applies a directional force directly to nanotube elements within a fabric layer) or transferred (wherein, for example, a directional force is applied through an another material). Further, in certain applications a directional force applied directly to one or more nanotube elements in a nanotube fabric layer can be transferred through those elements to other nanotube elements within the fabric layer. Exemplary directional forces include, but are not limited to, rolling, rubbing, polishing, and cryokinetic impingement. Such forces can be applied linearly (that is, across the surface of a fabric layer along a straight line), in an arc, or rotationally.

As previously discussed, it should be noted that a directional force as described above can be applied over a freely formed, fixed nanotube fabric. That is, over a substantially dry, fully formed nanotube fabric (that is, a nanotube fabric substantially free of any suspension medium which allows the nanotubes a range of motion) and formed from a plurality of free nanotube elements. That is, nanotube elements produced and harvested in an independent operation, such that the nanotube elements may be purified, sorted, and selected as desired by the needs of a specific application. In certain applications, this will allow the method for arranging nanotube elements within a nanotube fabric to essentially decouple from the method of forming that fabric. In this way, the methods of the present disclosure can be used to arrange nanotube fabric layers formed through a plurality of deposition and formation techniques (such as, but not limited to, spin coating, spray coating, dip coating, silk screen printing, and gravure printing) at a desired or preselected density, geometry, and configuration.

Further, the methods of the present disclosure do not require vertically grown films. As previously discussed, such vertically grown films (as well as the previously known methods for flatting them into a substantially aligned arrangement) can be limiting in many applications. For example, the previously known methods for flattening vertical films are limited in that they cannot rearrange nanotube elements once they have been flattened. As will be shown, in certain embodiments the methods of the present disclosure can be used to arrange a freely formed fixed nanotube fabric multiple times and in multiple directions. Vertically grown films can also be limited in applications where a nanotube film is formed over a non-flat material layer. Growing from a deposited catalyst layer, vertically grown nanotubes in such applications will tend to follow the topography of an underlying material layer. In such applications, however, a freely formed, fixed nanotube fabric can deposited in relatively thick layers (via, for example, a spin coating operation) such as to provide a substantially planar top surface. The methods of the present disclosure can then be used to arrange part or all of this freely formed, fixed nanotube fabric into a dense, ordered network of nanotube elements.

It should also be noted that while vertically grown nanotube films are limited in the type and quality of nanotube elements grown, a freely formed fixed nanotube fabric layer can be comprised of independently selected (and in some cases, purified and/or functionalized) nanotube elements. As such, the methods of the present disclosure may be used to arrange nanotube elements within a nanotube fabric formed with a preselected configuration. For example, the methods of the present disclosure can be used to arrange nanotube elements within nanotube fabrics made up of metallic nanotubes, semiconducting nanotubes, or some combination thereof. Similarly, the methods of the present disclosure can be used to arrange nanotube elements within nanotube fabrics made up of single walled nanotubes, multi walled nanotubes, or some combination thereof. Further, the methods of the present disclosure can be used to arrange nanotube elements within nanotube fabrics which are composites of nanotubes and other materials (such as, but not limited to, buckyballs, silica particles, amorphous carbon, silver nanotubes, quantum dots, colloidal silver, and monodisperse polystyrene beads). Further still, the methods of the present disclosure can be used to arrange nanotube elements within nanotube fabrics made up of nanotube elements which have been functionalized to have specific electrical properties or to react with certain physical or chemical conditions in a desired way.

In some embodiments of the present disclosure a directional force is applied over a nanotube fabric by moving a material surface across the nanotube fabric. In other embodiments a directional force is applied by moving a nanotube fabric (affixed to some substrate element, for example) across a fixed material surface. Further, the methods of the present disclosure can be used to arrange nanotube fabrics that include mixtures of nanotube elements and other materials. Such materials can include, but are not limited to, buckyballs, amorphous carbon, silver nanotubes, quantum dots (on the order of 2-10 nm), colloidal silver (on the order of 20 nm), monodisperse polystyrene beads (on the order of 200 nm), and silica particles (up to 600 nm). The methods of the present disclosure can be used to arrange nanotube elements within nanotube fabrics comprised of single wall nanotubes or multi wall nanotubes (or some combination, thereof). The methods of the present disclosure can also be used to arrange nanotube elements within nanotube fabrics comprised of metallic nanotubes or semiconducting nanotubes (or some combination, thereof).

In certain applications it may be desirable to arrange only a portion of a nanotube fabric into an ordered network of nanotube elements. Such applications might require a fabric to have certain regions ordered and other regions unordered or might require that the overall porosity of a nanotube fabric be reduced by a preselected value, such as would be achieved by only partially ordering a nanotube fabric. The methods of the present disclosure are well suited to such applications (as compared with previously known methods for adjusting the positions of nanotube elements within a nanotube film) as the degree to which a nanotube fabric is ordered is easily controlled by modulation of the magnitude of a directional force and the number of times that directional force is translated across the nanotube fabric (that is, the number of iterations). The use of such parameters within the present disclosure to partially order a nanotube fabric layer (or to arrange only nanotubes within preselected regions of a nanotube fabric) are shown and described in detail in the discussion of the subsequent figures.

Figure 2A:
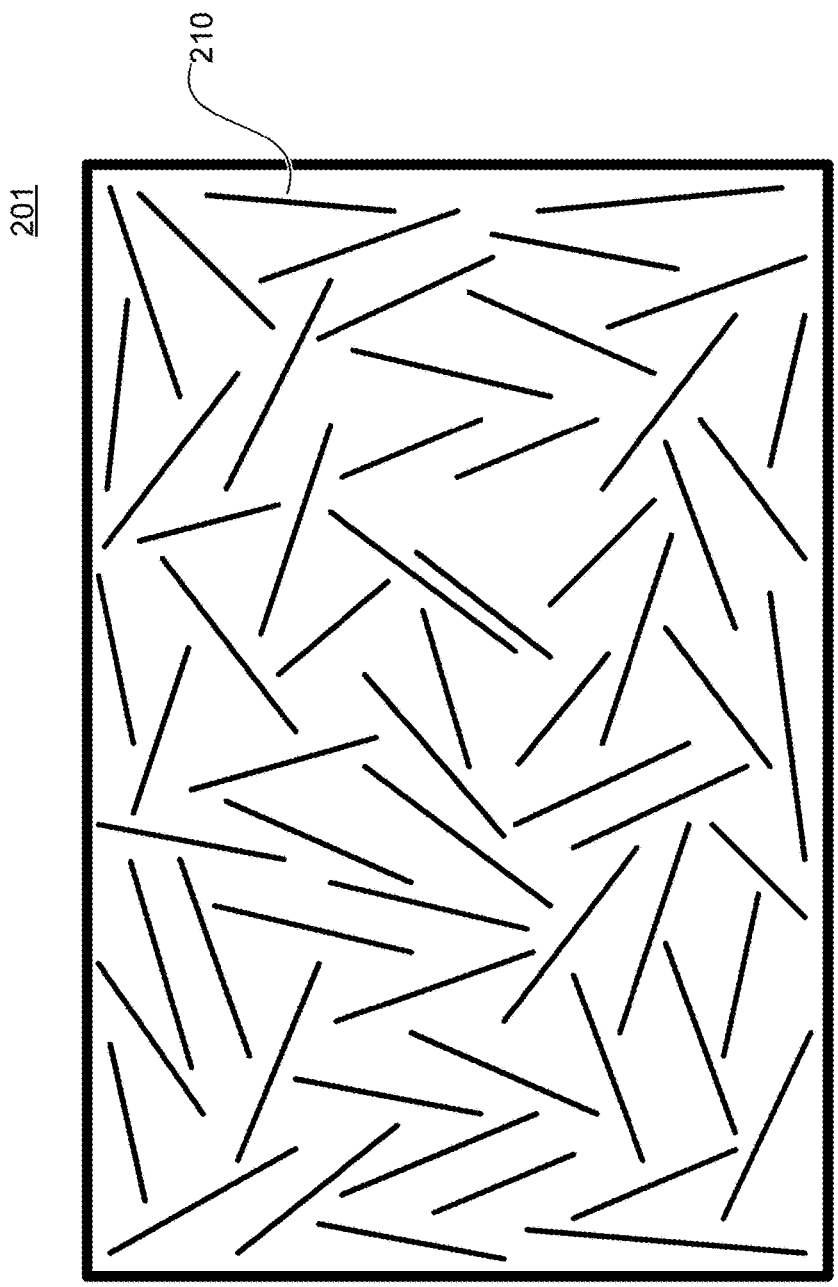
FIG. 2A is an illustration of an exemplary nanotube fabric layer comprised of a substantially unordered network of nanotube elements.
Figure 2B:
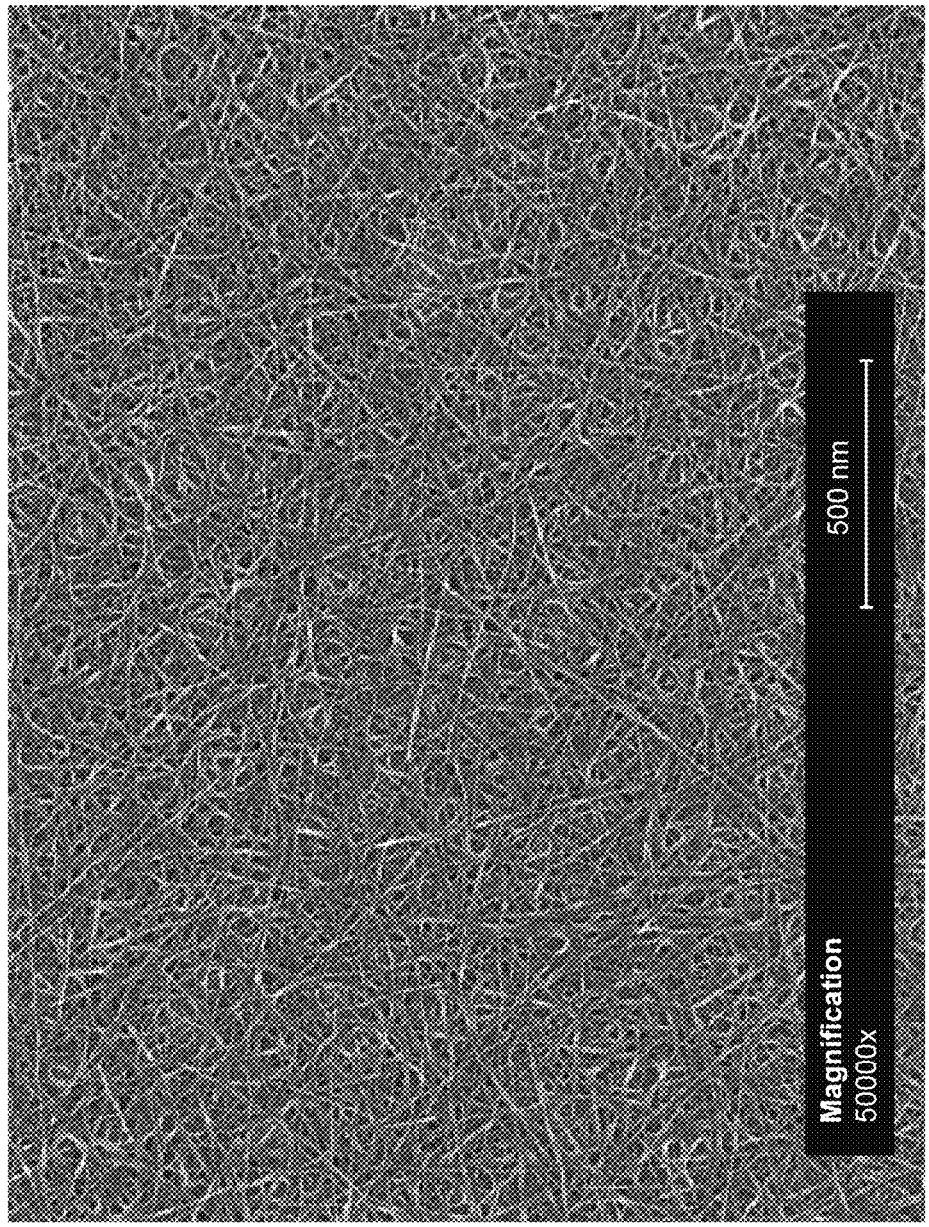
FIG. 2B is an SEM image of an exemplary nanotube fabric layer comprised of a substantially unordered network of nanotube elements.

FIG. 2A depicts a substantially unordered nanotube fabric layer 201 comprising a plurality of nanotube elements 210 deposited in a plurality of orientations with respect to each other. Within such a nanotube fabric layer 201, gaps and voids between the nanotube elements 210 are evident throughout the fabric layer 201. Taken another way, the nanotube fabric layer 201 depicted in FIG. 2A might be considered to have a low density of nanotube elements 210, with a relatively low number of nanotube elements 210 per unit of cross-sectional area. FIG. 2B is an SEM image depicting a nanotube fabric layer 202 analogous to the unordered nanotube fabric layer 201 depicted in FIG. 2A.

Figure 2C:
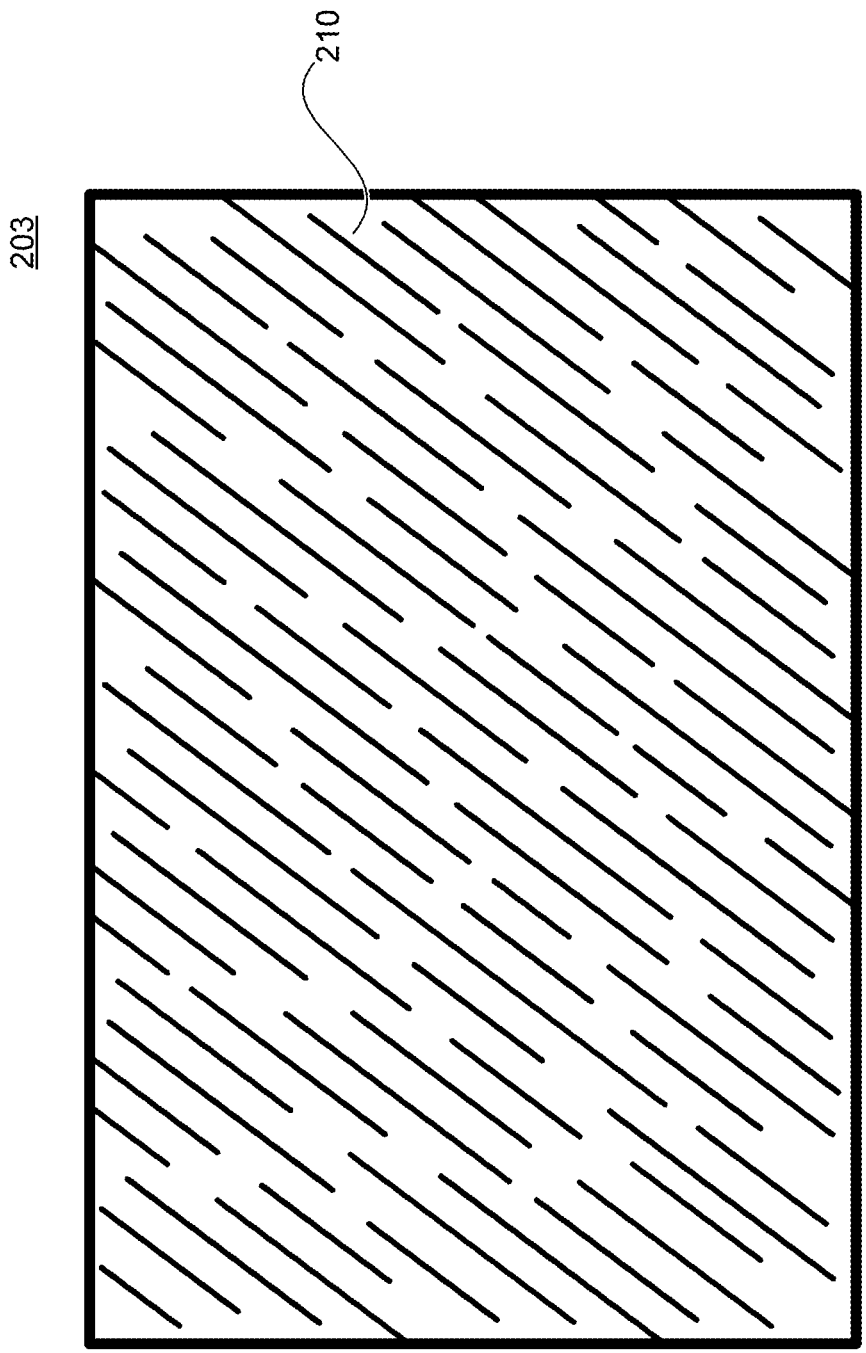
FIG. 2C is an illustration of an exemplary nanotube fabric layer comprised of a highly ordered network of nanotube elements.
Figure 2D:
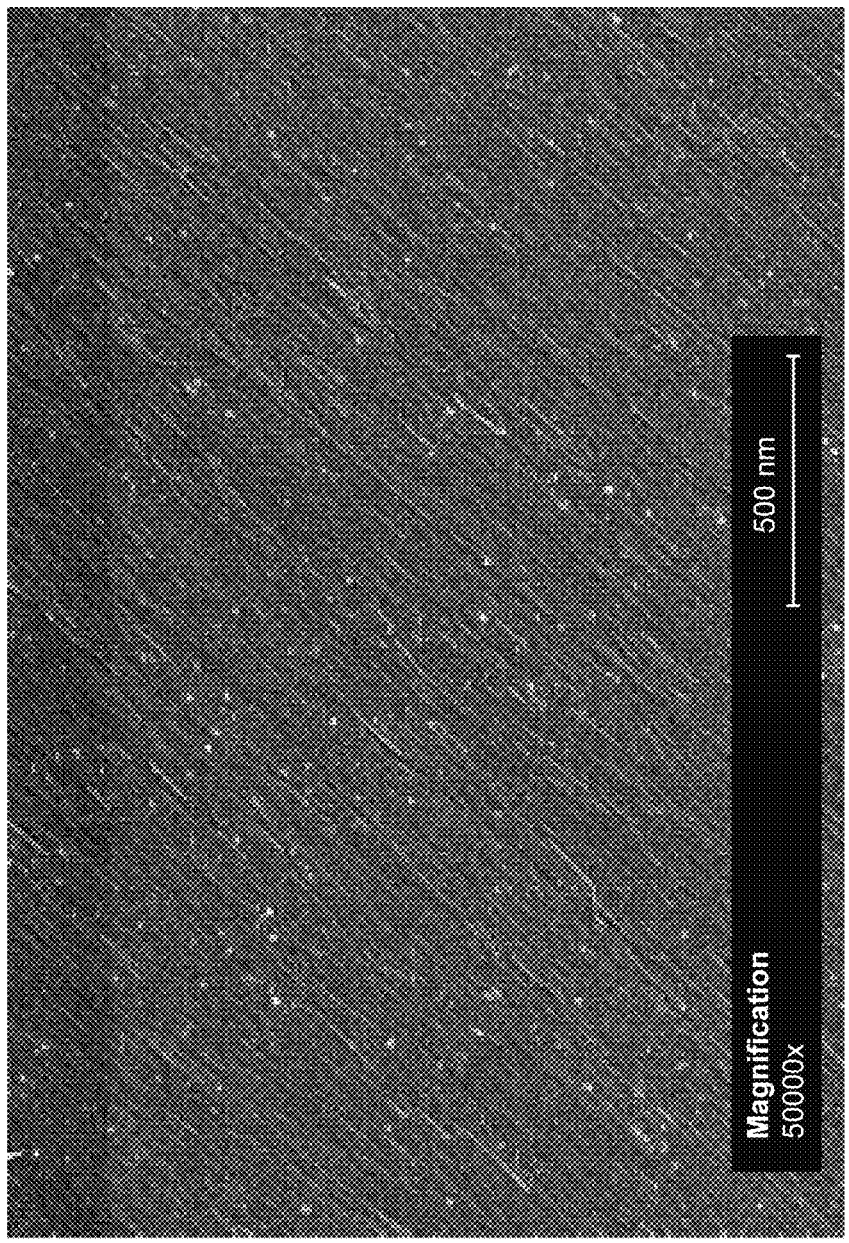
FIG. 2D is an SEM image of an exemplary nanotube fabric layer comprised of a highly ordered network of nanotube elements.

FIG. 2C depicts a nanotube fabric layer 203 comprising a network of substantially ordered nanotube elements 210. That is, the nanotube elements 210 within nanotube fabric layer 203 are arranged in a substantially uniform arrangement such that adjacent nanotube elements 203 group together along their sidewalls, substantially eliminating gaps between the nanotube elements. Taken another way, the ordered nanotube fabric layer 203 depicted in FIG. 2C might be considered to have a high density of nanotube elements 210, with a relatively high number of nanotube elements 210 per unit of cross-sectional area. FIG. 2D is an SEM image depicting a nanotube fabric layer 204 analogous to the ordered nanotube fabric layer 203 depicted in FIG. 2C.

It should be noted that the illustrations within FIGS. 2A and 2C have been provided simply to illustrate the methods of the present disclosure and have been rendered in such a way as to aid in the explanation of these methods. In particular, the relative sizes, positions, and density of the nanotube elements 210 depicted within FIGS. 2A and 2C have been designed such as to logically illustrate the relative orientation change between an unordered (FIG. 2A) and an ordered (FIG. 2C) nanotube fabric layer and have not been drawn to a uniform scale. Indeed, as will be clear to those skilled in the art, within both exemplary nanotube fabric layers 201 and 203, nanotube elements 210 would be packed much closer together with substantial overlapping and contact between adjacent nanotube elements 210. Further, gap sizes between individual nanotube elements 210 would be much smaller relative to the size of nanotube elements 210. FIGS. 2B and 2D (actual SEM images of unordered and ordered nanotube fabrics, respectively) have been included to provide realistic images of such fabrics to complement the essentially schematic representations depicted in FIGS. 2A and 2C.

FIGS. 3A-3F illustrate an exemplary process for rendering a substantially unordered nanotube fabric layer (such as the nanotube fabric layers 201 and 202 depicted in FIGS. 2A and 2B) into an ordered network of nanotube elements (such as in the nanotube fabric layers 203 and 204 depicted in FIGS. 2C and 2B). The exemplary process detailed in FIGS. 3A-3F has been intended to introduce and facilitate the discussion (on a relatively high level) of the methods of the present disclosure, specifically the use of a directional force to render an unordered nanotube fabric layer into an ordered network of nanotube elements. As such, while the exemplary process detailed in FIGS. 3A-3F initially introduces the use of a rolling process to apply a directional force for purposes of this overview, such a process will be discussed in greater detail within the discussion of FIGS. 7A-7C. Further, the present disclosure will also detail (in subsequent figures) a plurality of other processes for applying such a directional force to a nanotube fabric layer, including rolling, rubbing, polishing, and cryokinetic impingement.

Within the exemplary process illustrated in FIGS. 3A-3F, a substantially unordered nanotube fabric layer is first formed via three deposition operations. That is, three deposition operations—for example, three spin coating operations—are performed to realize an unordered nanotube fabric layer formed via three separately deposited layers of nanotube elements, each subsequent layer formed over the previously formed layer. As previously discussed, such unordered nanotube fabric layers can be realized through a plurality of deposition methods such as, but not limited to, spin coating, spray coating, dip coating, silk screen printing, and gravure printing. Further, within some applications CVD growth of nanotubes on a material surface may be used to realize an unordered nanotube fabric layer. The thickness of the individually deposited layers can be selected through a plurality of factors, including, but not limited to, the concentration of the nanotube application solution or the rotary speed of the substrate used in a spin coating operation. Further, while the exemplary process illustrated in FIGS. 3A-3F depicts specifically three deposition operations, the formation of a nanotube fabric layer is not limited in this way. Indeed, dependent on the needs of a specific application, such a nanotube fabric layer might be formed within a single deposition operation or within several deposition operations.

As will be detailed in the discussion of FIGS. 3A-3F below, a roller apparatus is used to apply a directional force over the unordered nanotube fabric layer. Within this exemplary process, this directional force is translated across the unordered nanotube fabric layer along a linear path, adjusting the underlying nanotube elements into a substantially uniform orientation parallel to this linear path. Within some applications, the individually deposited layers will also compress into each other under the applied directional force, reducing the thickness of the overall layer as a result. In this way, a region of an unordered nanotube fabric layer is rendered into an ordered network of nanotube elements.

Within the exemplary process depicted in FIGS. 3A-3F, a force normal to the plane of the nanotube fabric layer is used to apply the roller apparatus against the nanotube fabric layer, resulting in a downward pressure over the nanotube fabric layer as the roller apparatus is translated across. In some embodiments this pressure is relatively small (for example, substantially only the result of weight of the roller element itself—e.g., on the order of ten Pascals—as it is translated across the nanotube fabric layer). In other embodiments this force is larger (for example, on the order of two hundred Pascals). This increased pressure (provided by the applied normal force) between the roller apparatus and the nanotube fabric layer and increases the directional force translated across the nanotube fabric layer. As mentioned above, such a rolling operation (as well as the use of a normal force to apply increased pressure between a roller apparatus and a nanotube fabric layer) will be discussed in greater detail in the discussion of FIGS. 7A-7C.

Referring now to FIG. 3A, in a first process step 301 a substrate element 310 is provided. This substrate element 310 can be formed from a plurality of materials as best fits the needs of a specific application. For example, in some applications substrate element 310 may be a silicon wafer. In other applications, substrate element 310 may be a layer of conductive material, such as, but not limited to, tungsten, aluminum, copper, nickel, palladium, titanium nitride, and tungsten nitride. In still other applications, substrate element 310 may be a layer of semiconducting material such as, but not limited to, silicon and gallium arsenide. In other applications, substrate element 310 may be a layer of dielectric material such as, but not limited to, silicon oxide and aluminum oxide. In other applications, substrate element 310 may be a layer of organic semiconducting material such as, but not limited to, polyfluorene polythiophenes, polyacetylenes, polypyrroles, polyanilines, poly(p-phenylene sulfide), and poly(p-phenylene vinylene)s. In some applications substrate element 310 may be formed of a rigid material, such as, but not limited to, metal (e.g., steel or aluminum), ceramic, or glass. In other applications it may be formed of a flexible material such as a plastic film or sheet—e.g., polyethylene terephthalate (PET), polymethylmethacrylate, polyamides, polysulfones, and polycyclic olefins.

Figure 3B:
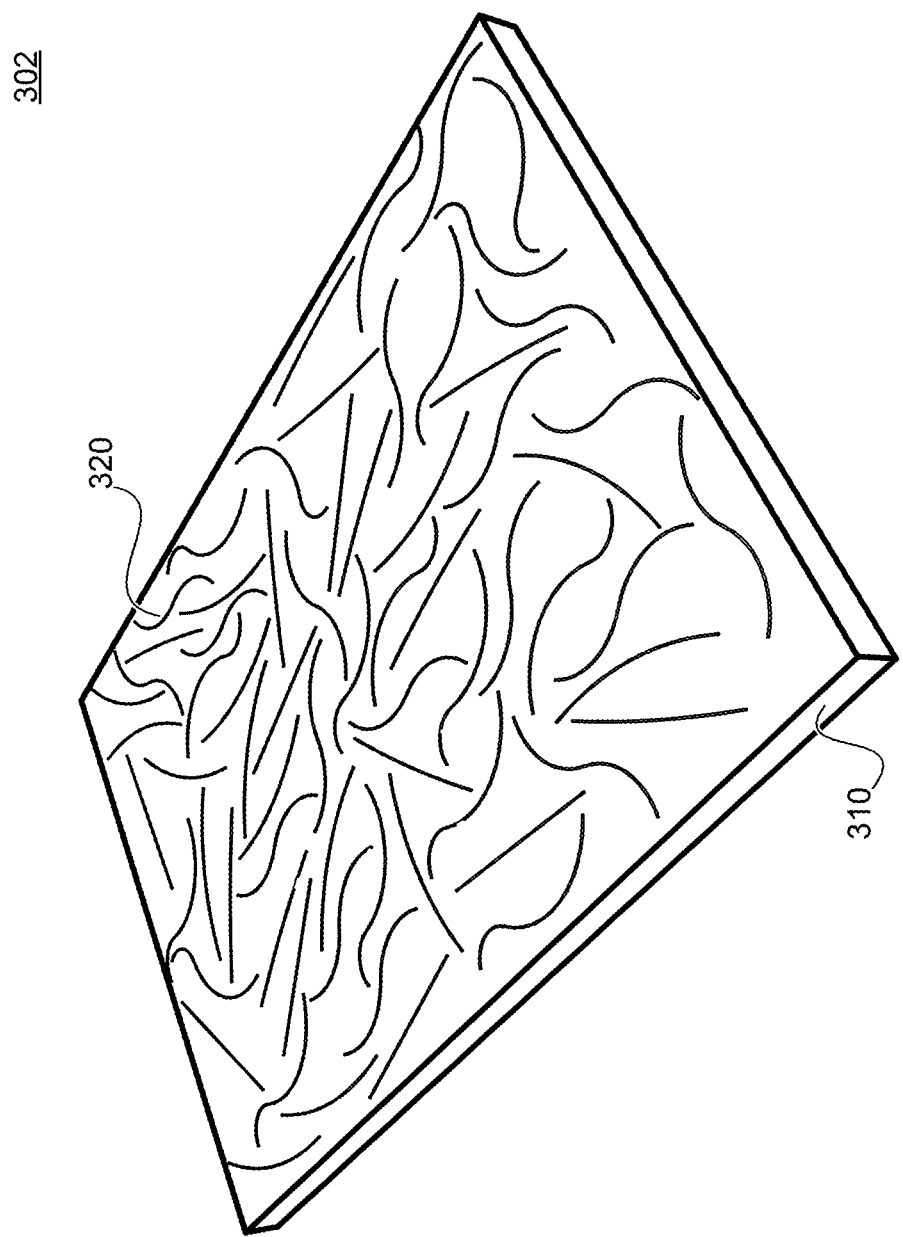
Figure 3D:
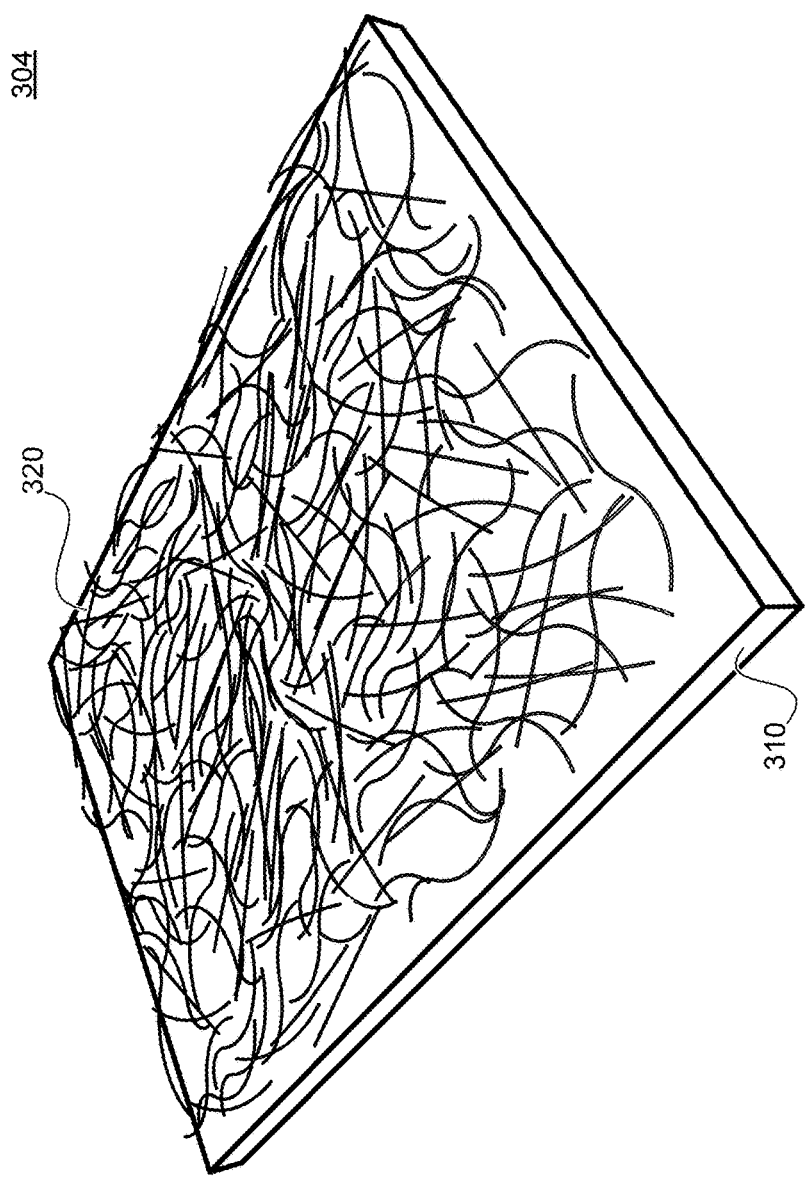

Referring now to FIG. 3B, in a next process step 302 a first layer of unordered nanotube elements 320 is formed over the substrate element 310. This first layer may be formed, for example, via a spin coating operation, a spray coating operation, a dip coating operation, a silk screen printing operation, and gravure printing operation as previously discussed. In some embodiments, such a layer may also be formed through CVD growth of nanotubes on a material surface. Referring now to FIG. 3C, in a next process step 303 a second layer of unordered nanotube elements 320 is formed over the first layer. Referring now to FIG. 3D, in a next process step 304 a third layer of unordered nanotube elements 320 is formed over the second layer. In this way, a nanotube fabric layer comprising essentially three individually deposited layers of substantially unordered nanotube networks is formed over substrate element 310.

Figure 3E:
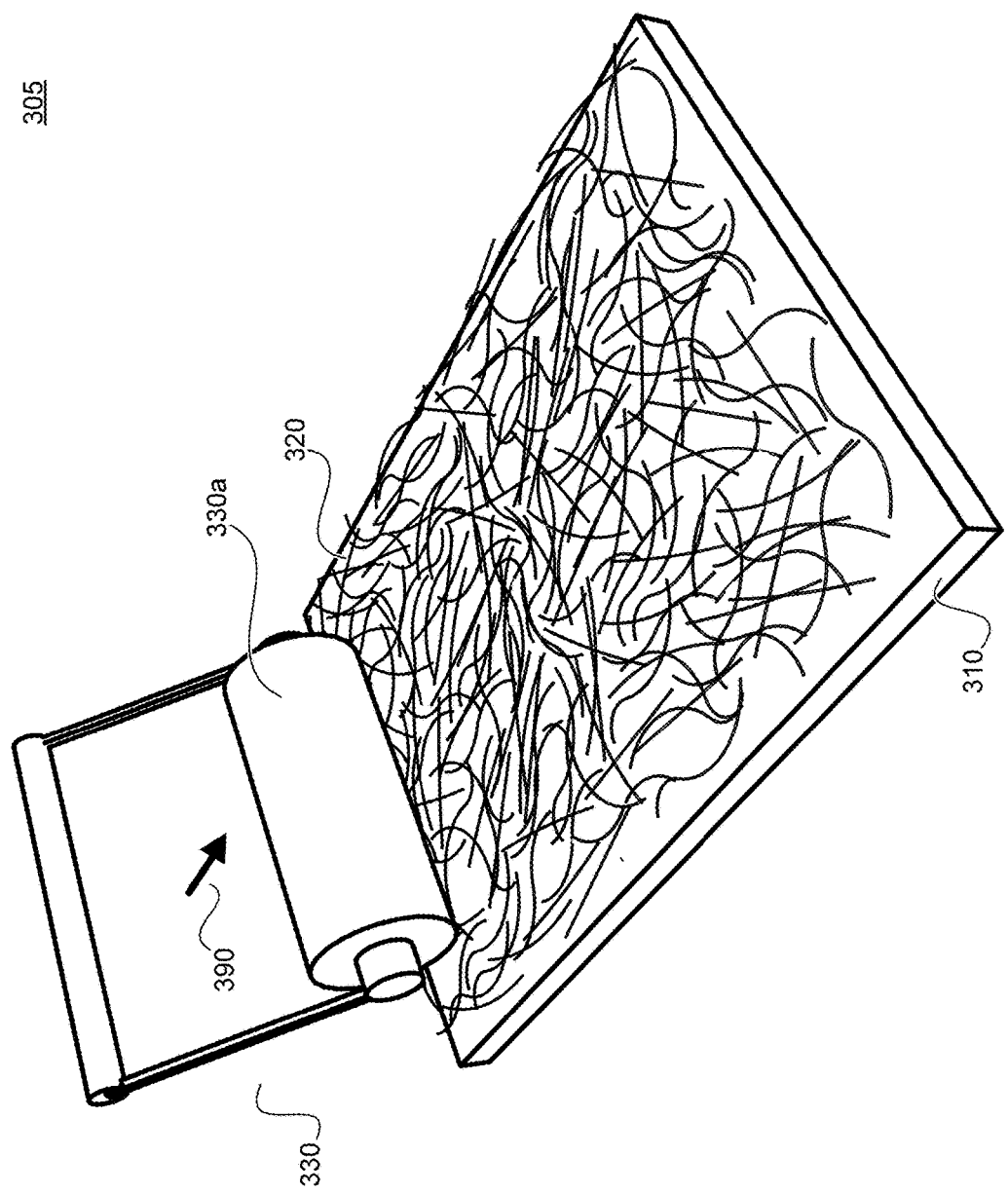

Referring now to FIG. 3E, in a next process step 305 a rolling apparatus 330 is used to apply a directional force over the deposited nanotube fabric layer. This applied directional force is translated over the surface of the unordered nanotube fabric layer along linear direction 390. The rolling apparatus 330 includes rolling element 330a and is passed over the deposited nanotube fabric layer in order to adjust the underlying nanotube elements into a substantially uniform orientation parallel to the rolling direction 390. In some applications the rolling apparatus 330 is passed over the deposited nanotube fabric layer once. In other applications the rolling apparatus 330 is passed over the deposited nanotube fabric layer multiple times (for example, on the order of 50 times or, in another example, on the order of 250 times) following substantially the same linear path with each pass. Though not illustrated in FIG. 3E, in some embodiments an intermediate barrier layer of pliable material (such as, but not limited to, a layer of PET) is situated over the deposited nanotube fabric layer prior to the application of rolling apparatus 330. Rolling element 330a can be formed from a plurality of materials, including, but not limited to, metal (such as, but not limited to, iron, cobalt, nickel, zinc, tungsten, chromium, manganese, magnesium, titanium, aluminum, and their alloys including family of steels), polymers including rubbers, plastics (including polystyrene), melamine, silicone, polycarbonate, polyethylene, porcelain, glasses (including silicon oxide and other crystalline solids), alumina, silicon carbide, and wood.

Figure 3F:
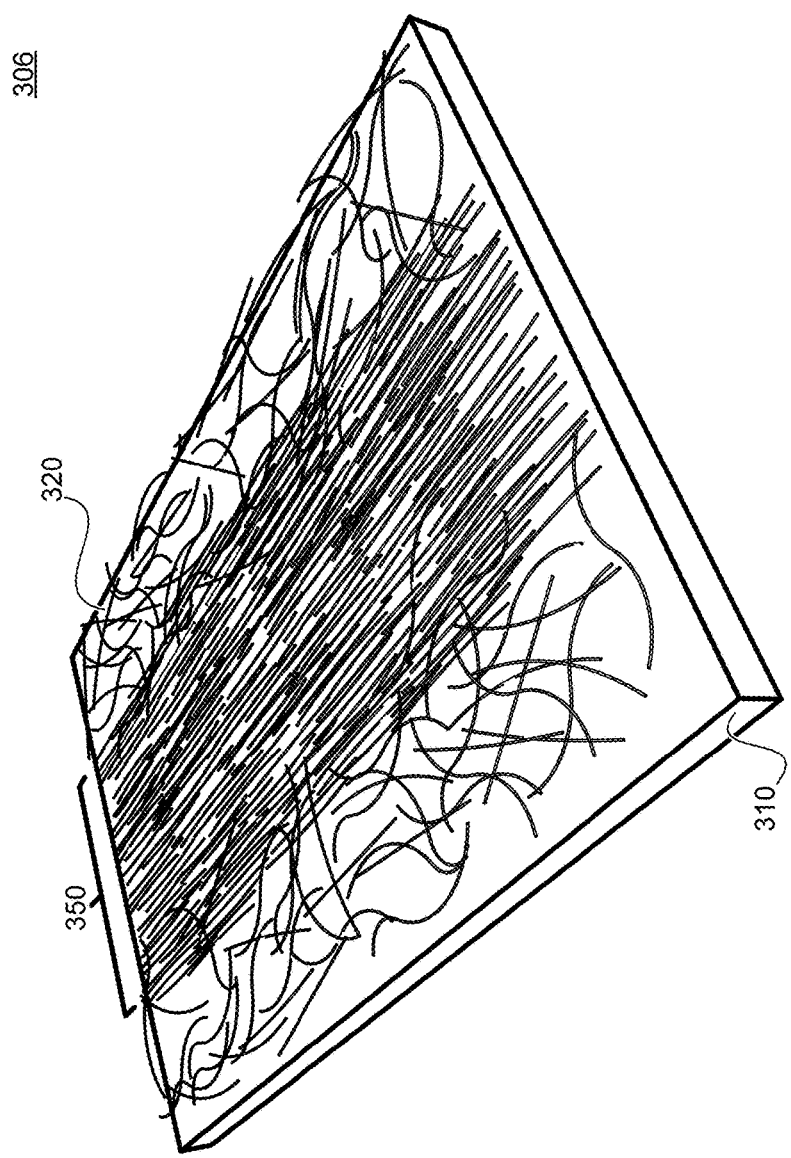

Referring now to FIG. 3F, the rolled region 350 of deposited nanotube fabric layer has been rendered into an ordered network of nanotube elements 320 (as depicted in structure 306). As depicted in FIG. 3F, this rolled region 350 exhibits essentially no gaps or voids between nanotube elements 320. In some embodiments, an additional process step might be used to provide a high temperature anneal process to the ordered network of nanotube elements 320— for example, baking the substrate element 310 and nanotube fabric layer within the range of 400° C. to 625° C. (as dependant on the needs of the specific application) for given time (for example, on the order of thirty minutes). This high temperature anneal process, in some embodiments, is helpful in preventing subsequent exposure to chemical and physical conditions during further processing of the fabric from disturbing the ordered nanotube fabric layer once it has been oriented. For example, in certain embodiments such a high temperature anneal process can render the ordered nanotube fabric into a substantially hydrophobic state, preventing the arranged nanotubes from reacting when exposed to water. However, it should be noted that in some embodiments a sensitivity to certain chemical or physical conditions can be beneficial to a specific application. For example, an ordered nanotube fabric that exhibits a localized change within the fabric when exposed to a specific chemical or physical condition would be useful in a sensor application or within an application for storing and/or recording information.

It should be noted that the illustrations within FIGS. 3A-3F have been provided simply to illustrate the methods of the present disclosure and have been rendered in such a way as to aid in the explanation of these methods. In particular, the relative sizes of the different structural elements within FIGS. 3A-3F have not been drawn to a uniform scale. Indeed, as will be clear to those skilled in the art, nanotube elements 320 would be much smaller than rolling apparatus 330, as would actual gap sizes between such elements 320.

Figure 4:
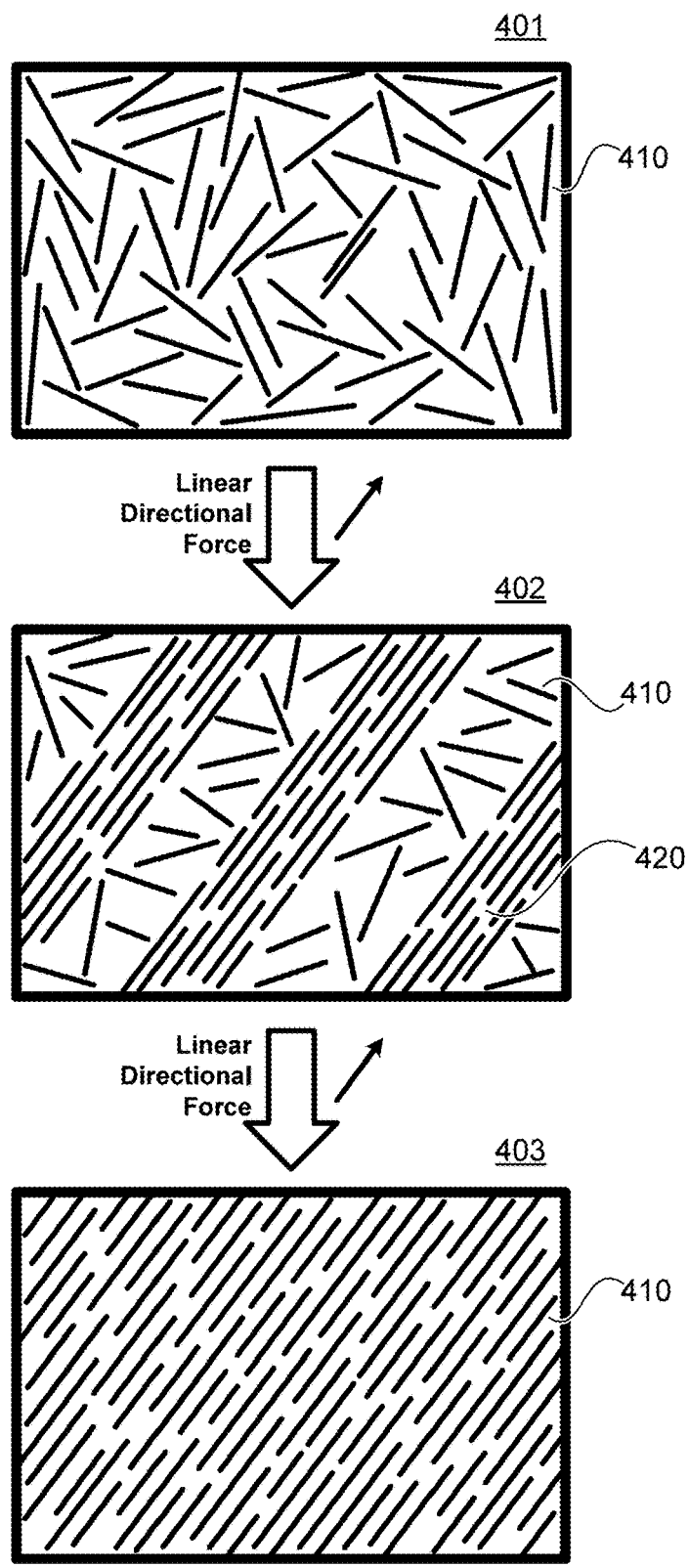
FIG. 4 is a process diagram illustrating a method of rendering a substantially unordered nanotube fabric layer into an ordered network of nanotube elements through the application of a linear directional force.
Figure 5:
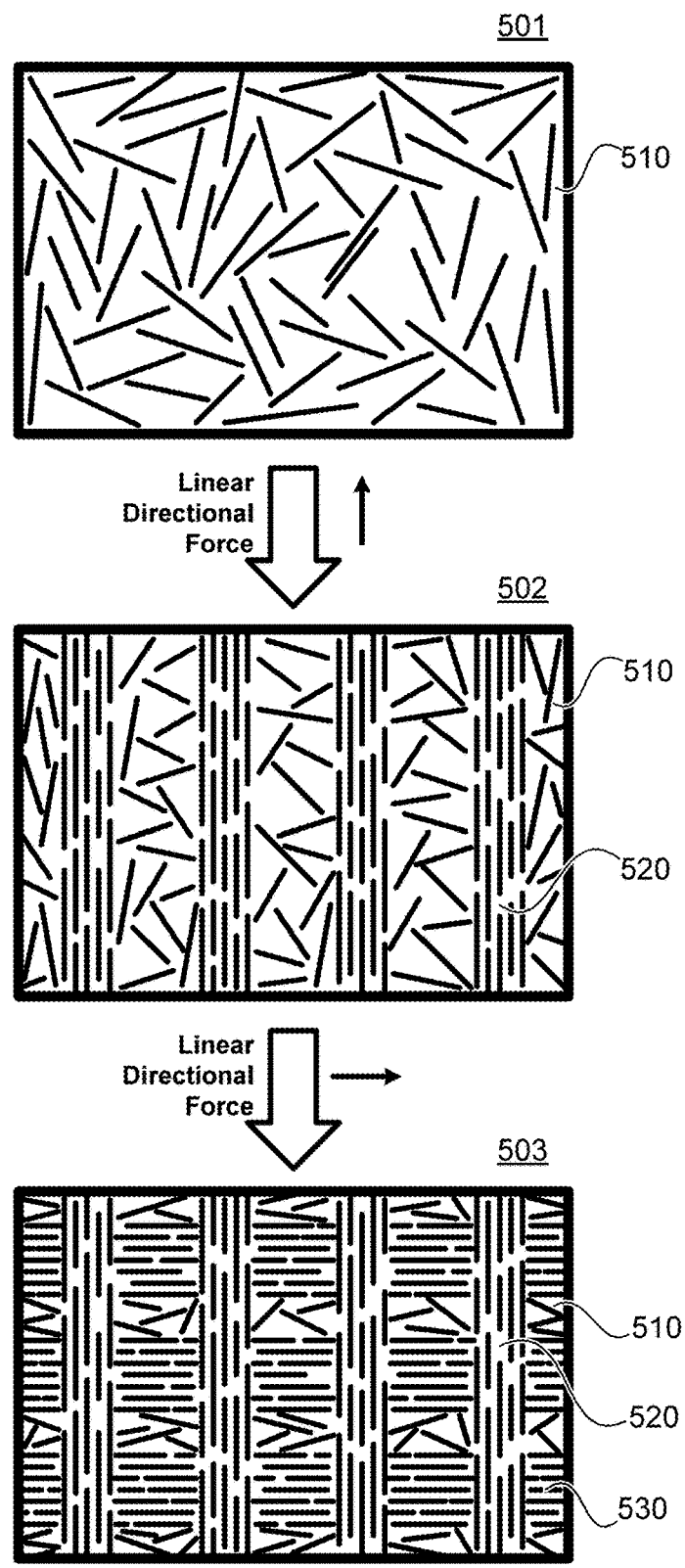
FIG. 5 is a process diagram illustrating a method of rendering a substantially unordered nanotube fabric layer into an ordered network of nanotube elements through the application of two linear directional forces, each force applied separately and in different directions.
Figure 6:
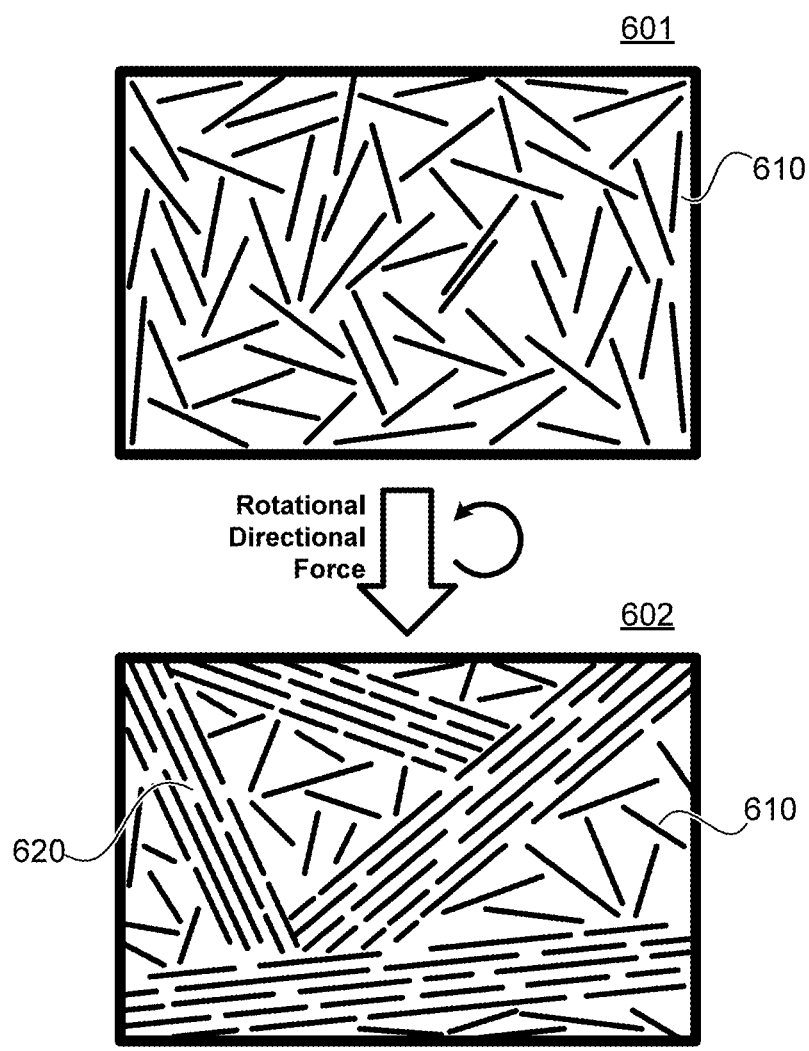
FIG. 6 is a process diagram illustrating a method of rendering a substantially unordered nanotube fabric layer into an ordered network of nanotube elements through the application of a rotational directional force.

While the exemplary process depicted in FIGS. 3A-3F applies a directional force along a single linear path in order to render a nanotube fabric layer into an ordered state, the methods of the present disclosure are not limited in this regard. Indeed, in some applications multiple directional forces may be applied sequentially in different directions to realize a plurality of regions within the nanotube fabric layer wherein the nanotube elements within adjacent ordered regions are oriented in different directions. In other applications, a rotational directional force may be applied over an unordered nanotube fabric layer to form regions of ordered nanotube elements within the nanotube fabric layer. FIGS. 4-6 illustrate the application of different directional forces in order to render nanotube fabrics into networks of ordered nanotube elements according to the methods of the present disclosure.

Referring now to FIG. 4, an exemplary process for rendering an unordered nanotube fabric layer into a network of ordered nanotube elements substantially oriented along a single direction through the use of an applied linear force is depicted. At the start of the exemplary process, an unordered nanotube fabric layer 401 comprising a plurality of nanotube elements 410 is provided. A linear directional force is then applied over the unordered nanotube fabric layer 401 (for example, a rolling force applied fifty times in the direction indicated in FIG. 4) to realize partially ordered nanotube fabric layer 402. Partially ordered nanotube fabric layer 402 exhibits regions of ordered nanotube elements 420 wherein nanotube elements have been oriented in the direction of the applied force. The nanotube elements in these regions 420 are grouped together along their sidewalls, resulting in essentially no gaps or voids within those regions 420. A linear directional force is then applied again along the same direction (for example, the same rolling force applied an additional fifty times) to realize ordered nanotube fabric layer 403. Within ordered nanotube fabric layer 403, essentially all of the nanotube elements 410 have been rendered into a substantially uniform orientation along the direction of the applied force. As depicted in FIG. 4, ordered nanotube fabric layer 403 is substantially free of gaps and voids.

Referring now to FIG. 5, an exemplary process for rendering an unordered nanotube fabric layer into a network of ordered nanotube elements substantially oriented in multiple directions through the use of linear force applied along multiple directions is depicted. At the start of the exemplary process, an unordered nanotube fabric layer 501 comprising a plurality of nanotube elements 510 is provided. A first linear directional force is then applied over the unordered nanotube fabric layer 501 in a first direction (as indicated n FIG. 5) to realize first partially ordered nanotube fabric layer 502. This first linear force may be, for example, a rubbing force applied twenty times. First partially ordered nanotube fabric layer 502 exhibits regions of ordered nanotube elements 520 wherein nanotube elements have been oriented in the direction of the first applied force. The nanotube elements in these regions 520 are grouped together along their sidewalls, resulting in essentially no gaps or voids within those regions 520. A second linear directional force is then applied along a second direction (as indicated in FIG. 5) to realize second partially ordered nanotube fabric layer 503. This second linear force may be, for example, another rubbing force applied twenty times in the second direction. Second partially ordered nanotube fabric layer 503 exhibits a plurality of regions 530 wherein the nanotube elements have been oriented in the direction of the second applied force.

It should be noted that the nanotube elements 510 within the ordered regions 520 (that is, those nanotube elements oriented by the application of the first linear force) are, in general, substantially unaffected by the application of the second linear directional force. That is, once a region of nanotube elements 510 has been sufficiently rendered into an ordered network substantially oriented along a first direction, the nanotube elements within that region will tend to remain in their ordered state, resisting a change in orientation significantly more so than unordered nanotube elements, even when subjected to a force applied in a second direction. It should be noted, however, that in some embodiments, a persistent application of the second linear directional force will reorder an ordered network of nanotubes along the direction of the second directional force.

As depicted in FIG. 5, second partially ordered nanotube fabric layer 503 includes regions 520 ordered along a first direction and regions 530 oriented along a second direction. Within both sets of regions (520 and 530), the nanotube elements 510 are grouped together along their sidewalls, resulting in those regions (520 and 530) being essentially free of gaps and voids. The remaining regions of unordered nanotube elements 510 within second partially ordered nanotube fabric layer 503 could be rendered into an ordered state through the application of an additional directional force.

Figure 11A:
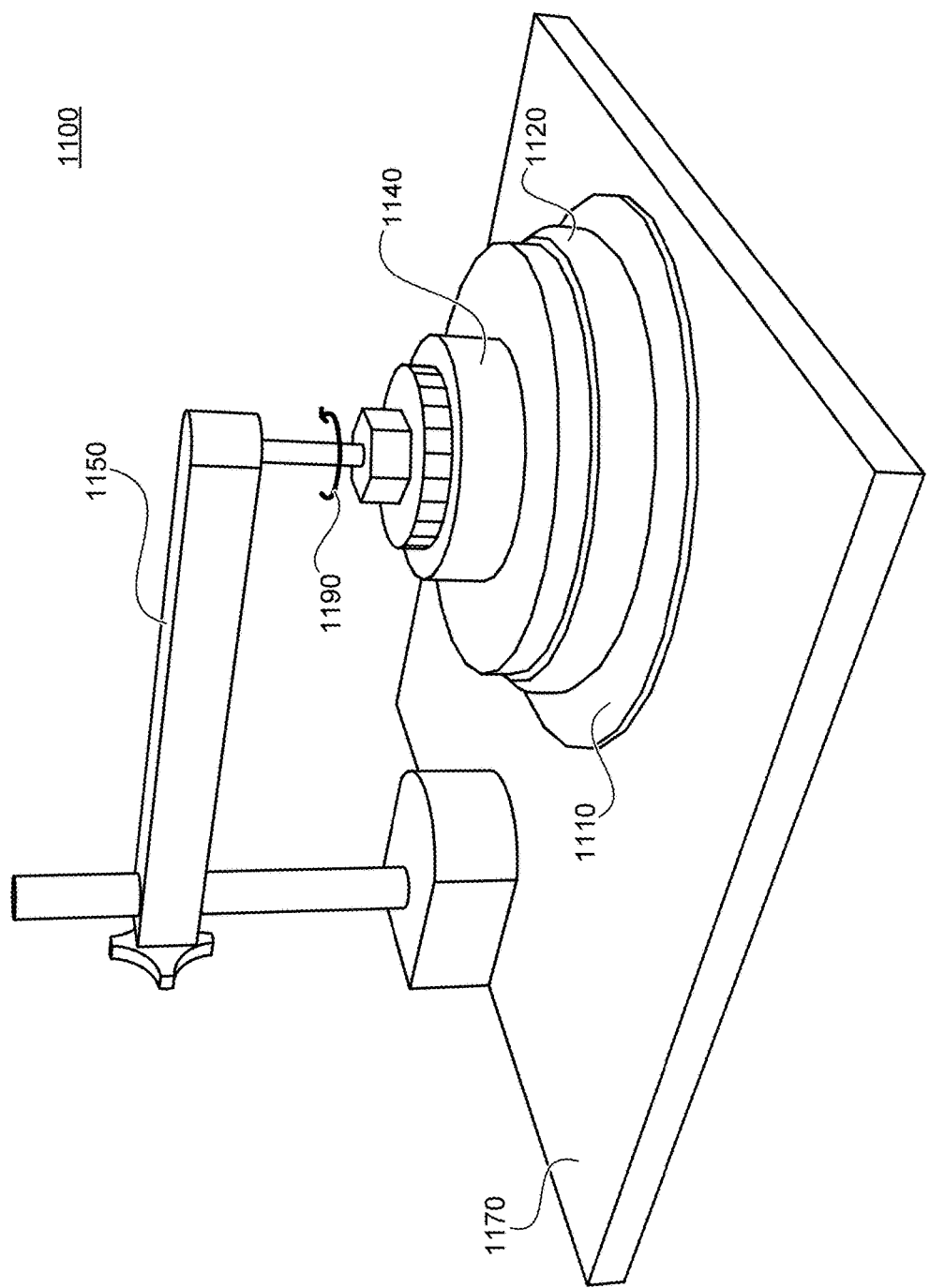
FIG. 11A is a perspective drawing depicting an exemplary polishing apparatus suitable for applying a rotational directional force over a nanotube fabric layer according to the methods of the present disclosure.

Referring now to FIG. 6, an exemplary process for rendering an unordered nanotube fabric layer into a network of ordered nanotube elements (with different regions of the fabric layer substantially oriented in multiple directions) through the use of rotational directional force is depicted. At the start of the exemplary process, an unordered nanotube fabric layer 601 comprising a plurality of nanotube elements 610 is provided. A rotational directional force is then applied over the unordered nanotube fabric layer 601 to provide partially ordered nanotube fabric layer 602. Such a rotational directional force may be applied, for example, by rotating a wool polishing pad at approximately sixty rotations per minute for approximately ninety seconds (an apparatus suitable for applying such a rotational directional force is illustrated in FIGS. 11A and 11B and discussed in detail below). Partially ordered nanotube fabric layer 602 exhibits several regions of ordered nanotube elements 620 wherein nanotube elements have been grouped together along their sidewalls, resulting in essentially no gaps or voids within those regions 620. Due to the rotational directional force, these ordered regions 620 are oriented in different directions. The remaining regions of unordered nanotube elements 610 within partially ordered nanotube fabric layer 602 could be rendered into an ordered state through the application of an additional directional force.

It should be noted that the partially ordered nanotube fabric layers within the previous illustrations (that is, nanotube fabric layers 402, 502, and 602 in FIGS. 4, 5, and 6, respectively) depict nanotube fabric layers initially beginning to order themselves into relatively narrow bands responsive to an applied directional force. In this respect, it should be further noted, these illustrations are consistent with the partially ordered nanotube fabrics depicted within the exemplary SEM images of FIGS. 20A and 25B. Without wishing to be bound by theory, it is believed that within certain embodiments a certain number of nanotube elements within the unordered nanotube fabric will originally be oriented in the direction of the applied directional force. Responsive to the applied directional force, nanotube elements adjacent to these certain nanotube elements—but positioned in slightly different orientations—will tend to adjust their orientation to match that of the nanotube elements already oriented in the desired direction. Within these embodiments, it is believe that increased application (repetition) of a directional force will tend to adjust more and more of the unordered nanotube elements into an orientation consistent with these original nanotube elements until, ultimately, the entire nanotube fabric layer is adjusted into a substantially uniform orientation.

Figure 8A:
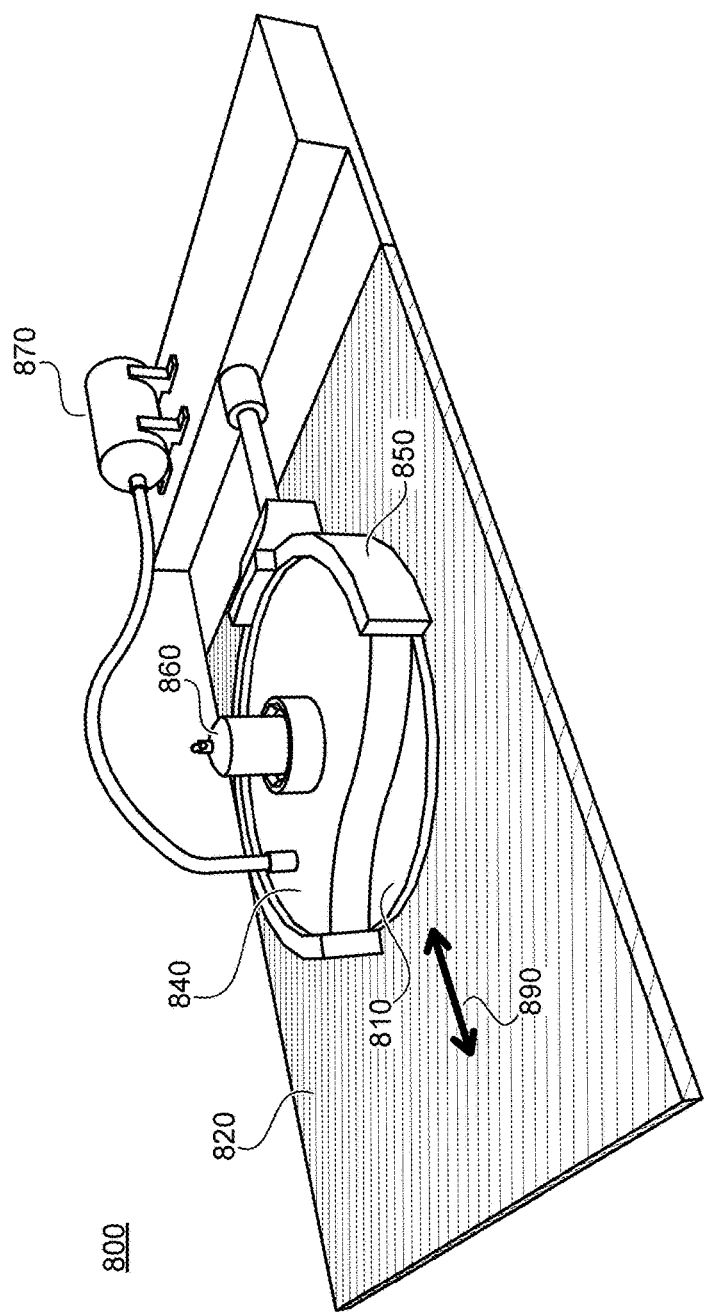
FIG. 8A is a perspective drawing depicting an exemplary rubbing apparatus suitable for applying a directional force over a nanotube fabric layer according to the methods of the present disclosure.
Figure 8B:
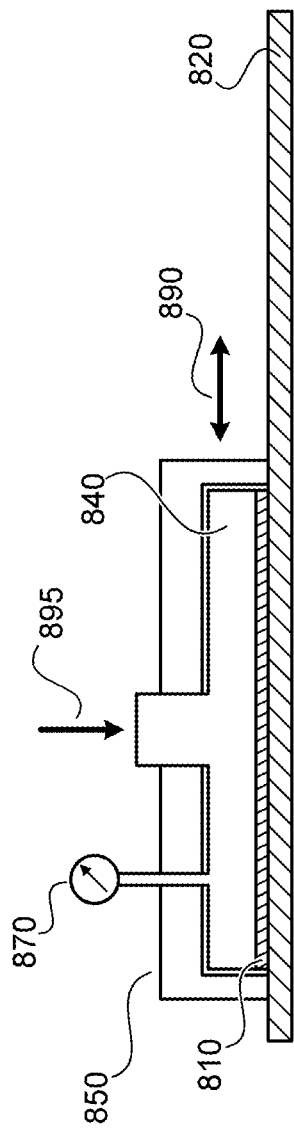
FIG. 8B is a diagram illustrating the operation of the exemplary rubbing apparatus depicted in FIG. 8A.
Figure 9A:
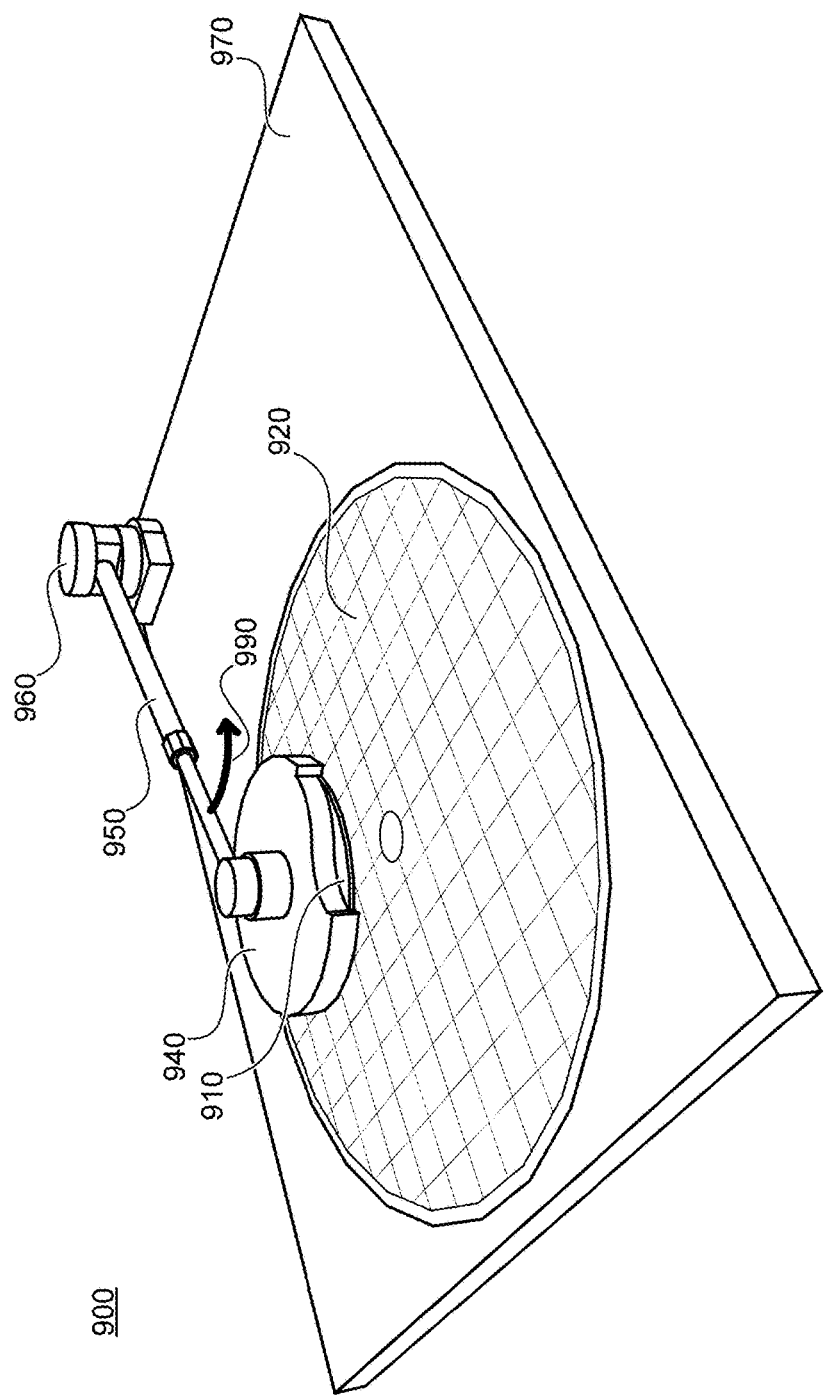
FIG. 9A is a perspective drawing depicting an exemplary rubbing apparatus suitable for applying a directional force in an arc over a nanotube fabric layer according to the methods of the present disclosure.
Figure 9B:
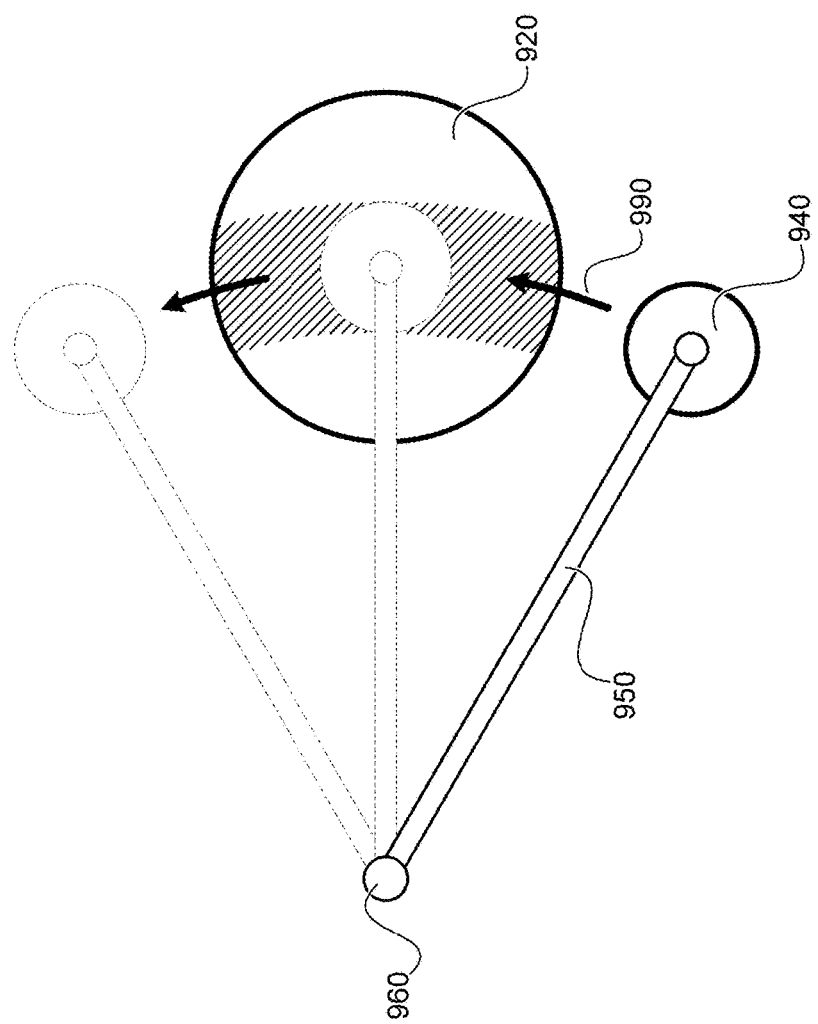
FIG. 9B is a diagram illustrating the operation of the exemplary rubbing apparatus depicted in FIG. 9A.
Figure 10A:
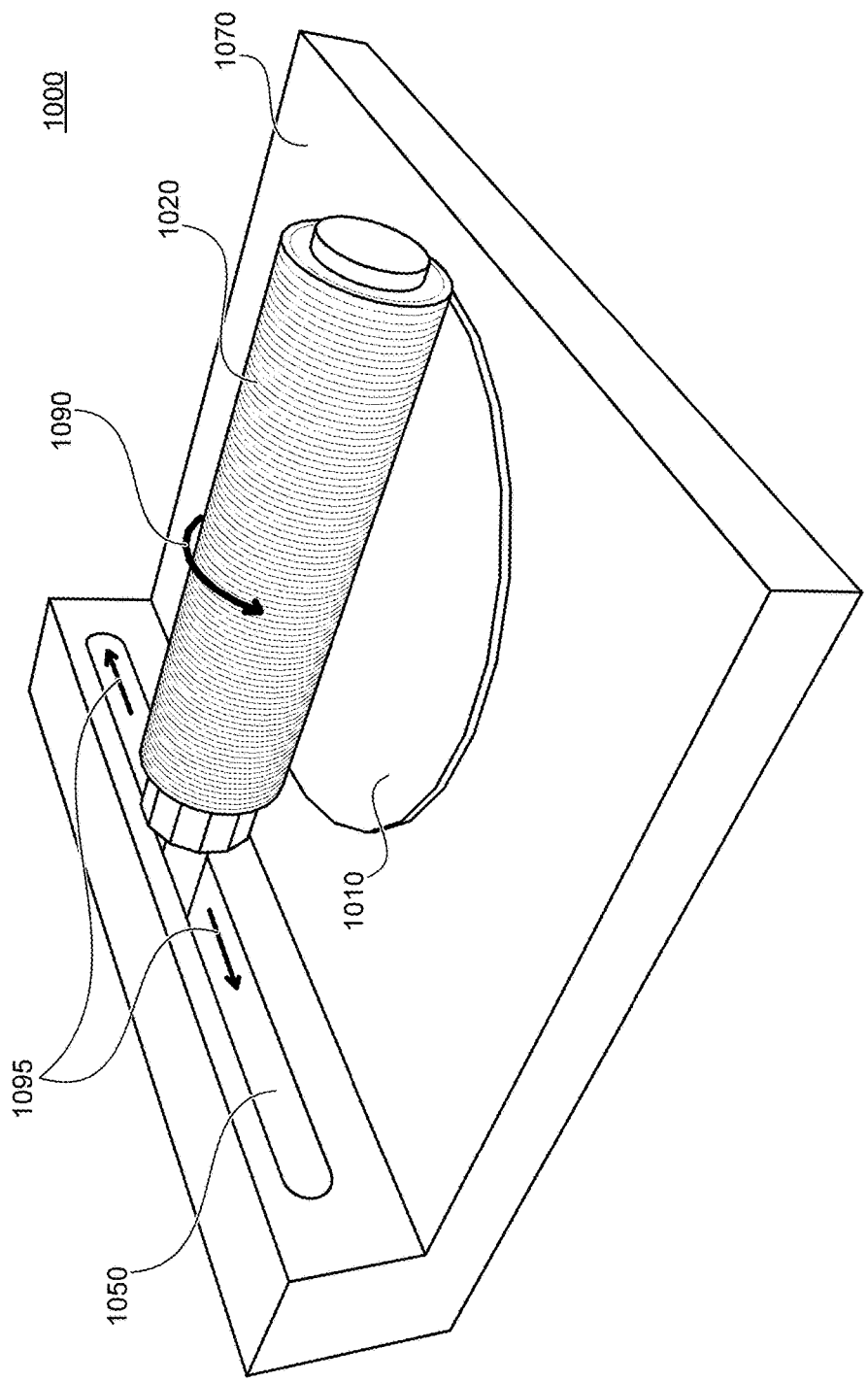
FIG. 10A is a perspective drawing depicting an exemplary polishing apparatus suitable for applying a linear directional force over a nanotube fabric layer according to the methods of the present disclosure.
Figure 12A:
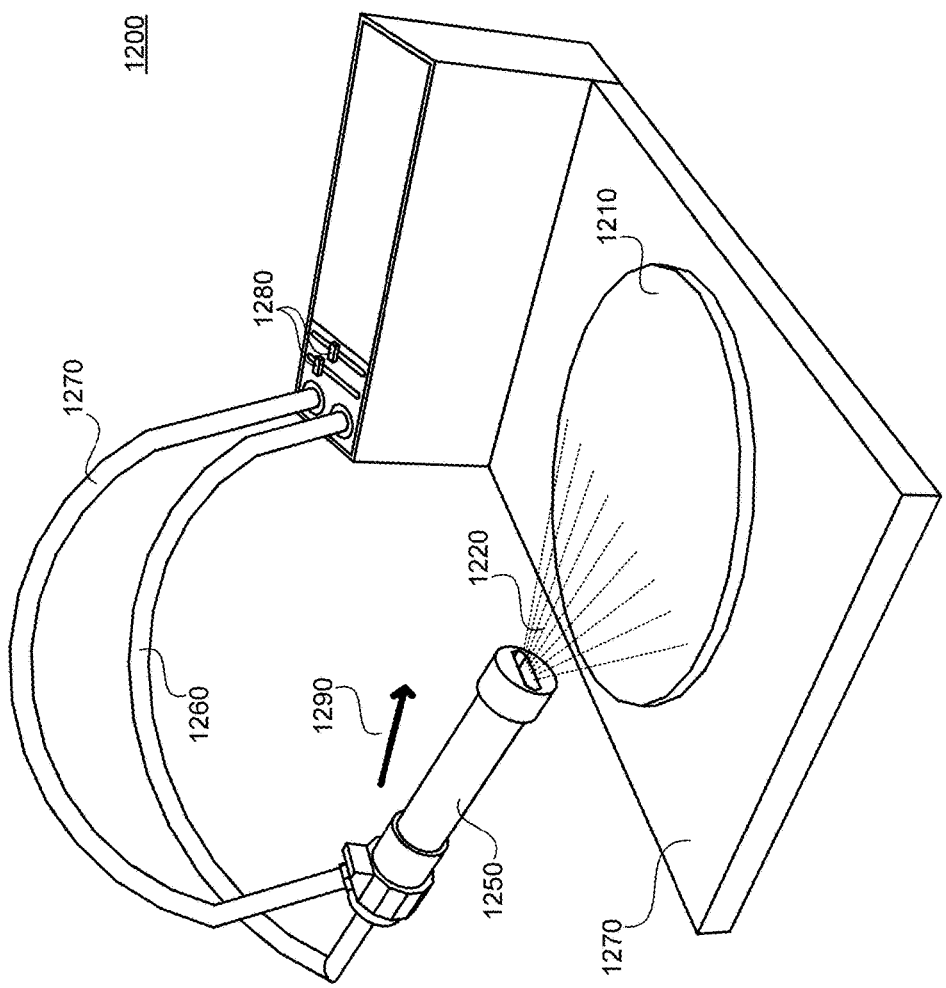
FIG. 12A is a perspective drawing depicting an exemplary cryokinetic impingement apparatus suitable for applying a directional force over a nanotube fabric layer according to the methods of the present disclosure.
Figure 12B:
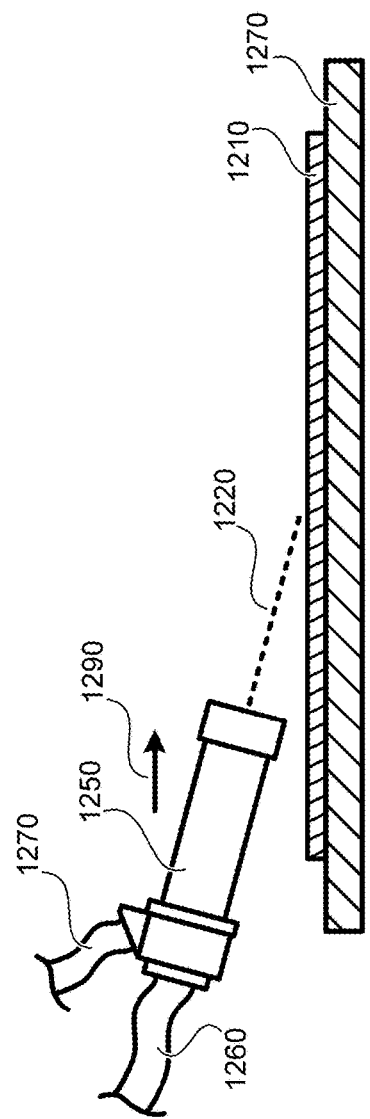
FIG. 12B is a diagram illustrating the operation of the exemplary cryokinetic impingement apparatus depicted in FIG. 12A.

Having introduced the methods of the present disclosure on a relatively high level—specifically the use of a directional force in one or more directions to arrange a substantially unordered (or, in some applications, a partially ordered) nanotube fabric layer into an ordered network of nanotube elements—the present disclosure will now discuss a plurality of methods for applying such a directional force in detail. Specifically, FIGS. 7A-7B detail the use of a rolling apparatus to apply a directional force. FIGS. 8A-8B detail the use of a rubbing apparatus to apply a directional force in a linear motion. FIGS. 9A-9B detail the use of a rubbing apparatus to apply a directional force in an arcing motion. FIGS. 10A-10B detail the use of a polishing apparatus to apply a directional force in a linear direction. FIGS. 11A-11B detail the use of a polishing apparatus to apply a rotational directional force. FIGS. 12A-12B detail the use of a cryokinetic impingement apparatus to apply a directional force. And, FIGS. 13A-13B detail the use of a roll-to-roll polishing apparatus to apply a rotational directional force on a large scale.

Figure 7A:
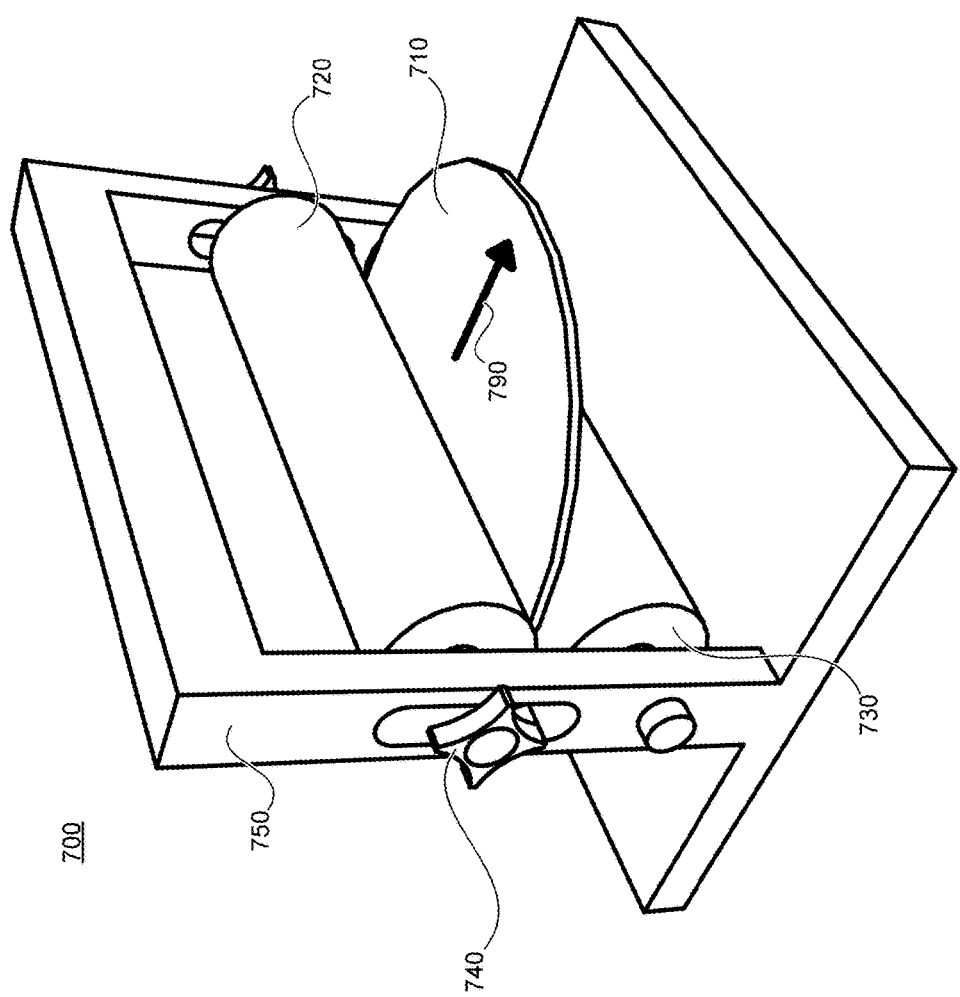
FIG. 7A is a perspective drawing depicting an exemplary rolling apparatus suitable for applying a directional force over a nanotube fabric layer according to the methods of the present disclosure.
Figure 7B:
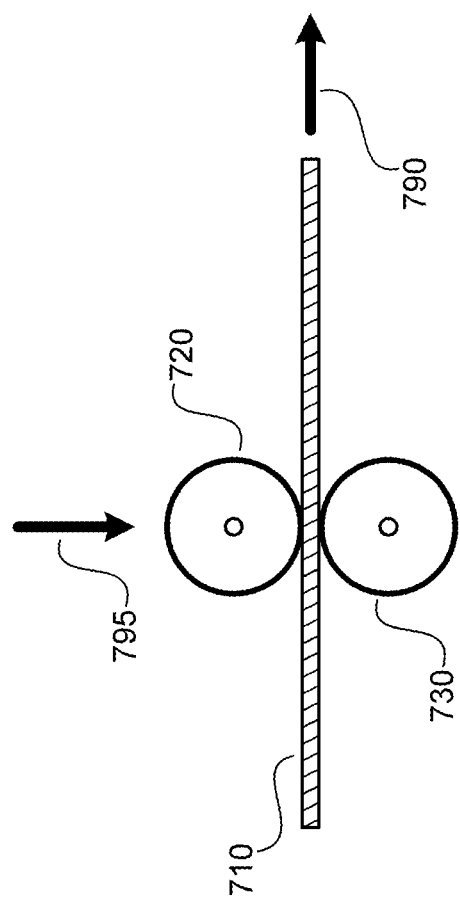
FIG. 7B is a diagram illustrating the operation of the exemplary rolling apparatus depicted in FIG. 7A.

Referring now to FIGS. 7A-7B, a rolling apparatus suitable for applying a linear directional force across a nanotube fabric layer is depicted. As described briefly in the exemplary process depicted in FIGS. 3A-3F, in some applications a directional rolling force can be applied by rolling a cylindrical element over a formed nanotube layer one or more times. This cylindrical element can be formed from a plurality of materials, including, but not limited to, metal (such as, but not limited to, iron, cobalt, nickel, zinc, tungsten, chromium, manganese, magnesium, titanium, aluminum, and their alloys including family of steels), polymers including rubbers, plastics (including polystyrene), melamine, silicone, polycarbonate, polyethylene, porcelain, glasses (including silicon oxide and other crystalline solids), alumina, silicon carbide, and wood. In some embodiments, this cylindrical element is applied directly to the nanotube fabric layer. In other embodiments, an intermediate layer—such as, but not limited to, a layer of polyethylene terephthalate (PET) film—is situated between the nanotube fabric layer and the surface of the cylindrical element. In some embodiments the cylindrical element is rolled over the formed nanotube layer once. In other embodiments the cylindrical element is rolled over the formed nanotube layer on the order of fifty times. In still other embodiments the cylindrical element is rolled over the formed nanotube layer on the order of two hundred and fifty times. In some embodiments, no additional downward force is applied to the cylindrical element as it is passed over the nanotube fabric layer—that is, substantially only the weight of the cylindrical element is responsible for the downward force applied (providing, for example, on the order of 500 Pascals of pressure over the nanotube fabric layer as the roller apparatus is translated across). In other embodiments an additional downward force (for example, on the order of fifty Newtons, or in another example on the order of five hundred Newtons) is applied to the cylindrical element—for example, through the use of a pressing mechanism or through the use of a rolling apparatus which passes a nanotube fabric coated substrate element through a pair of cylindrical rollers held apart a fixed distance. In such embodiments, this additional downward force provides significantly more pressure (for example, on the order of 20,000 Pascals) over the nanotube fabric layer as the roller apparatus is translated across.

Figure 19A:
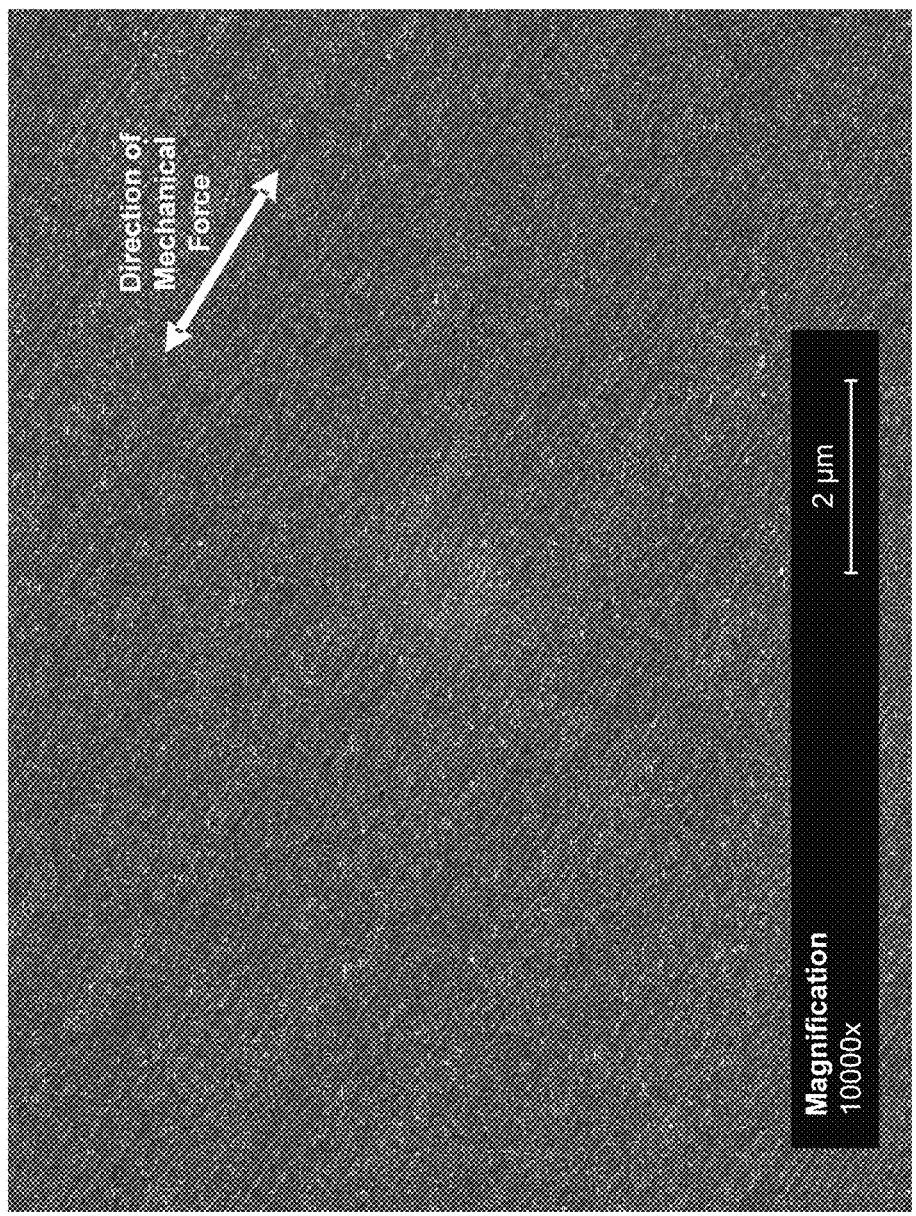
FIGS. 19A-19C are SEM images (at different magnifications) of an exemplary nanotube fabric layer comprising a network of nanotube elements rendered into an ordered arrangement through the application of a directional rolling force.
Figure 19B:
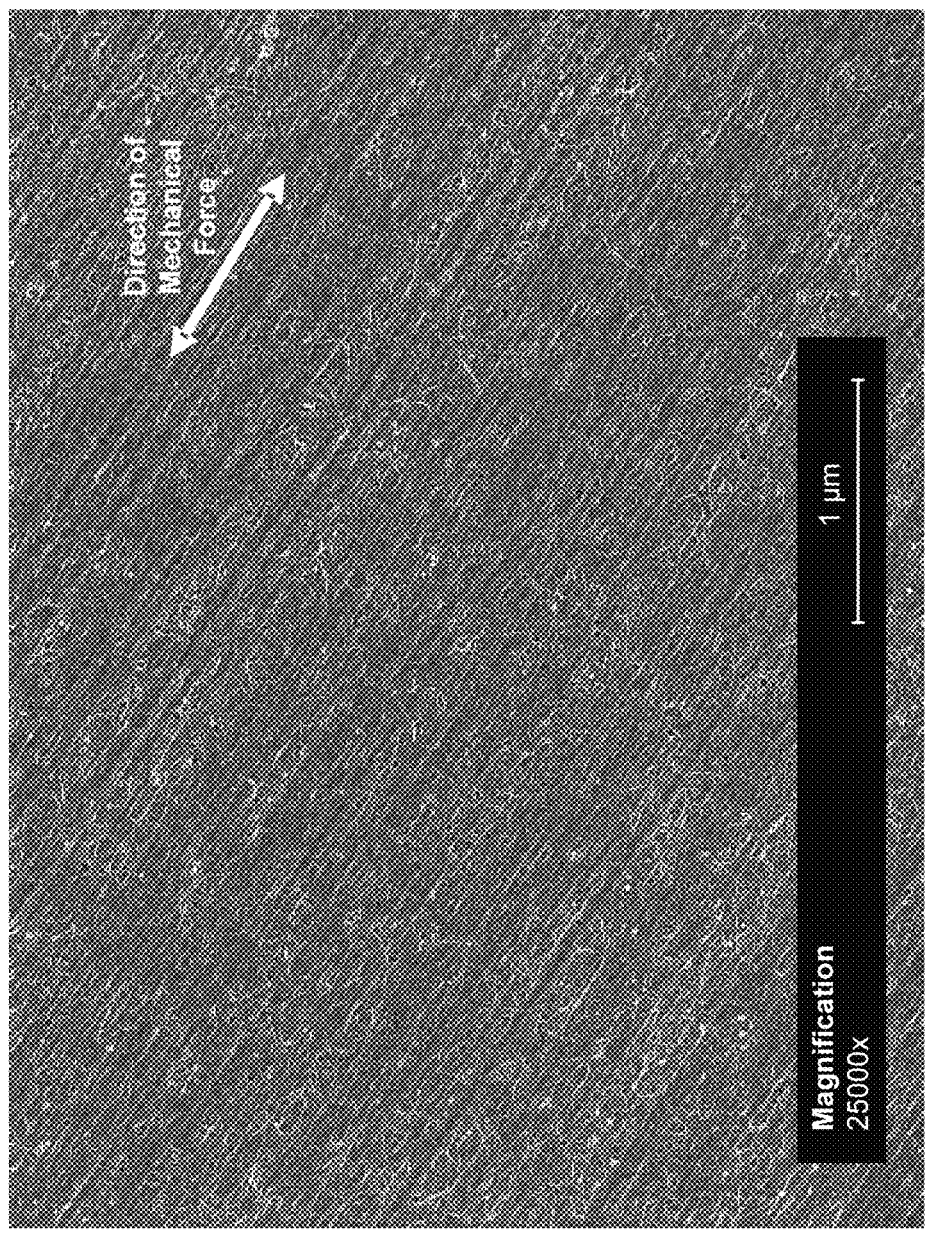
Figure 19C:
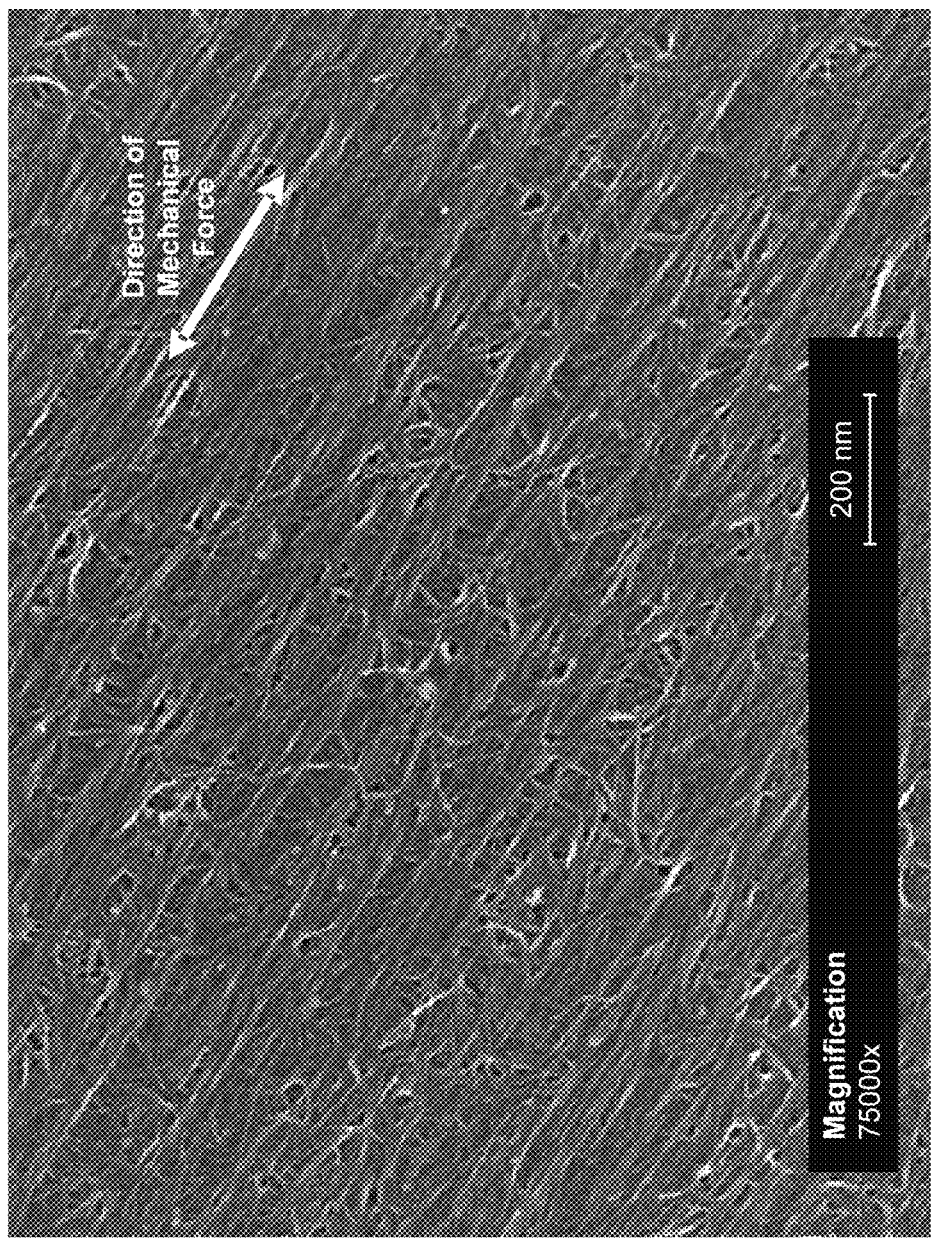

FIGS. 7A and 7B are a perspective drawing and an application diagram, respectively, depicting an exemplary rolling apparatus 700 suitable for applying a rolling force over a deposited nanotube fabric layer according to the methods of the present disclosure. A substrate element 710 coated with a nanotube fabric layer is passed between upper roller element 720 and lower roller element 730 along direction 790. Upper roller element 720 is adjustable within frame 750 through adjustment mechanism 740 such that a desired rolling force may be applied to the substrate element 710 along direction 795 and translated across a nanotube fabric layer deposited on the substrate element 710 along direction 790 as it is passed between upper and lower roller elements (720 and 730, respectively). In this way, a rolling force can be applied across a nanotube fabric layer one or more times, rendering the nanotube layer into a network of ordered nanotube elements. FIGS. 19A-19C (discussed in detail below) are SEM images depicting an exemplary nanotube fabric layer after the application of such a directional rolling force.

Referring now to FIGS. 8A-8B, a rubbing apparatus suitable for applying a linear directional force across a nanotube fabric layer is depicted. In some applications, a directional rubbing force can be applied to a nanotube fabric layer by first forming a nanotube fabric layer over a substrate layer and subsequently sliding that nanotube fabric layer across a rubbing surface (the nanotube fabric layer in direct contact with the rubbing surface) one or more times (as is depicted in the exemplary apparatus of FIGS. 8A-8B). In other applications, a rubbing surface can be moved over a formed nanotube fabric layer (that is, the nanotube fabric layer is fixed in place while a rubbing element is moved across—such as the exemplary apparatus illustrated in FIG. 21). Within the methods of the present disclosure, a rubbing element comprises a sheet of flat material which can provide a smooth interface to a nanotube fabric to minimize abrasion or scratching of the nanotube fabric. Such a rubbing surface or rubbing element can be formed from a plurality of materials, including, but not limited to, the smooth surface of an elemental silicon wafer, polytetrafluoroethylene (PTFE), cellulose acetate, cellulose (e.g., rayon), polyesters (e.g., polyethylene terephthalate and polybutyrate), polyamides (e.g., commercially available nylons), polymeric materials (in fibrous, foam, fabric, or film forms) including blends of the aforementioned polymer material types or natural materials (e.g., leather, cellulosic material as fiber or sheets), and semi-rigid slurries (such as, but not limited to, semi-rigid slurries of starch and water).

In some embodiments the nanotube fabric layer is passed over the rubbing surface once. In other embodiments the nanotube fabric layer is passed over the rubbing surface on the order of twenty times. In still other embodiments the nanotube fabric layer is passed over the rubbing surface on the order of two hundred times. In some embodiments the nanotube fabric layer is passed over the rubbing surface with a unidirectional movement (that is, only propelled forward against the rubbing surface a set distance from an initial position, then lifted from the rubbing surface and returned to this initial position for subsequent rubbing passes). In other embodiments the nanotube fabric layer is passed over the rubbing surface with a bidirectional movement (that is, propelled forward against the rubbing surface a set distance from an initial position and then pulled back against the rubbing surface to the initial position again).

In some embodiments a normal force (applied orthogonally with respect to the directional force) is applied either to the substrate element or to the rubbing surface (or both) such as to modulate the pressure between the two materials, and thus modulate the magnitude of the directional force as it is translated across the nanotube fabric layer. In some embodiments the pressure provided by this additional downward force is on the order of 300 to 800 Pascals. In other embodiments the pressure provided by this additional downward force may be greater than 1000 Pascals. In certain embodiments, such pressures may increase the speed or quality of ordering within the underlying nanotube fabric layer so long as such pressures do not damage or otherwise ablate the fabric layer.

FIGS. 8A and 8B are a perspective drawing and an application diagram, respectively, depicting an exemplary rubbing apparatus 800 well suited for applying a directional rubbing force over a nanotube fabric layer according to the methods of the present disclosure. Within this example, a nanotube fabric is formed on a substrate element 810, and the substrate element 810 is then moved across a fixed rubbing surface 820. The substrate element 810 (coated with a nanotube fabric layer) is secured against a vacuum plate 840 (using vacuum pump 870) and placed against rubbing surface 820 such that the nanotube fabric layer is against rubbing surface 820. A carrier mechanism 850 is secured around vacuum plate 850 and used to propel substrate element 810 across rubbing surface 820 along direction 890. A weighted element 860 is positioned atop vacuum plate 840 such as to increase the pressure applied between the nanotube fabric layer and the rubbing surface 820. The additional force provided by weighted element 860 in direction 895 is translated across the nanotube fabric layer in direction 890 as substrate element 810 is propelled across rubbing surface 820. In this way, a rubbing force can be applied across a nanotube fabric layer one or more times, rendering the nanotube layer into a network of ordered nanotube elements. FIGS. 20A-20C, 21A-21C, and 22A-22C (discussed in detail below) are SEM images depicting nanotube fabric layers after the application of such a directional rubbing force.

Referring now to FIGS. 9A-9B, a rubbing apparatus suitable for applying a directional force in an arcing motion across a nanotube fabric layer is depicted. In some applications a directional rubbing force can be applied to a nanotube fabric layer by passing a rubbing element over the surface of a formed nanotube fabric layer in an arcing motion. For example a chemical mechanical polishing (CMP) machine can be used to pass a rubbing pad back and forth in a shallow arc over a nanotube fabric layer deposited over a substrate element (the substrate held in a fixed position on a vacuum plate within the CMP machine). Such a rubbing pad might typically be formed of a polyurethane material, but may be comprised of other materials, including, but not limited to, polyester and polyamide microfibers, other forms of polyester (e.g., fibrous, foam, fabric, and film forms of polyester), polyamide and other polymers, styrene, polyvinylalcohol foam, cotton, wool, cellulose, and rayon.

Figure 23A:
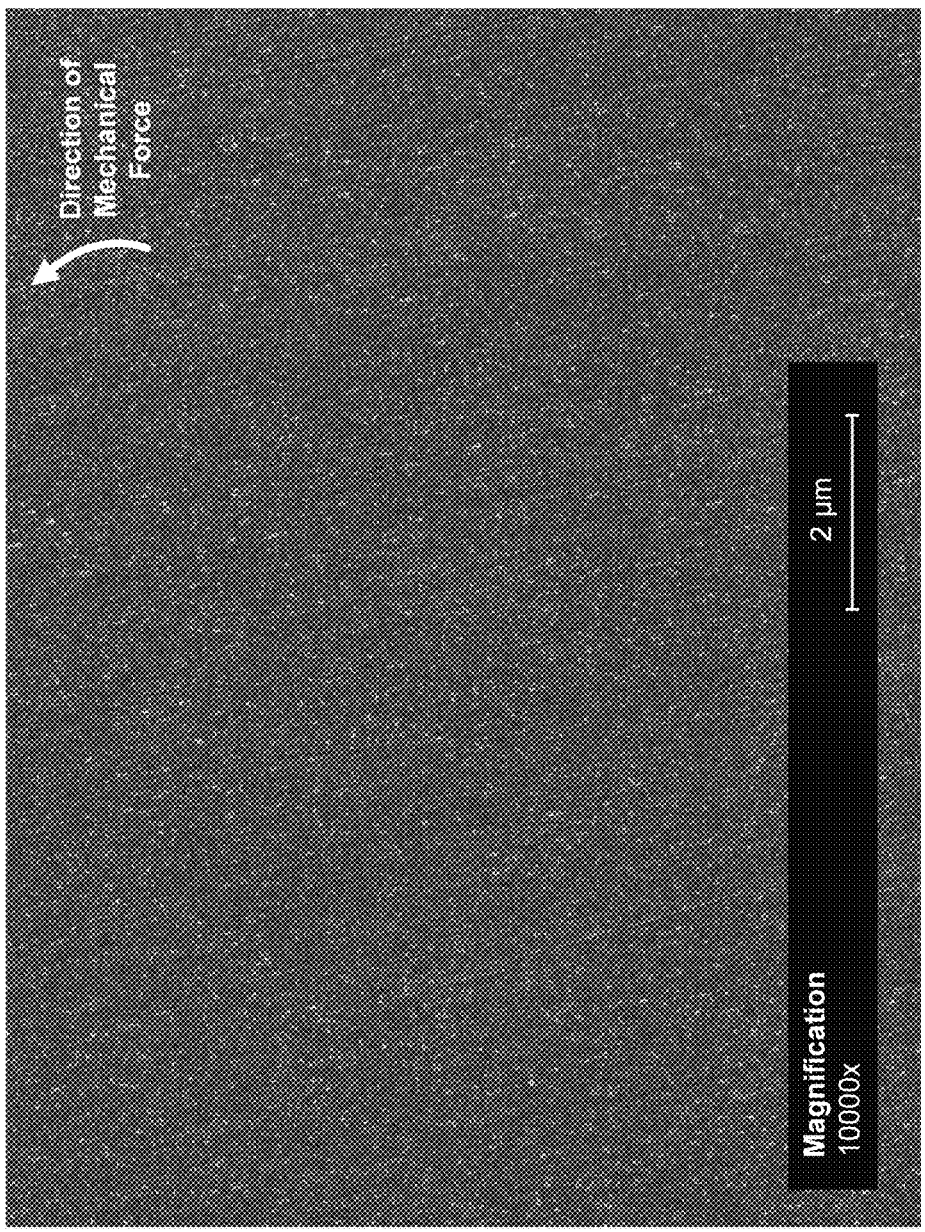
FIGS. 23A-23C are SEM images (at different magnifications) of an exemplary nanotube fabric layer comprising a network of nanotube elements rendered into an ordered arrangement after one hundred passes of a wool rubbing pad swept across the nanotube fabric layer in an arcing motion.
Figure 23B:
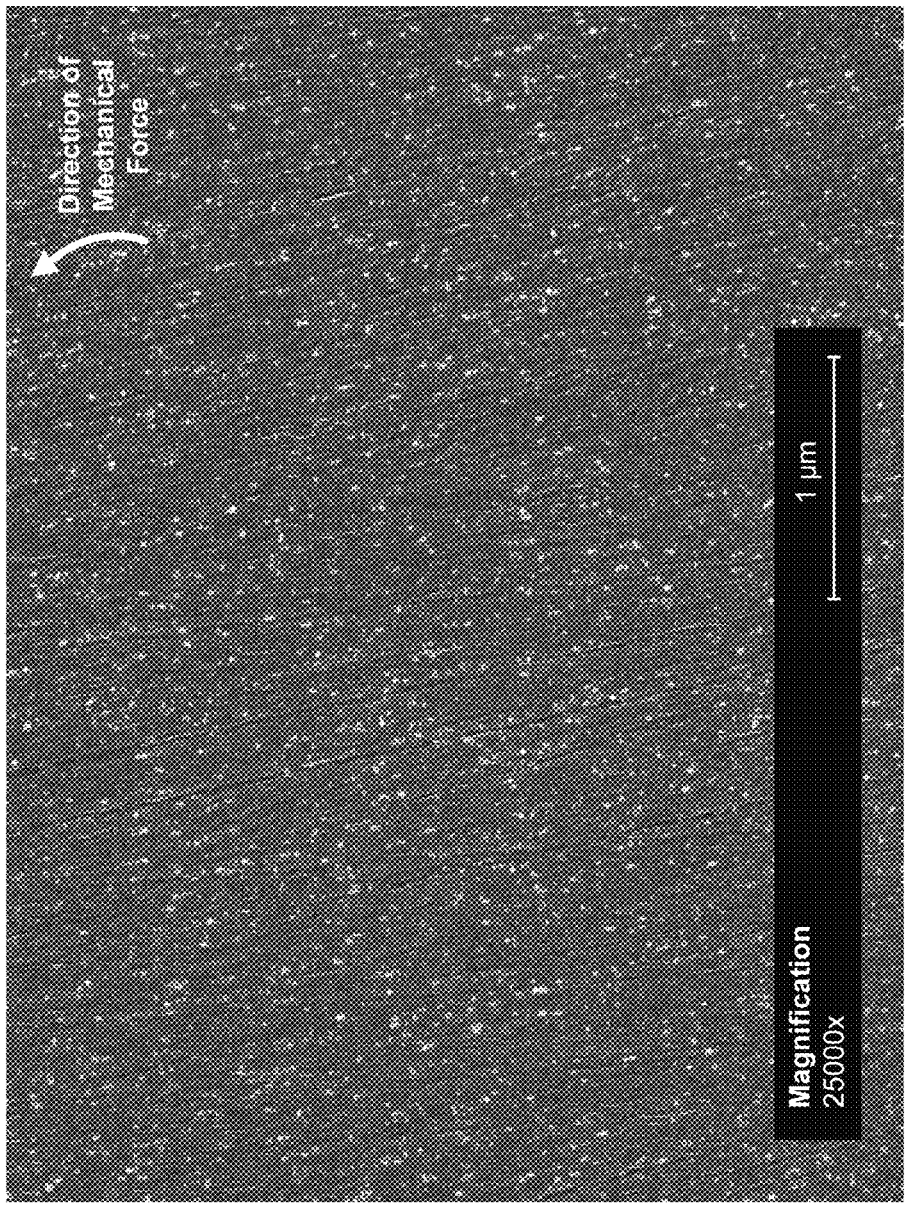
Figure 23C:
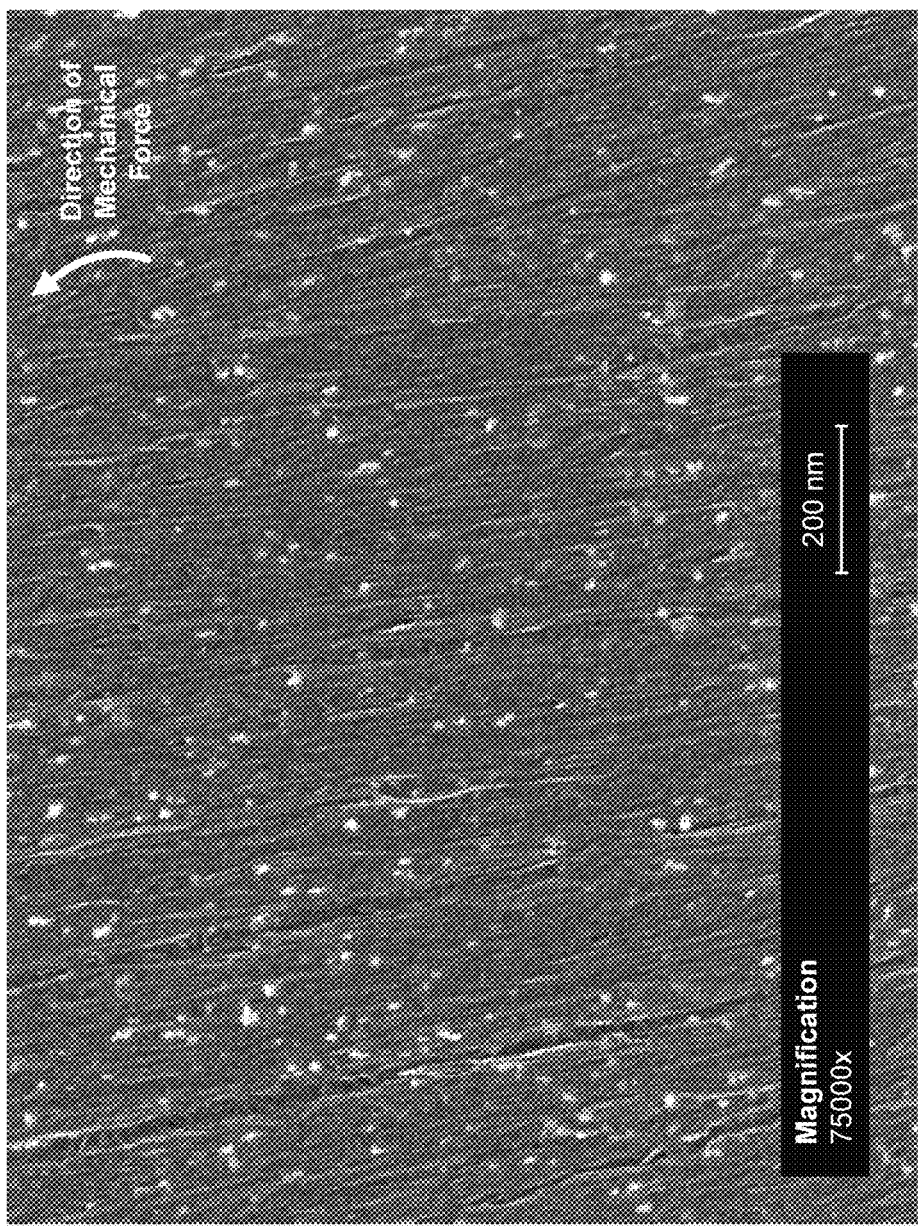

FIGS. 9A and 9B are a perspective drawing and an application diagram, respectively, depicting a first exemplary rubbing apparatus 900 suitable for applying a directional force over a deposited nanotube fabric layer in an arcing motion according to the methods of the present disclosure. A substrate element 910 coated with a nanotube fabric layer is placed within a carrier assembly 940. The carrier assembly 940 is moved by adjustable arm 950 rotating on pivot mechanism 960 in an arc across rubbing surface 920 (fixed in place within device surface 970) such that the nanotube fabric layer deposited on the surface of substrate element 910 is passed over rubbing surface 920 in direction 990. In this way, a rubbing directional force can be applied across a nanotube fabric layer one or more times, rendering the nanotube layer into a network of ordered nanotube elements. FIGS. 23A-23C (discussed in detail below) are SEM images depicting nanotube fabric layers after the application of such a directional rubbing force. It should be noted, that as show in FIGS. 23A-23C, a nanotube fabric ordered via a rubbing directional force applied in a wide arcing motion will tend to order in a substantially linear direction.

Referring now to FIGS. 10A-10B, a polishing apparatus suitable for applying a directional force in a linear motion across a nanotube fabric layer is depicted. A cylindrical polishing element—e.g., as a rigid cylinder coated with a soft polishing material (such as, but not limited to, wool and velour) and rotated about its long axis—can be rotated on the order of fifteen to twenty rotations per minute (RPM) as it is translated linearly over a region of the nanotube fabric layer (with the rotating cylinder in contact with the nanotube fabric layer) repeatedly for several minutes. Suitable polishing material may include, but is not limited to, polyester and polyamide microfibers, other forms of polyester (e.g., fibrous, foam, fabric, and film forms of polyester), polyamide and other polymers, styrene, polyvinylalcohol foam, cotton, wool, cellulose, and rayon. The force applied to the polishing material as it is translated across the nanotube fabric layer may be selected as to increase the pressure between the two materials. For example, in some embodiments the applied force is selected such as to compress the nap of the polishing material against the nanotube fabric layer by approximately fifty percent. In some embodiments it may be important to prevent this force from compressing the nap of the polishing material completely and allowing the backing of the polishing material to come into physical contact with the nanotube fabric layer. Within such embodiments, such contact may result in the backing layer scratching or otherwise damaging the nanotube fabric layer. As the polishing material is passed across the nanotube fabric layer, this additional force is translated across the nanotube fabric layer imparting a directional force over the fabric. In some embodiments this applied force may result in a pressure on the order of 5 to 100 Pascals across the nanotube fabric layer. In other embodiments this applied force may result in a pressure on the order of 500 Pascals.

Figure 24A:
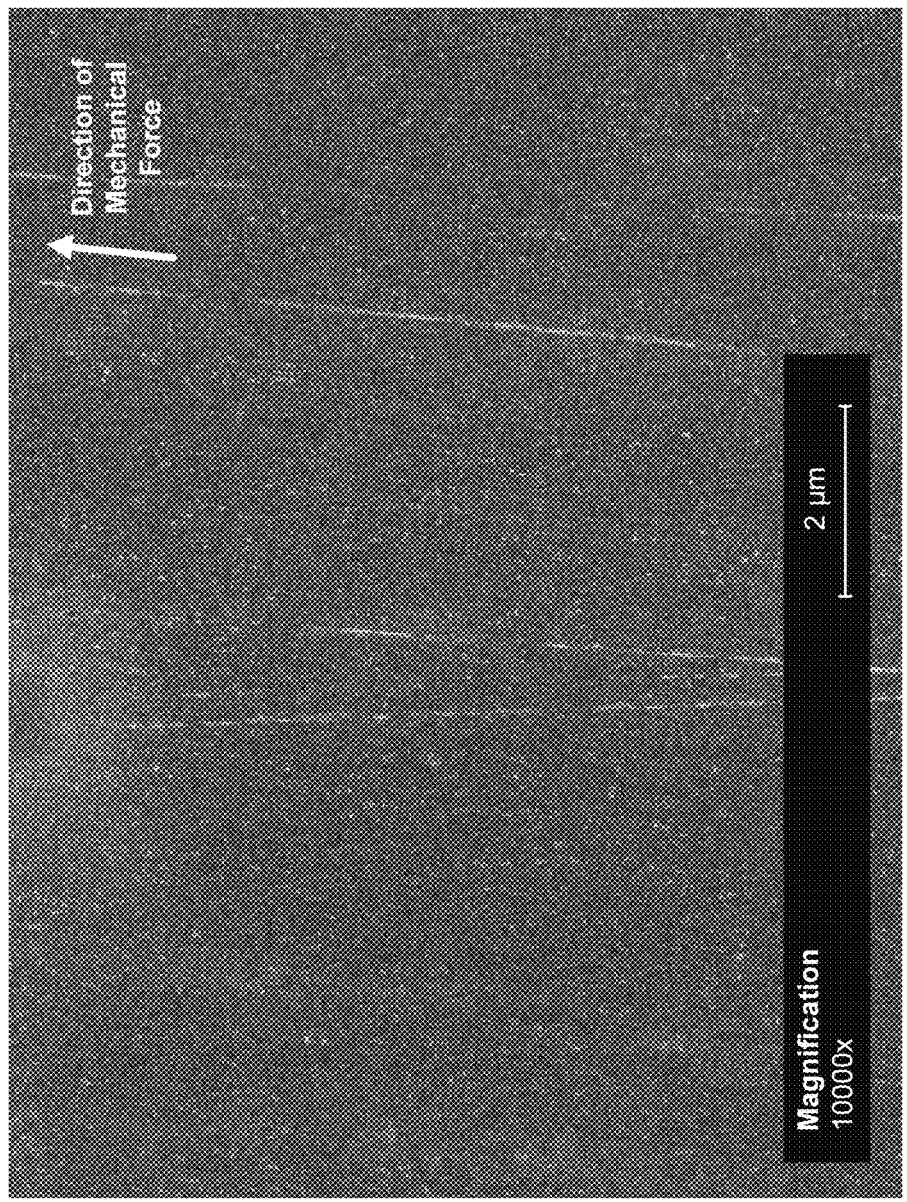
FIGS. 24A-24C are SEM images (at different magnifications) of an exemplary nanotube fabric layer comprising a network of nanotube elements rendered into an ordered arrangement after fifty passes of a velour polishing roller swept across the nanotube fabric layer in an linear motion.
Figure 24B:
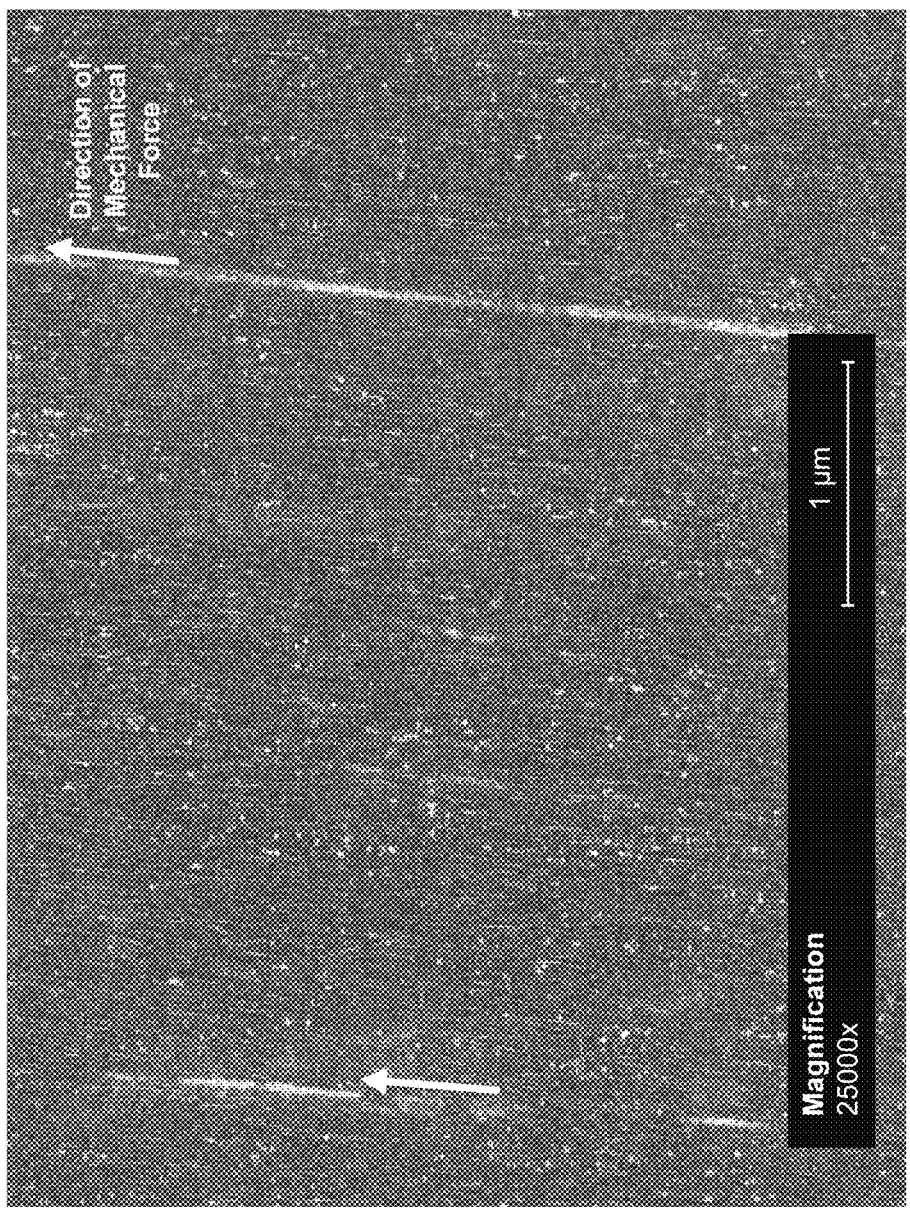
Figure 24C:
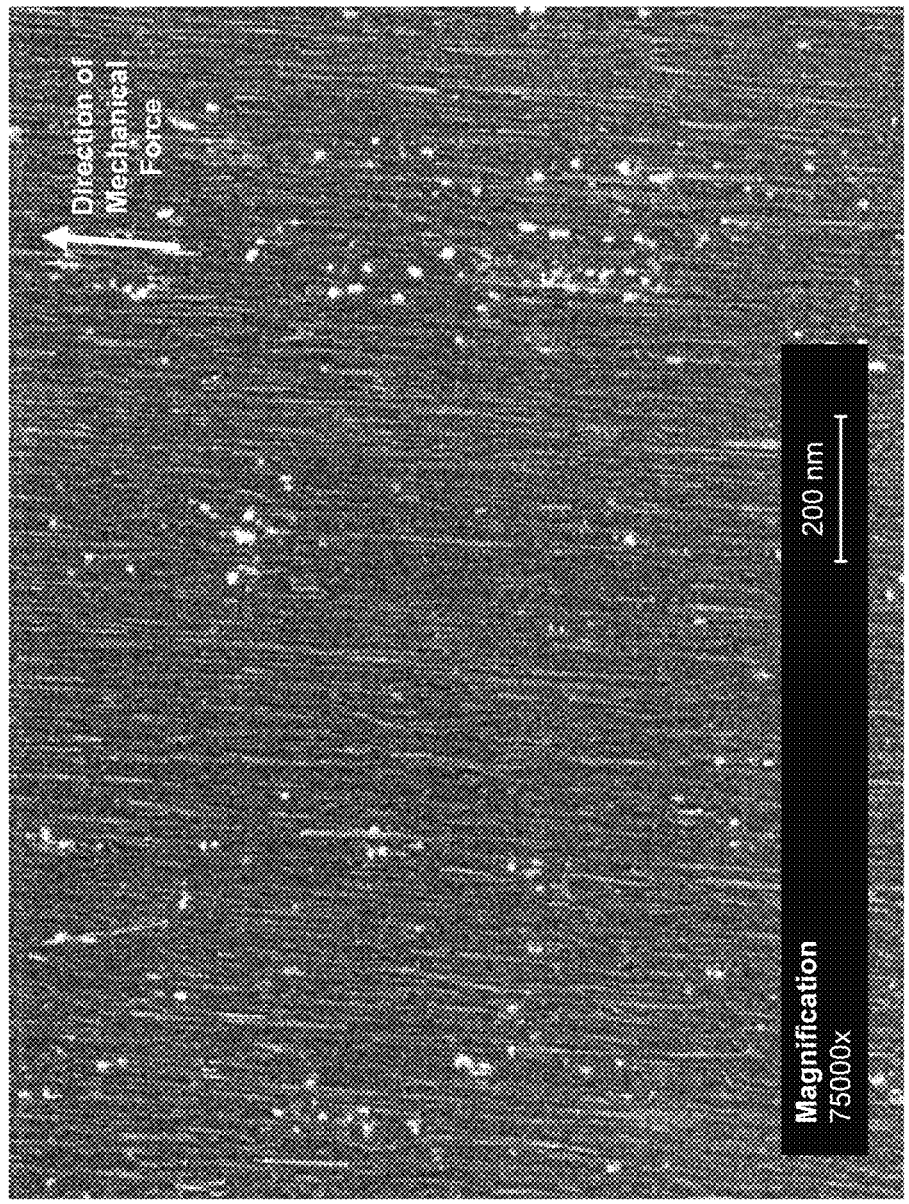

FIGS. 10A and 10B are a perspective drawing and an application diagram, respectively, depicting a second exemplary polishing apparatus 1000 suitable for applying a directional force over a deposited nanotube fabric layer according to the methods of the present disclosure. A substrate element 1010 coated with a nanotube fabric layer is secured in place on a vacuum table 1070. A cylindrical polishing element 1020 is positioned within track element 1050 such that the polishing material covering the surface of cylindrical polishing element 1020 is placed against the nanotube fabric layer deposited over substrate element 1010. Cylindrial roller 1020 is rotated in direction 1090 (for example, at 60 rpm) and then moved within track element 1050 such that the force applied by the cylindrical polishing element 1020 is translated across the nanotube fabric layer deposited on substrate element 1010. In this way, a polishing force can be applied across a nanotube fabric layer one or more times, rendering the nanotube layer into a network of ordered nanotube elements. FIGS. 24A-24C (discussed in detail below) are SEM images depicting nanotube fabric layers after the application of such a polishing directional force.

Referring now to FIGS. 11A-11B, a polishing apparatus suitable for applying a rotational directional force over a nanotube fabric layer is depicted. A rotational directional force can be applied to a nanotube fabric layer by rotating a polishing element over the surface of a formed nanotube fabric layer. For example a polishing pad can be placed over a nanotube fabric layer and rotated for a set time (for example, on the order of ninety seconds). Suitable material for the polishing element may include, but is not limited to, polyester and polyamide microfibers, other forms of polyester (e.g., fibrous, foam, fabric, and film forms of polyester), polyamide and other polymers, styrene, poly vinylalcohol foam, cotton, wool, cellulose, and rayon. In some embodiments, a polishing material may be selected according to a specific denier specification (denier being an attribute of textiles indicating the weight in grams of 9000 meters of a fiber). In some embodiments an additional force is applied to the polishing element as it is rotated over the nanotube fabric layer as to increase the pressure between the two materials. As the polishing element is rotated, this additional force is translated across the nanotube fabric layer. In some embodiments this applied force may result in a pressure on the order of two to five Pascals across the nanotube fabric layer. In other embodiments this applied force may result in a pressure on the order of 100 Pascals.

Figure 25A:
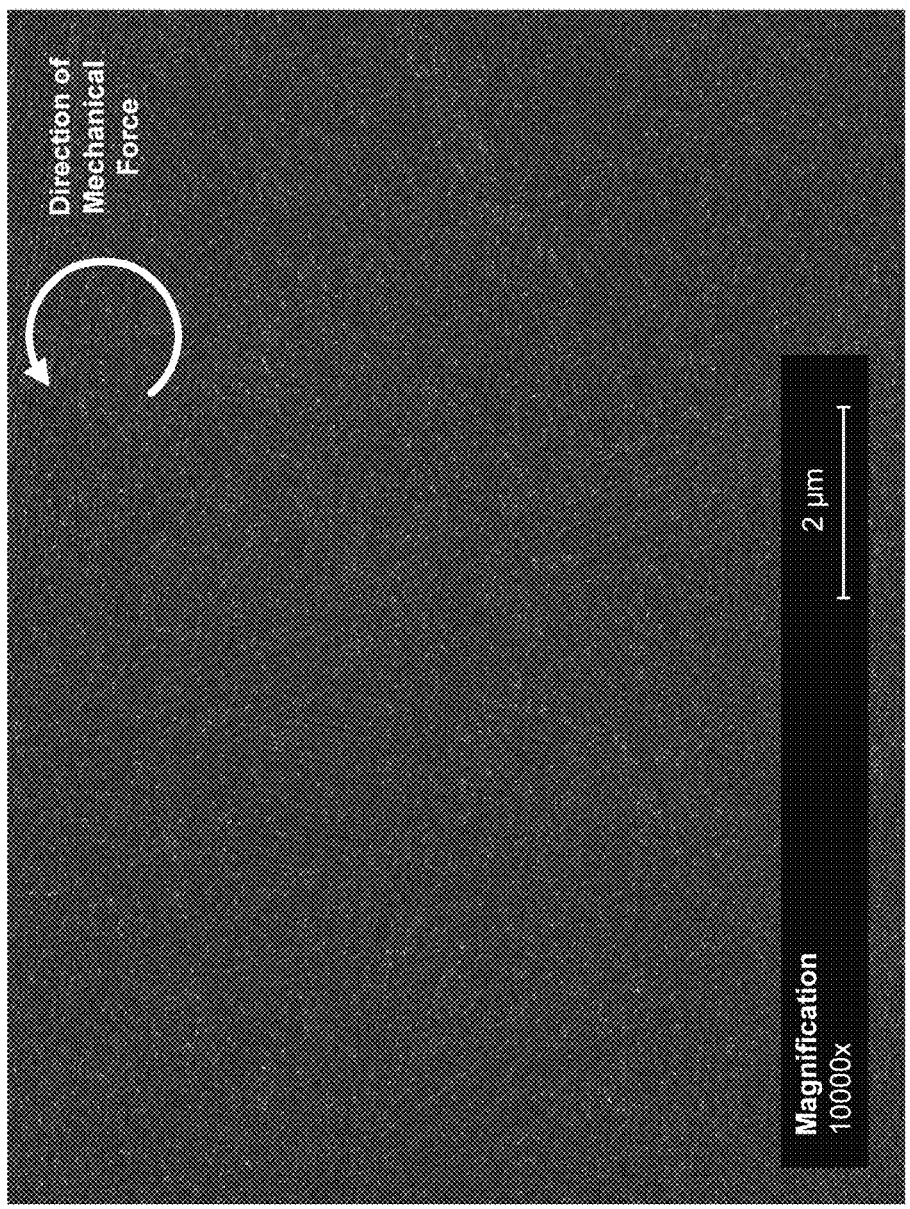
FIGS. 25A-25C are SEM images (at different magnifications) of an exemplary nanotube fabric layer comprising a network of nanotube elements rendered into an ordered arrangement after the application of a rotational directional force over the nanotube fabric layer via a rotating wool polishing pad rotated at sixty rpm for ninety seconds.
Figure 25B:
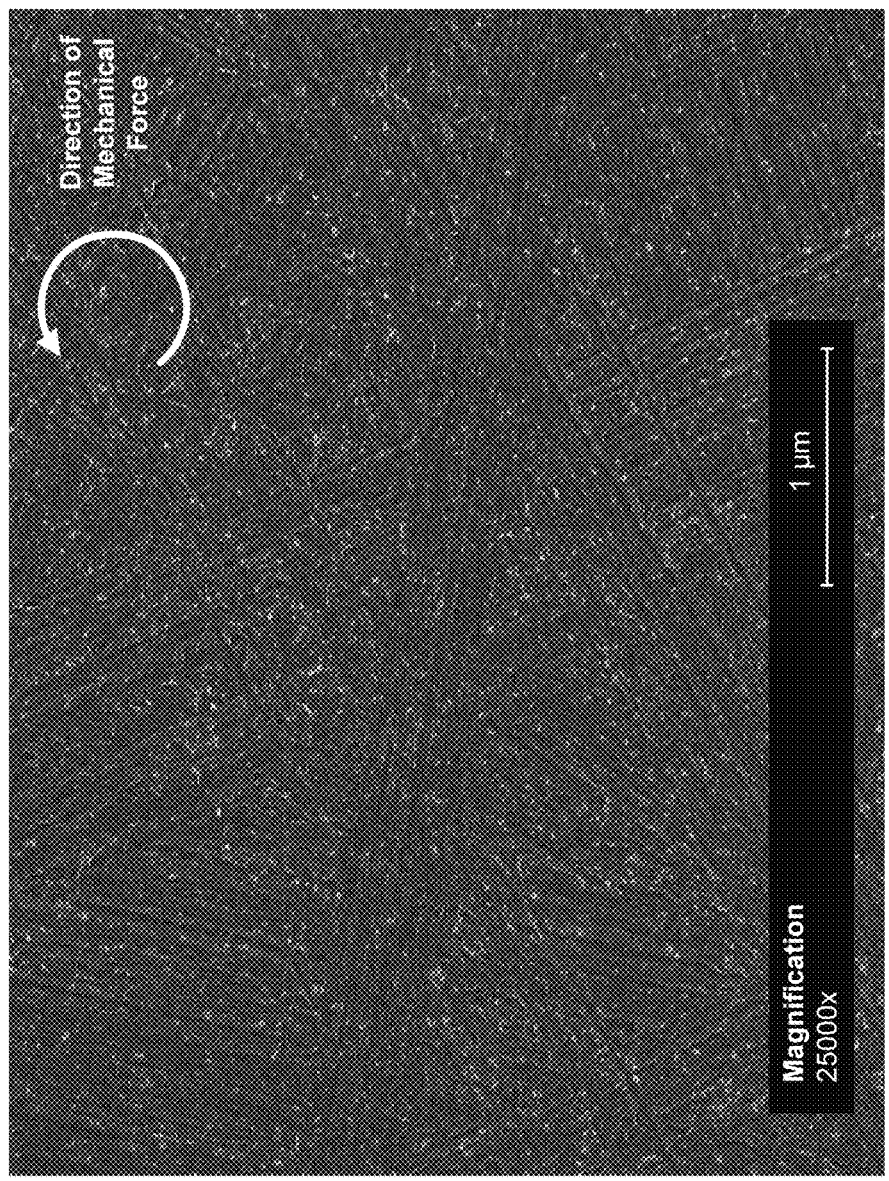
Figure 25C:
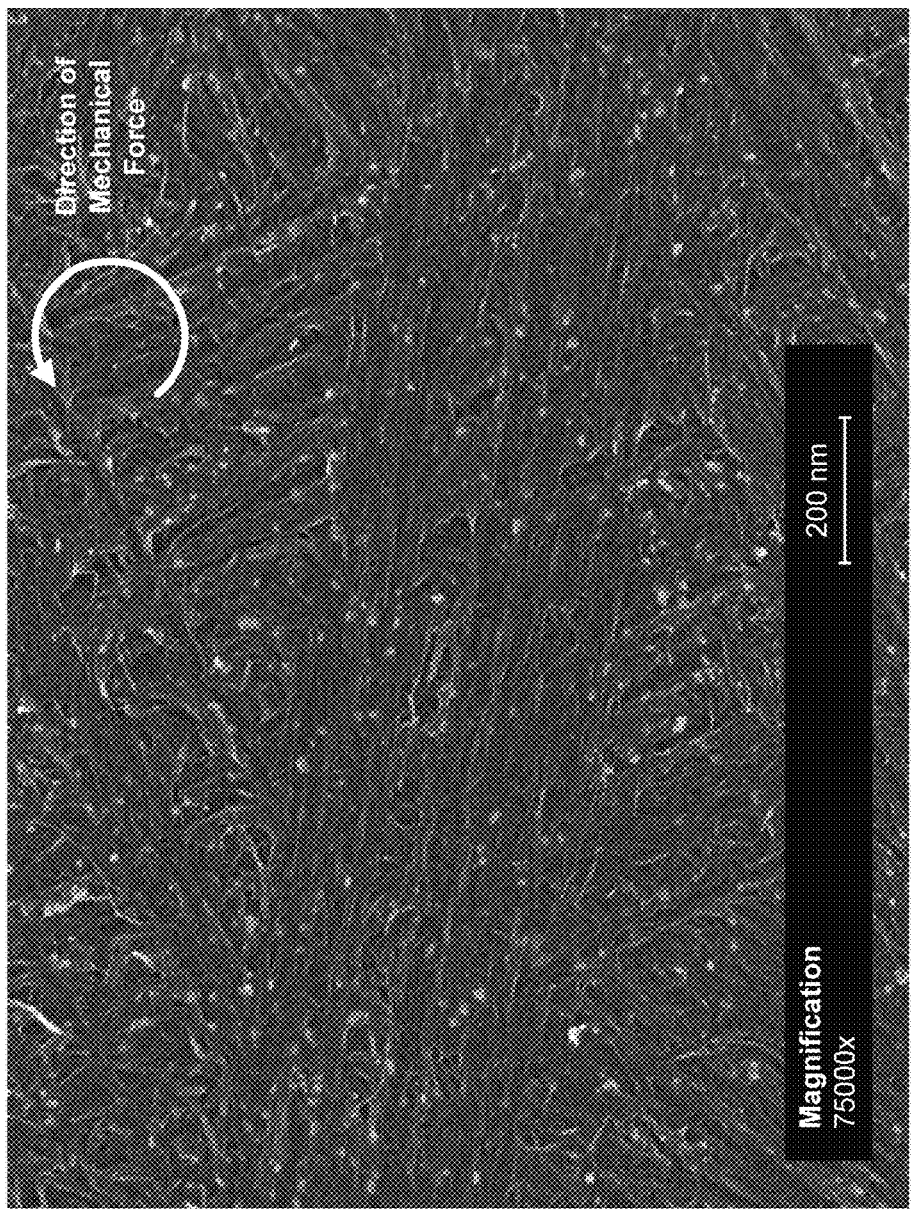

FIGS. 11A and 11B are a perspective drawing and an application diagram, respectively, depicting a exemplary apparatus 1100 suitable for applying a rotational polishing force over a deposited nanotube fabric layer according to the methods of the present disclosure. A substrate element 1110 coated with a nanotube fabric layer is secured in place on a vacuum table 1170. A polishing element 1120 is fixed within rotating assembly 1140 and positioned with adjustment arm 1150 such that the polishing element 1120 is placed against the nanotube fabric layer deposited over substrate element 1110. Polishing element 1120 is then rotated in place in direction 1190 (for example, at sixty rotation per minute for sixty seconds). In this way, a rotational polishing force can be applied across a nanotube fabric layer, rendering the nanotube layer into a network of ordered nanotube elements. FIGS. 25A-25C (discussed in detail below) are SEM images depicting nanotube fabric layers after the application of such a rotational polishing force.

Referring now to FIGS. 12A-12B, a cryokinetic impingement apparatus suitable for applying a directional force over a nanotube fabric layer is depicted. A directional polishing force can be applied to a nanotube fabric layer through the use of a cryokinetic process. FIGS. 12A-12B illustrate an exemplary cryokinetic impingement device well suited for use with the methods of the present disclosure. Within such a device, an application wand 1250 is used to direct a spray of frozen particles 1220 at a shallow angle (for example, on the order of 15 degrees with respect to the plane of the nanotube fabric layer) over a nanotube fabric layer 1210 at a relatively high velocity (for example, propelled with a pressure on the order of 60 PSIG). The impact of these frozen particles 1220 provides a directional force which is translated across the nanotube fabric layer 1210 as application wand 1250 is moved along direction 1290. Within such a system, frozen particles 1220 may be rice-sized particles (for example, on the order of 0.125 inches diameter) of a frozen gas such as, but not limited to, carbon dioxide ($CO_2$) or argon.

FIGS. 12A and 12B, a perspective drawing and an application diagram, respectively, of a cryokinetic impingement system are depicted. A nanotube fabric coated wafer 1210 is secured to vacuum plate 1230 such as to hold it in place during the polishing operation. An application wand 1250 is fed by an air hose 1270 and a pellet supply hose 1260 such as to direct a spray of frozen pellets 1220 across nanotube fabric coated wafer 1210. Controls 1280 on the pelletizer unit allow for control of the velocity and quantity of stream 1220. Within an exemplary polishing operation, application wand 1250 is positioned at a shallow angle and moved across nanotube fabric covered wafer 1210 along direction 1290.

Though not illustrated in FIGS. 12A and 12B, in some embodiments an intermediate barrier layer of pliable material—such as, but not limited to, a layer of PET, a plastic membrane (e.g., Saran wrap, based upon polyvinylidene chloride), or a thin foil film—is situated over the deposited nanotube fabric layer prior to the application of the cryokinetic spray 1220. Within such embodiments, this layer of pliable material may be used to protect the underlying nanotube fabric layer 1210 and guard against ablation of the individual nanotube elements under the high velocity spray 1220. In some embodiments this layer of pliable material may also be useful in efficiently transferring the force cryokinetic spray to the nanotube fabric. In this way, a polishing force can be applied across a nanotube fabric layer one or more times, rendering the nanotube layer into a network of ordered nanotube elements. FIGS. 28A-28D (discussed in detail below) are SEM images depicting nanotube fabric layers after the application of such a cryokinetic impingement force.

In other applications a similar (with respect to the above described cryokinetic impingement operation) ordering operation may be realized through the use of a jet of high pressure gas or liquid (e.g., an air gun). Within such a high pressure flow polishing operation, an air gun may be used to flow a gas (such as, but not limited to, nitrogen) over an unordered nanotube fabric layer to render that fabric layer into an ordered network of nanotube elements. As with the cryokinetic impingement operation, in some embodiments a high pressure flow operation might employ a pliable protective layer—such as, but not limited to, a layer of PET, a plastic membrane (e.g., Saran wrap, based upon polyvinylidene chloride), or a thin foil film—over the nanotube fabric layer during the air flow operation. An exemplary high pressure air flow polishing operation is depicted in FIGS. 32A-32D and described in detail below.

Figure 13A:
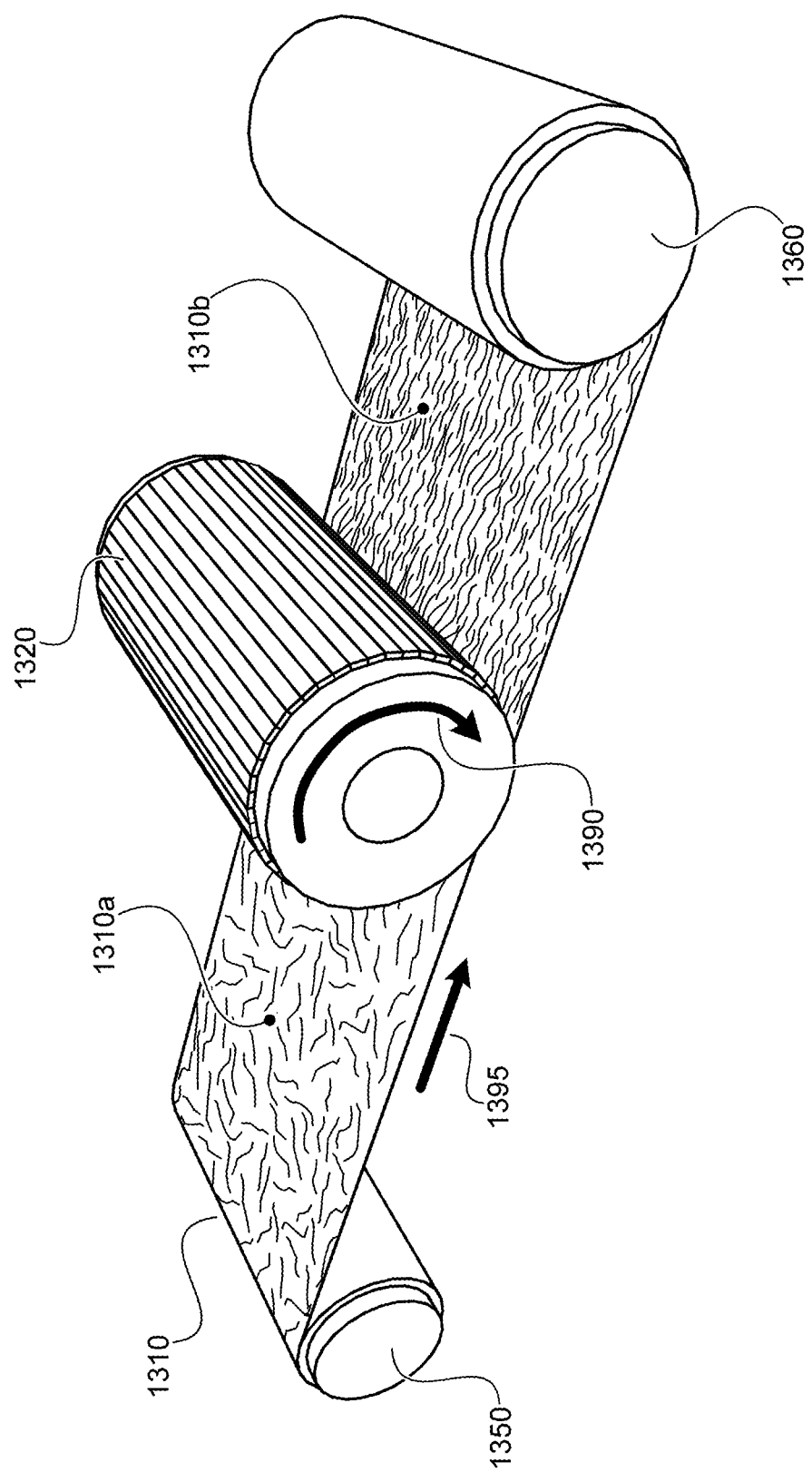
FIG. 13A is a perspective drawing depicting an exemplary roll-to-roll polishing apparatus suitable for applying a linear directional force over a nanotube fabric layer according to the methods of the present disclosure.
Figure 13B:
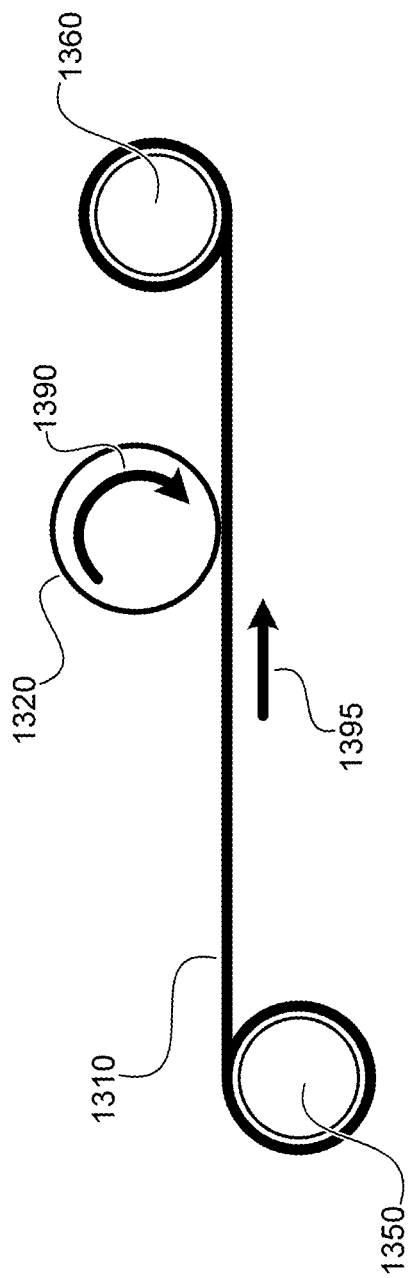
FIG. 13B is a diagram illustrating the operation of the exemplary roll-to-roll polishing apparatus depicted in FIG. 13A.

Referring now to FIGS. 13A-13B, a roll-to-roll polishing apparatus suitable for applying a directional force over a nanotube fabric layer is depicted. A flexible material 1310 (such as, but not limited to, paper, plastic, or metallic foil) coated with a substantially unordered nanotube fabric 1310a is transferred between a first roller 1350 and a second roller 1360 along direction 1395. Within the exemplary roll-to-roll polishing apparatus depicted in FIGS. 13A and 13B, a cylindrical polishing element 1320 is rotated along direction 1320 against the unordered nanotube fabric layer as it is linearly translated beneath it between the first and second rollers (1350 and 1360, respectively). The composition and use of such a cylindrical polishing element 1320 is depicted and described in detail within the discussion of FIGS. 10A and 10B above. The directional force applied by cylindrical polishing element 1320 arranges the nanotube elements within unordered nanotube fabric layer 1310a (deposited by applicator 1340) into a network of ordered nanotubes 1310b. In this way, a large scale nanotube fabric can be arranged into an ordered nanotube fabric layer.

It should be noted that while a cylindrical polishing element 1320 is depicted in FIGS. 13A and 13B, the methods of this aspect of the present disclosure are not limited in this regard. Indeed, any of the rolling, rubbing, and polishing methods described within the present disclosure may be used with a roll-to-roll system as depicted in FIGS. 13A and 13B. Further, in certain applications a roll-to-roll polishing apparatus such as is depicted in FIGS. 13A and 13B might further include an applicator mechanism and drying mechanism which can be used to deposit and dry a nanotube fabric over flexible material 1310 as it is transitioned between first roller 1350 and second roller 1360

In other applications a layer of piezoelectric material may be placed over an unordered nanotube fabric layer and used to apply a directional force to the fabric layer. Within such applications, the piezoelectric material will vibrate in response to certain electrical stimuli, effectively generating a rubbing force which is translated over the nanotube fabric layer. In some embodiments, a layer of piezoelectric material may be shaped such as to apply such a directional force only to one or more preselected regions within the nanotube fabric layer. Within such embodiments, those preselected regions may be rendered into ordered networks of nanotube elements, leaving the remaining regions substantially unordered. Such a selectively ordered nanotube fabric layer would be useful, for example, as a masking or imprinting device within a photolithography operation. An exemplary piezoelectric rubbing operation is depicted in FIGS. 30A-30D and described in detail below.

As previously discussed, a CMP machine—a polishing/planarizing apparatus typically readily available in semiconductor fabrication facilities—is a device well suited (within certain applications) for applying a directional force over a nanotube fabric. For example, a CMP machine can be used to pass a polishing element or a rubbing element over a nanotube fabric layer deposited over a silicon wafer in an arcing or a linear path (in an operation similar to that of the exemplary apparatus depicted in FIGS. 9A and 9B). In another example, a CMP machine can be used to rotate a polishing element or a rubbing element over a nanotube fabric deposited over a silicon wafer (in an operation similar to that of that of the exemplary apparatus depicted in FIGS. 11A and 11B).

Within certain applications a polishing element or a rubbing element can be applied to the nanotube fabric layer using a lubricating medium. Such lubricating media can include, but are not limited to, water, halocarbon (included, but not limited to, liquids including halogen containing alcohols, alkyl nitrites, alkanols, organic amines, fluorinated compounds and perfluorocarbons, perfluorohexane, perfluoroheptane chlorocarbons, perfluorinated or substantially fluorinated organic compounds including perfluorohexane, perfluoro(2-butyl-tetrahydrofurane, and perfluorinated polyether), liquefied gases (including, but not limited to, liquid carbon dioxide ($CO_2$) and liquid xenon), hydrocarbon liquids (including, but not limited to, $C_3$-$C_{12}$ alkanes, $C_8$-$C_{16}$ arylalkanes, $C_{10}$-$C_{25}$ arylcyloalkanes, $C_6$-$C_{12}$ aromatics, toluene, and Xylene), functionalized organic liquids (including, but not limited to, those containing ketone, aldehyde, ester, ether, amide, alcohol, $C_2$-$C_{12}$ ethers, DME, glymes, methanol, ethanol, propanol, butanol, acetone, and tetrahydrofuran), organo-siloxane based cyclics and linear liquids (including, but not limited to, groups of polydimethylsiloxanes cylic and linear liquids and polyphenylsiloxane cyclic and linear liquids), and solids (including, but not limited to, molybdenum disulfide, boron nitride, graphite, and styrene beads).

Within such applications a lubricating medium may facilitate the application of a directional force by limiting drag between a polishing (or rubbing) element and the surface of the nanotube fabric. For example, within an ordering operation wherein a rubbing element is applied with relatively high pressure, a lubricating medium can be used to ensure that the resulting directional force is applied evenly over the entire surface of the nanotube fabric.

In some applications a lubricating medium can be applied to a polishing/rubbing pad prior to an ordering operations (for example, a polishing/rubbing pad being dampened with water). In other applications a lubricating medium can be deposited over a nanotube fabric prior to the application of a polishing/rubbing pad. Within such applications, the lubrication medium is selected and/or applied in such a way as to not result in any substantial re-suspension of nanotube elements within the nanotube fabric into the applied lubrication medium.

It should be noted that while the use of a lubricating medium is beneficial in certain applications (as described above) in other applications it may be problematic within an ordering operation. In certain applications, for example, the application of a lubricating medium can fully dislodge nanotube elements from a substrate surface. In another example, a lubricating medium (within certain applications) may react (physically or chemically) with the nanotube elements damaging or otherwise adversely affecting the unordered nanotube fabric layer.

It should also be noted that the arrangement of nanotube elements within nanotube fabric layers via the methods of the present disclosure also provides nanotube fabrics which are highly smooth as compared to unordered nanotube fabric layers. Within some applications, these smoother fabric layers provide optimized surfaces for the deposition of subsequent material layers. For example, such ordered nanotube fabric layers may be expected to have a substantially uniform thickness across the entire layer, reducing the likelihood of thin areas in the fabric which may, in some application, allow a subsequently deposited layer to penetrate through the nanotube fabric layer.

Figure 14A:
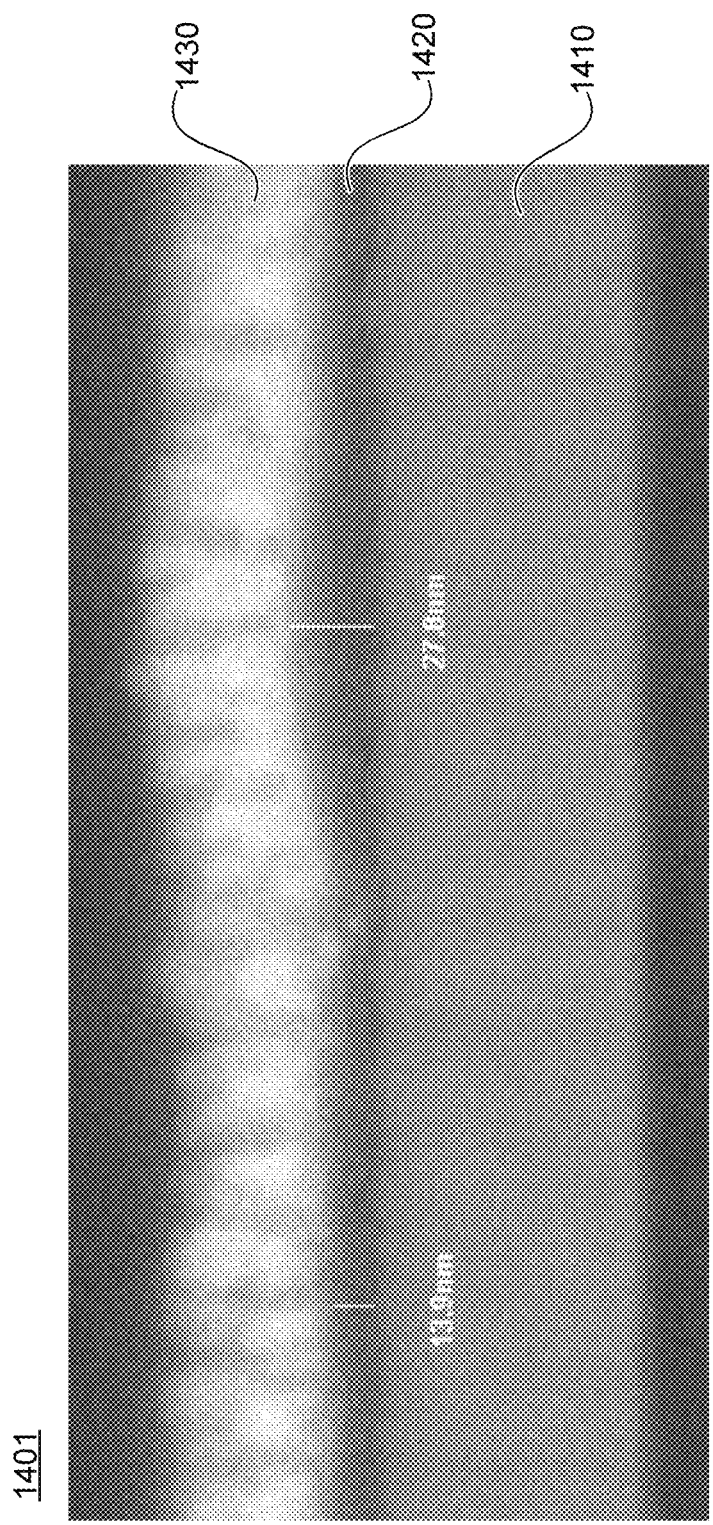
FIGS. 14A-14B are cross sectional images of a three-layer structure including a substantially unordered nanotube fabric layer.
Figure 14B:
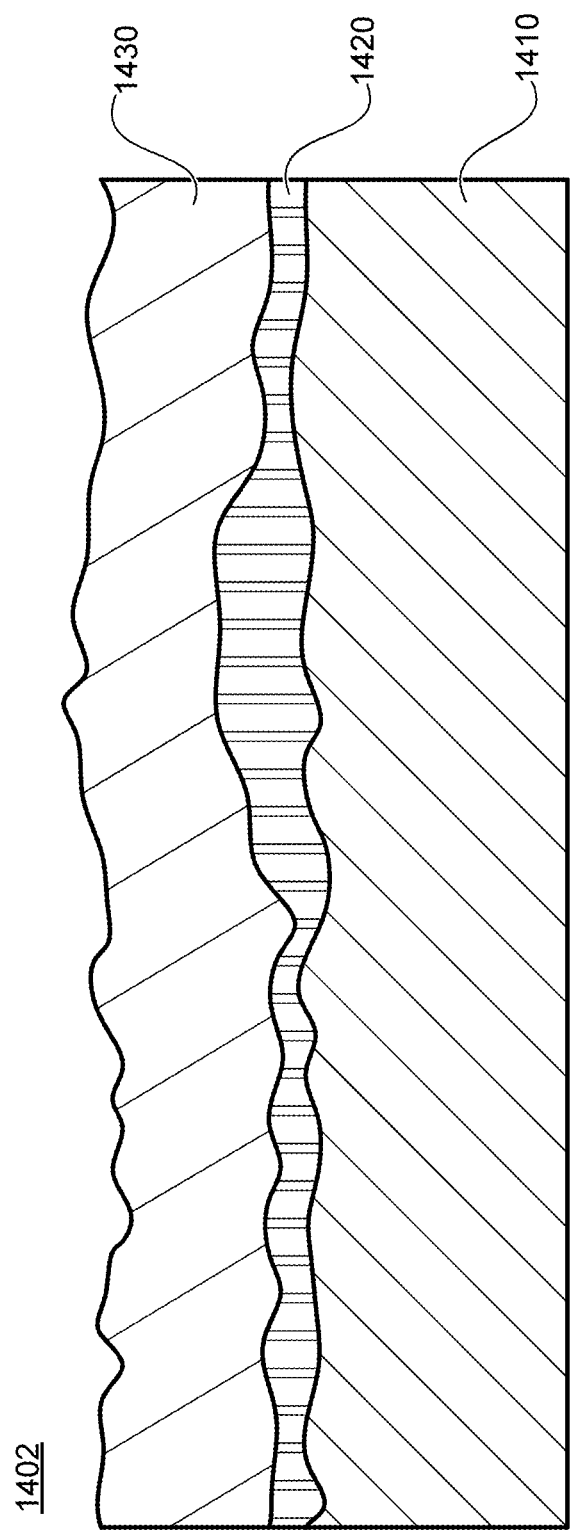

To this end, FIGS. 14A and 14B depict a cross section view of a substantially unordered nanotube fabric layer 1420 deposited over a substrate layer 1410. A top layer of material 1430 has been further deposited over the unordered nanotube fabric layer 1420 to create a three-layer structure. FIG. 14A is an SEM image 1401 of this three-layer structure, while FIG. 14B is a line drawing of the same structure. As can be observed in the two images (1401 and 1402), substantially unordered nanotube fabric layer 1420 exhibits a non-uniform thickness, providing a number of "thin spots" between substrate layer 1410 and top material layer 1430.

Figure 15A:
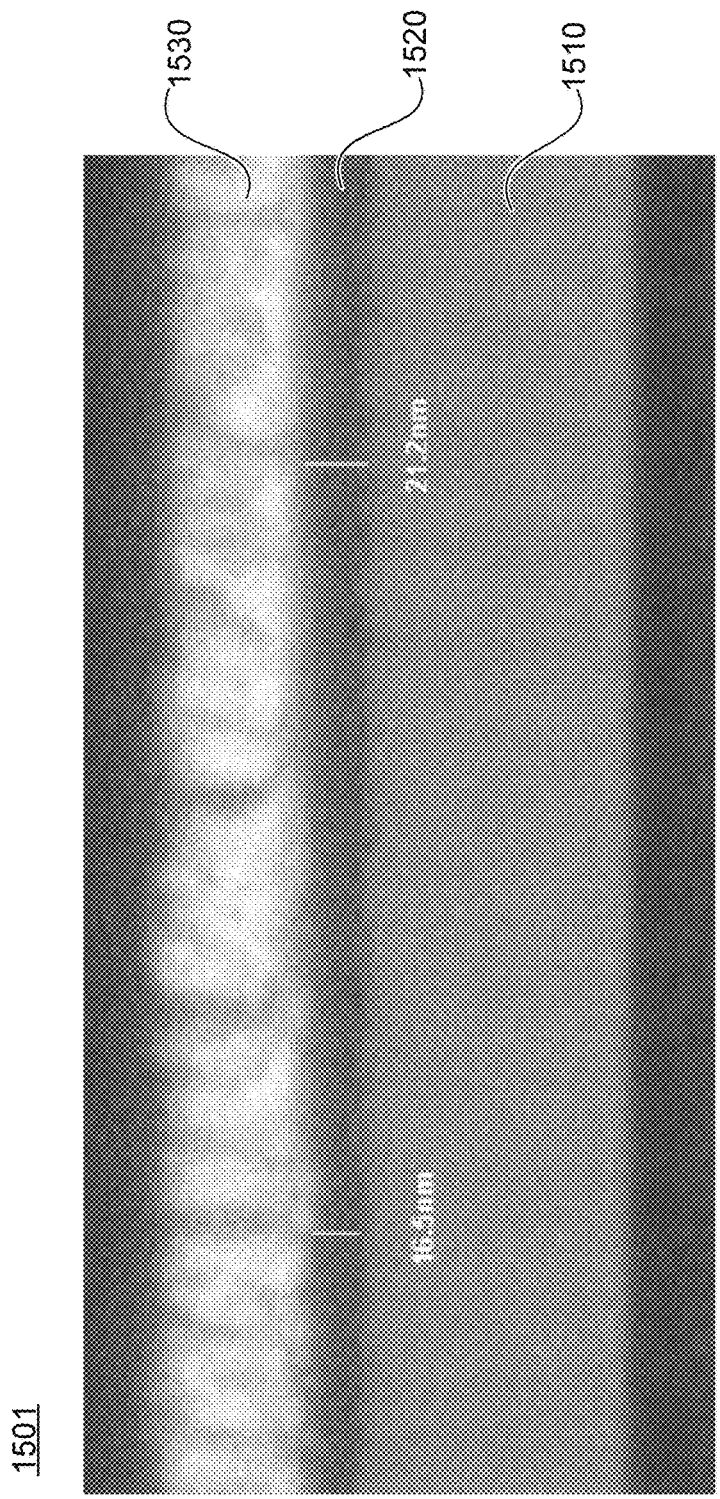
FIGS. 15A-15B are cross sectional images of a three-layer structure including an ordered nanotube fabric layer.
Figure 15B:
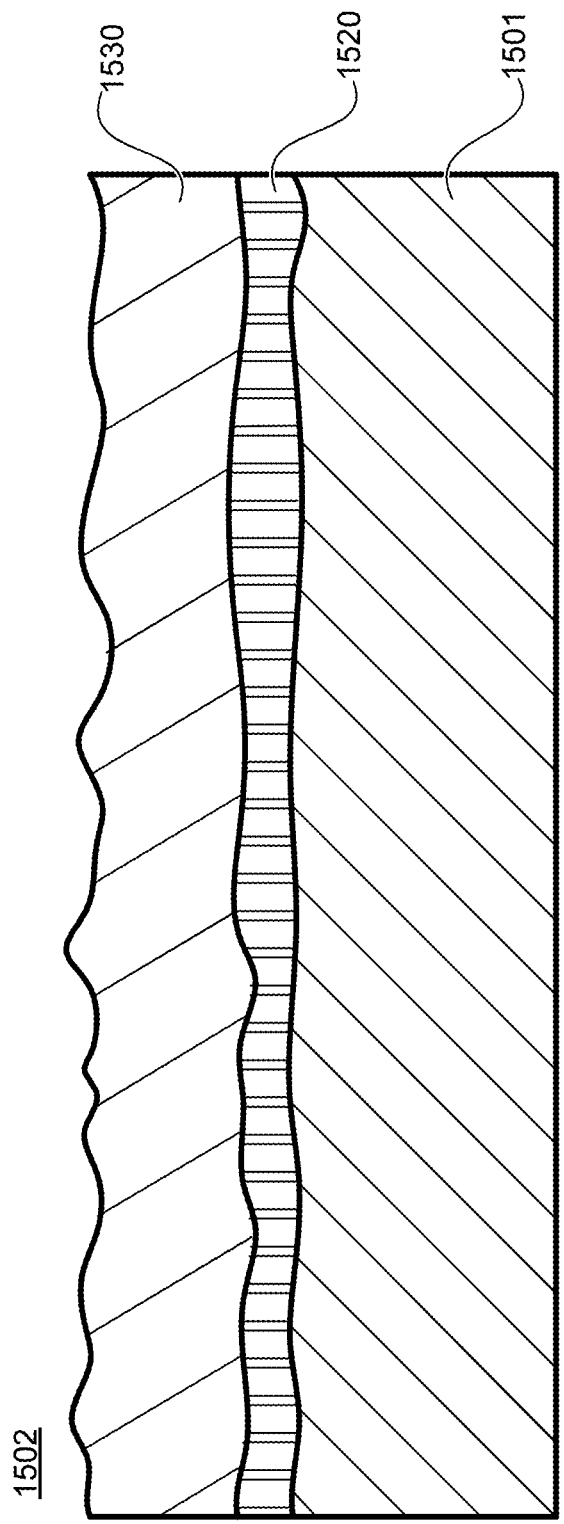

Conversely, FIGS. 15A and 15B depict a cross section view of an ordered nanotube fabric layer 1520 deposited over a substrate layer 1510. As with the previous structure of FIGS. 14A and 14B, a top layer of material 1530 has been further deposited over the ordered nanotube fabric layer 1520 to create a three-layer structure. FIG. 15A is an SEM image 1501 of this three-layer structure, while FIG. 15B is a line drawing of the same structure. As can be observed in the two images (1501 and 1502), unordered nanotube fabric layer 1520 exhibits a significantly improved uniformity in thickness (as compared with unordered nanotube fabric layer 1420 in FIGS. 14A and 14B), providing a more uniform separation distance between substrate layer 1510 and top material layer 1530.

It should also be noted that within certain embodiments an ordered nanotube fabric layer would possess a decreased coefficient of friction (as compared with an unordered nanotube fabric layer) and would be useful in the fabrication of low friction coatings. For example, a layer of nanotube fabric may be formed over the inner surface of a cylinder within an internal combustion engine and then rendered into an ordered state. Such an ordered fabric could then be used to reduce the coefficient of friction of a piston moving within the cylinder. In another example, ordered nanotube fabric layers may be formed over the mating surfaces of gears, bearings, shafts, and other mechanical components within a mechanized system. Such coating would reduce the friction between the mating surfaces of these components, reducing wear and extending the life of the individual components and, by extension, the system itself. In another example, such ordered nanotube fabric layers may be used to provide nanoscale low friction surfaces and coatings within microelectromechanical systems (MEMS).

Figure 16:
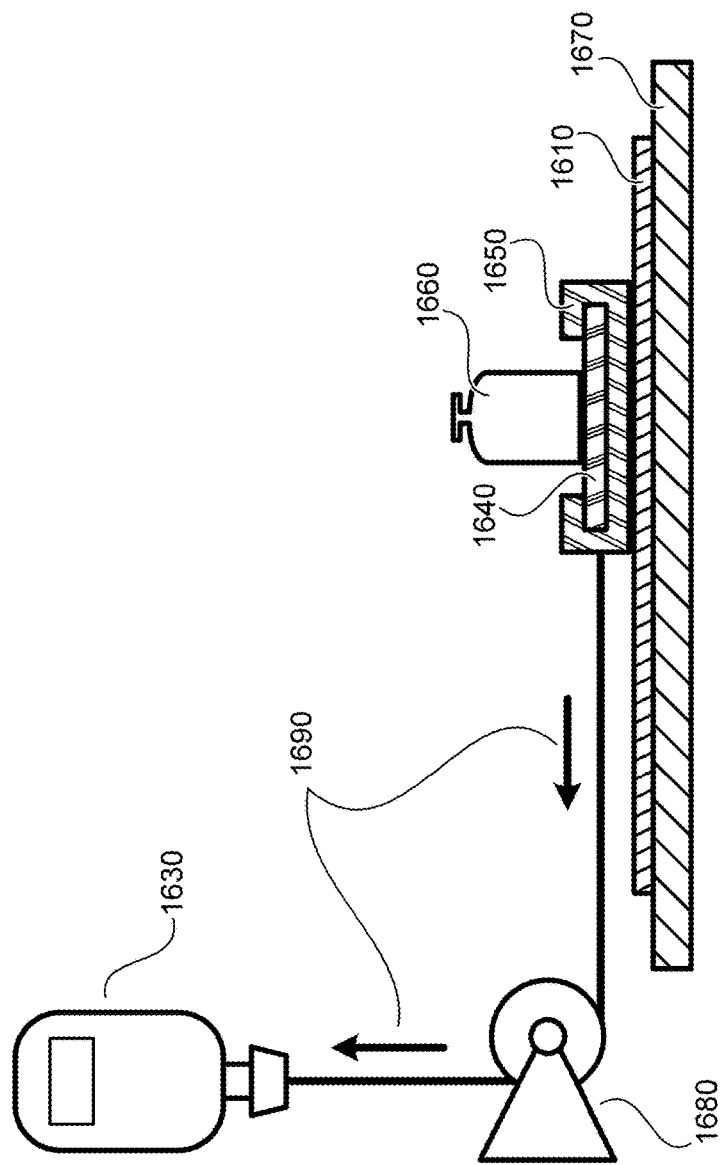
FIG. 16 is a diagram illustrating an apparatus used to determine the frictional observed over a partially ordered nanotube fabric layer.
Figure 17:
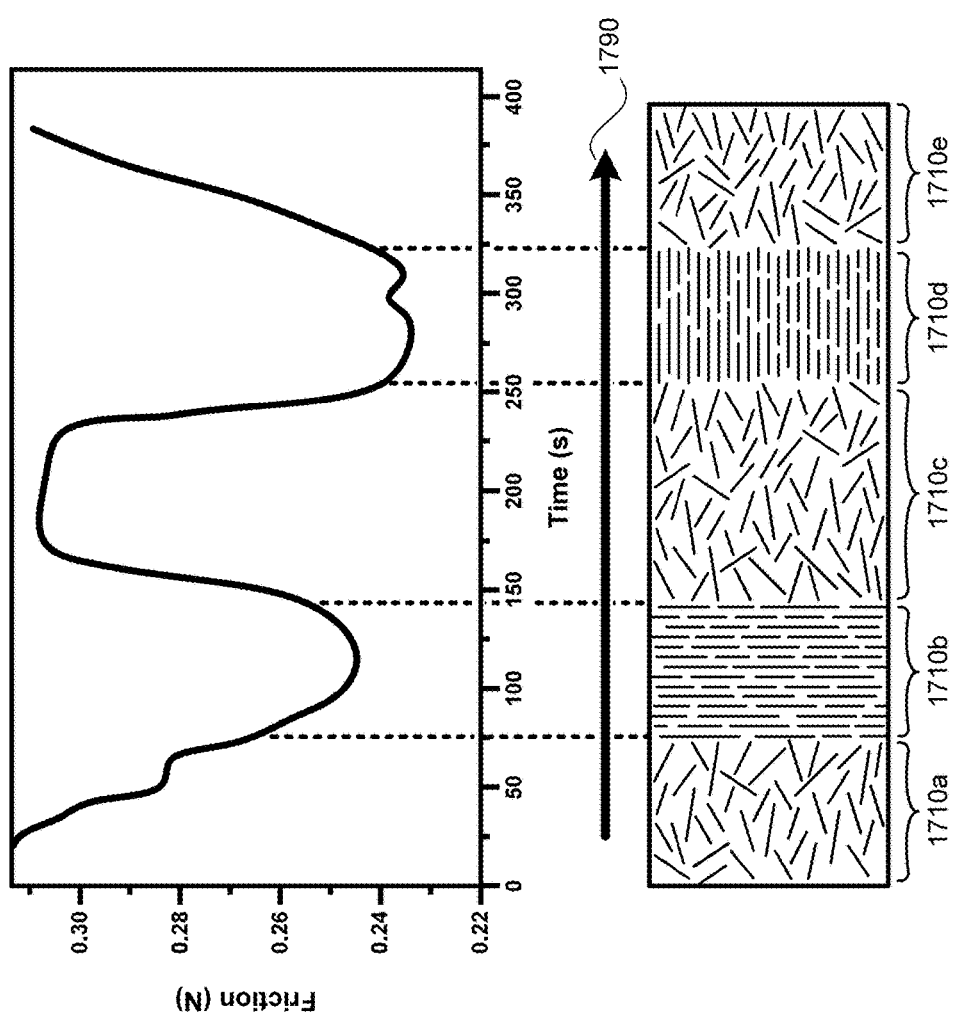
FIG. 17 is a plot of the frictional forces observed with the apparatus of FIG. 16 over a partially ordered nanotube fabric layer.

FIGS. 16 and 17 illustrate an experiment performed on a partially ordered nanotube fabric layer to demonstrate the reduced coefficient of friction of an ordered nanotube fabric layer as compared with an unordered nanotube fabric layer. A nanotube fabric layer 1610 was formed over a silicon substrate 1670 and cut into a strip approximately 4 cm wide and 20 cm long. The nanotube fabric layer 1610 was then selectively rendered into an ordered state such as to realize five regions (1710*a*-1710*e*) along the length of the strip, as depicted in FIG. 17. A polishing pad 1650 was then wrapped over and secured to a cleaved $SiO_2$ wafer 1640 (approximately 4 cm by 4 cm in dimension) such as to form a rigid rubbing element and placed over the selectively ordered nanotube fabric layer 1610. A weighted element 1660 (approximately 75 g) was placed over this rigid rubbing element (formed by polishing material 1650 and wafer piece 1640) to provide a downward force as the rubbing element was pulled along the length of nanotube fabric layer 1610. A force gage 1630 was then used with pulley element 1680 to slide the polishing material 1650 across the length of nanotube fabric layer 1610 along direction 1690.

Referring now specifically to FIG. 17, the frictional force observed using the force gage (1630 in FIG. 16) has been plotted and mapped to the physical location of rigid rubbing element as it was pulled across the nanotube fabric layer along direction 1790, which corresponds to direction 1690 in FIG. 16. As discussed above, the nanotube fabric layer strip (1610 in FIG. 16) has been rendered into five regions. Regions 1710*a*, 1710*c*, and 1710*e* have been left substantially unordered to act as control regions for the experiment. Region 1710*b* has been rendered into an ordered network of nanotube elements oriented in a direction perpendicular to direction 1790 (that is, perpendicular to the path of the rubbing element). Region 1710*d* has been rendered into an ordered network of nanotube elements oriented in a direction parallel to direction 1790 (that is, parallel to the path of the rubbing element).

As is evident within the plot of FIG. 17, as the rigid rubbing element was passed over the unordered nanotube fabric layer of region 1710*c*, the frictional force observed was approximately 0.310 N. As the rigid rubbing element was passed over the perpendicularly oriented nanotube fabric layer (with respect to the direction of the frictional force) of region 1710*b*, the frictional force observed was approximately 0.245 N, approximately a 21% reduction in friction with respect to control regions 1710*a*, 1710*c*, and 1710*e*. As the rigid rubbing element was passed over the parallelly oriented nanotube fabric layer (with respect to the direction of the frictional force) of region 1710*d*, the frictional force observed was approximately 0.235 N, approximately a 24% reduction in friction with respect to control regions 1710*a*, 1710*c*, and 1710*d*.

It should also be noted that while much of the present disclosure describes processes of rendering ordered networks of nanotube elements from substantially unordered nanotube fabrics, the methods of the present disclosure are not limited in this regard. Indeed, the methods of the present disclosure may also be employed to render a partially ordered nanotube fabric layer into more highly ordered nanotube fabric layer. For example, a rafted nanotube fabric layer (formed, for example, via the methods taught in U.S. Pat. App. No. 61/304,045 to Sen et al.) may be rendered into a fully ordered nanotube fabric layer through the application of a directional force as previously described in the various embodiments of the present disclosure.

Within certain applications a directional force may be applied over a relatively thick nanotube fabric layer. Within such applications, even the repeated application of a directional force may only render those nanotubes near the surface of the thick nanotube fabric layer into an ordered network of nanotube elements. That is, the resulting structure may be described as a thin ordered nanotube fabric layer formed adjacent to a thicker unordered nanotube fabric layer. Such a structure may be used to realize an ordered nanotube fabric layer formed over a substrate element comprising an unordered nanotube fabric layer. Within some embodiments, such a structure—an ordered nanotube fabric layer formed over an unordered nanotube fabric layer— could be further adjusted by applying a directional force to the opposing surface of the unordered nanotube layer, rendering that opposing surface into a network of ordered nanotube elements. Within certain applications of such embodiments, the originally deposited thick nanotube fabric layer is deposited over a sacrificial substrate element, which is removed or otherwise volatized to allow the application of such a force to the opposing surface of the unordered nanotube fabric layer. In some aspects of such embodiments the resulting structure might be described as two thin ordered nanotube fabric layers formed with a thicker layer of unordered nanotube elements situated between them.

It should be noted that while a number of the figures and examples within the present disclosure depict and describe processes specifically related to semiconducting manufacturing, the methods of the present disclosure are not limited in this regard. Indeed, nanotube fabrics comprised of ordered nanotube fabric layers can be used within a plurality of systems and devices. For example, within certain embodiments such a nanotube fabric would be substantially gas impermeable and useful within the fabrication of gas containers (such as, but not limited to, oxygen tanks and flotation devices). Within other embodiments such a nanotube fabric layer would be substantially hydrophobic and be useful as moisture resistant coatings (for example, on solar panels) or as corrosion resistant coatings. Within other embodiments such a nanotube fabric layer would be substantially impermeable to certain particulate contaminants and be useful within the fabrication of protective barrier layers. Within other embodiments such a nanotube fabric layer would be substantially impermeable to certain biohazardous materials (e.g., bacteria) and would be useful in the fabrication of bio-filters and the like. Within other embodiments, such a nanotube fabric could be useful as a transparent or translucent protective coating which could be applied over other materials (for example over the chassis of vehicles to prevent paint scratches or as the binding agent within safety glass. Within other embodiments, such a nanotube fabric would be highly resistant to stress and wear (yet remain relatively thin) and would be useful in the fabrication highly stressed mechanical parts (e.g., piston cylinders within internal combustion engines).

Within other embodiments, such a nanotube fabric would be highly resistant to penetration and useful within the fabrication of puncture resistant material such as would be useful armor plating for vehicles or person protective equipment. For example, a relatively thin ordered nanotube fabric layer may be used in conjunction with a padding material to realize a lightweight bulletproof vest. In another example, a nanotube fabric may be formed over a material surface and then rendered into an ordered network through the methods of the present disclosure to realize a relatively lightweight substantially bulletproof panel which could be used to armor plate a tank or car.

Figure 18:
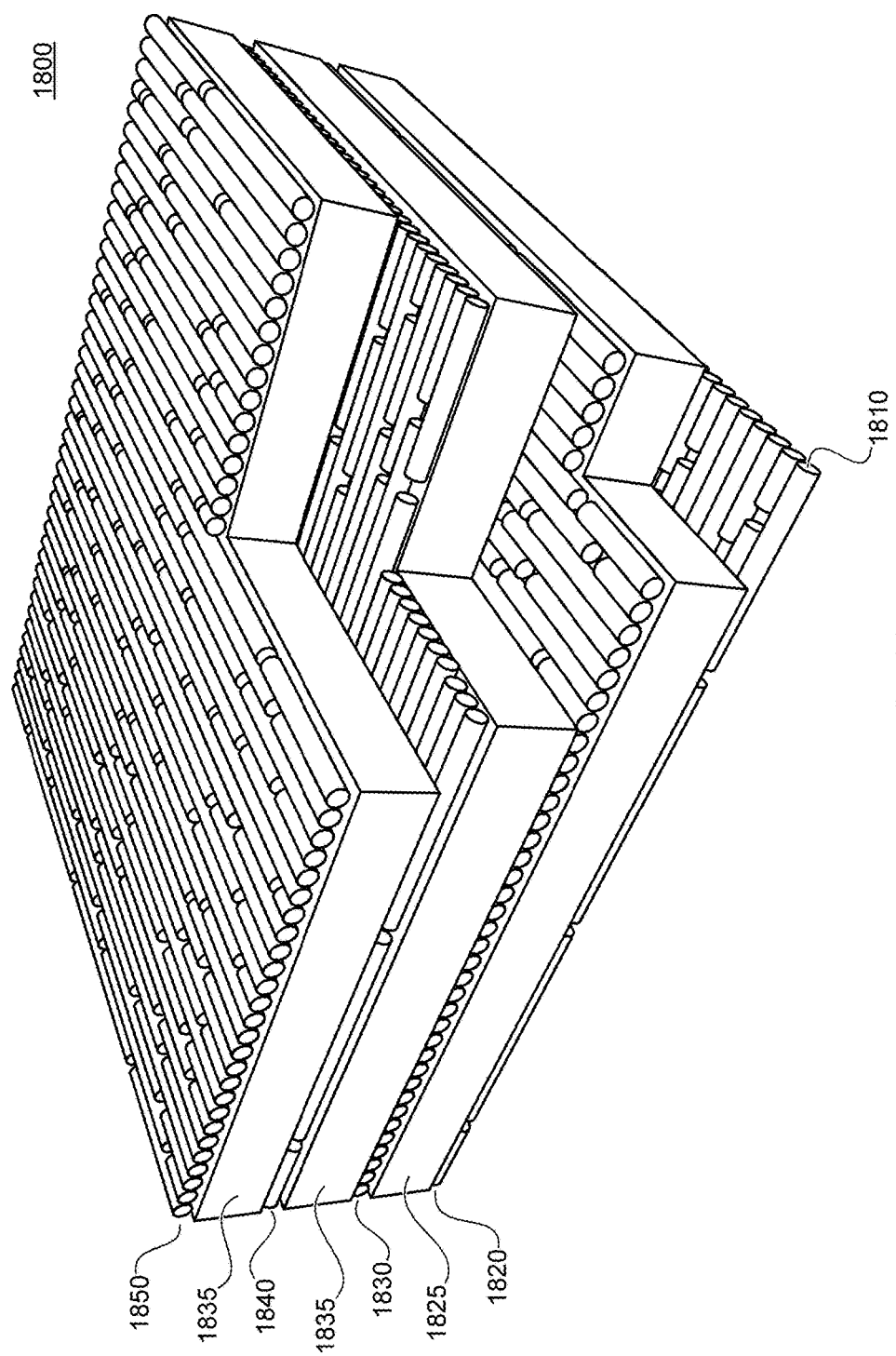
FIG. 18 is an illustration drawing depicting a multi-layer nanotube fabric element comprised of multiple layers of ordered nanotube elements wherein each layer comprises nanotube elements oriented in a direction different from those in adjacent layers.

To this end, FIG. 18 is a perspective drawing of a multilayer nanotube fabric element 1800 comprising four individual ordered nanotube fabric layers (1820, 1830, 1840, and 1850) and three unordered nanotube fabric layers (1825, 1835, and 1845). Each of the four ordered nanotube fabric layers (1820, 1830, 1840, and 1850) was deposited separately and rendered into an ordered network of nanotube elements before a subsequent nanotube fabric layer was deposited. Further, each of the ordered nanotube fabric layers (1820, 1830, 1840, and 1850) was rendered into an ordered state along a different orientation as compared with adjacent layers. That is, the first ordered nanotube fabric layer 1820 was rendered into an ordered state through the use of a linear force applied in a first direction, and the second ordered nanotube fabric layer 1830 was rendered into an ordered state through the use of a linear force applied in a second direction, and so on. As previously discussed, within certain embodiments of the present disclosure, a directional force applied over a relatively thick nanotube fabric layer will tend to render only those nanotube near the surface of that layer into an ordered network. As such, the nanotube fabric element 1800 includes layers of unordered nanotube elements (1825, 1835, and 1845) remaining from the ordering processes used. In this way, a multilevel nanotube fabric element 1800 is formed comprising a plurality of independently ordered nanotube fabric layers (1820, 1830, 1840, and 1850).

It should be noted that while the multilayer nanotube fabric element 1800 (as depicted in FIG. 18) includes layers of unordered nanotube elements (1825, 1835, and 1845) between the ordered nanotube fabric layers (1820, 1830, 1840, and 1850), the methods of the present disclosure are not limited in this regard. Indeed, within the methods of the present disclosure each individually formed layer can be rendered into a thick ordered nanotube fabric layer (as opposed to only the surface of the layer being ordered) prior to the formation of a subsequent layer, essentially eliminating unordered layers (1825, 1835, and 1845). That is, a fabric layer comprised of an ordered network of nanotube elements over its entire thickness. In some embodiments of the present disclosure, each individually formed layer could be kept thin enough as to ensure that the nanotube fabric layer was ordered from top to bottom during the application of a directional force prior to the formation of a subsequent layer. In other embodiments, each individually formed layer could be subjected to sufficient iterations of a directional force such as to ensure that the nanotube fabric layer was ordered from top to bottom prior to the formation of a subsequent layer.

The following examples describe the rendering of several unordered nanotube fabric layers into ordered networks of individual nanotube elements according to the methods of the present disclosure.

Within each example a purified nanotube application solution was first realized through the following method. Fifty grams of raw (that is, unfunctionalized) carbon nanotubes (CNTs) were refluxed in microelectronics grade nitric acid. Supplies of raw nanotubes (such as were used in the following examples) may be purchased commercially from a number of vendors (e.g., Thomas Swan). The concentration of the nitric acid, the reflux time, and temperature were optimized based on the starting CNT material. For example, CNTs were refluxed in concentrated nitric acid (70%) at 120° C. for 24-30 hours. After the nitric acid reflux step, the CNT suspension in acid was diluted in 0.35 to 3% nitric acid solution (8-16 L) and taken through several passes of cross-flow filtration (CFF). First few passes of CFF (hereinafter called CFF1) may remove the acid and soluble metal salts in the suspension. The pH of the suspension during the CFF1 steps was maintained at 1+/−0.3 by recovering the material in 0.35-3% nitric acid after each step. Typically five to eleven CFF1 steps were performed. After the CFF1 steps, the retentate was collected in DI water and the pH of the nanotube:DI water suspension was increased to 8+/−0.2 with ammonium hydroxide (concentration 29%) and sonicated. This liquid was taken through another set of CFF passes (hereinafter referred as CFF2). CFF2 may remove the amorphous carbon impurities in the solution. After the CFF2 process, the retentate was collected in DI water and the pH of the nanotube:DI water liquid was adjusted to pH 8+/−0.2 and the solution was sonicated for 120 minutes in a chilled sonicator bath (4-5° C.).

At this step of the process a desired concentration or optical density of the CNT formulation can be achieved by controlling the volume of the DI water used to recover the retentate from the CFF2 membrane. For example if the optical density of the CNT formulation before the last CFF2 step is 2 and the volume is 2 L, then a recovery volume of 1 L can lead to an optical density close to 4 assuming there is negligible loss in optical density through the permeate at this point. Similarly, if the optical density of the CNT formulation before the last CFF2 step is 2 and the volume is 16 L, then a recovery volume of 1 L can lead to a CNT formulation of optical density 32. The concentration of the CNT formulation (optical density) that can be practically achieved is dependent on, but is not limited to, the starting CNT charge used in the reaction, the reaction conditions, number of CFF steps, CFF membrane pore size, CFF membrane surface area, and pH.

Finally, the solution was centrifuged two or three times at about 70000-100000 g for about 20-30 min each. In certain cases, the pH of the solution was adjusted to 8+/−0.2 in between the centrifugation passes which may remove residual metal or carbon nanoparticles in the liquid by sedimentation. After the centrifugation step, the supernatant was collected and used as the final purified nanotube application solution. The concentration of the final nanotube application solution depends on the centrifugation conditions used. Typically for a spin coat application CNT solutions with an optical density projected to be approximately 20+/−5 and a pH of 7+/−0.5 were used.

Further, within each of the following examples, this purified nanotube application solution was then spun coat over a substrate layer to form an unordered nanotube fabric layer. Specifically, three spin coating operations were performed to form the nanotube fabric layers of examples 1, 2, 3, 5, 7, 9, 10, 11, 12, 13, 14, 16, 17, 18, 19, and 20, four spin coating operation were performed to form the nanotube fabric layers of examples 4 and 8, one spin coating operation was performed to form the nanotube fabric layer of example 6, and five spin coating operations were performed to form the nanotube fabric layer of example 15. The nanotube fabric layer of examples 1, 2, 3, 4, 5, 6, 7, 8, 9, 11, 13, 16, 17, 17, 19, and 20 were formed over a silicon dioxide substrate. The nanotube fabric layer of example 10 was formed over a 1018 low carbon steel substrate. The nanotube fabric layer of example 12 was formed over a polyethylene terephthalate (PET) substrate. The nanotube fabric layer of example 14 was formed over a 2024 aluminum alloy substrate. The nanotube fabric layer of example 15 was formed over a titanium nitride (TiN) substrate.

For all examples, the spin coating operations were as follows. A raw wafer was pre-baked on a 300° C. hot plate for five minutes. Approximately 3 ml of the adjusted solution was dispensed onto the wafer via a plastic pipette while the wafer was rotated at 60 rpm. After thirty seconds, the spin speed was increased to 500 rpm for two seconds, then subsequently reduced to fifty rpm for 180 seconds, and finally increased to 2000 rpm for twenty seconds. For examples 1-14, the wafer was placed on a 300° C. hot plate for two minutes between each spin coating operation. For example 15, the wafer was placed in a 500° C. environment for five minutes between each spin coating operation. After a cool down cycle, the entire process was repeated again twice such as to apply the desired number of coats of the application solution over the wafer.

Once an unordered nanotube fabric layer was formed over the surface of a wafer, a directional force was applied over the surface of the fabric layer (as detailed in each of the following examples) in order to render at least a portion of the nanotube fabric layer into an ordered network of nanotube elements. Within an example 20 an additional layer of silicon nanowires was applied over the surface of the nanotube fabric layer (via a spin coating operation, as described below) prior to the application of a directional force. Finally an anneal process (625° C. for thirty minutes) was performed.

Example 1

FIGS. 19A-19C are SEM images of an exemplary nanotube fabric layer at different magnifications (1901, 1902, and 1903 respectively) first formed via three spin coating operations of a purified nanotube application solution (as described above) and then rendered into an ordered network of nanotube elements through the application of a directional rolling force along the direction indicated within each SEM image. The rolling force was applied via a steel hand roller, rolled directly against the nanotube fabric layer fifty times with light pressure (approximately two Newtons). As is evident in FIG. 19A (the 10,000× magnification image), the resulting nanotube fabric layer was rendered into an ordered state oriented along the direction of the applied rolling force.

Example 2

Figure 20A:
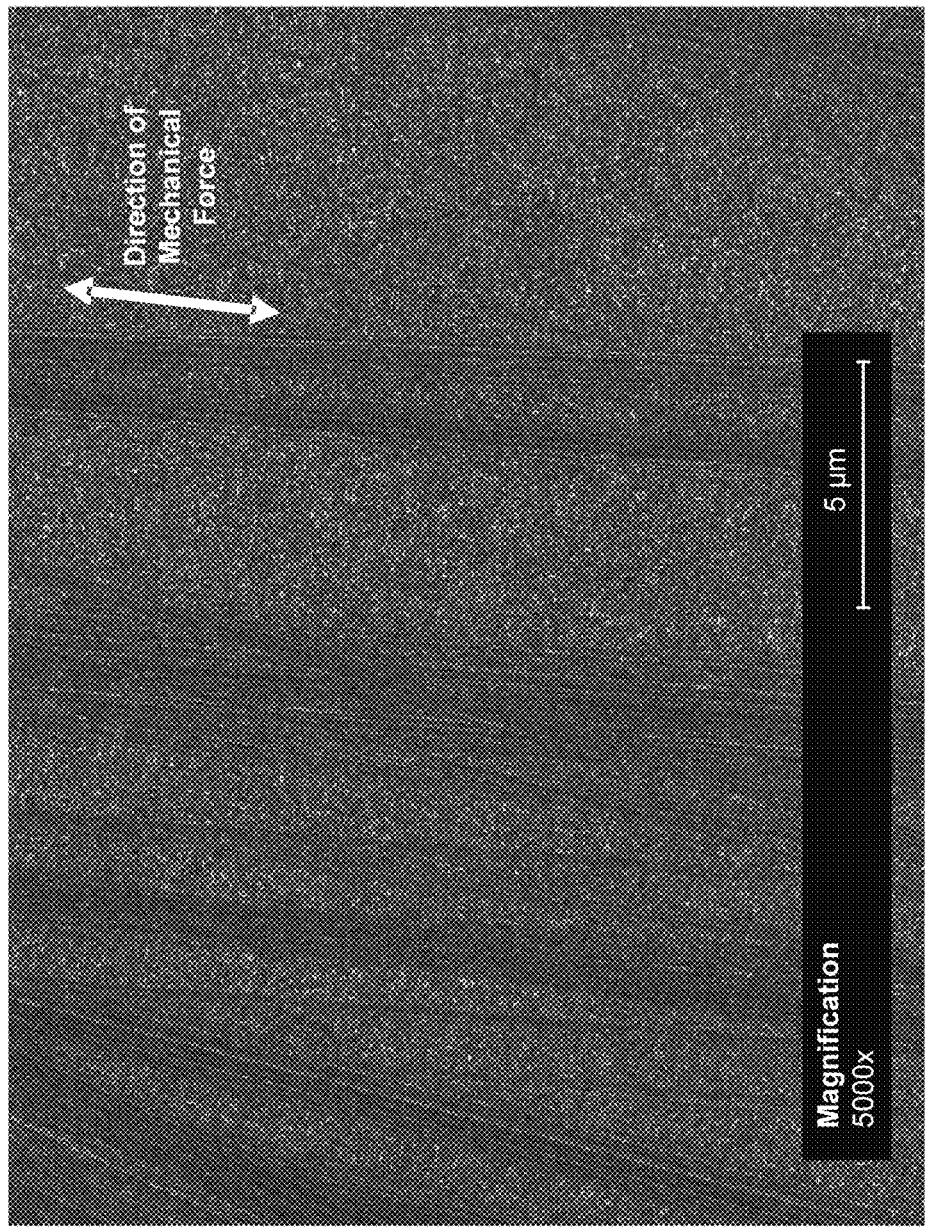
FIGS. 20A-20C are SEM images (at different magnifications) of an exemplary nanotube fabric layer comprising regions of nanotube elements rendered into a partially ordered arrangement after fifteen rubbing passes over a TEFLON or polytetrafluoroethylene film.
Figure 20B:
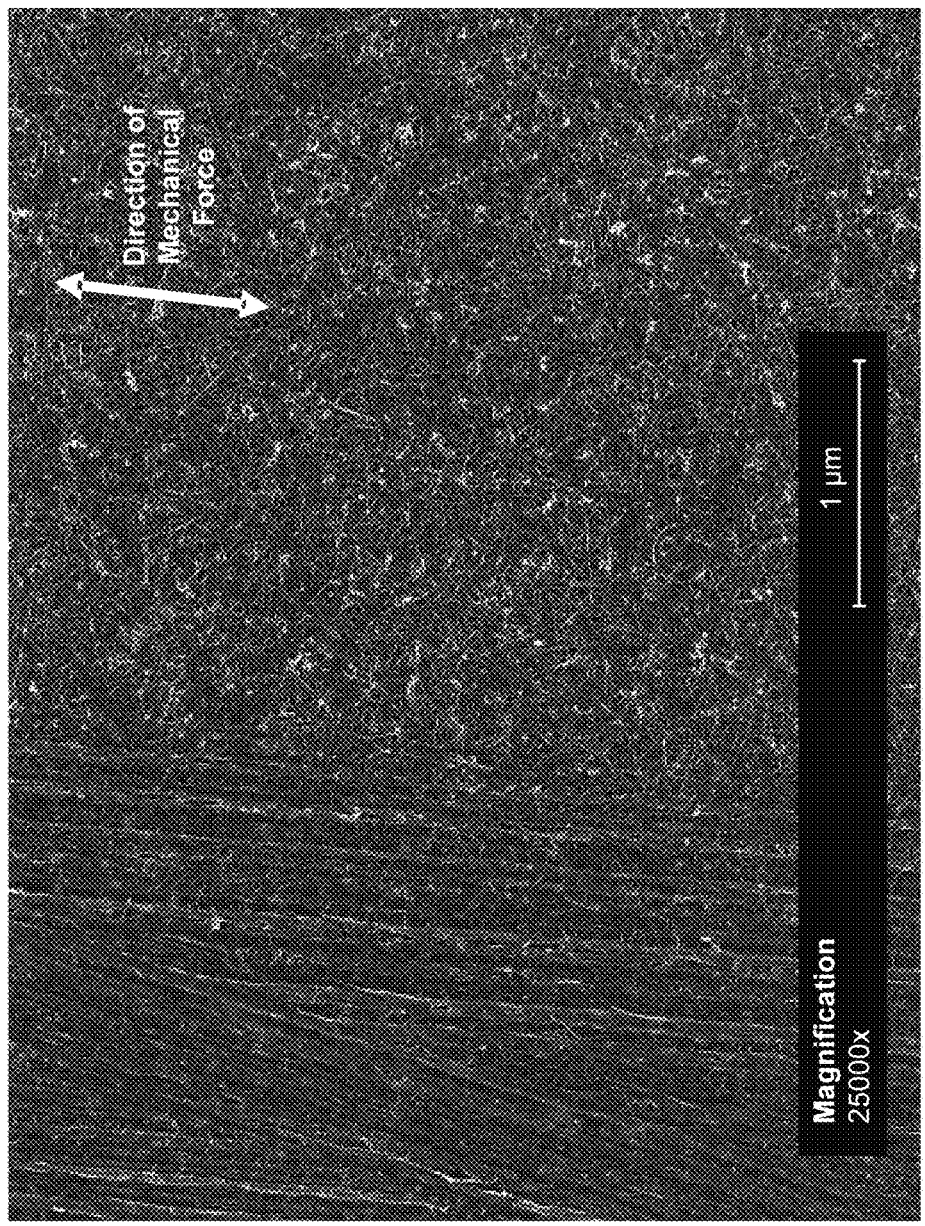
Figure 20C:
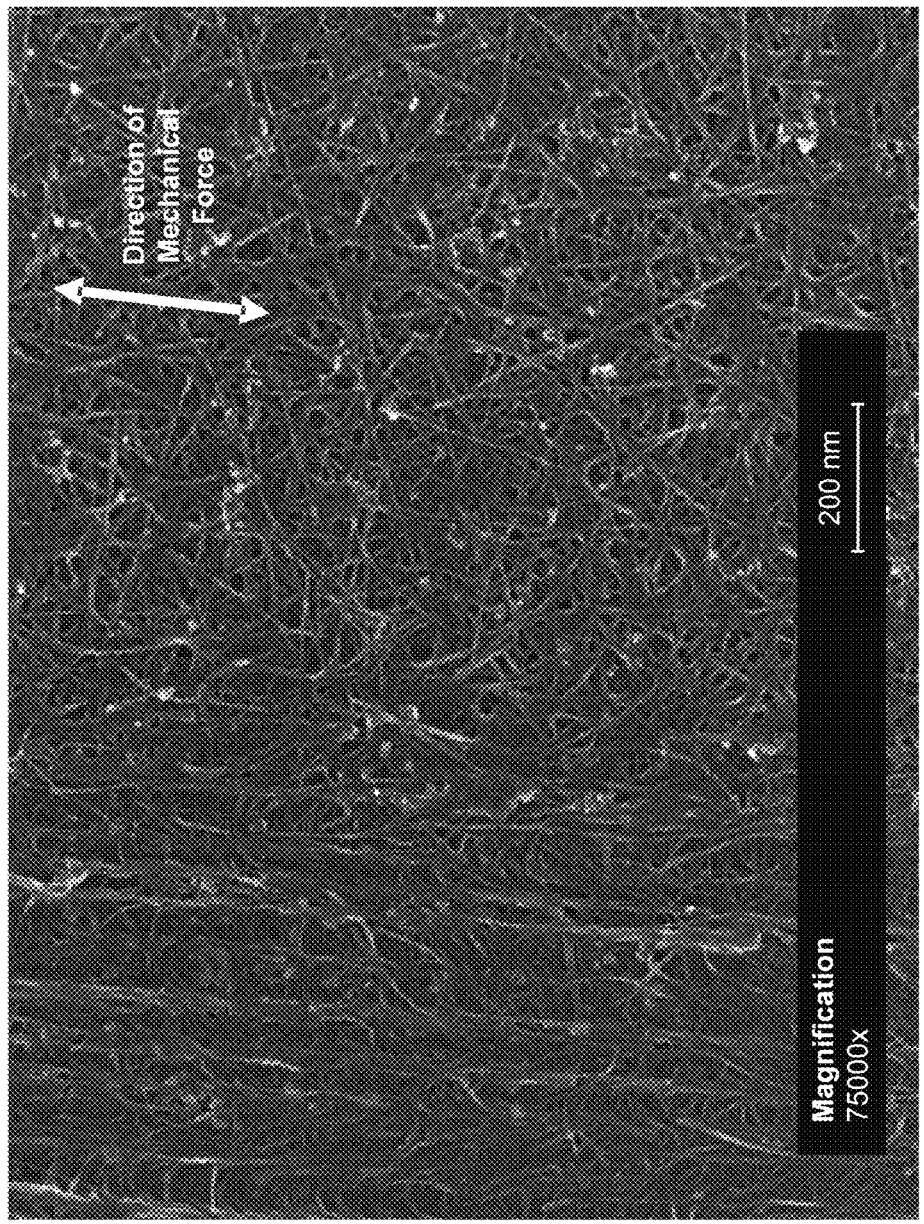

FIGS. 20A-20C are SEM images of an exemplary nanotube fabric layer at different magnifications (2001, 2002, and 2003 respectively) first formed via three spin coating operations of a purified nanotube application solution (as described above) and then rendered into an ordered network of nanotube elements through the application of a directional rubbing force along the direction indicated within each SEM image. The rubbing force was applied by placing the wafer facedown on a TEFLON or polytetrafluoroethylene sheet (such that the nanotube fabric layer was in direct contact with the TEFLON or polytetrafluoroethylene sheet), placing a 150 g weight on the reverse side (that is, the non-coated side) of the wafer, and sliding the wafer along the TEFLON or polytetrafluoroethylene sheet a distance of approximately five inches fifteen times. As is evident in FIG. 20A (the 5,000× magnification image), the nanotube fabric layer exhibited thin bands (on the order of 2 μm across) of ordered nanotubes resulting from the applied rubbing force.

Example 3

Figure 21A:
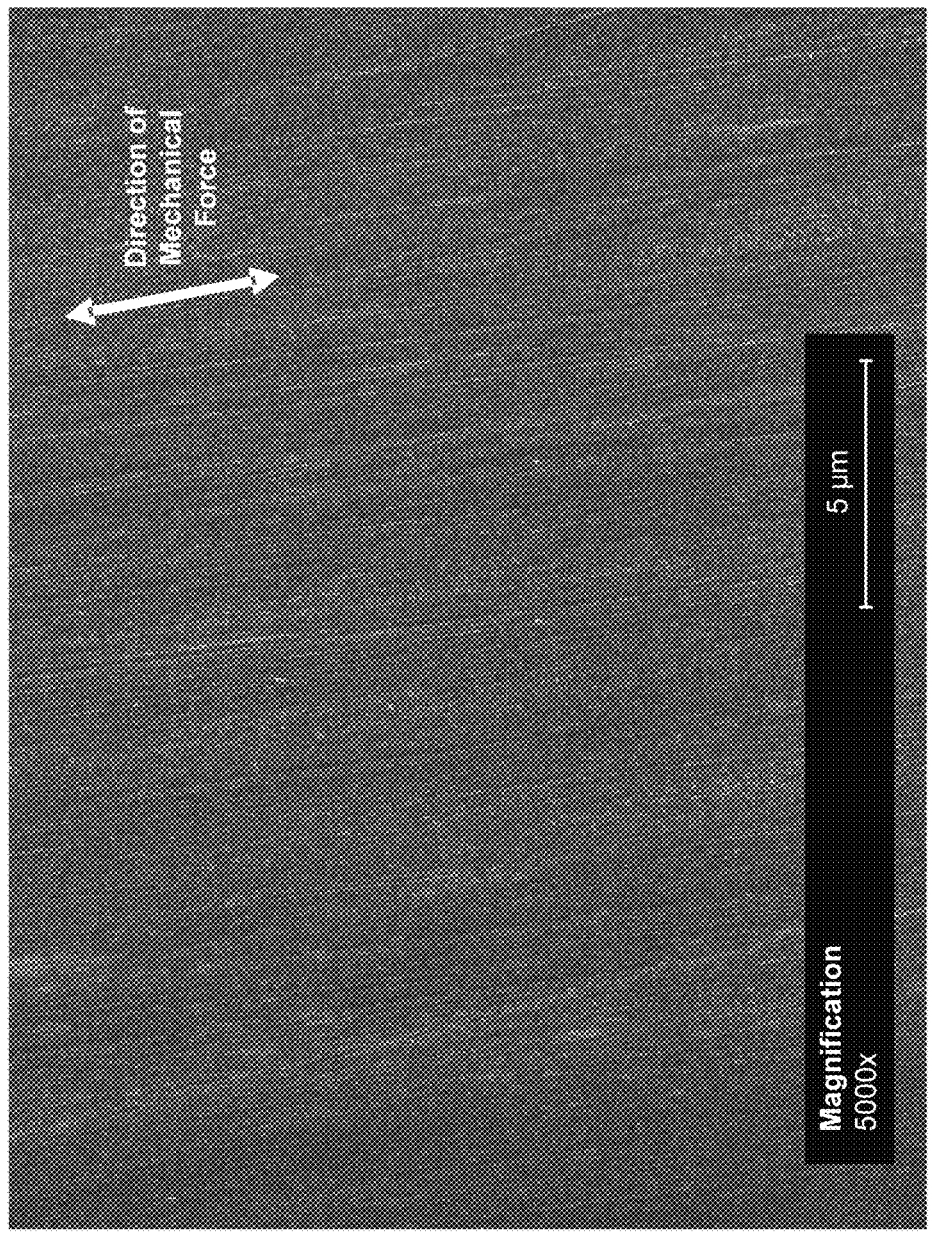
FIGS. 21A-21C are SEM images (at different magnifications) of an exemplary nanotube fabric layer comprising a network of nanotube elements rendered into an ordered arrangement after twenty five rubbing passes over a TEFLON or polytetrafluoroethylene film.
Figure 21B:
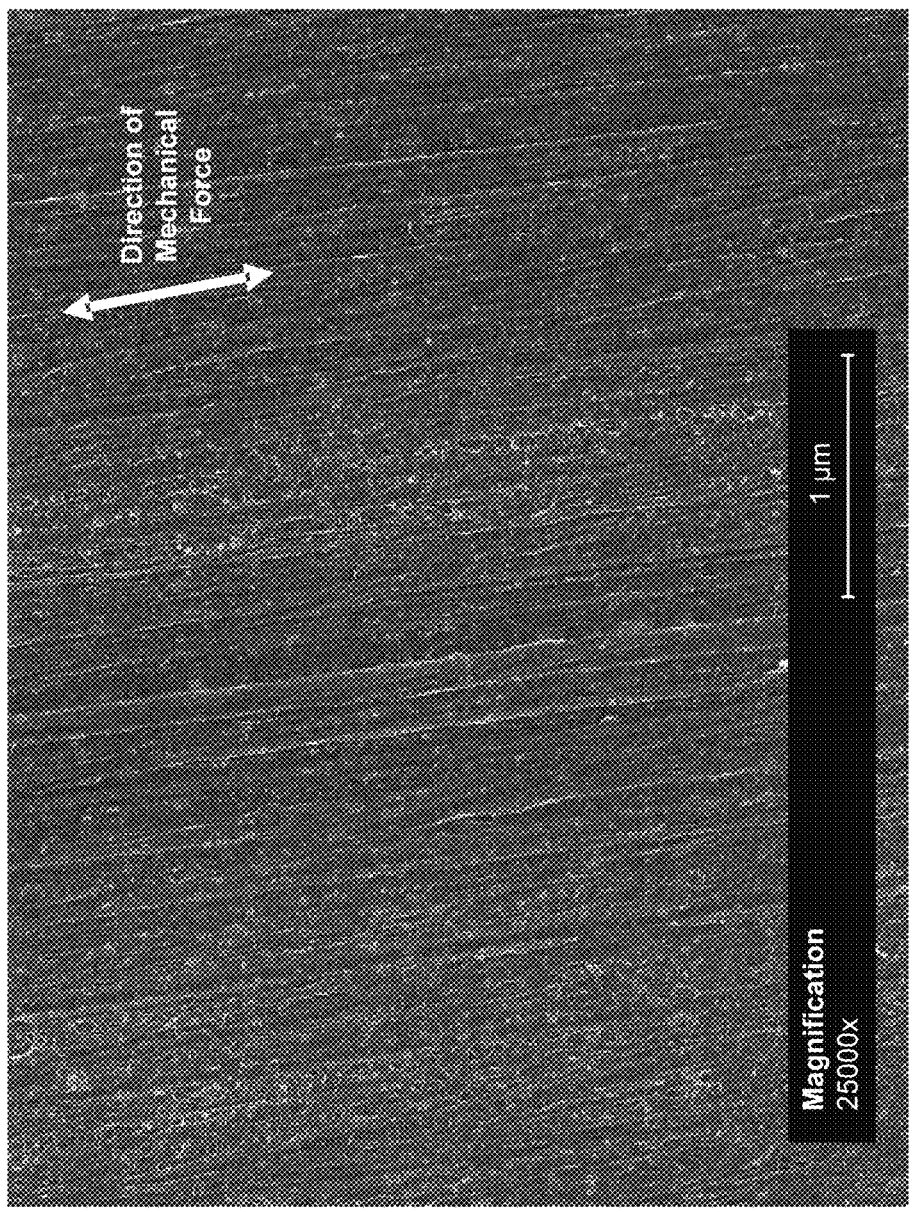
Figure 21C:
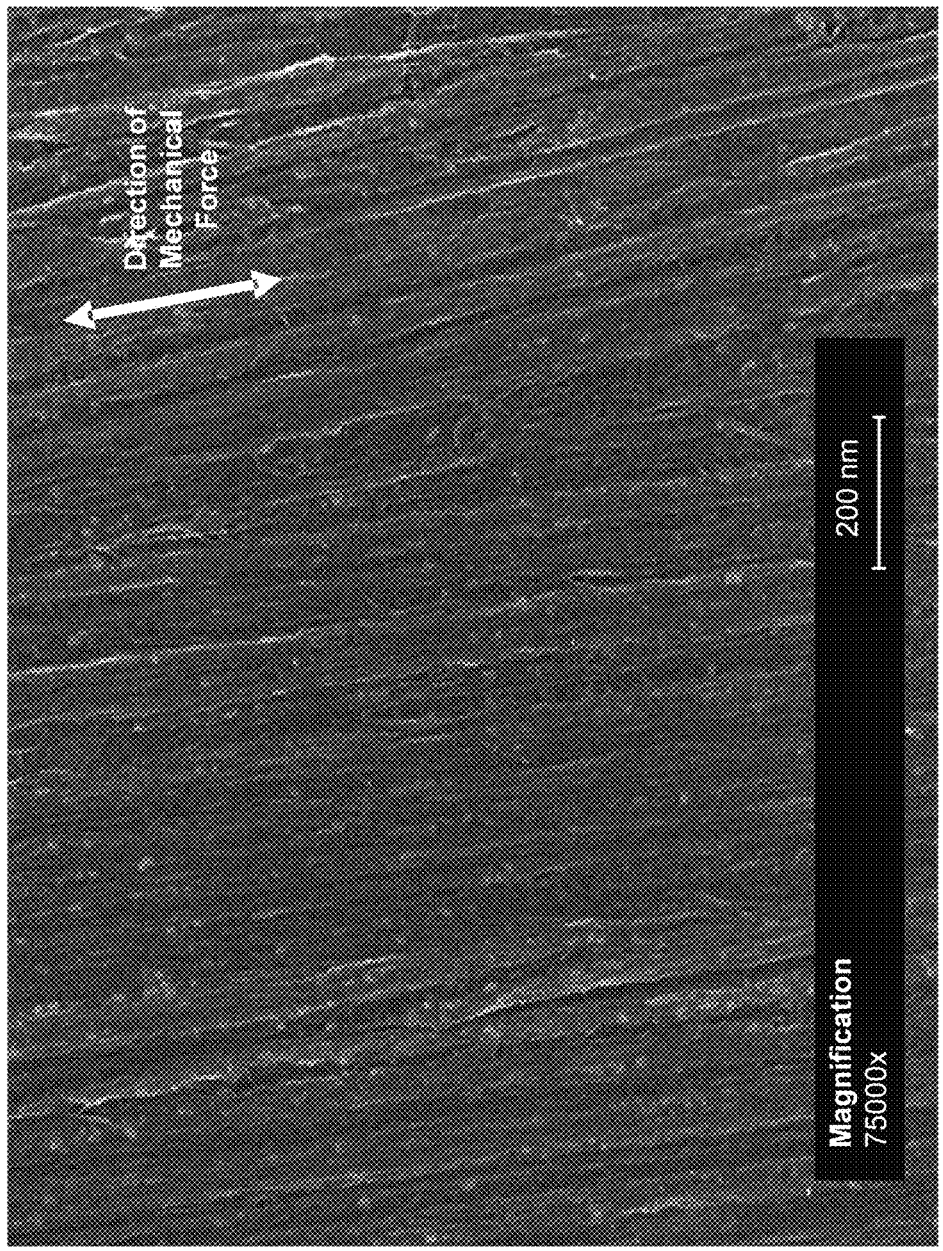

FIGS. 21A-21C are SEM images of an exemplary nanotube fabric layer at different magnifications (2101, 2102, and 2103 respectively) first formed via three spin coating operations of a purified nanotube application solution (as described above) and then rendered into an ordered network of nanotube elements through the application of a directional rubbing force along the direction indicated within each SEM image. The rubbing force was applied by placing the wafer facedown on a TEFLON or polytetrafluoroethylene sheet (such that the nanotube fabric layer was in direct contact with the TEFLON or polytetrafluoroethylene sheet), placing a 150 g weight on the reverse side (that is, the non-coated side) of the wafer, and sliding the wafer along the TEFLON or polytetrafluoroethylene sheet a distance of approximately five inches twenty-five times. As is evident in FIG. 21A (the 5,000× magnification image), the resulting nanotube fabric layer was rendered into an ordered state oriented along the direction of the applied rubbing force.

Example 4

Figure 22A:
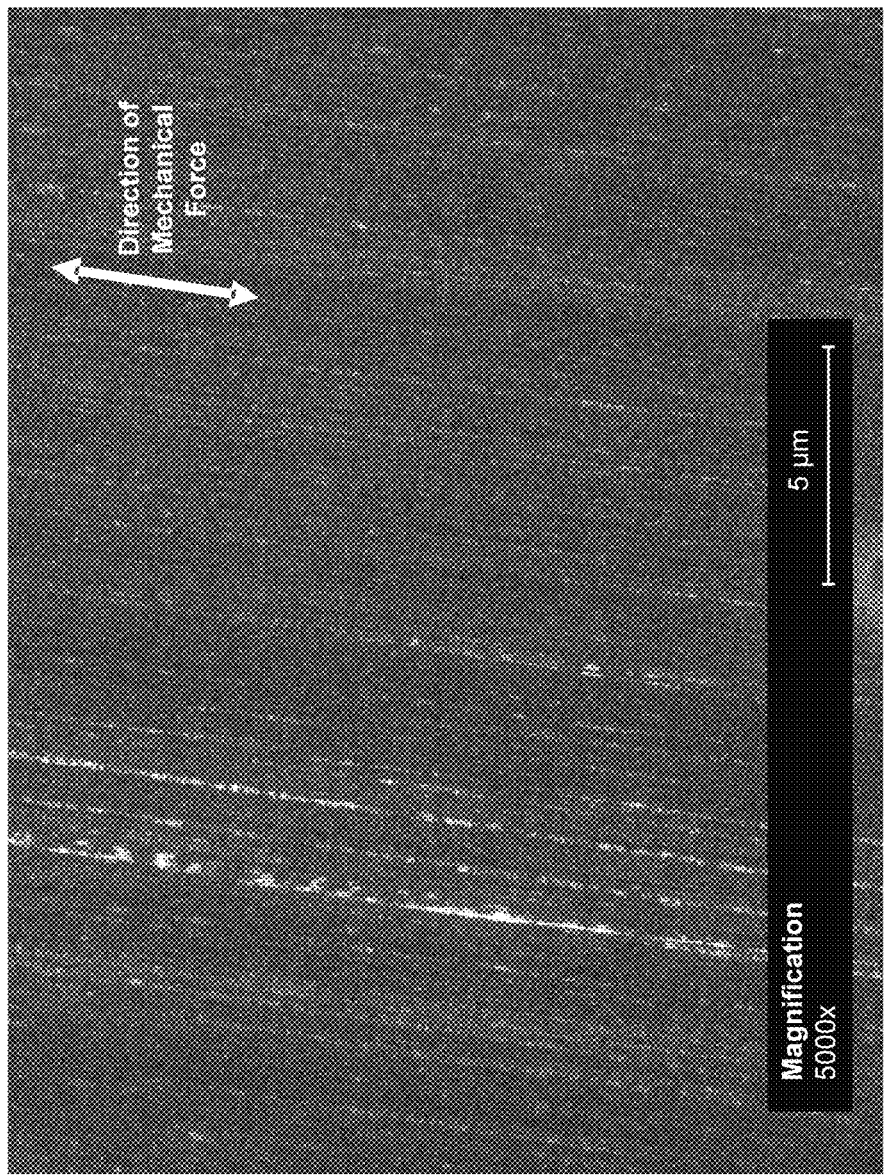
FIGS. 22A-22C are SEM images (at different magnifications) of an exemplary nanotube fabric layer comprising a network of nanotube elements rendered into an ordered arrangement after two hundred and fifty rubbing passes over a silicon wafer.
Figure 22B:
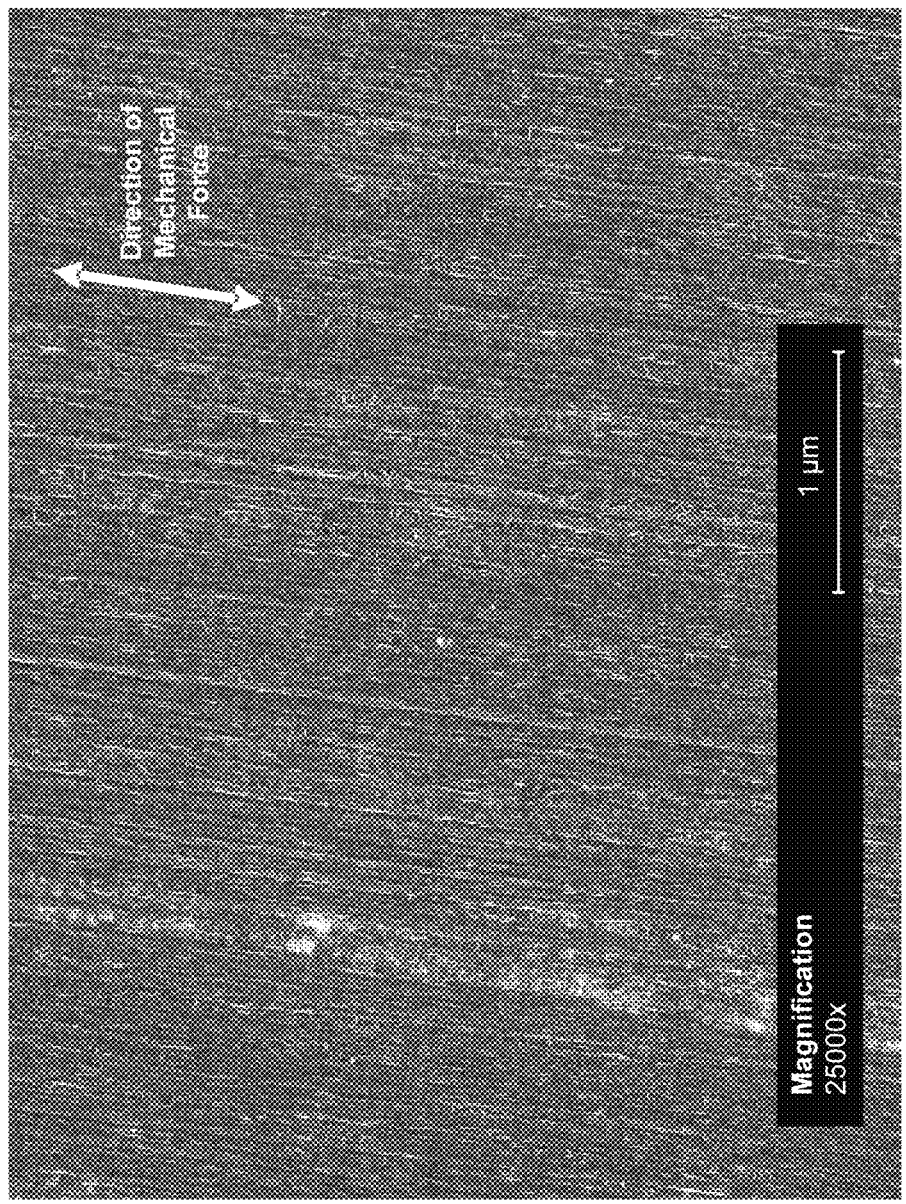
Figure 22C:
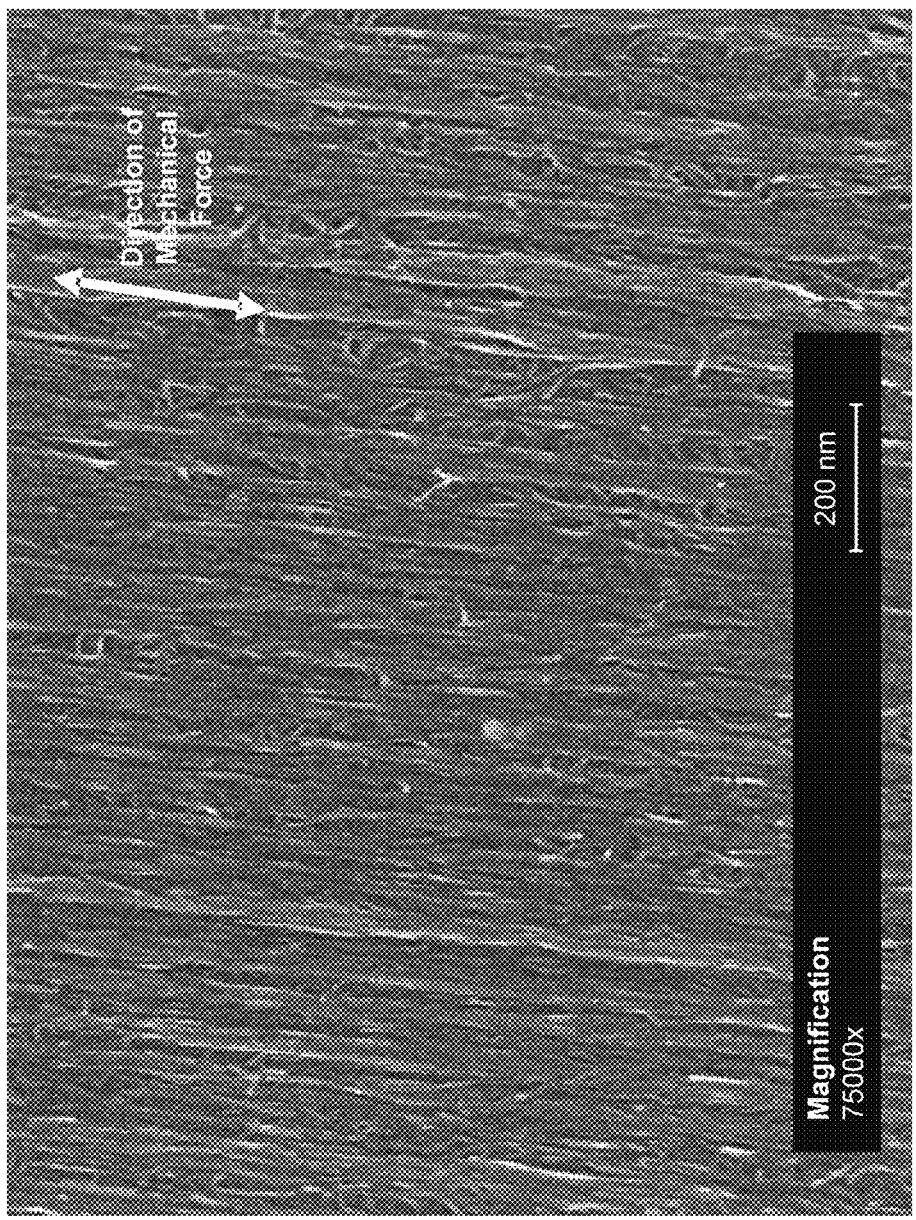

FIGS. 22A-22C are SEM images of an exemplary nanotube fabric layer at different magnifications (2201, 2202, and 2203 respectively) first formed via four spin coating operations of a purified nanotube application solution (as described above) and then rendered into an ordered network of nanotube elements through the application of a directional rubbing force along the direction indicated within each SEM image. The rubbing force was applied by placing the wafer facedown on a 300 mm silicon dioxide wafer (such that the nanotube fabric layer was in direct contact with the silicon dioxide wafer surface), placing a 150 g weight on the reverse side (that is, the non-coated side of the wafer), and sliding the wafer along silicon dioxide wafer a distance of approximately four inches 250 times. As is evident in FIG. 22A (the 5,000× magnification image), the resulting nanotube fabric layer was rendered into an ordered state oriented along the direction of the applied rubbing force.

Example 5

FIGS. 23A-23C are SEM images of an exemplary nanotube fabric layer at different magnifications (2301, 2302, and 2303 respectively) first formed via three spin coating operations of a purified nanotube application solution (as described above) and then rendered into an ordered network of nanotube elements through the application of an arcing rubbing force along the direction indicated within each SEM image. The rubbing force was applied by passing a wool rubbing pad over the wafer in an arcing motion 100 times.

The wool rubbing pad was not rotated as it was passed over the wafer. As is evident in FIG. 23A (the 10,000× magnification image), the resulting nanotube fabric layer was rendered into an ordered state oriented in a substantially linear direction substantially tangent to the initial angle of the applied arcing force. As evident in FIG. 23B (the 25,000× magnification image), despite the arcing direction of the applied rubbing force the nanotube elements were ordered in a generally linear orientation.

Example 6

FIGS. 24A-24C are SEM images of an exemplary nanotube fabric layer at different magnifications (2401, 2402, and 2403 respectively) first formed via a single spin coating operation of a purified nanotube application solution (as described above) and then rendered into an ordered network of nanotube elements through the application of a linearly applied polishing force along the direction indicated within each SEM image. The polishing force was applied by passing a cylindrical velour roller over the wafer in a linear motion 50 times. The cylindrical velour roller was rotated at a speed of 60 rpm and passed over the wafer at a constant rate of approximately 0.4 inches per second for each pass. As is evident in FIG. 24C (the 75,000× magnification image), the resulting nanotube fabric layer was rendered into an ordered state oriented along the direction of the applied polishing force.

Example 7

FIGS. 25A-25C are SEM images of an exemplary nanotube fabric layer at different magnifications (2501, 2502, and 2503 respectively) first formed via three spin coating operations of a purified nanotube application solution (as described above) and then rendered into an ordered network of nanotube elements through the application of a rotational polishing force along the direction indicated within each SEM image. The polishing force was applied by positioning a round wool polishing pad over the wafer and rotating the polishing pad at a rate of sixty rotations per minute for ninety seconds. As is evident in FIG. 25B (the 25,000× magnification image), the resulting nanotube fabric layer was rendered into several regions of ordered nanotube elements oriented in along several directions.

Example 8

Figure 26A:
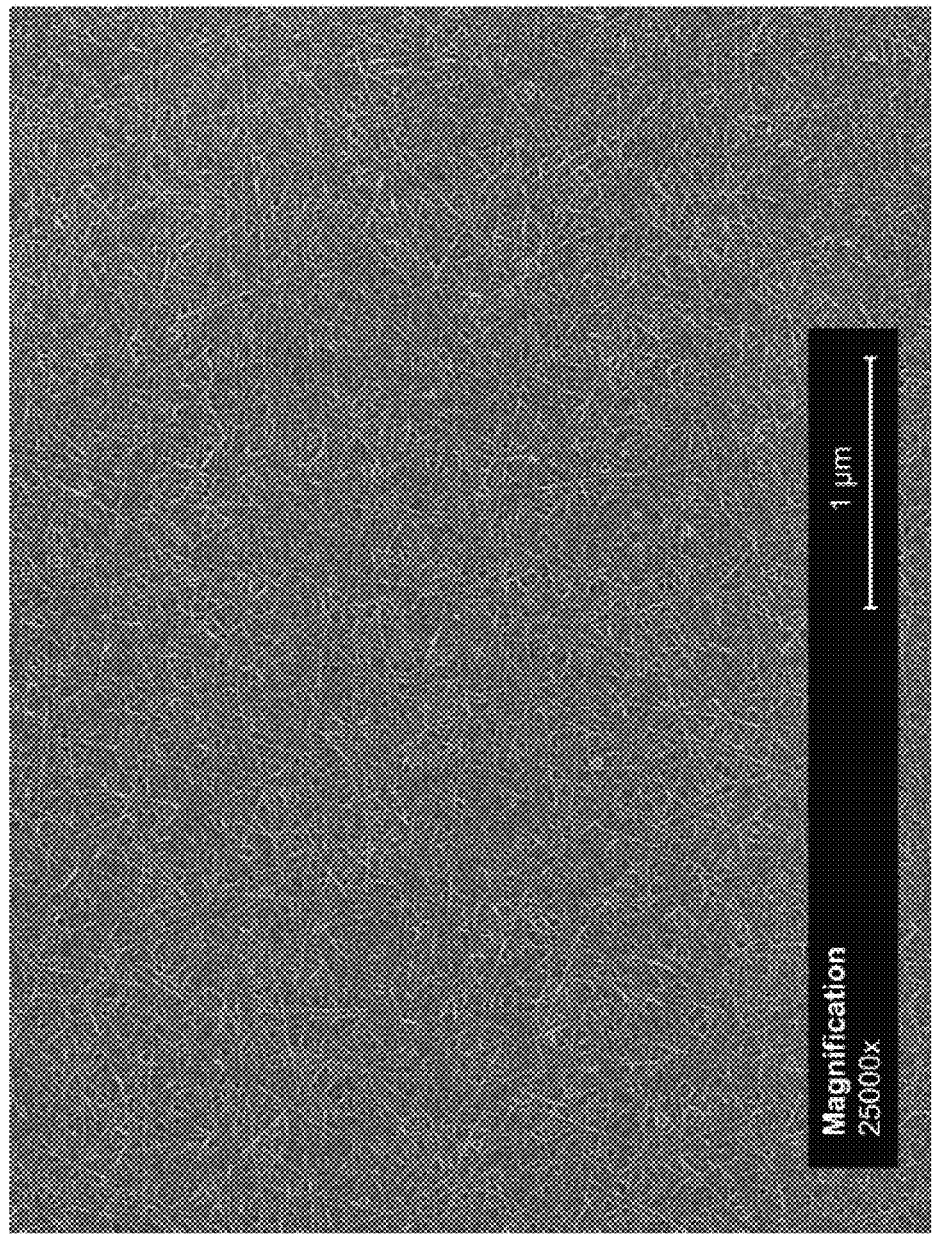
FIGS. 26A-26C are SEM images (at different magnifications) of an exemplary nanotube fabric layer comprising a network of unordered nanotube elements.
Figure 26B:
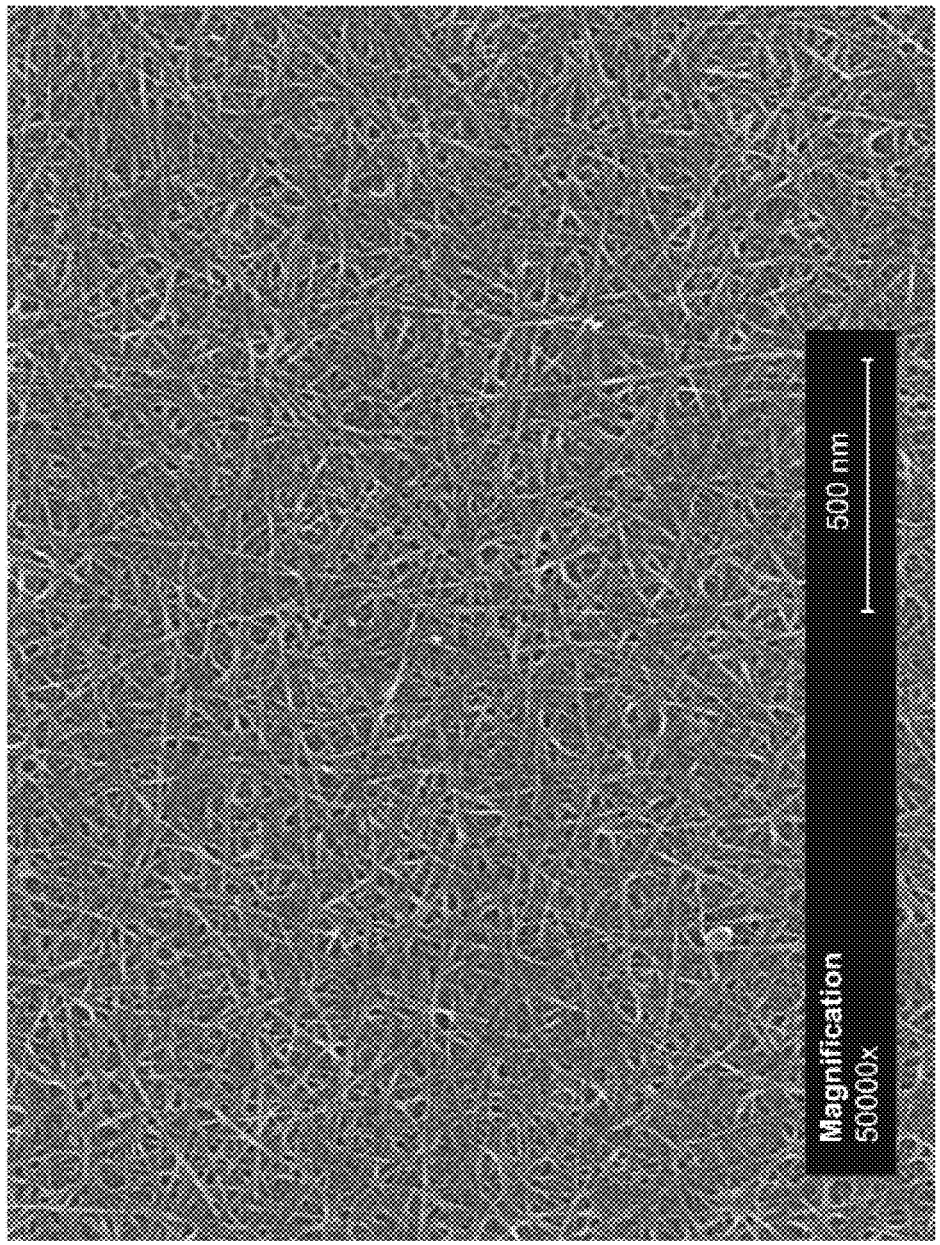
Figure 26C:
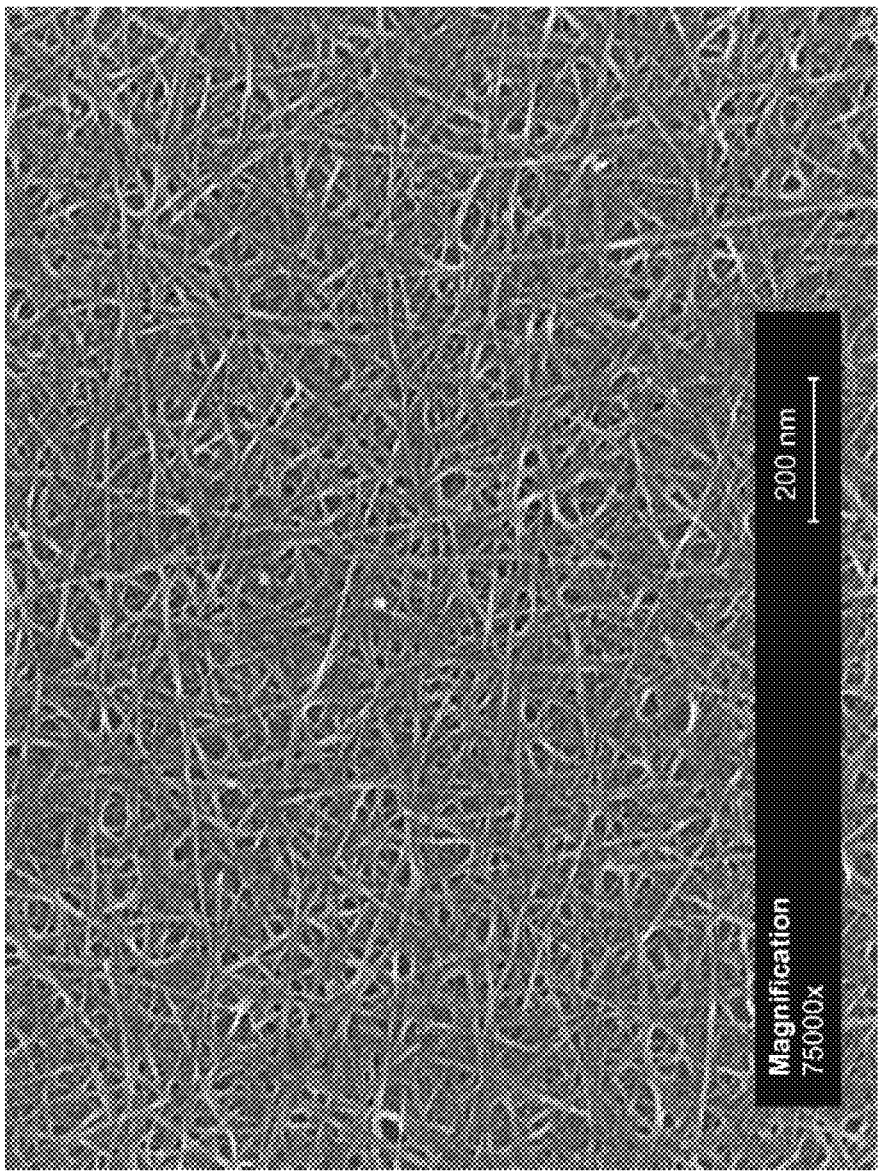
Figure 27A:
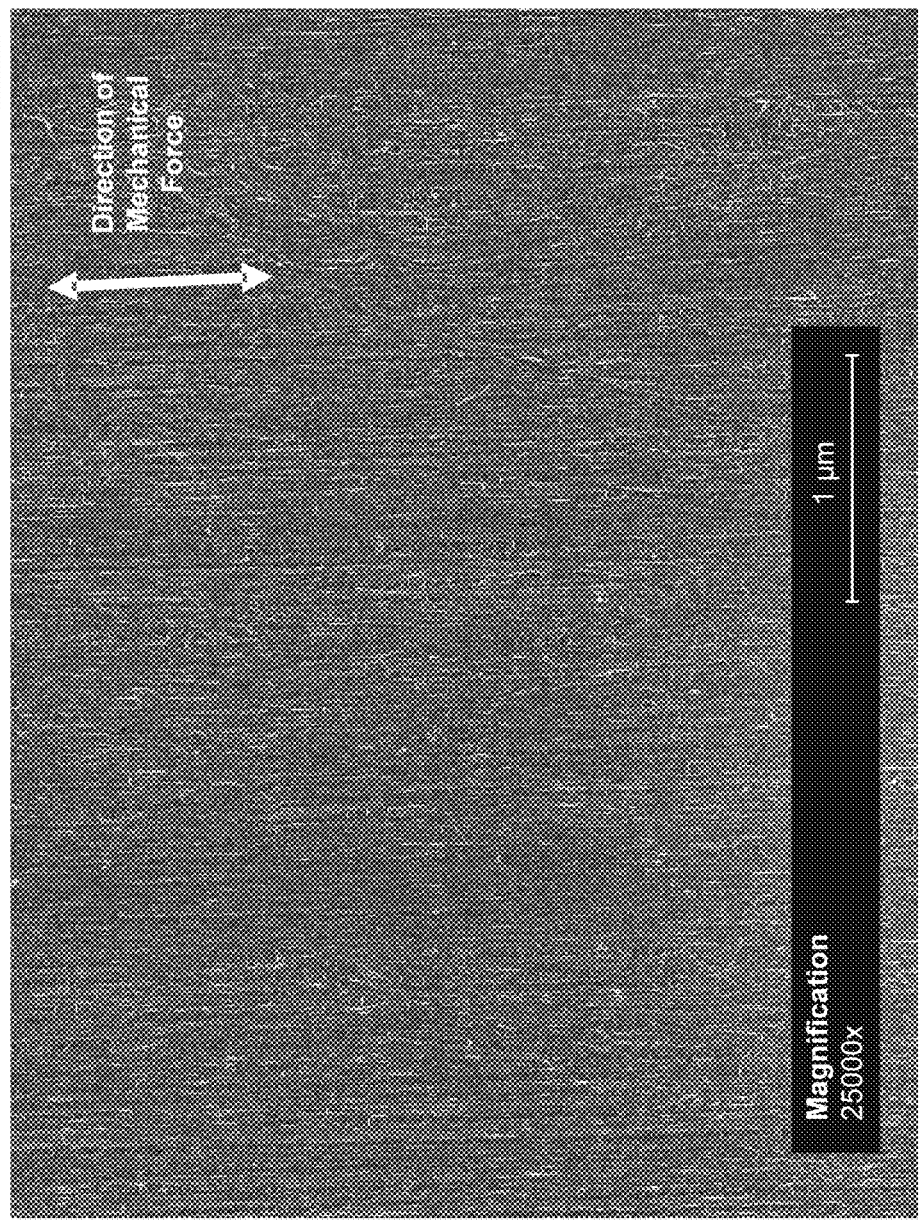
FIGS. 27A-27C are SEM images (at different magnifications) of the exemplary nanotube fabric layer of FIGS. 26A-26C after being rendered into a network of nanotube elements by sliding a weighted CMP pad along the length of the nanotube fabric layer 20 times.
Figure 27B:
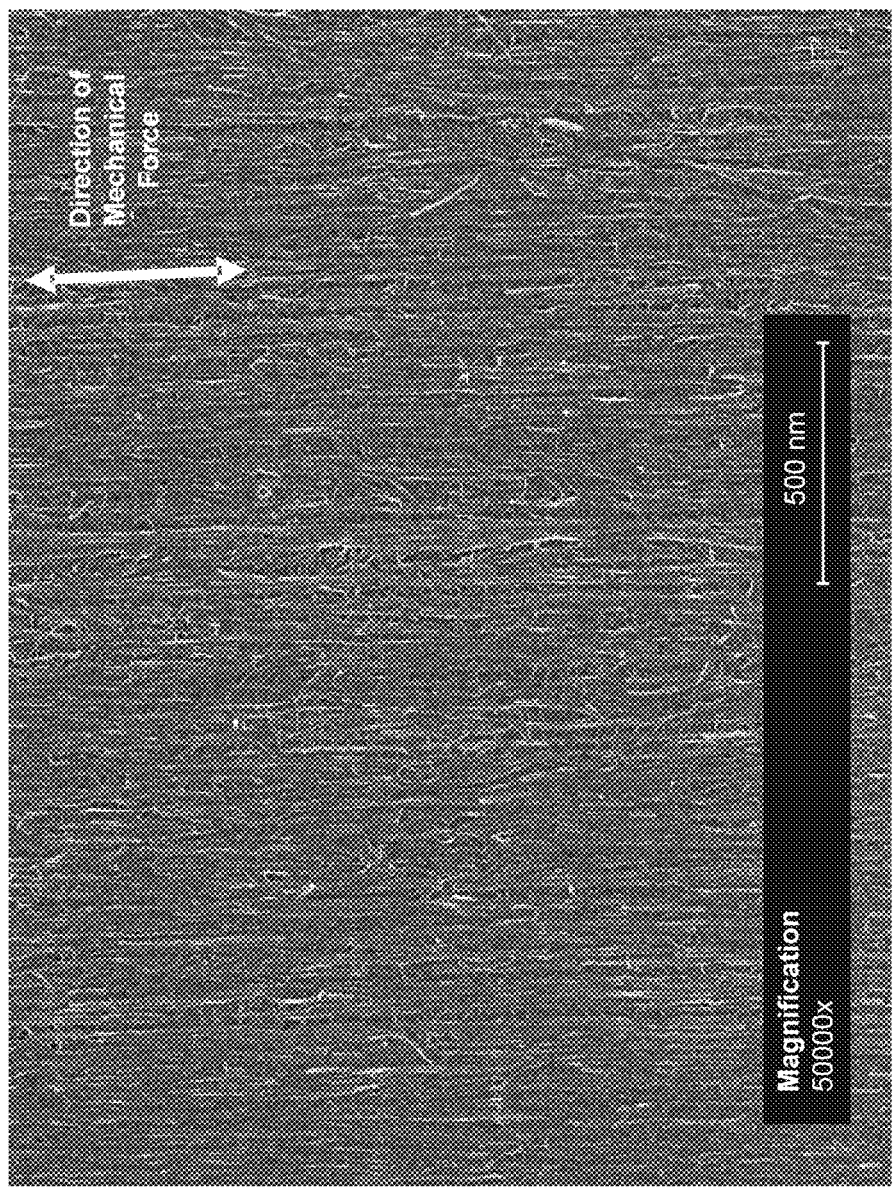
Figure 27C:
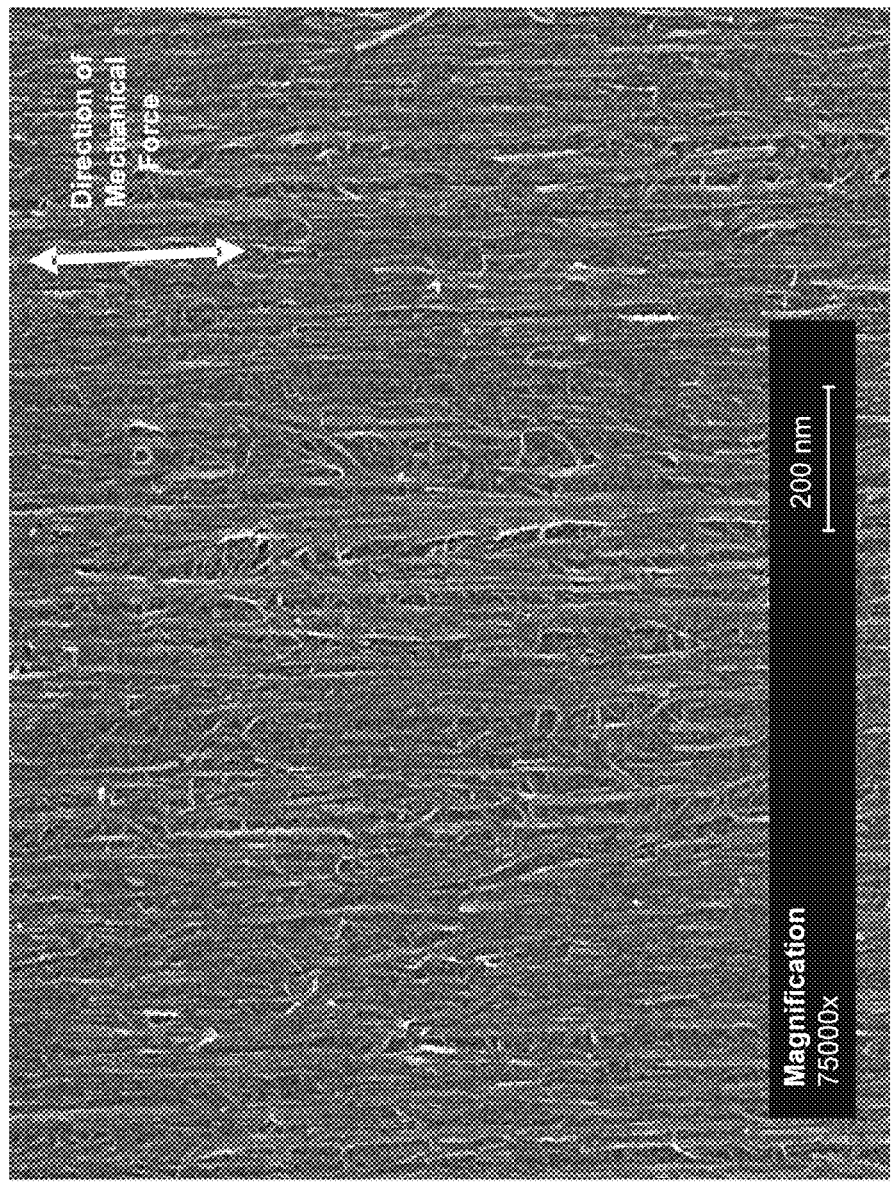

FIGS. 26A-26C are SEM images of an exemplary nanotube fabric layer at different magnifications (2601, 2602, and 2603 respectively) prior to being rendered into an ordered state by the methods of the present disclosure. The nanotube fabric layer depicted in FIGS. 26A-26C was formed via four spin coating operations of a purified nanotube application solution (as described above) over a Si wafer. The deposited nanotube fabric layer was then rendered into an ordered network of nanotube elements through the application of a linear rubbing force. The linear rubbing force was applied by sliding a weighted CMP pad (approximately 75 g) along the length of the nanotube fabric layer 20 times. FIGS. 27A-27B are SEM images of the same nanotube fabric layer depicted in FIGS. 26A-26C after this linear rubbing force was applied along the direction indicated in FIGS. 27A-27C. As is evident in FIG. 27C (the 75,000× magnification image), the resulting nanotube fabric layer was rendered into an ordered network of nanotube elements oriented in direction of the applied force.

Example 9

Figure 28A:
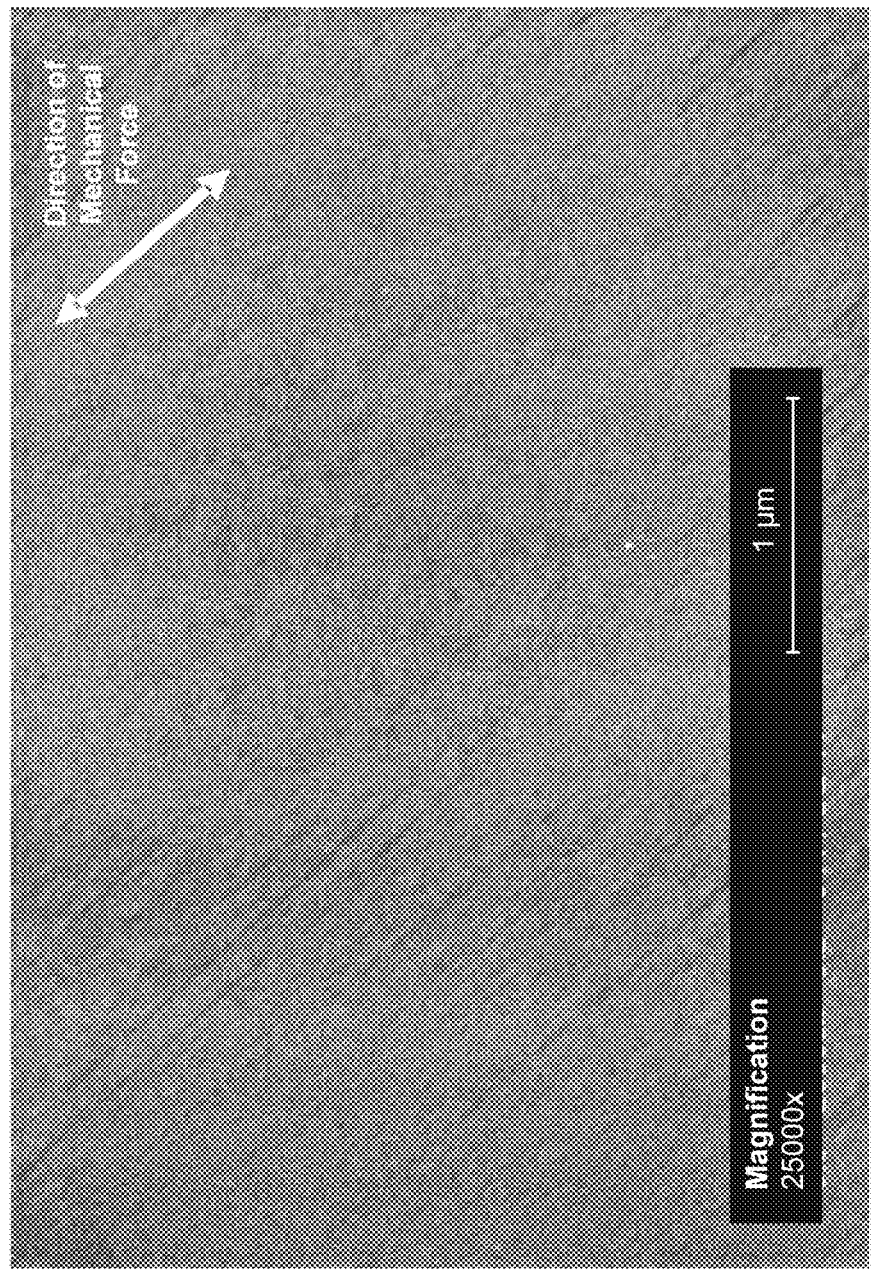
FIGS. 28A-28D are SEM images (at different magnifications) detailing the rendering of an exemplary nanotube fabric layer into an ordered state via a cryokinetic impingement operation.
Figure 28B:
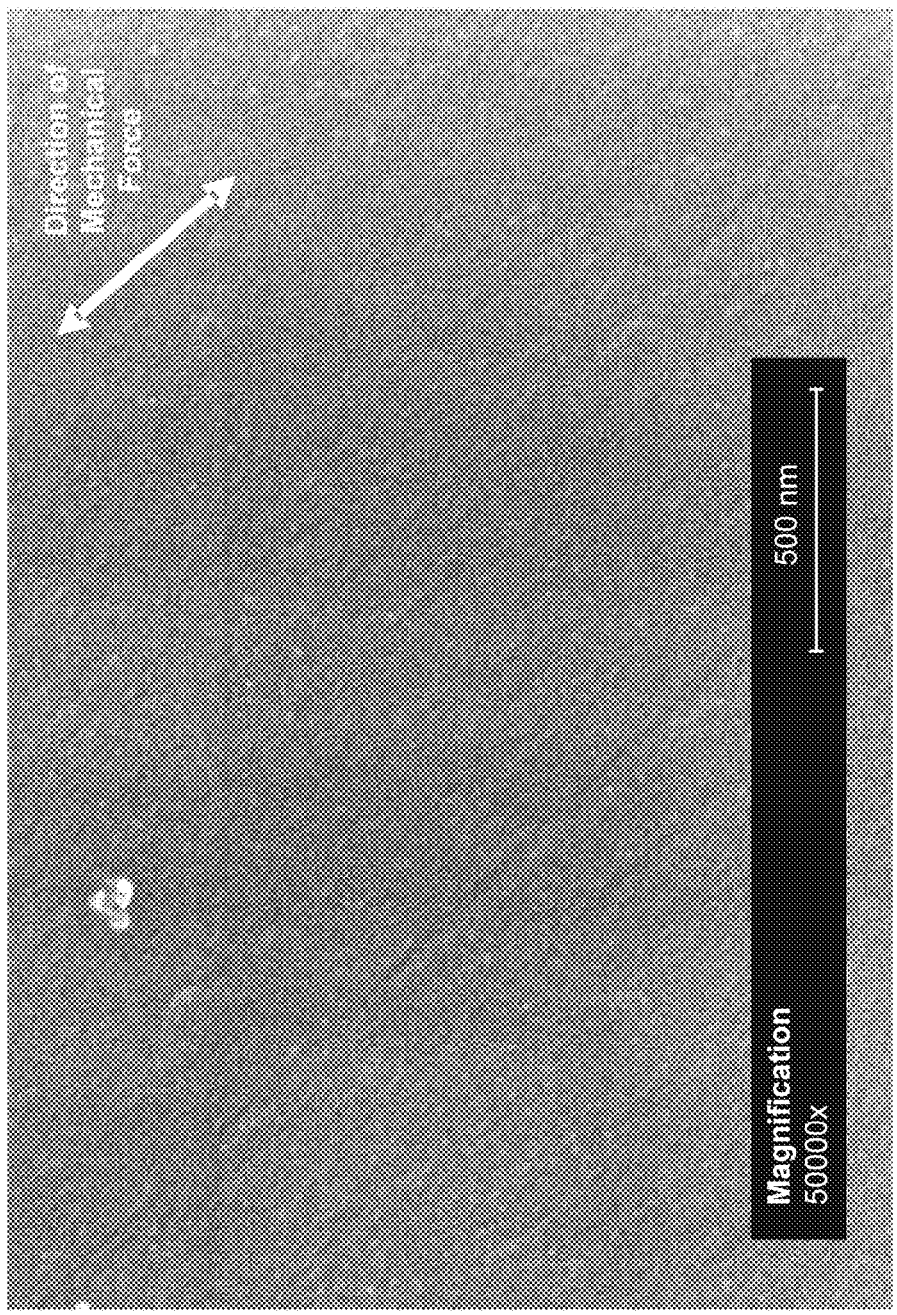
Figure 28C:
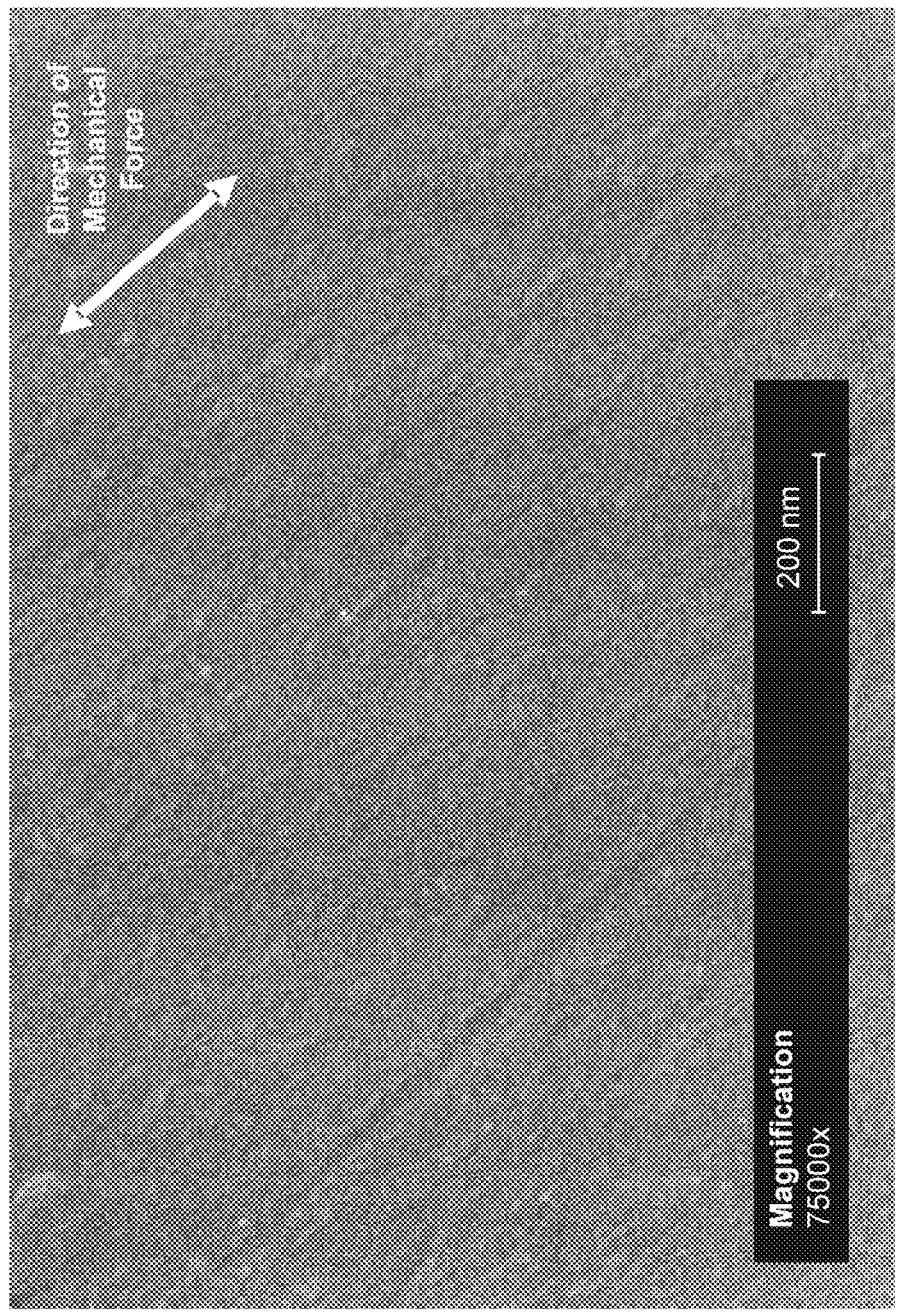
Figure 28D:
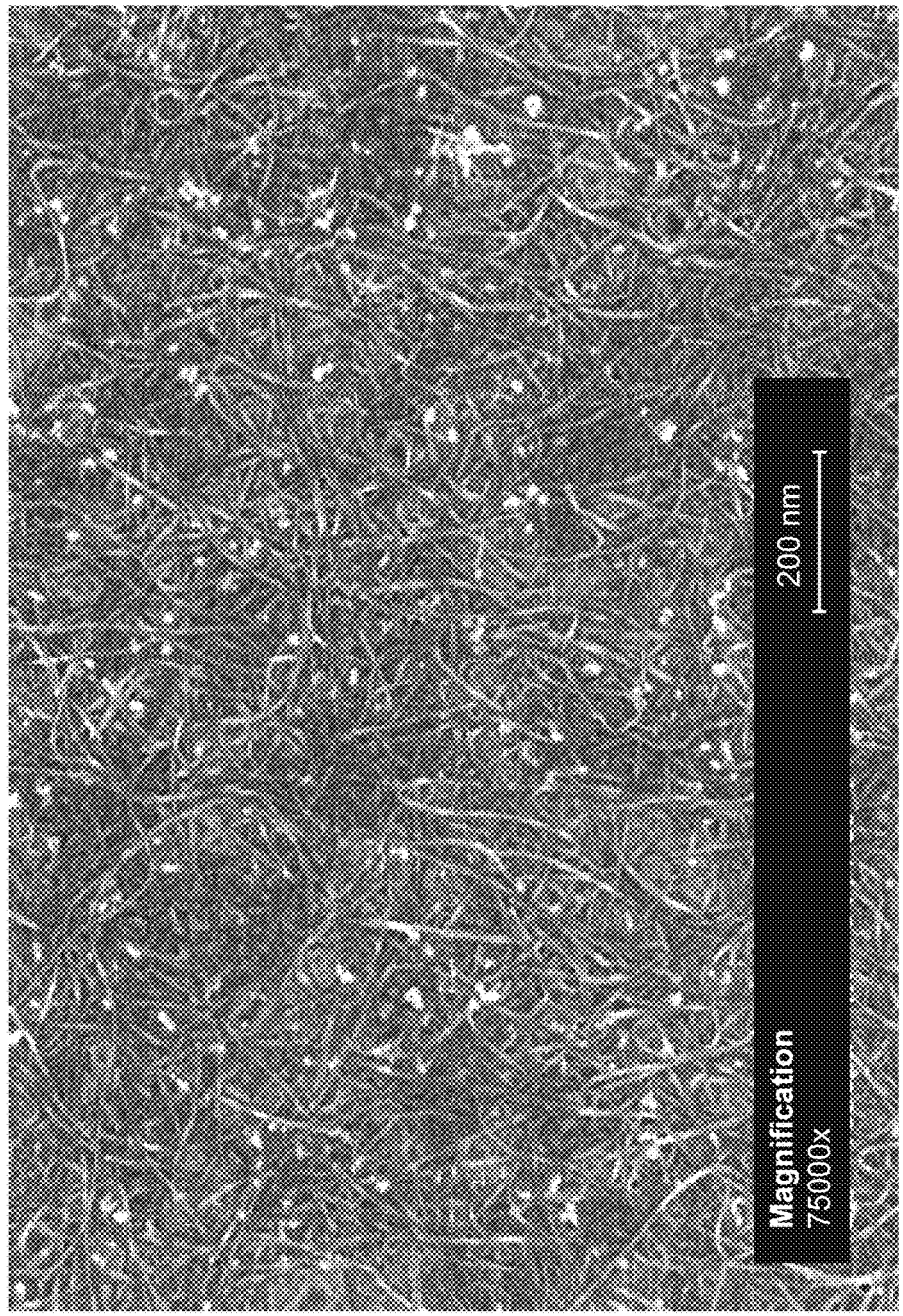

FIGS. 28A-28C are SEM images of an exemplary nanotube fabric layer at different magnifications (2801, 2802, and 2803 respectively) first formed via three spin coating operations of a purified nanotube application solution (as described above) and then rendered into an ordered network of nanotube elements through the application of cryokinetic impingement operation along the direction indicated within each SEM image. FIG. 28D is an SEM image 2804 of the formed nanotube fabric layer prior to the application of the cryokinetic impingement operation illustrating the substantially unordered state of the nanotube fabric layer prior to the application of the polishing force. Once the nanotube fabric layer was formed on the silicon substrate, a protective plastic layer (Saran wrap, based upon polyvinylidene chloride) was positioned over the fabric layer. Then a cryokinetic impingement gun (a commercial dry ice cleaning system available from Va-Tran System, Inc.) was used to spray frozen pellets of carbon dioxide for ten passes. Each pass included sweeping the spray across the wafer surface (protected by the plastic layer) for ten seconds. Between each pass, the protective plastic layer was given time to defrost (on the order of thirty seconds). As is evident in FIG. 28C (the 75,000× magnification image), the resulting nanotube fabric layer was rendered into an ordered state oriented along the direction of the applied cryokinetic impingement force.

Example 10

Figure 29A:
FIGS. 29A-29C are SEM images detailing the rendering of an exemplary nanotube fabric layer deposited over a 1018 low carbon steel substrate into an ordered state via a rubbing operation.
Figure 29B:
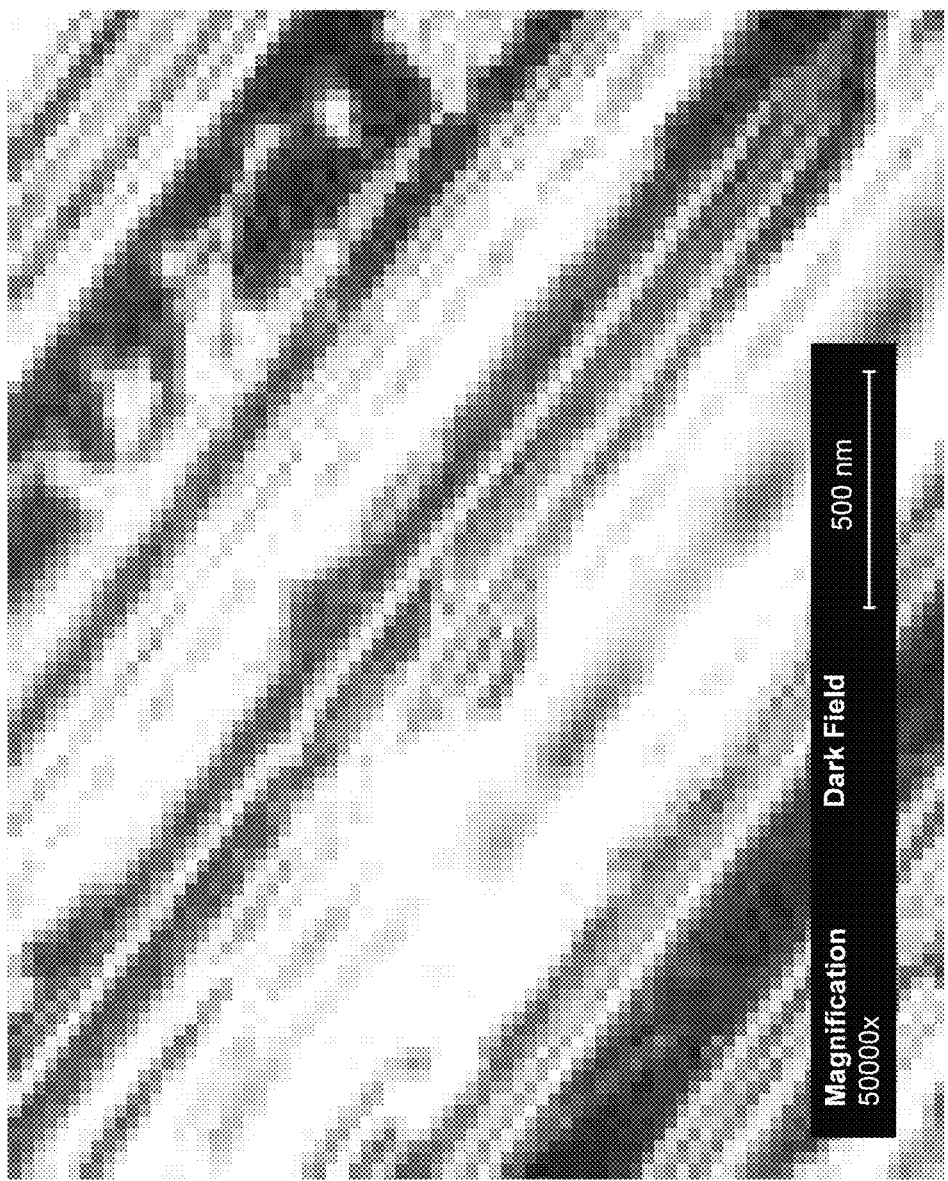
Figure 29C:

FIGS. 29A-29C are SEM images depicting the formation and subsequent ordering of an exemplary nanotube fabric layer formed over a 1018 low carbon steel substrate. FIG. 29A is an SEM image 2901 of the steel substrate prior to the deposition of the nanotube fabric layer. FIG. 29B is an SEM image 2902 of the exemplary nanotube fabric layer (in a substantially unordered state) formed via three spin coating operations of a purified nanotube application solution (as described above). FIG. 29C is an SEM image 2903 of the exemplary nanotube fabric layer after being rendered into an ordered network of nanotube elements through the application of a directional rubbing force along the direction indicated within SEM image 2903. Machining grooves along the surface of the steel substrate are visible in all three SEM images (2901, 2902, and 2903) running orthogonal to the indicated direction of the applied rubbing force (shown in SEM image 2903). The rubbing force was applied by placing the wafer face down on a rayon polishing pad (that is, placing the wafer such that the nanotube fabric layer was positioned in direct physical contact with the rayon polishing pad) and sliding the wafer approximately six to eight inches along the surface of the pad fifty times. The rayon polishing pad used within this example was a South Bay Technology, Inc. p/PRF12A-10 "rayon-fine polishing cloth." As is evident in FIG. 29C, the resulting nanotube fabric layer was rendered into an ordered state oriented along the direction of the applied rubbing force.

Example 11

Figure 30A:
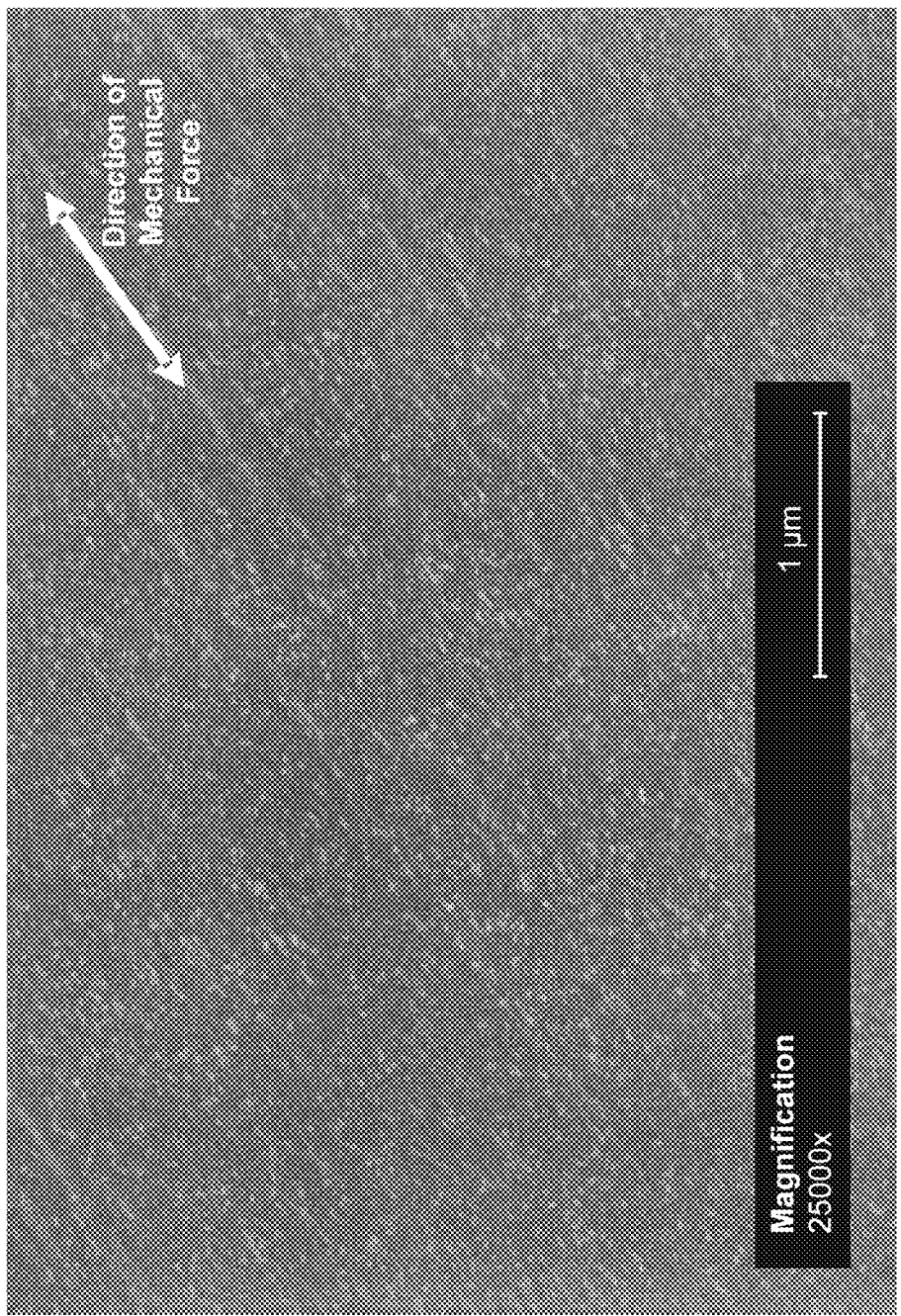
FIGS. 30A-30D are SEM images (at different magnifications) detailing the rendering of an exemplary nanotube fabric layer into an ordered state via piezoelectric rubbing operation.
Figure 30B:
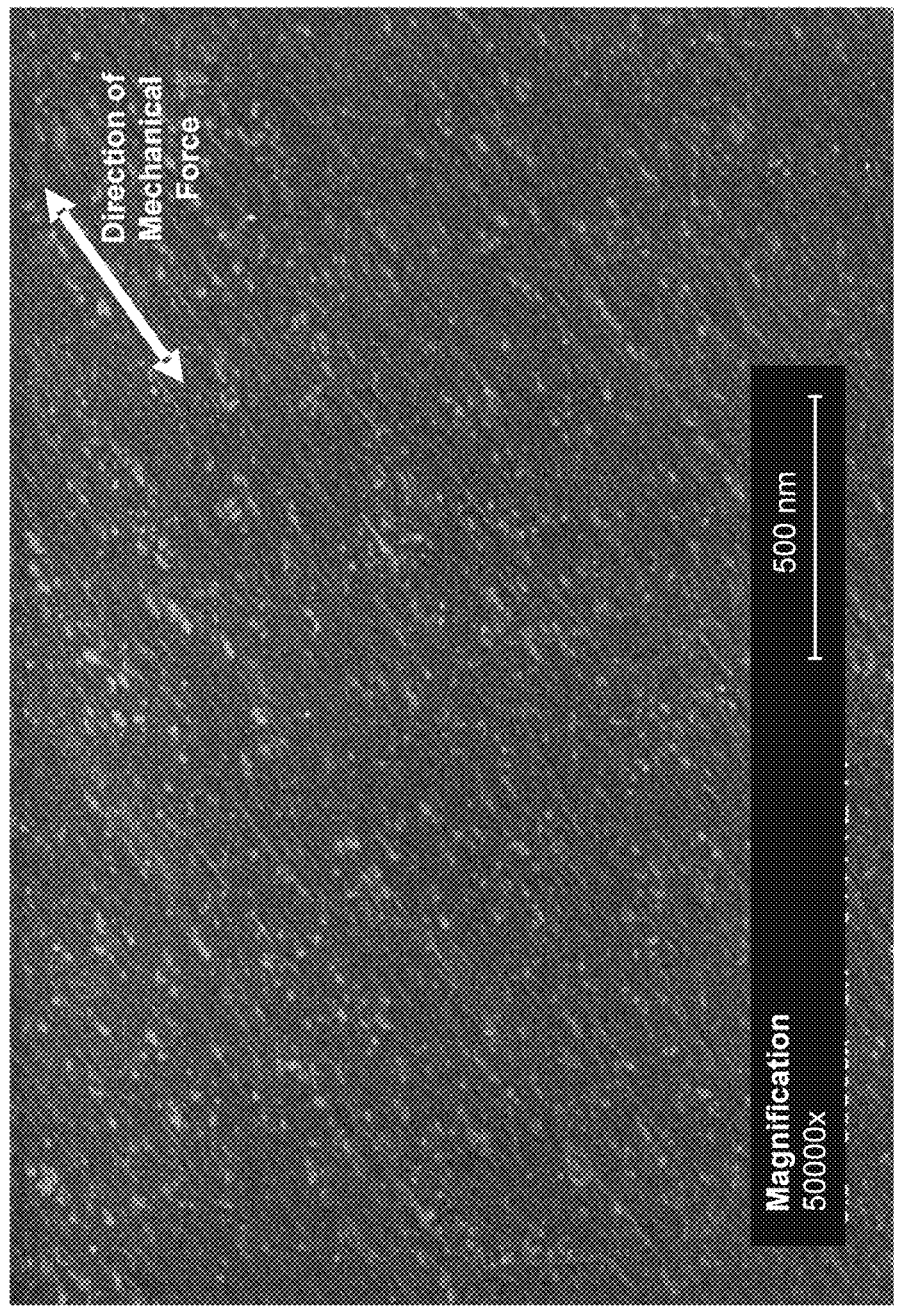
Figure 30C:
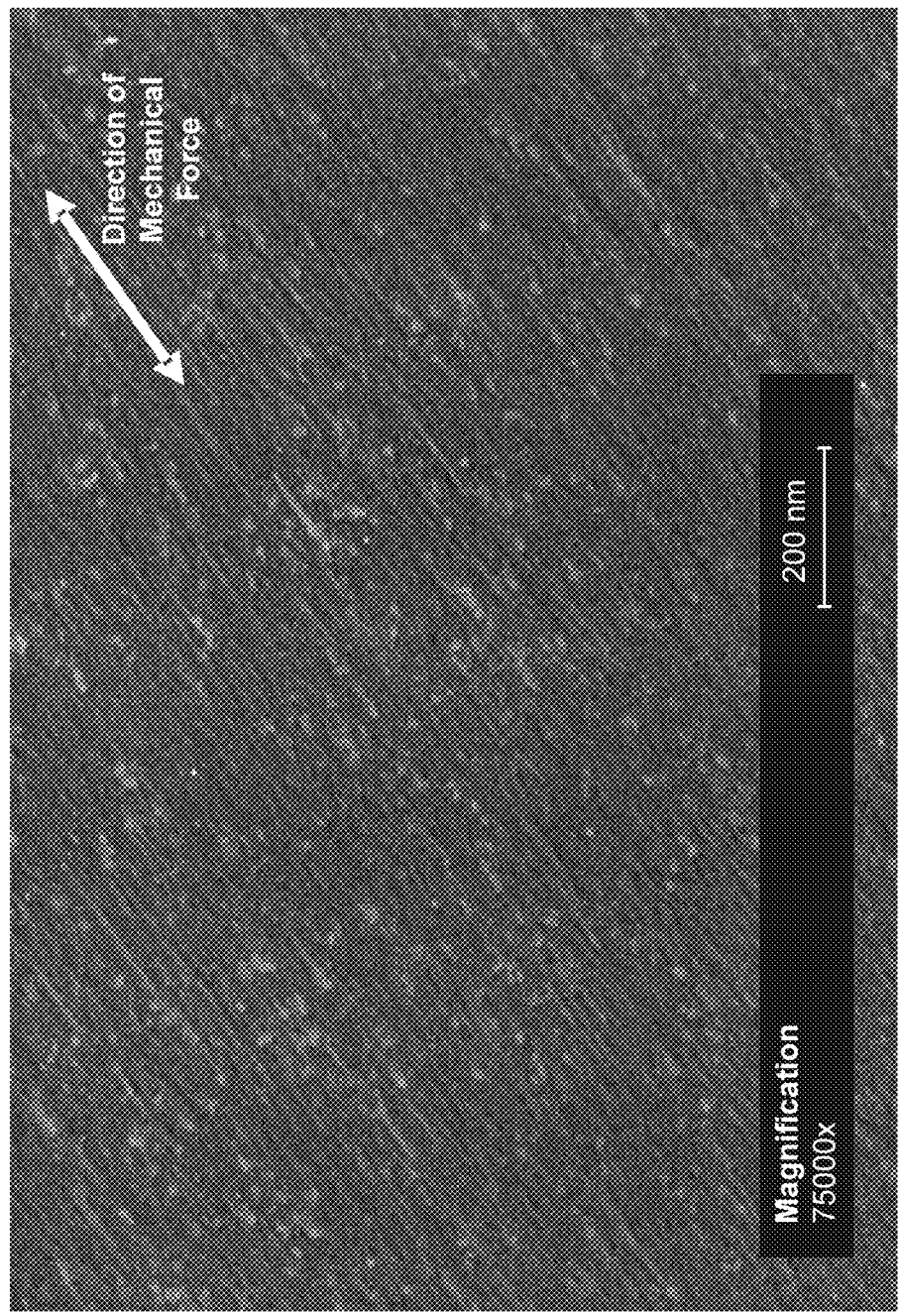
Figure 30D:
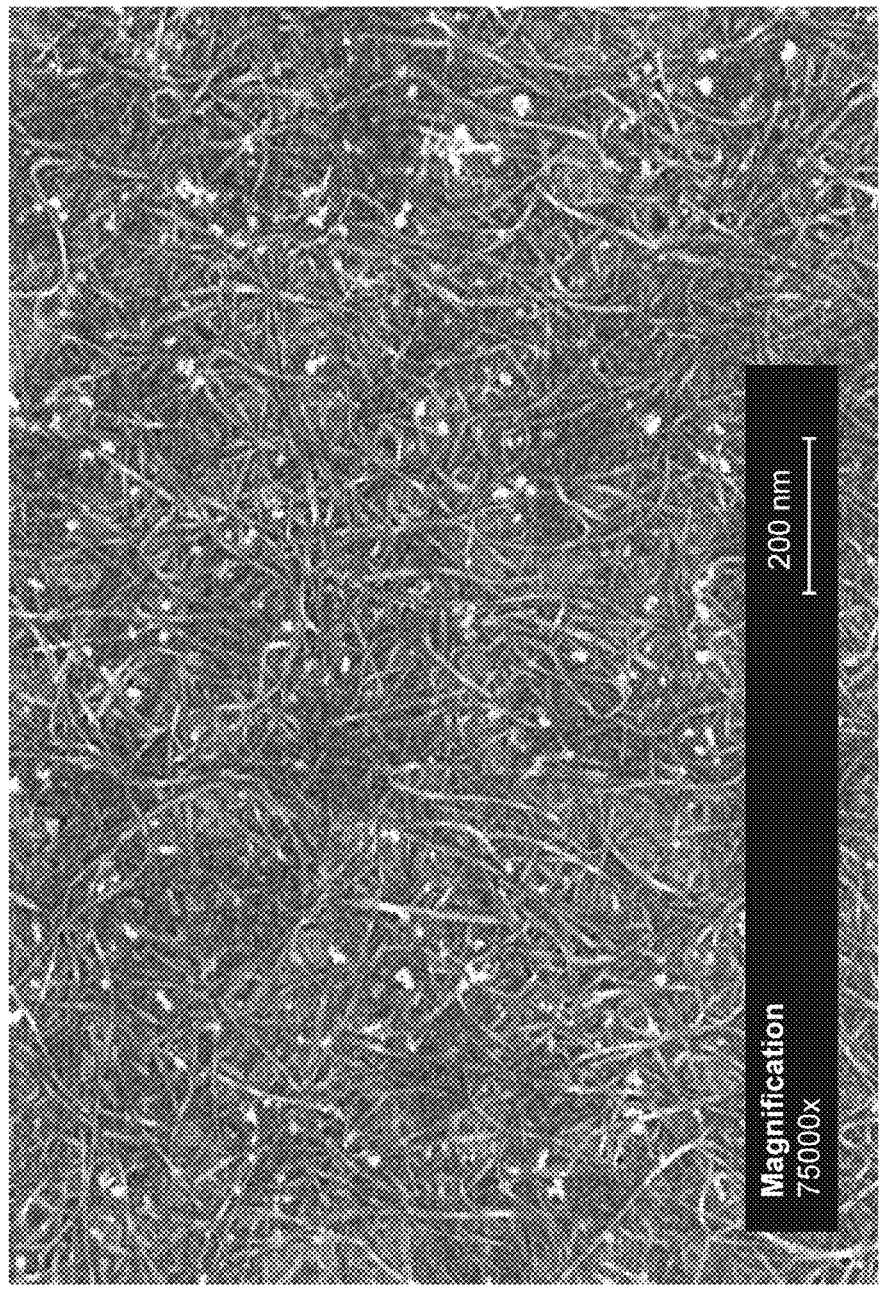

FIGS. 30A-30C are SEM images of an exemplary nanotube fabric layer at different magnifications (3001, 3002, and 3003 respectively) first formed via three spin coating operations of a purified nanotube application solution (as described above) and then rendered into an ordered network of nanotube elements through the application of piezoelectric generated rubbing force along the direction indicated within each SEM image. FIG. 30D is an SEM image 3004 of the formed nanotube fabric layer prior to the application of the piezoelectric generated rubbing force illustrating the substantially unordered state of the nanotube fabric layer prior to the application of the rubbing force. Once the nanotube fabric layer was formed on the silicon substrate, a protective plastic layer (Saran wrap, based upon polyvinylidene chloride) was positioned over the fabric layer. Then a y-poled piezoelectric crystal element was placed over the plastic layer such that the element covered substantially the entire nanotube fabric layer. A 1.25 pound weight was then place over the piezoelectric crystal element (using a layer of PTFE film to provide electrical isolation between the weight and the piezoelectric crystal) such as to maintain sufficient pressure between the crystal element and the nanotube fabric layer. The piezoelectric crystal element was then driven by a piezo amplifier at 11 kHz, 10 V (peak to peak) for 2.5 hours. The direction indicated in SEM images 2901, 2902, and 2903 is representative of the axis of vibration of the piezoelectric crystal element. As is evident in FIG. 30C (the 75,000× magnification image), the resulting nanotube fabric layer was rendered into an ordered state oriented along the direction of vibration.

Example 12

Figure 31A:
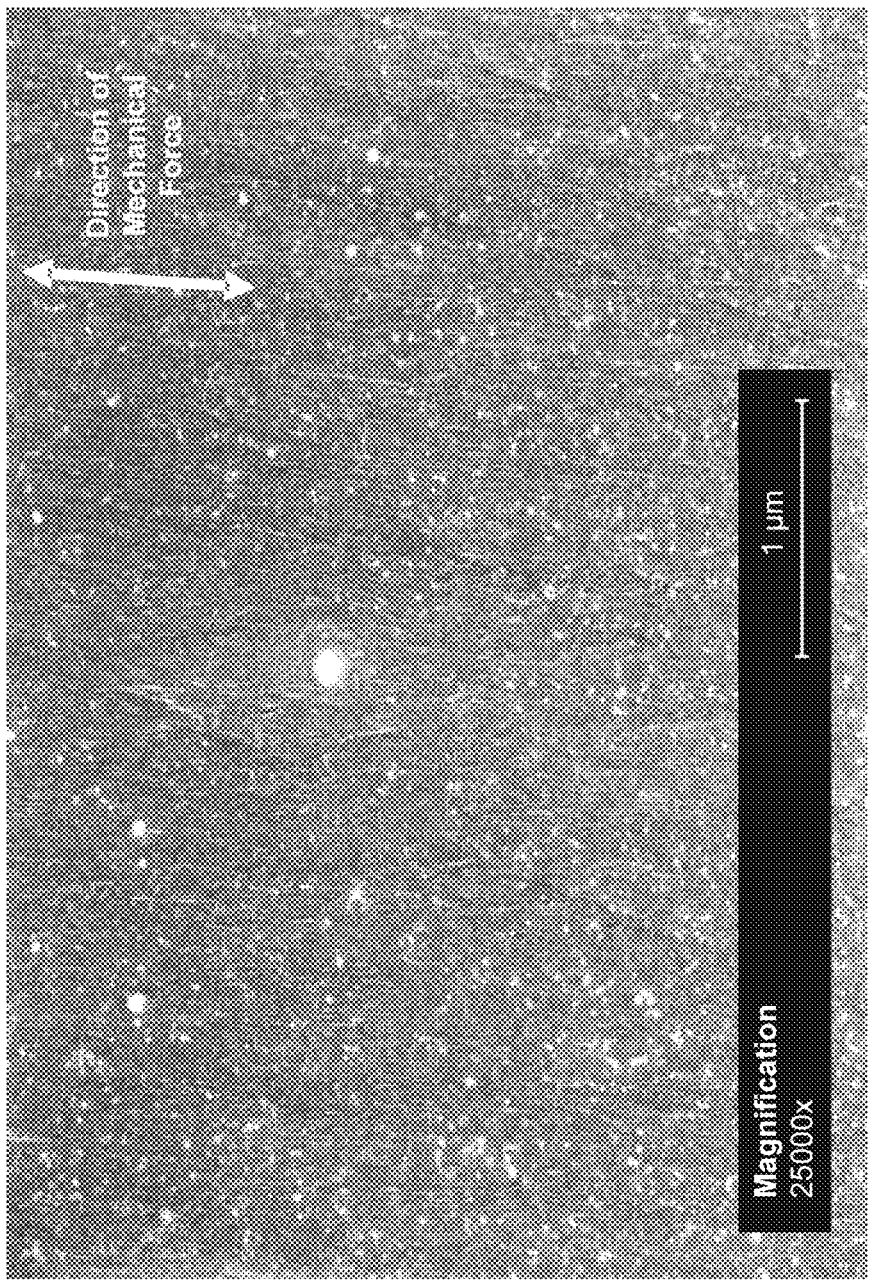
FIGS. 31A-31C are SEM images (at different magnifications) detailing the rendering of an exemplary nanotube fabric layer deposited over a polyethylene terephthalate (PET) substrate into an ordered state via a rubbing operation.
Figure 31B:
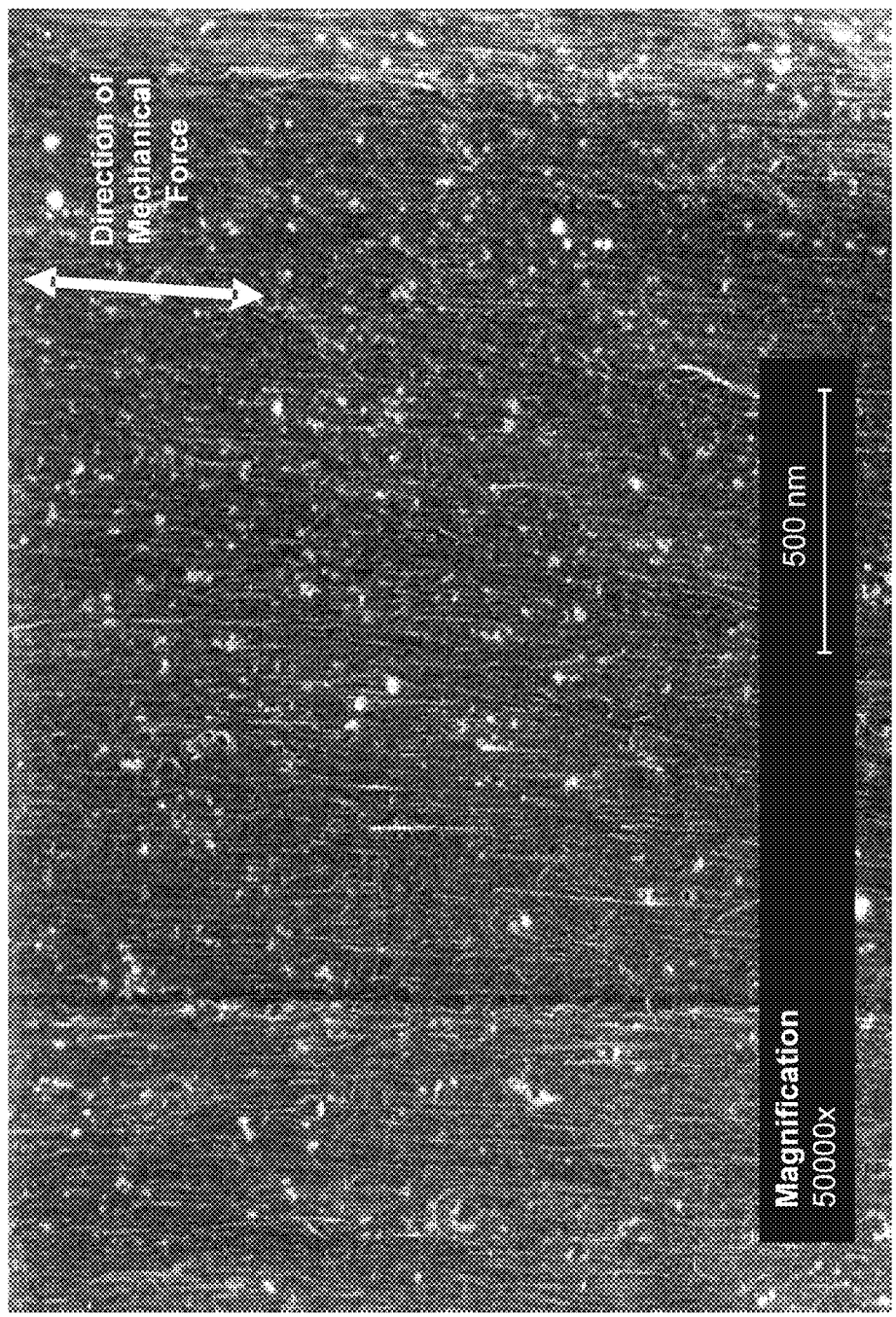
Figure 31C:
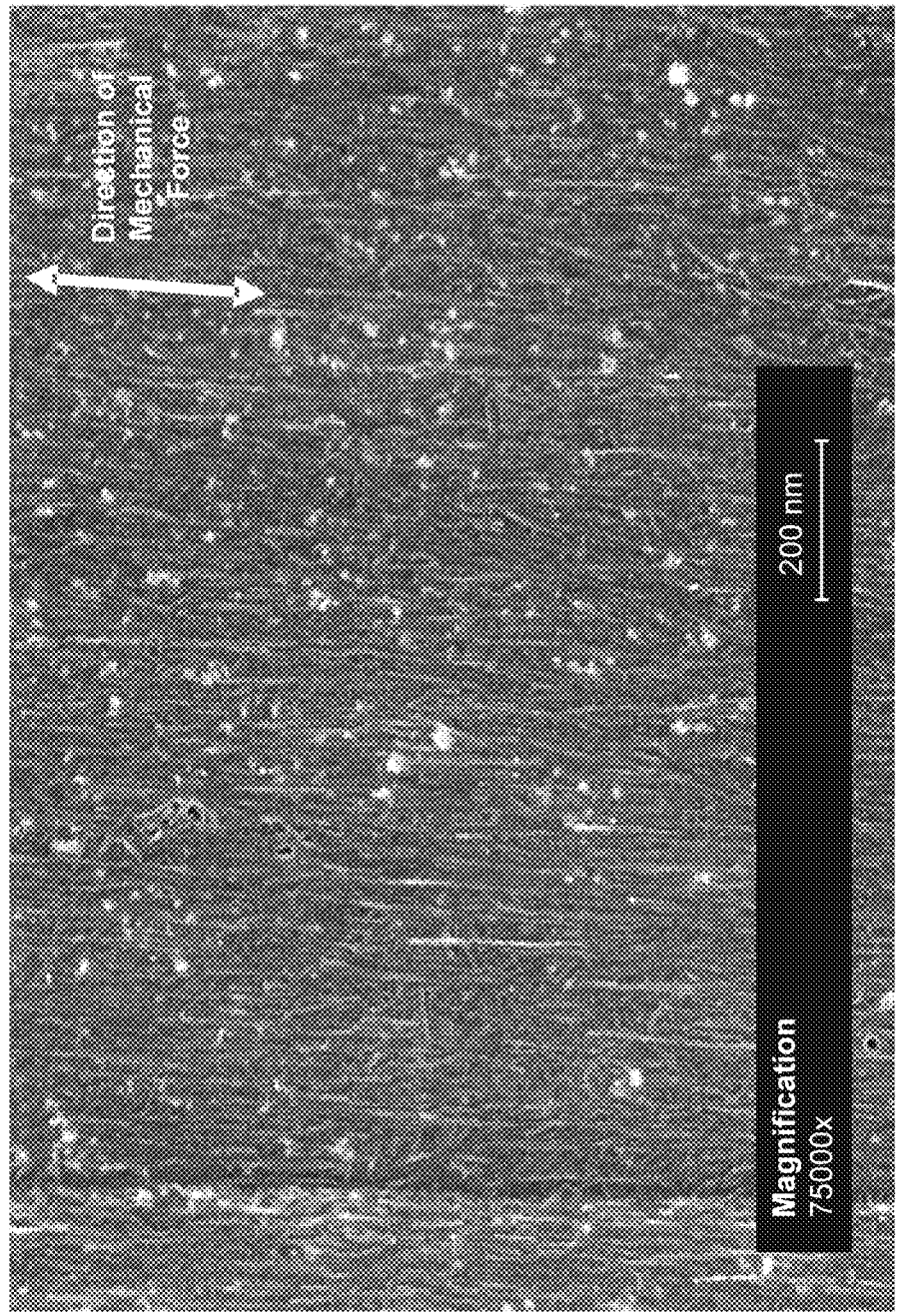

FIGS. 31A-31C are SEM images at different magnifications (3101, 3102, and 3103 respectively) of an exemplary nanotube fabric layer formed over a polyethylene terephthalate (PET) substrate and rendered into an ordered network of nanotube elements through the application of a directional rubbing force along the direction indicated within each SEM image. The rubbing force was applied by placing the wafer face down on a rayon polishing pad (that is, placing the wafer such that the nanotube fabric layer was positioned in direct physical contact with the rayon polishing pad) and sliding the wafer approximately six to eight inches along the surface of the pad fifty times. The rayon polishing pad used within this example was a South Bay Technology, Inc. p/PRF12A-10 "rayon-fine polishing cloth." As is evident in FIG. 31C (the 75,000× magnification image), the resulting nanotube fabric layer was rendered into an ordered state oriented along the direction of the applied rubbing force.

Example 13

Figure 32A:
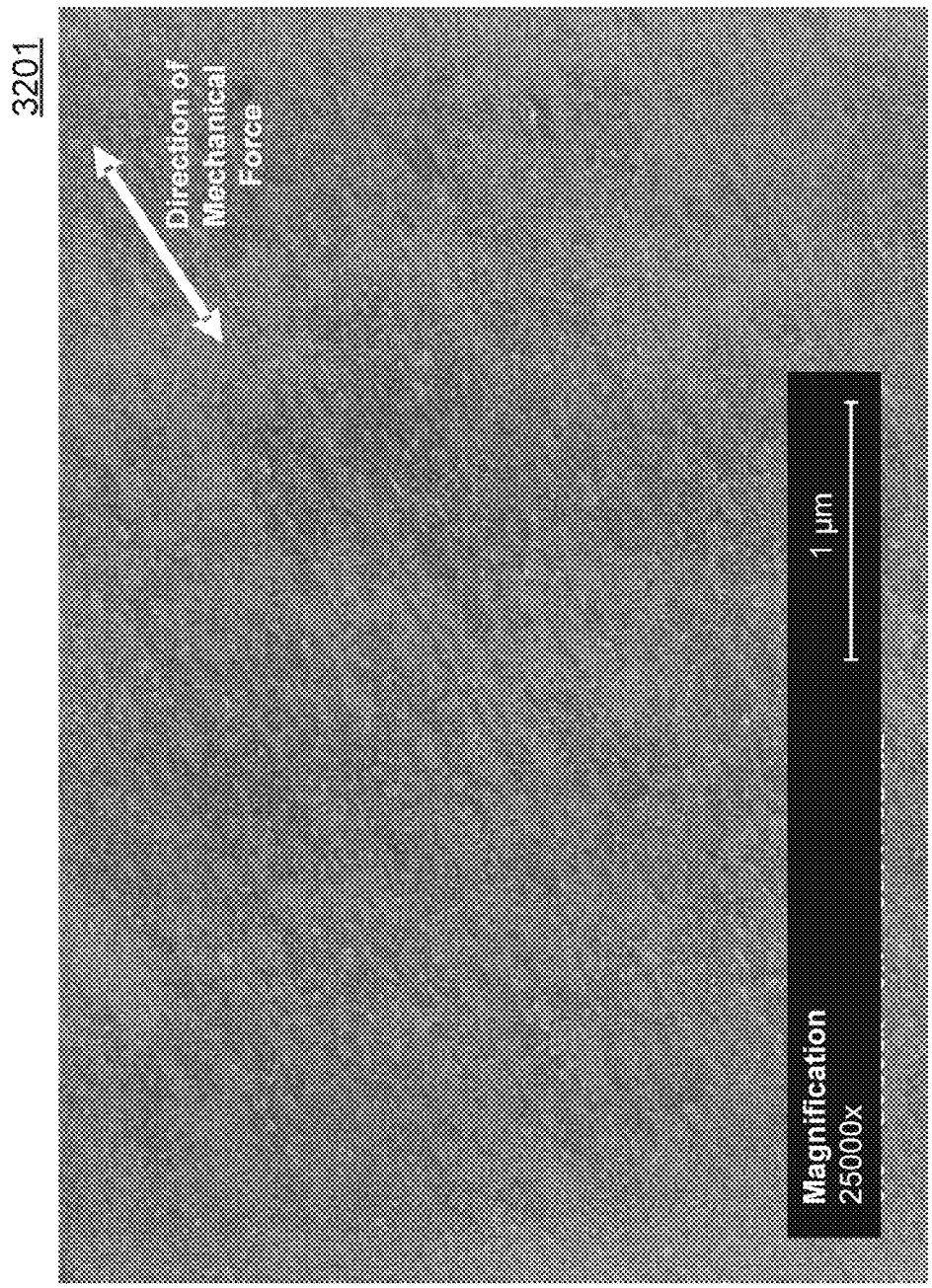
FIGS. 32A-32D are SEM images (at different magnifications) detailing the rendering of an exemplary nanotube fabric layer into an ordered state via a high pressure air flow polishing operation.
Figure 32B:
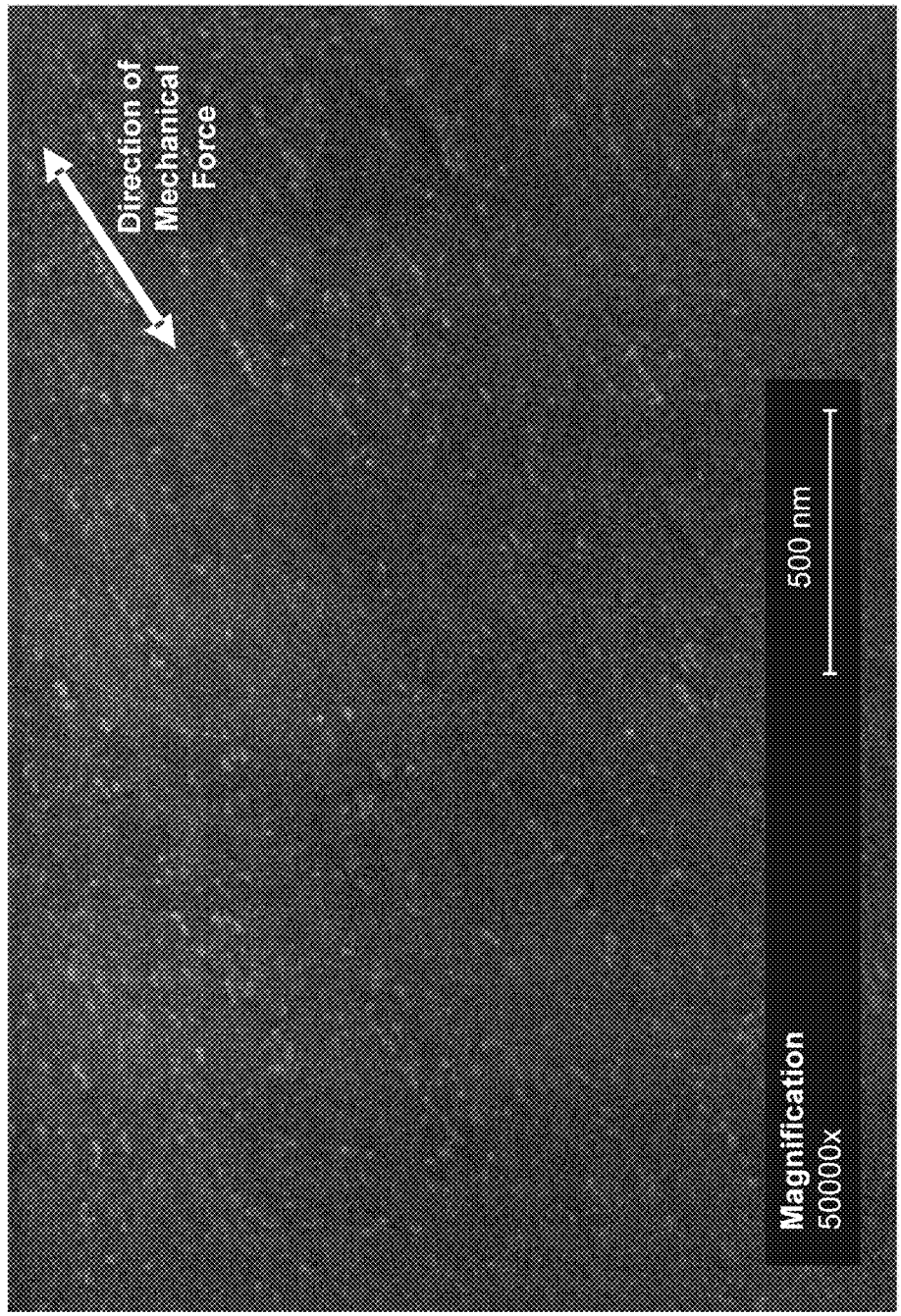
Figure 32C:
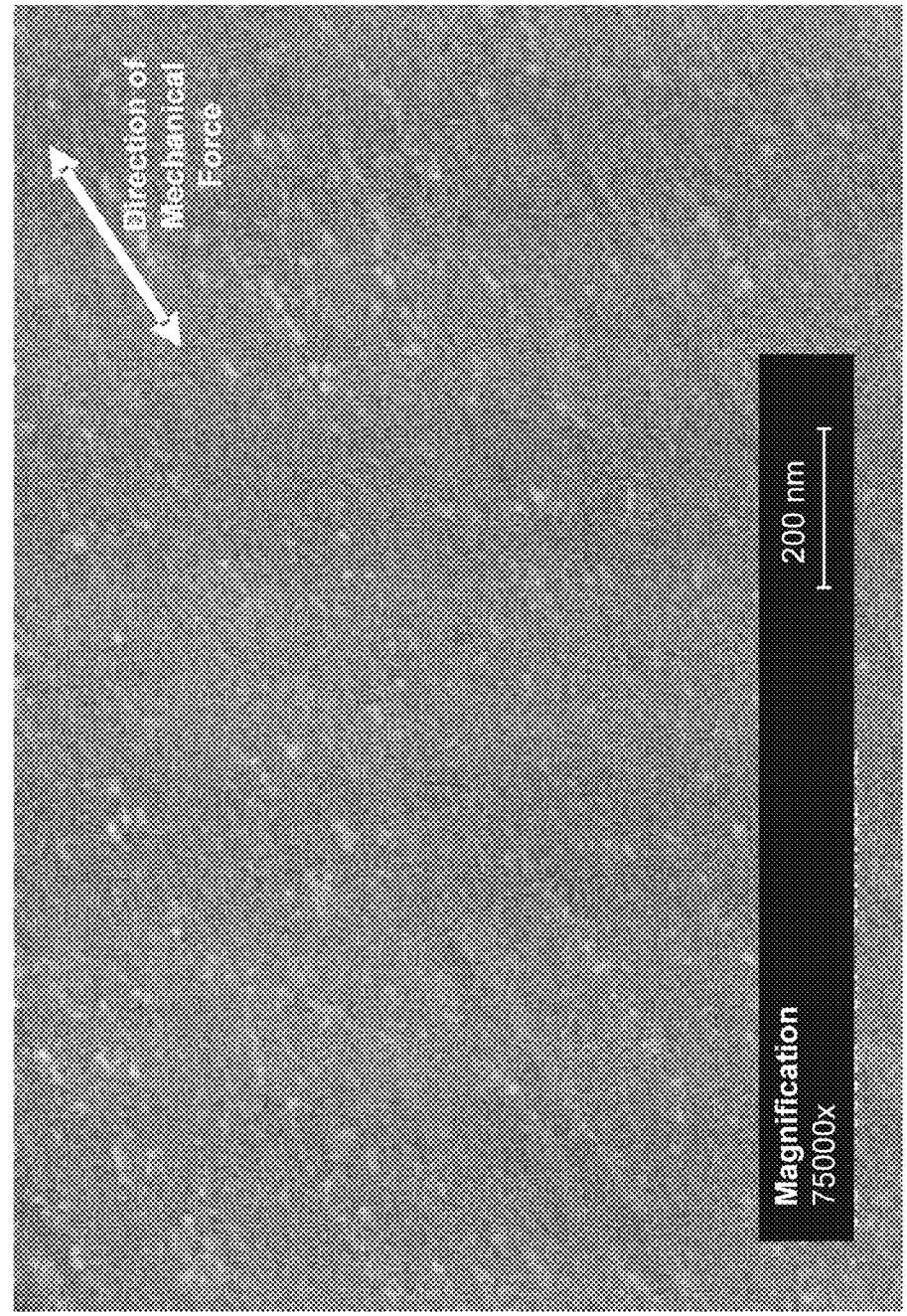
Figure 32D:
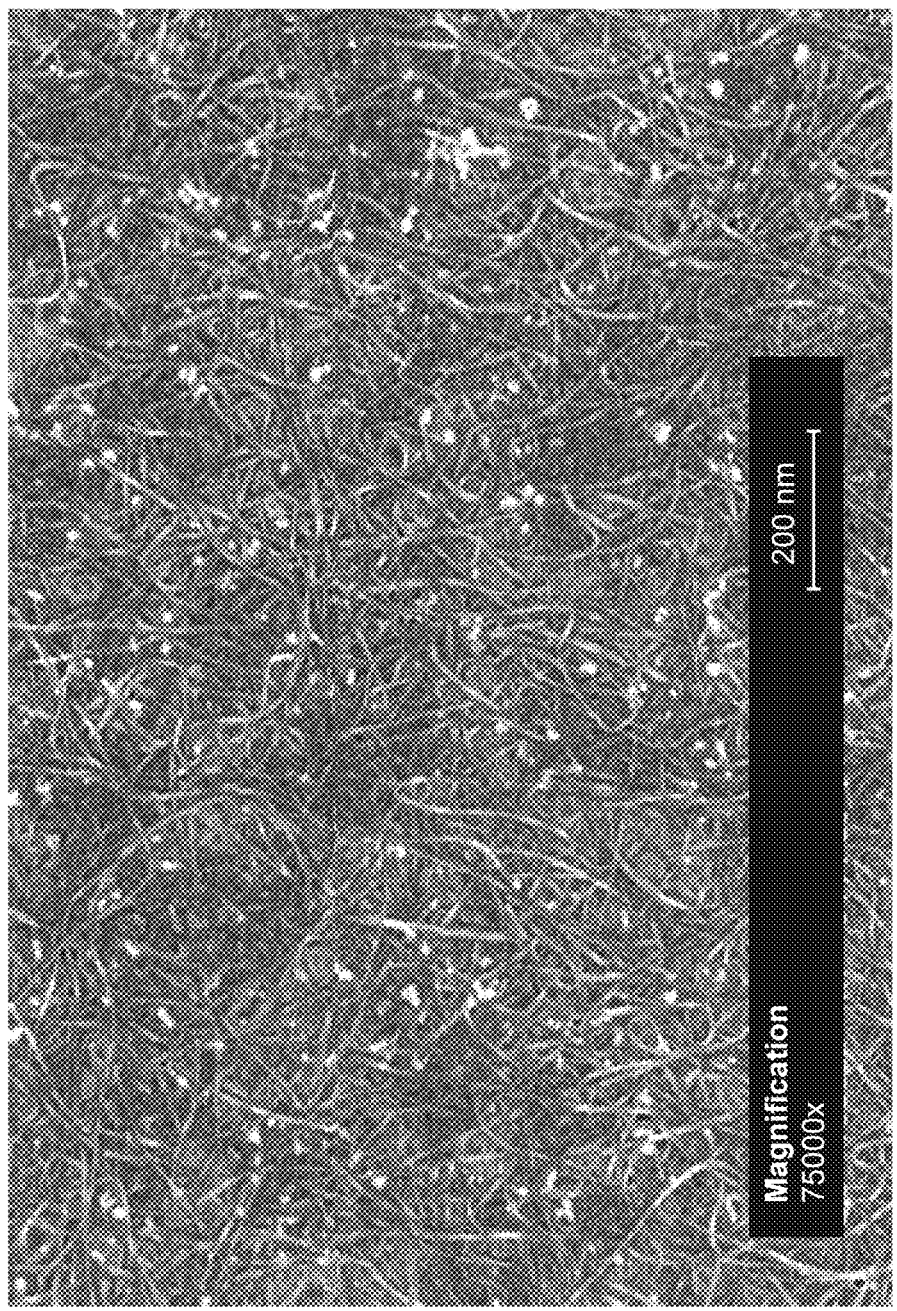

FIGS. 32A-32C are SEM images of an exemplary nanotube fabric layer at different magnifications (3201, 3202, and 3203 respectively) first formed via three spin coating operations of a purified nanotube application solution (as described above) and then rendered into an ordered network of nanotube elements through the application of high pressure air flow polishing operation along the direction indicated within each SEM image. FIG. 32D is an SEM image 3204 of the formed nanotube fabric layer prior to the application of the high pressure air flow polishing operation illustrating the substantially unordered state of the nanotube fabric layer prior to the application of the polishing force. Once the nanotube fabric layer was formed on the silicon substrate, a protective plastic layer (Saran wrap, based upon polyvinylidene chloride) was positioned over the fabric layer. Then an air gun (a commercial precision safety air gun available from Exair, model number 1410SS fitted with a "nano supper air" nozzle, model number 1110SS) was used to flow nitrogen gas (N2) at 100 psi over the nanotube fabric layer for twelve sweeps. Each sweep included moving the air gun across the wafer surface (protected by the plastic layer) in a "zig zag" pattern for approximately ten seconds. As is evident in FIG. 32C (the 75,000× magnification image), the resulting nanotube fabric layer was rendered into an ordered state oriented along the direction of the air flow.

Example 14

Figure 33A:
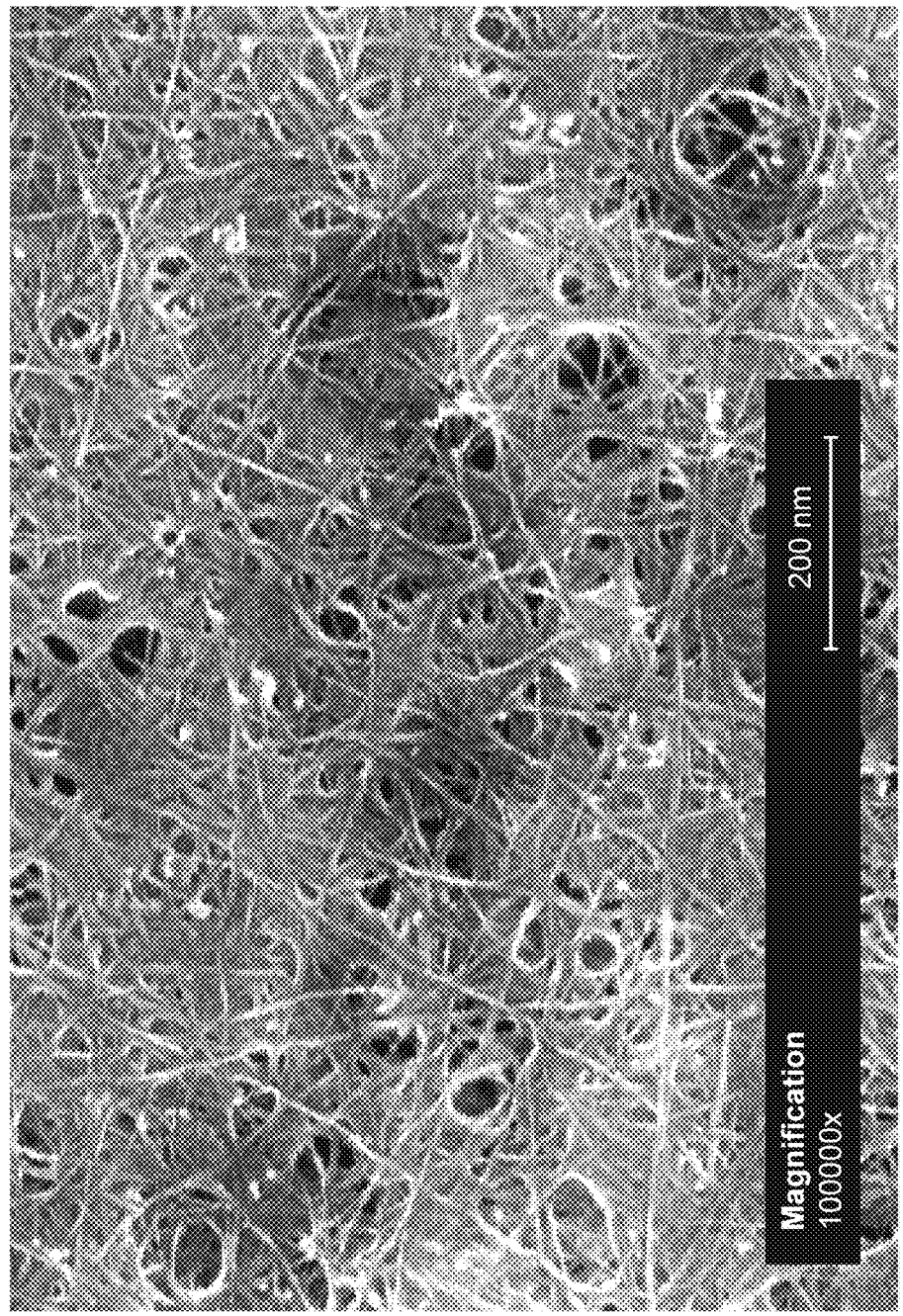
FIGS. 33A-33B are SEM images detailing the rendering of an exemplary nanotube fabric layer deposited over a 2024 aluminum alloy substrate into an ordered state via a rubbing operation.
Figure 33B:
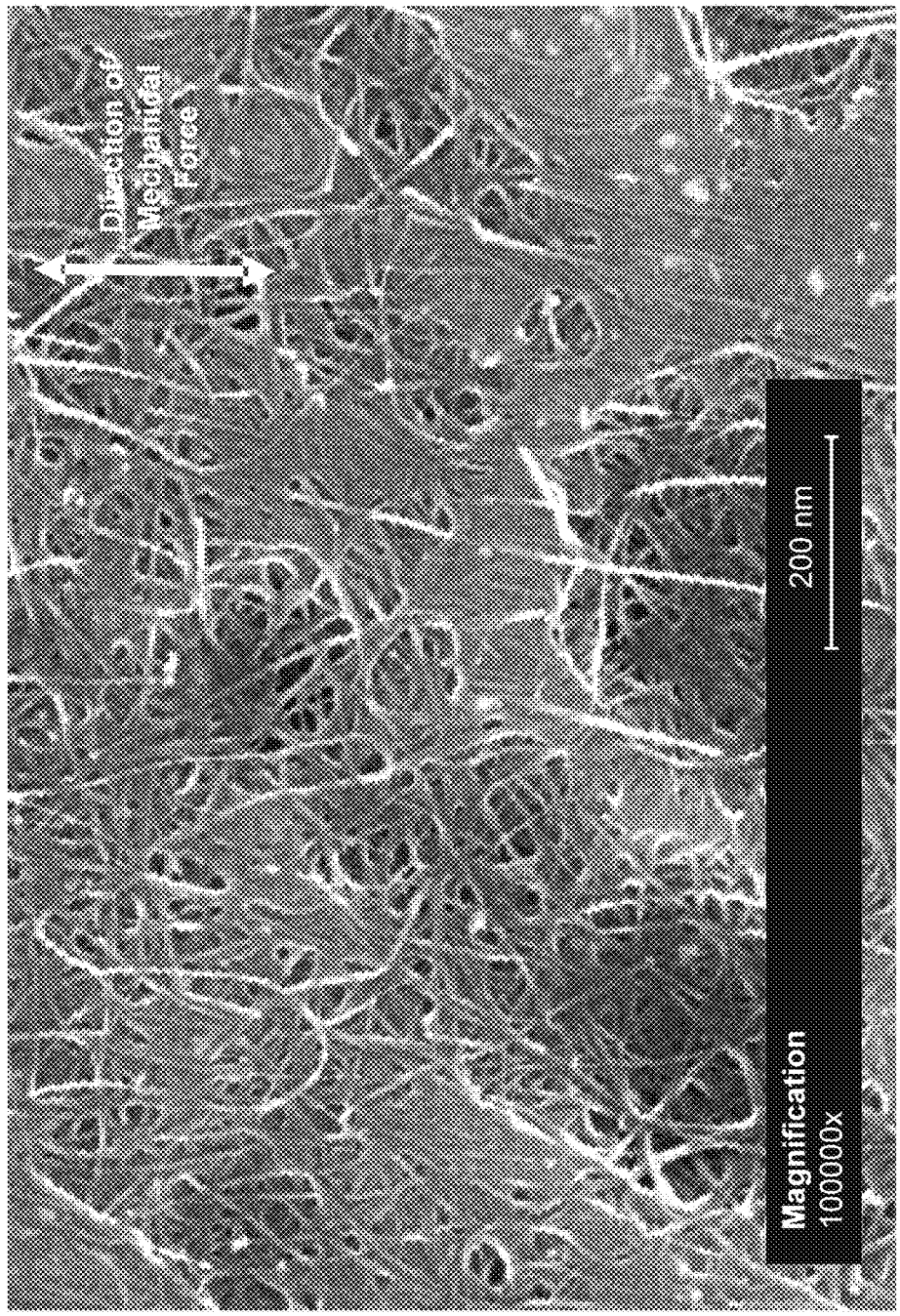

FIGS. 33A-33B are SEM images depicting the ordering of an exemplary nanotube fabric layer formed over a 2024 aluminum alloy substrate. FIG. 33A is an SEM image 3301 of an exemplary nanotube fabric layer (in a substantially unordered state) formed via three spin coating operations of a purified nanotube application solution (as described above). FIG. 33B is an SEM image 3302 of the exemplary nanotube fabric layer after being rendered into an ordered network of nanotube elements through the application of a directional rubbing force along the direction indicated within SEM image 3302. The rubbing force was applied by placing the wafer face down on a rayon polishing pad (that is, placing the wafer such that the nanotube fabric layer was positioned in direct physical contact with the rayon polishing pad) and sliding the wafer approximately six to eight inches along the surface of the pad fifty times. The rayon polishing pad used within this example was a South Bay Technology, Inc. p/PRF12A-10 "rayon-fine polishing cloth." As is evident in FIG. 33B, the resulting nanotube fabric layer was rendered into an ordered state oriented along the direction of the applied rubbing force.

It should be noted that the surface of the 2024 aluminum alloy substrate shows large pores in the aluminum oxide surface coating where the nanotube elements within the nanotube fabric layer are recessed from the surface. The nanotube elements within these pore regions show little evidence of alignment whereas the nanotube elements on the surface (that is, those nanotube elements not within the pores) of the denser aluminum oxide surface shows a very high degree of alignment. This suggests that contact with the fabric was an important aspect in aligning this sample.

Example 15

Figure 34A:
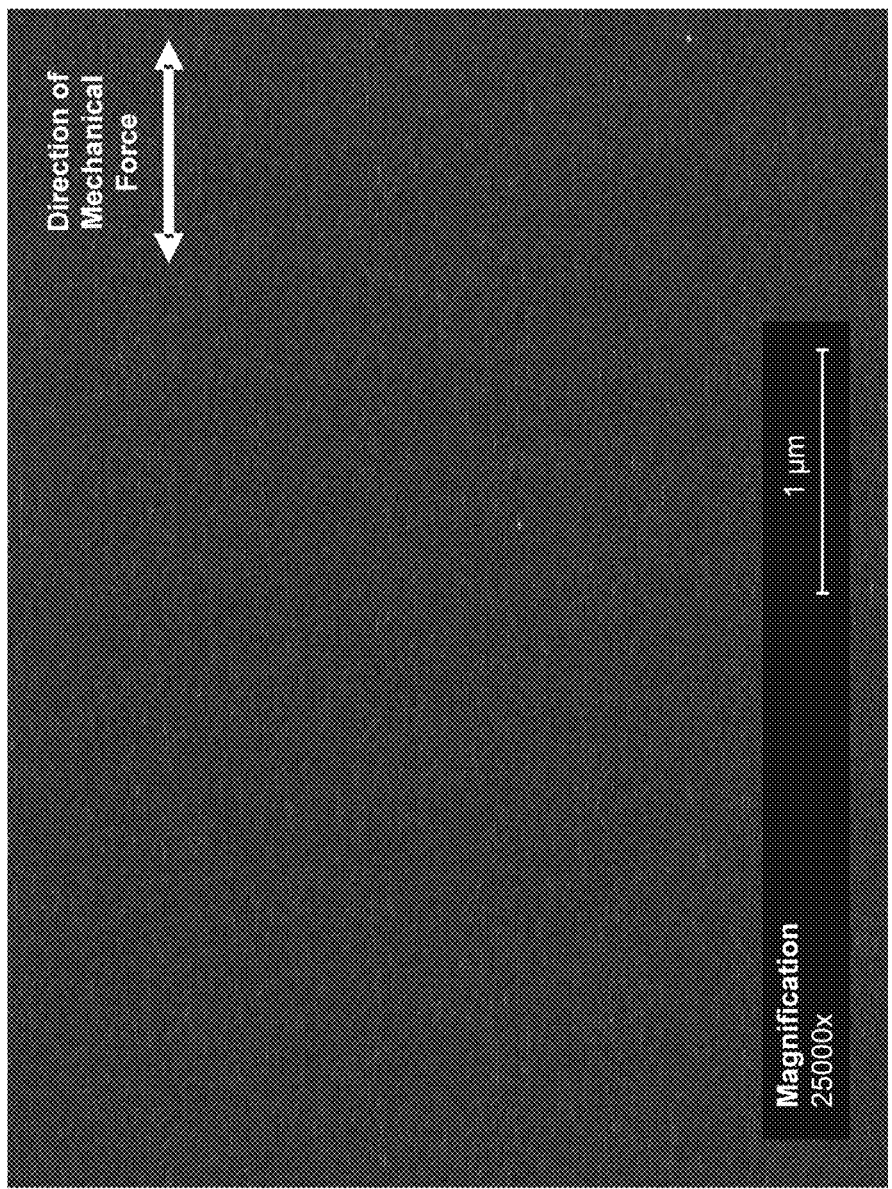
FIGS. 34A-34C are SEM images detailing the rendering of an exemplary nanotube fabric layer deposited over a titanium nitride (TiN) substrate into an ordered state via a rubbing operation performed using a chemical mechanical polishing (CMP) machine.
Figure 34B:
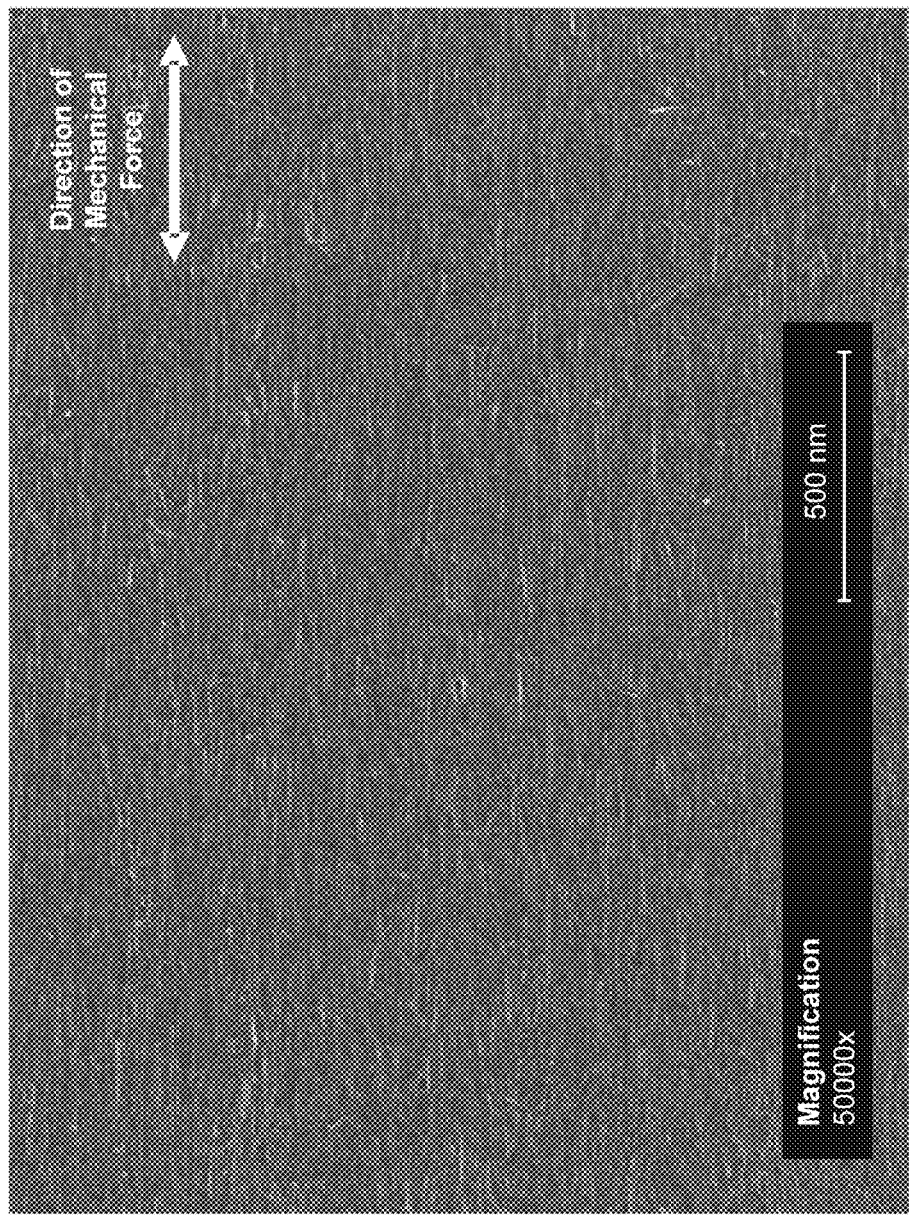
Figure 34C:
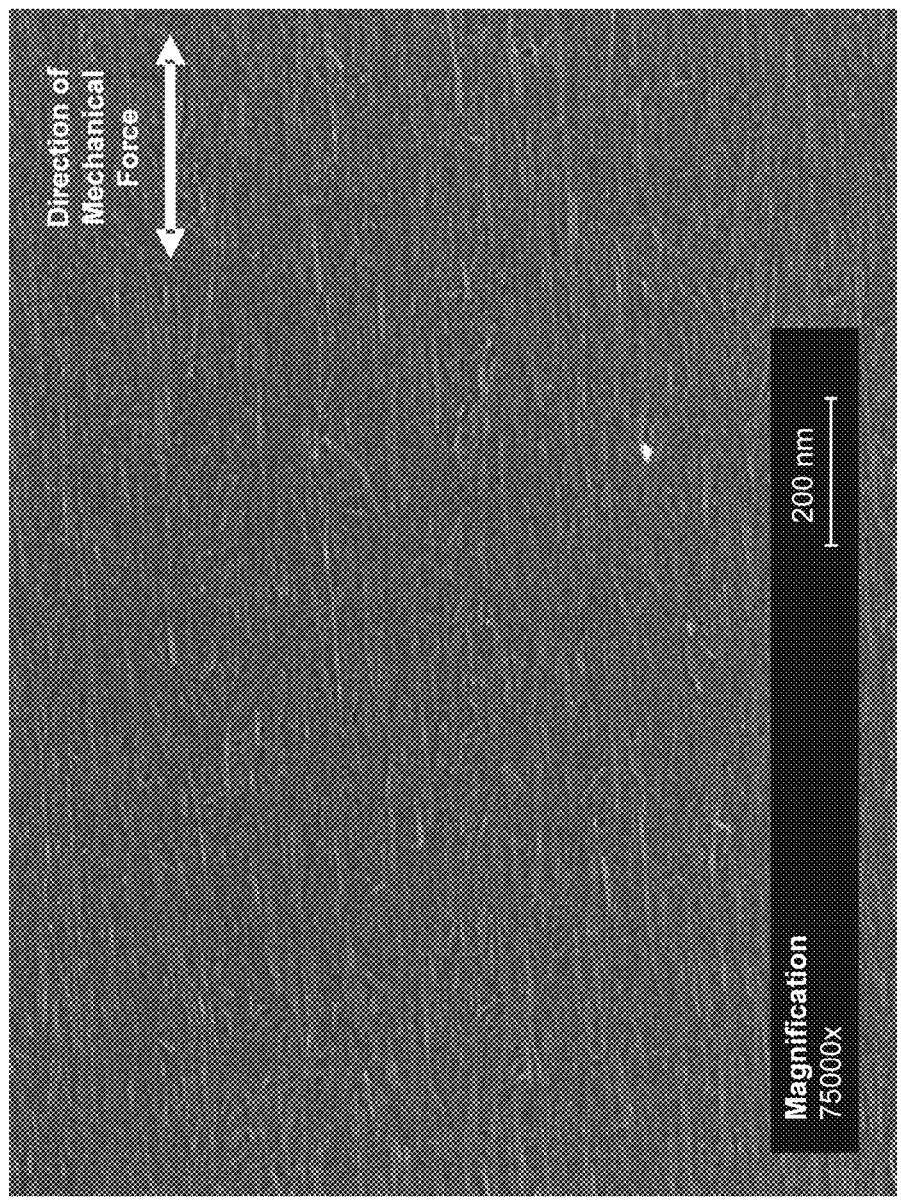

FIGS. 34A-34C are SEM images of an exemplary nanotube fabric layer at different magnifications (3401, 3402, and 3403 respectively) first formed via five spin coating operations of a purified nanotube application solution (as described above) and then rendered into an ordered network of nanotube elements through the application of a directional rubbing force along the direction indicated within each SEM image. The rubbing force was applied by placing the wafer facedown on a 20" ROHM HAAS SPM3100 CMP pad (such that the nanotube fabric layer was in direct contact with the cmp pad surface). Prior to the start of the rubbing operation, the wafer—loaded into the head of a CMP machine—was sprayed with deionized water to provide a lubricating medium at the interface between the nanotube fabric layer on the wafer surface and the CMP pad. The CMP head passed the wafer back and forth over the CMP pad in a maximum stroke length of 1.6 inches at a rate of ten strokes/minute for five minutes. The CMP pad was not rotated as the wafer was rubbed across its surface. As is evident in FIG. 34C (the 75,000× magnification image), the nanotube fabric layer was rendered into an ordered state oriented along the direction of the applied rubbing force.

Example 16

Figure 35:
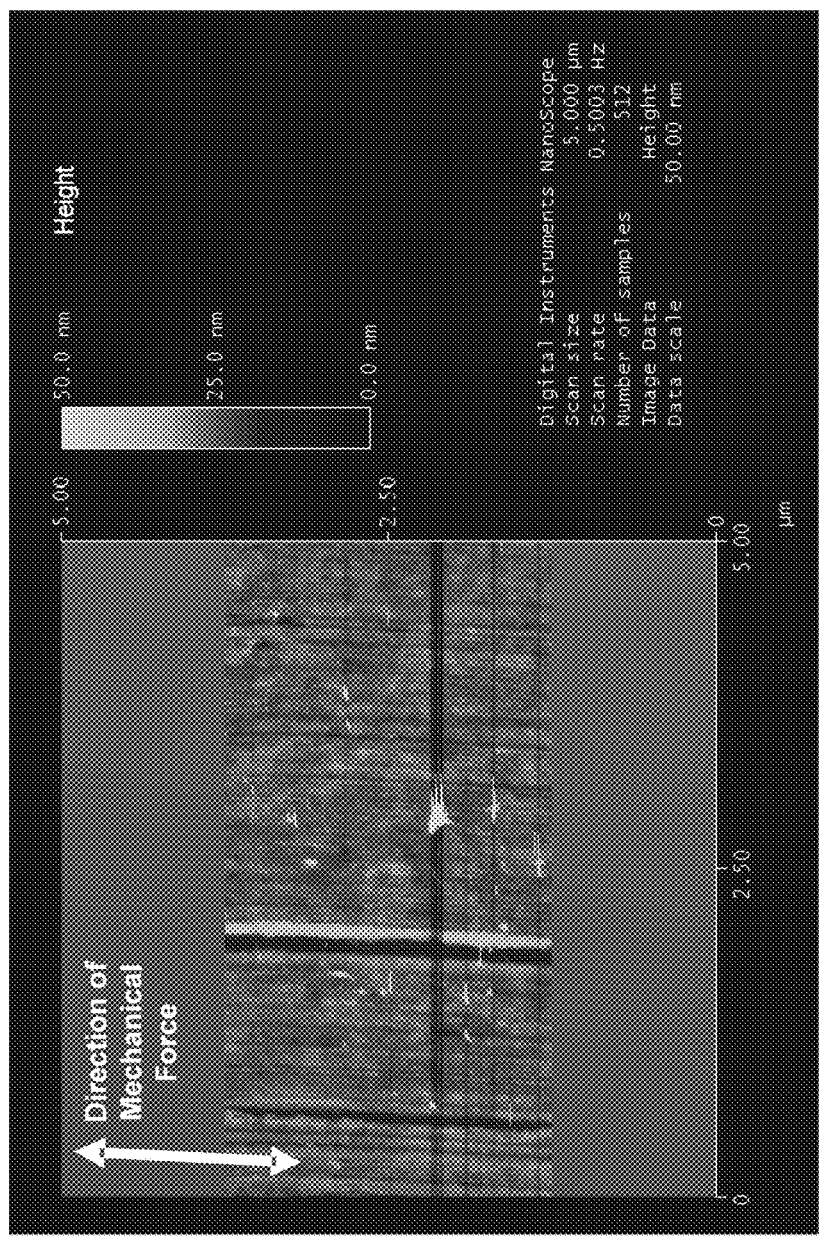
FIG. 35 is an AFM image detailing the rendering of an exemplary nanotube fabric layer into an ordered state via the use of an electronically controlled linear actuator to provide a rubbing force with a stroke length of 1 mm.

FIG. 35 is an AFM image 3501 of an exemplary nanotube fabric layer first formed via three spin coating operations of a purified nanotube application solution (as described above) and then rendered into an ordered network of nanotube elements through the application of a rubbing force via an electronically controlled linear actuator. Within the present example, a Newton linear actuator (model no. CMA 12CCCL) was driven with a Newport universal motion controller driver (model no. ESP 300) to translate a silicon wafer back and forth over the surface of the exemplary nanotube fabric layer. Both the actuator and the motion controller driver are available from Newport Corporation of Irvine, Calif., and the use of such equipment is well known to those skilled in the art. The silicon wafer was translated a distance of 1 mm with each stroke for a total of one hundred iterations. The assembly also provided a downward force (that is a force pressing the silicon rubbing surface against the nanotube fabric layer) of 38 g. As is evident in FIG. 35, the nanotube fabric layer was rendered into an ordered state oriented along the direction of the applied rubbing force.

Example 17

Figure 36:
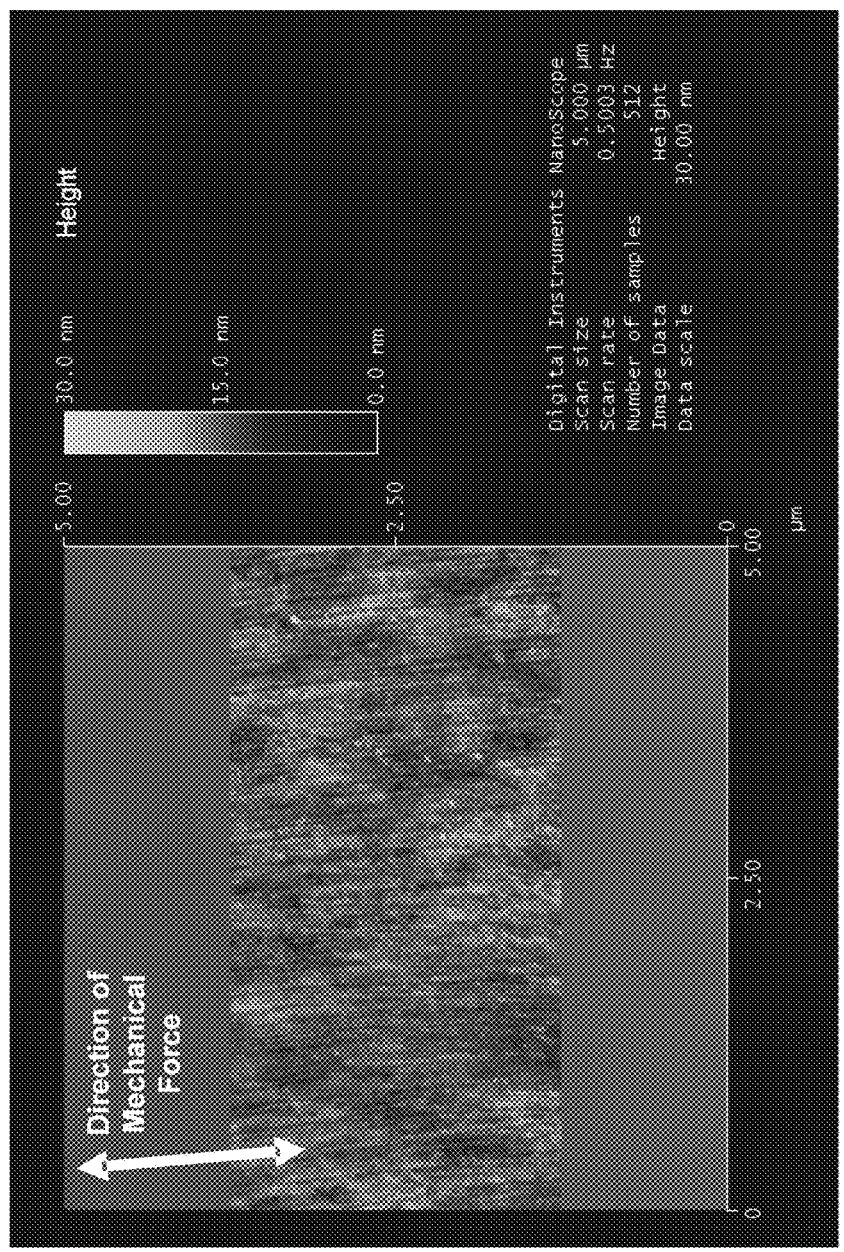
FIG. 36 is an AFM image detailing the rendering of an exemplary nanotube fabric layer into an ordered state via the use of an electronically controlled linear actuator to provide a rubbing force with a stroke length of 0.1 mm.

FIG. 36 is an AFM image 3601 of an exemplary nanotube fabric layer first formed via three spin coating operations of a purified nanotube application solution (as described above) and then rendered into an ordered network of nanotube elements through the application of a rubbing force via an electronically controlled linear actuator. Within the present example, a Newton linear actuator (model no. CMA 12CCCL) was driven with a Newport universal motion controller driver (model no. ESP 300) to translate a silicon wafer back and forth over the surface of the exemplary nanotube fabric layer. Both the actuator and the motion controller driver are available from Newport Corporation of Irvine, Calif., and the use of such equipment is well known to those skilled in the art. The silicon wafer was translated a distance of 0.1 mm with each stroke for a total of one thousand iterations. The assembly also provided a downward force (that is a force pressing the silicon rubbing surface against the nanotube fabric layer) of 42 g. As is evident in FIG. 36, the nanotube fabric layer was rendered into an ordered state oriented along the direction of the applied rubbing force.

Example 18

Figure 37:
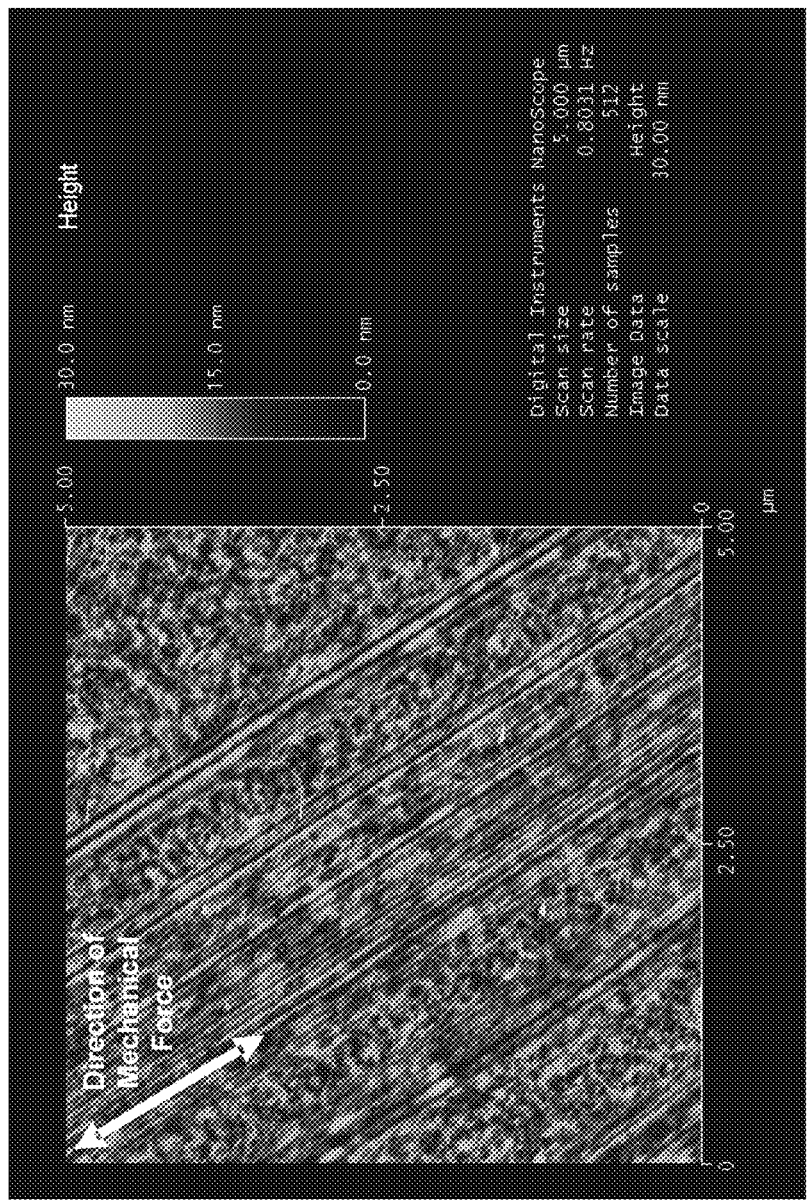
FIG. 37 is an AFM image detailing the rendering of an exemplary nanotube fabric layer into an ordered state via the use of an electronically controlled linear actuator to provide a rubbing force with a stroke length of 0.05 mm.

FIG. 37 is an AFM image 3701 of an exemplary nanotube fabric layer first formed via three spin coating operations of a purified nanotube application solution (as described above) and then rendered into an ordered network of nanotube elements through the application of a rubbing force via an electronically controlled linear actuator. Within the present example, a Newton linear actuator (model no. CMA 12CCCL) was driven with a Newport universal motion controller driver (model no. ESP 300) to translate a silicon wafer back and forth over the surface of the exemplary nanotube fabric layer. Both the actuator and the motion controller driver are available from Newport Corporation of Irvine, Calif., and the use of such equipment is well known to those skilled in the art. The silicon wafer was translated a distance of 0.05 mm with each stroke for a total of one thousand iterations. The assembly also provided a downward force (that is a force pressing the silicon rubbing surface against the nanotube fabric layer) of 80 g. As is evident in FIG. 37, the nanotube fabric layer was rendered into an ordered state oriented along the direction of the applied rubbing force.

Example 19

Figure 38:
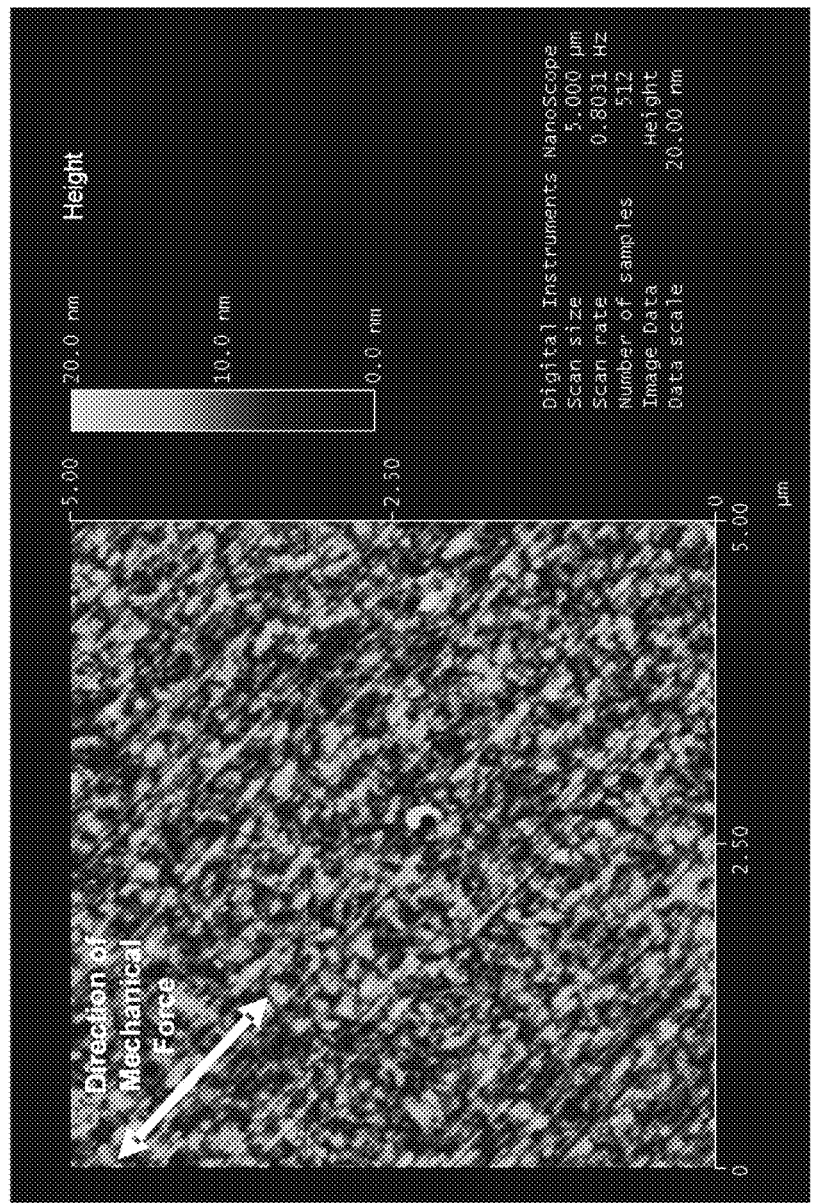
FIG. 38 is an AFM image detailing the rendering of an exemplary nanotube fabric layer into an ordered state via the use of an electronically controlled linear actuator to provide a rubbing force with a stroke length of 0.01 mm.

FIG. 38 is an AFM image 3801 of an exemplary nanotube fabric layer first formed via three spin coating operations of a purified nanotube application solution (as described above) and then rendered into an ordered network of nanotube elements through the application of a rubbing force via an electronically controlled linear actuator. Within the present example, a Newton linear actuator (model no. CMA 12CCCL) was driven with a Newport universal motion controller driver (model no. ESP 300) to translate a silicon wafer back and forth over the surface of the exemplary nanotube fabric layer. Both the actuator and the motion controller driver are available from Newport Corporation of Irvine, Calif., and the use of such equipment is well known to those skilled in the art. The silicon wafer was translated a distance of 0.01 mm with each stroke for a total of one thousand iterations. The assembly also provided a downward force (that is a force pressing the silicon rubbing surface against the nanotube fabric layer) of 28 g. As is evident in FIG. 38, the nanotube fabric layer was rendered into an ordered state oriented along the direction of the applied rubbing force.

Example 20

Figure 39A:
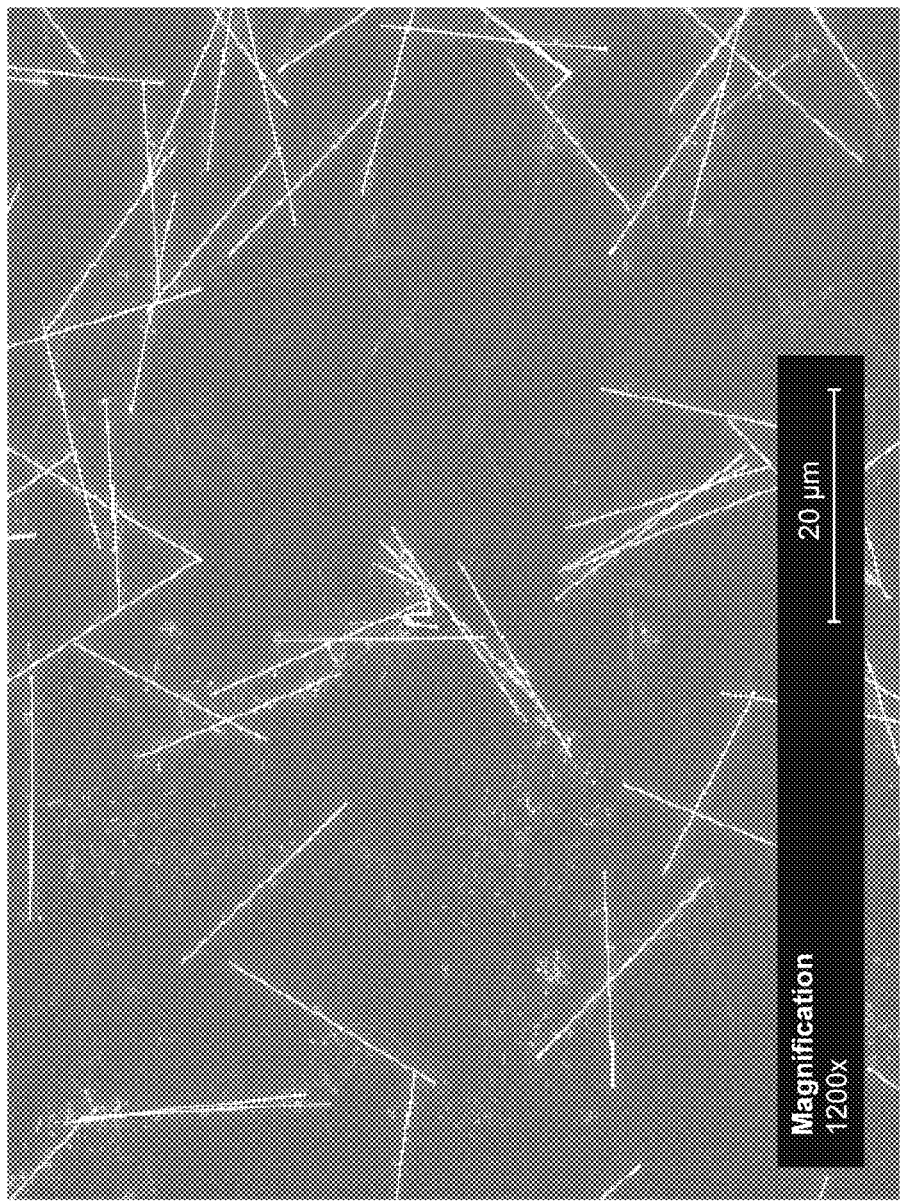
FIGS. 39A-39D are SEM images detailing the rendering of an exemplary nanotube fabric layer coated with a layer of silicon nanowires into an ordered state via the use of a rayon rubbing pad.
Figure 39B:
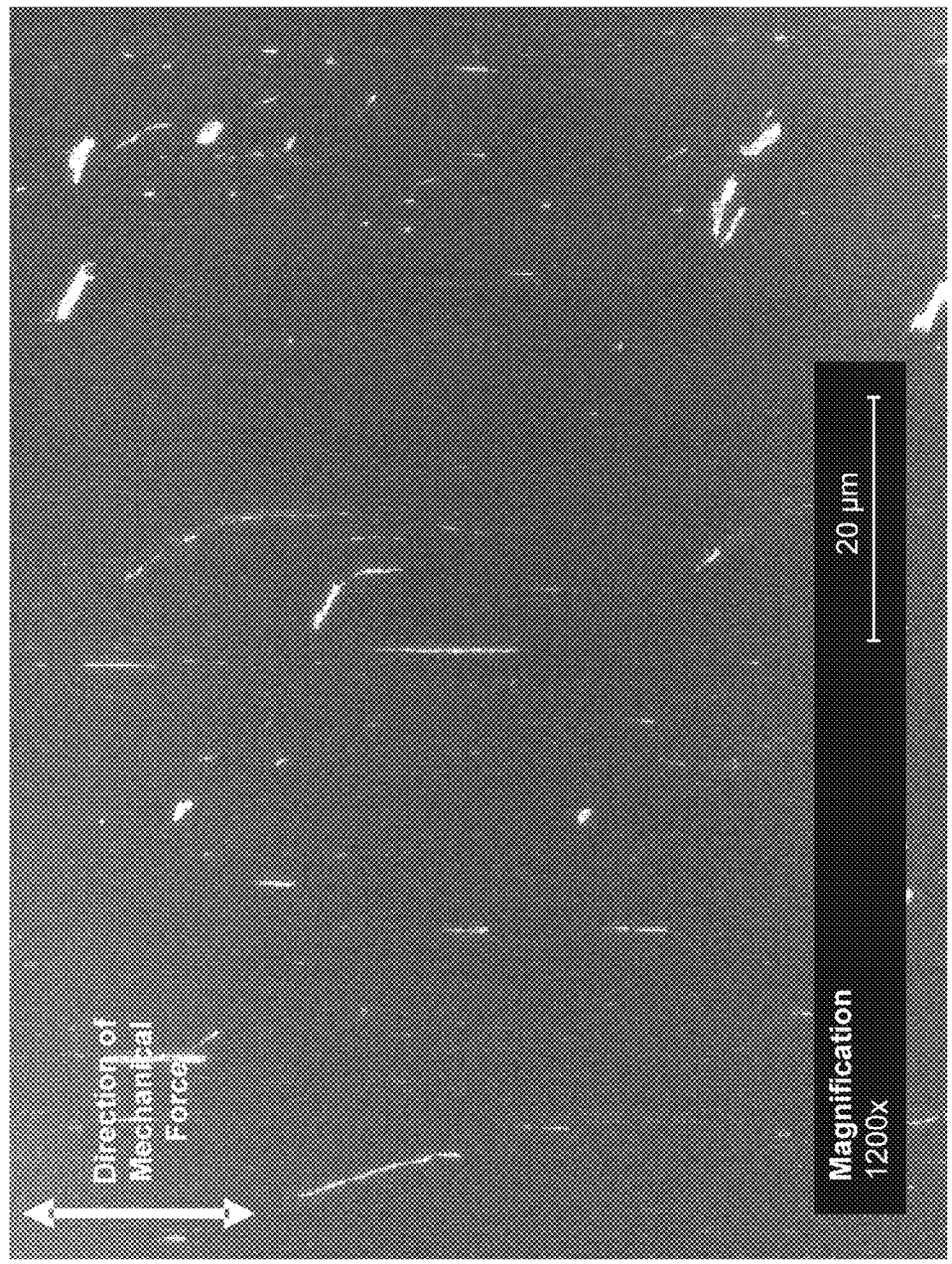
Figure 39C:
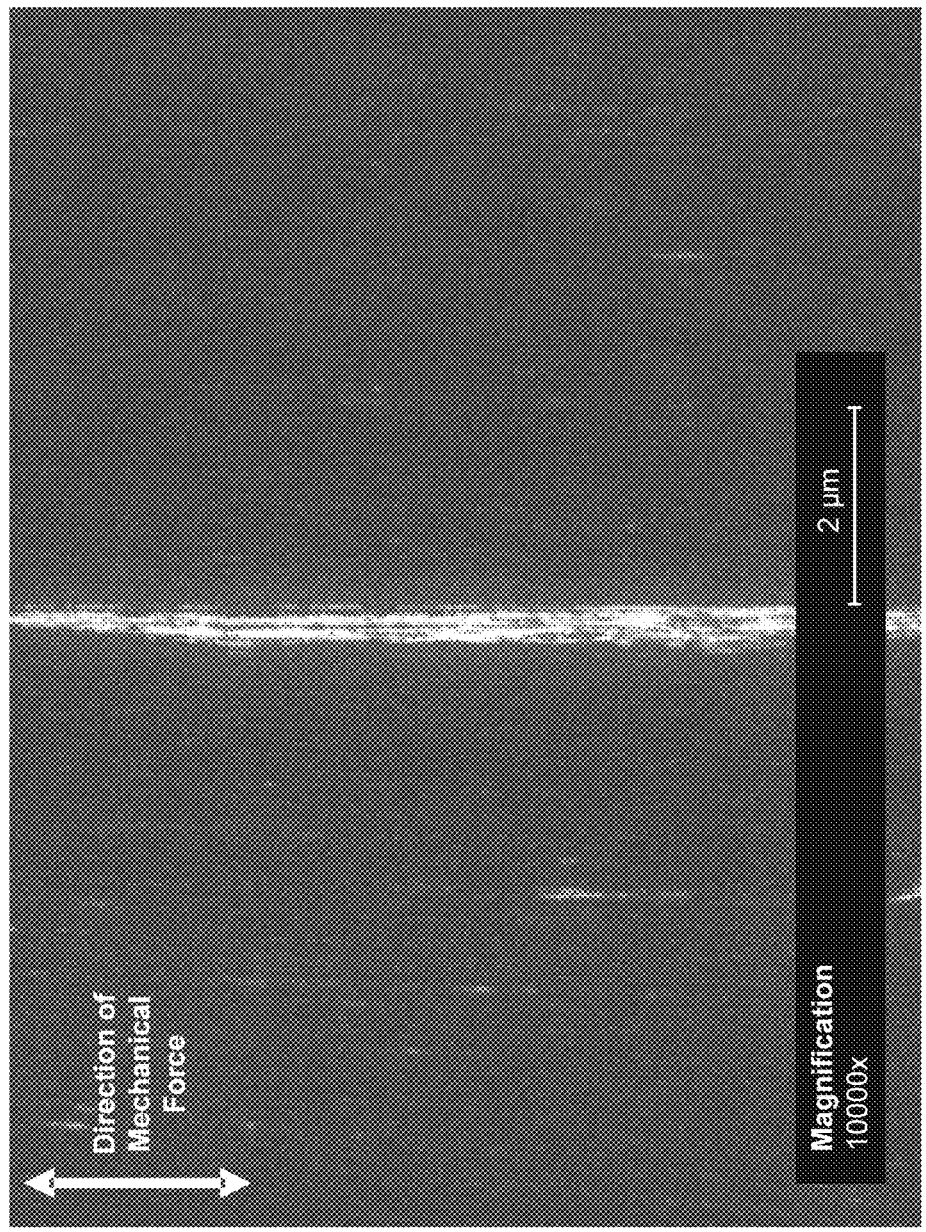
Figure 39D:
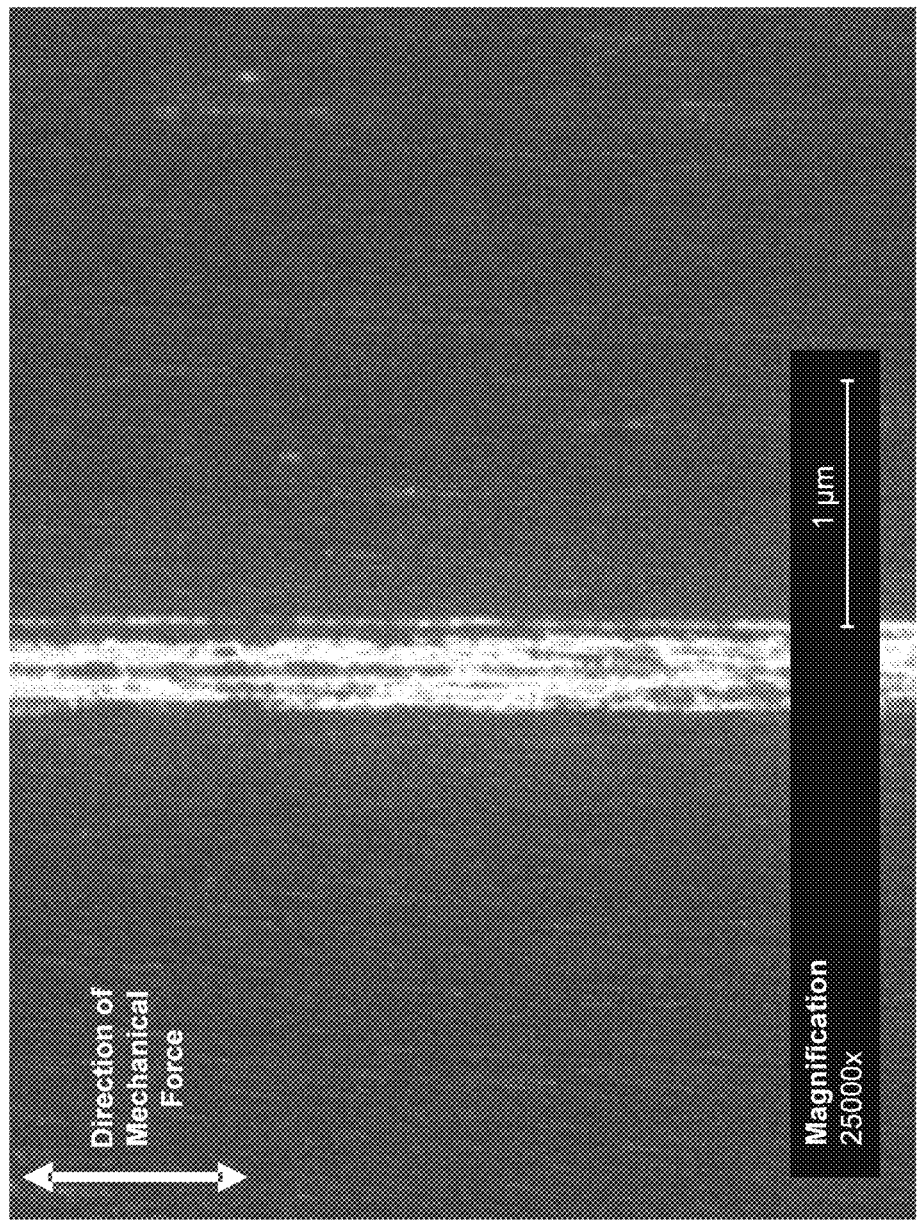

FIGS. 39A-39D are SEM images depicting the formation and subsequent ordering of an exemplary nanotube fabric layer along with an exemplary layer of silicon nanowires. FIG. 39A is an SEM image 3901 of an exemplary nanotube fabric layer first formed via three spin coating operations of a purified nanotube application solution over a silicon wafer (as described above) and then coated with a layer of silicon nanowires. Specifically, monodispersed silicon nanowires (available from Sigma-Aldrich, Inc of St. Louis, Mo., model no. 730866) were applied dropwise to the formed nanotube fabric layer. Thirty drops were applied, with each drop being allowed to air dry before the subsequent drop was applied. After all thirty drops had been applied, the silicon wafer (now coated with the nanotube fabric layer and the layer of silicon nanowires) was baked at 300° C. for two minutes. FIGS. 39B-39D are SEM images of the exemplary nanotube fabric and silicon nanowire layer at different magnifications (3902, 3904, and 3904 respectively) after being rendered into an ordered network of nanotube elements through the application of a directional rubbing force. The rubbing force was applied by placing the wafer face down on a rayon polishing pad (that is, placing the wafer such that the nanotube fabric and silicon nanowire layer was positioned in direct physical contact with the rayon polishing pad) and sliding the wafer approximately four inches along the surface of the pad thirty times. The rayon polishing pad used within this example was a South Bay Technology, Inc. p/PRF12A-10 "rayon-fine polishing cloth." As is evident in FIG. 39C (the 10,000× magnification image), both the nanotube fabric layer and the silicon nanowires were rendered into an ordered state oriented along the direction of the applied rubbing force. The present example demonstrates the generality of the methods of the present disclosure for use in ordering high aspect ratio nanoscopic structures (including, but not limited to, nanotubes and nanowires).

We have described multiple techniques to minimize or substantially eliminate gaps and voids within a nanotube fabric. The techniques also can be said to control the positioning of the nanotubes within the fabric, to control the positions of gaps within the nanotube fabric, and to control the concentration of the nanotubes within the fabric. For example, these techniques can provide low porosity, high density fabrics. Further, the techniques can be described as controlling the gaps of nanotubes within the nanotube fabric. Thus, we have disclosed techniques to create devices sized to and smaller than the current lithography limits (for example, less than or equal to about 20 nm). Low porosity, high density fabrics also can be created by, for example, filling gaps in the nanotube film with additional nanotube elements.

Further, we have described a plurality of methods and apparatus for translating a directional force over a nanotube fabric layer. The selection and use of one or more of these methods in an ordering operation should, in most applications of the methods of the present disclosure, be limited only to such methods and apparatus which do not damage or otherwise ablate the nanotubes within the nanotube fabric layer being operated on.

Further, it should be understood to one of skill in the art that the ordered nanotube fabrics produced by the methods disclosed herein can be used in any device, article or process where a thin, strong, durable film is required for a certain function. For example, the methods of the present disclosure are useful for any application using nanotube fabrics wherein the concentration of the nanotube elements within the fabric or the number or size of gaps within the fabric are required to fit within a preselected tolerance.

Although the present invention has been described in relation to particular embodiments thereof, many other variations and modifications and other uses will become apparent to those skilled in the art. It is preferred, therefore, that the present invention not be limited by the specific disclosure herein, but rather be defined by the appended claims; and that these claims will encompass modifications of and improvements to what has been described.

What is claimed is:

1. A method for arranging nanotube elements within a nanotube fabric, comprising:
   providing a plurality of nanotube elements over a material layer to obtain a substantially dry, fully formed, fixed nanotube fabric comprising a plurality of nanotube elements in a first operation, wherein said nanotube fabric is substantially free of any suspension medium; and
   translating a rotational force over at least a portion of said substantially dry, fully formed, fixed nanotube fabric in a second operation to arrange at least a portion of said nanotube elements into an ordered network;
   wherein said second operation is performed subsequent to said first operation; and
   wherein said rotational force arranges said nanotube elements within said portion of said nanotube fabric into a plurality of ordered regions, wherein each ordered region is comprised of nanotube elements in a substantially uniform orientation.

2. The method of claim 1 wherein said rotational force is applied over said portion of said portion of said nanotube fabric at least once.

3. The method of claim 1 further comprising repeatedly applying said rotational force to said portion of said nanotube fabric.

4. The method of claim 1 wherein said material layer is rigid.

5. The method of claim 4 wherein said material layer is selected from a group consisting of elemental silicon, silicon oxide, silicon nitride, silicon carbides, PTFE, organic polymers, pvc, styrenes, polyvinyl alcohol, polyvinyl acetate, hydrocarbon polymers, inorganic backbone, boron nitride, gallium arsenide, group III/V compounds, group II/VI compounds, wood, metals, metal alloys, metal oxides, ceramics, and glass.

6. The method of claim 1 wherein said material layer is a rigid structural composite.

7. The method of claim 1 wherein said material layer is flexible.

8. The method of claim 7 wherein said material is selected from a group consisting of polyethylene terephthalate (PET), polymethylmethacrylate, polyamides, polysulfones, and polycyclic olefins.

9. The method of claim 1 wherein applying said rotational force arranges at least a portion of said nanotube fabric into a preselected orientation within at least one preselected region of said nanotube fabric.

10. The method of claim 1 further comprising depositing a lubricating medium over a portion of said nanotube fabric prior to said application of said rotational force.

11. The method of claim 10 wherein said lubricating medium is comprised of at least one material selected from the list consisting of water, halocarbon liquids, liquefied gases, hydrocarbon liquids, functionalized organic liquids, organo-siloxane based cyclics, linear liquids, molybdenum disulfide, boron nitride, graphite, and styrene beads.

12. The method of claim 1 wherein said nanotube fabric is formed via one of a spin coating operation, a spray coating operation, a dip coating operation, a silk screen printing operation, or a gravure printing operation.

13. The method of claim 1 wherein said nanotubes are carbon nanotubes.

14. The method of claim 1 wherein said nanotube fabric is a composite mixture of carbon nanotubes and other materials.

15. The method of claim 14 wherein said other materials are selected from the group consisting of buckyballs, amorphous carbon, silver nanotubes, quantum dots, colloidal silver, monodisperse polystyrene beads, and silica particles.

16. The method of claim 1 wherein said nanotube elements are functionalized carbon nanotubes.

17. The method of claim 16 wherein said functionalized carbon nanotubes are carbon nanotubes affixed with moieties which provide an electrically insulating barrier over the sidewalls of said carbon nanotubes.

18. The method of claim 17 wherein said moieties are organic functional groups.

19. The method of claim 17 wherein said moieties are silicon functional groups.

20. The method of claim 17 wherein said moieties include at least one of organosilicate, silicon oxide, organo silicon oxide, methylsilsequioxane, hydrogen silsequioxane, organosiloxane, dimethylsiloxane/polyorgano ether, organopolymer, DNA, and polyamide.

21. The method of claim 1 wherein said rotational force is applied through a polishing element.

22. The method of claim 21 wherein said polishing element in rotated within a plane parallel to said nanotube fabric layer.

23. The method of claim 21 wherein said polishing element comprises at least one of polyester microfiber, polyamide microfiber, polyester, polyamide, styrene, polyvinylalcohol foam, cotton, wool, cellulose, and rayon.

24. The method of claim 1 wherein said rotational force is applied to said nanotube fabric through an intervening material.

25. The method of claim 1 wherein said ordered regions are substantially free of gaps and voids.

26. The method of claim 1 wherein the orientation of nanotube elements within said ordered regions is responsive to the direction of said applied rotational force.

27. A method for arranging nanotube elements within a nanotube fabric, comprising:
- providing a plurality of nanotube elements over a material layer to obtain a substantially dry, fully formed, fixed nanotube fabric comprising a plurality of nanotube elements in a first operation, wherein said nanotube fabric is substantially free of any suspension medium; and
- translating a rotational force over at least a portion of said substantially dry, fully formed, fixed nanotube fabric in a second operation to arrange at least a portion of said nanotube elements into an ordered network;
- wherein said second operation is performed subsequent to said first operation; and
- wherein said rotational force arranges said nanotube elements such that said portion of said nanotube fabric is substantially free of gaps and voids.

* * * * *